(12) United States Patent
Babaei

(10) Patent No.: US 11,405,147 B2
(45) Date of Patent: Aug. 2, 2022

(54) ENHANCED WIRELESS DEVICE AND WIRELESS NETWORK PROCESSES

(71) Applicant: Alireza Babaei, Fairfax, VA (US)

(72) Inventor: Alireza Babaei, Fairfax, VA (US)

(73) Assignee: PanPsy Technologies, LLC, Fairfax, VA (US)

( * ) Notice: Subject to any disclaimer, the term of this patent is extended or adjusted under 35 U.S.C. 154(b) by 0 days.

(21) Appl. No.: 17/480,041

(22) Filed: Sep. 20, 2021

(65) Prior Publication Data

US 2022/0094484 A1 Mar. 24, 2022

Related U.S. Application Data

(60) Provisional application No. 63/080,739, filed on Sep. 20, 2020.

(51) Int. Cl.
*H04L 1/18* (2006.01)
*H04W 72/12* (2009.01)
*H04W 76/28* (2018.01)

(52) U.S. Cl.
CPC .......... *H04L 1/1819* (2013.01); *H04L 1/1896* (2013.01); *H04W 72/1263* (2013.01); *H04W 72/1289* (2013.01); *H04W 76/28* (2018.02)

(58) Field of Classification Search
CPC ... H04W 28/04; H04W 72/04; H04W 72/042; H04W 88/08; H04W 76/28; H04W 72/1263; H04W 72/1289; H04L 5/0007; H04L 1/1896; H04L 1/1819
USPC ........................................................ 370/329
See application file for complete search history.

(56) References Cited

U.S. PATENT DOCUMENTS

| 2019/0158229 A1* | 5/2019 | Wei ...................... H04L 1/1848 |
| 2019/0199503 A1* | 6/2019 | Son ...................... H04L 5/0053 |
| 2019/0215897 A1 | 7/2019 | Babaei et al. |
| 2020/0275474 A1* | 8/2020 | Chen ........................ H04L 1/08 |

OTHER PUBLICATIONS

3GPP TSG-RAN WG2 #111e, Electronic Meeting, Aug. 17-28, 2020, Tdoc-2006700, Agenda item: 8.5.3, Source: Ericsson, Title: Uplink enhancements for URLLC in unlicensed controlled environments. (Year: 2020).*
3GPP TSG-RAN WG1 Meeting #102-e, e-Meeting, Aug. 17-28, 2020, R1-2007059, Agenda item: 8.3.1.1, Source: Moderator (Nokia), Title: Feature lead summary #1, on Rel 17 HARQ-ACK feedback enhancements for NR-Rel 17, URLLC/IIoT (AI 8.3.1.1). (Year: 2020).*
3GPP TSG RAN WG1 #102-e, e-Meeting, Aug. 17-28, 2020, R1-2006899, Agenda Item: 8.3.1.1, Source: Google, Inc., Title: HARQ enhancement for SPS. (Year: 2020).*

(Continued)

*Primary Examiner* — Peter G Solinsky
*Assistant Examiner* — Sanjay K Dewan
(74) *Attorney, Agent, or Firm* — Alireza Babaei

(57) ABSTRACT

A wireless device may receive, in a first timing, a TB associated with a semi-persistent scheduling configuration. The wireless device may start a DRX retransmission timer in a first symbol after the first timing in response to determining to defer a HARQ feedback, associated with the TB, from a second timing to a later timing based on the second timing not being valid for transmission of the HARQ feedback.

20 Claims, 57 Drawing Sheets

(56) References Cited

OTHER PUBLICATIONS

3GPP TSG RAN WG1 #102-e, e-Meeting, Aug. 17-28, 2020, R1-2005374, Source: vivo, Title: HARQ-ACK enhancements for Rel-17 URLLC, Agenda item: 8.3.1.1. (Year: 2020).*
3GPP TSG RAN WG1 #102-e; R1-2006730; e-Meeting, Aug. 17-28, 2020; Source: NTT Docomo, Inc.; Title: Discussion on enhancements for unlicensed band URLLC; Agenda Item: 8.3.2; Document for: Discussion and Decision.
3GPP TSG RAN WG1 #102-e; R1-2006799; e-Meeting, Aug. 17-28, 2020; Agenda item: 8.3.1.1; Source: Qualcomm Incorporated; Title: HARQ-ACK enhancement for IOT and URLLC; Document for: Discussion/Decision.
3GPP TSG-RAN WG1 Meeting #102-e; e-Meeting, Aug. 17-28, 2020; R1-2006801; Agenda item: 8.3.2; Source: Qualcomm Incorporated; Title: uplink enhancements for URLLC in unlicensed controlled environments Document for: Discussion/Decision.
3GPP TSG RAN WG1 #102-e; R1-2006887; e-Meeting, Aug. 17-28, 2020; Source: WILUS Inc.; Title: Discussion on HARQ-ACK enhancement for IIoT/URLLC; Agenda item: 8.3.1.1; Document for: Discussion/Decision.
3GPP TSG RAN WG1 #102-e; R1-2006888; e-Meeting, Aug. 17-28, 2020; Source: WILUS Inc.; Title: Discussion on enhancement for unlicensed URLLC/IIoT; Agenda item: 8.3.2; Document for: Discussion.
3GPP TSG RAN WG1 #102-e; R1-2006899; e-Meeting, Aug. 17-28, 2020; Agenda Item: 8.3.1.1; Source: Google, Inc.; Title: HARQ enhancement for SPS; Document for: Discussion and decision.
3GPP TSG RAN WG1 Meeting #102-e; R1-2006929; E-meeting, Aug. 17-28, 2020; Agenda Item: 8.3.2; Source: Huawei, HiSilicon; Title: Uplink enhancements for URLLC in unlicensed controlled environments; Document for: Discussion and Decision.
3GPP TSG-RAN WG1 Meeting #102-e; R1-2007059; e-Meeting, Aug. 17-28, 2020; Agenda item: 8.3.1.1; Source: Moderator (Nokia); Title: Feature lead summary #1 on Rel-17 HARQ-ACK feedback enhancements for NR; Rel-17 URLLC/IIoT (AI 8.3.1.1); Document for: Discussion and Decision.
3GPP TSG RAN WG1 Meeting #102-e; R1-2007069; e-Meeting, Aug. 17-28, 2020; Agenda item: 8.3.2; Source: Moderator (Ericsson); Title: Summary#1 on enhancements for unlicensed band URLLC/IIoT for R17; Document for: Discussion and Decision.
3GPP TSG-RAN WG1 Meeting#102-e; R1-20XXXXX; e-Meeting, Aug. 17-28, 2020; Agenda item: 8.3.1.1; Source: Moderator (Nokia); Title: Feature lead summary #2 on HARQ-ACK feedback enhancements for NR Rel-17 URLLC/IIoT (AI 8.3.1.1); Document for: Discussion and Decision.
3GPP TSG-RAN WG1 Meeting #102-e; R1-2007216; e-Meeting, Aug. 17-28, 2020; Agenda item: 8.3.1.1; Source: Moderator (Nokia); Title: Feature lead summary #3 on HARQ-ACK feedback enhancements for NR Rel-17 URLLC/IIoT (AI 8.3.1.1); Document for: Discussion and Decision.
3GPP TSG RAN WG1 Meeting #102-e; R1-2007228; e-Meeting, Aug. 17-28, 2020; Agenda item: 8.3.2; Source: Moderator (Ericsson); Title: Summary#2 on enhancements for unlicensed band URLLC/IIoT for R17; Document for: Discussion and Decision.
3GPP TSG RAN WG1 #102-e; R1-2007286; e-Meeting, Aug. 17-28, 2020; Agenda Item: 8.3.1.2; Source: Moderator (InterDigital, Inc.); Title: Feature lead summary #3 on CSI feedback enhancements for enhanced URLLC/IIoT; Document for: Discussion and Decision.
3GPP TSG RAN WG1 Meeting #102-e; R1-2007301; e-Meeting, Aug. 17-28, 2020; Agenda item: 8.3.2; Source: Moderator (Ericsson); Title: Summary#3 on enhancements for unlicensed band URLLC/IIoT for R17; Document for: Discussion and Decision.
3GPP TSG RAN WG1 Meeting #102-e; R1-2007332; e-Meeting, Aug. 17-28, 2020; Agenda item: 8.3.2; Source: Moderator (Ericsson); Title: Summary#3 on enhancements for unlicensed band URLLC/IIoT for R17; Document for: Discussion and Decision.
3GPP TSG-RAN WG1 Meeting #102-e; R1-2007354; e-Meeting, Aug. 17-28, 2020; Agenda item: 8.3.1.1; Source: Moderator (Nokia); Title: Feature lead summary #4 on HARQ-ACK feedback enhancements for NR Rel-17 URLLC/IIoT (AI 8.3.1.1); Document for: Discussion and Decision.
3GPP TSG RAN WG1 Meeting #102-e; R1-2007391; e-Meeting, Aug. 17-28, 2020; Agenda item: 8.3.2; Source: Moderator (Ericsson); Title: Summary#5 on enhancements for unlicensed band URLLC/IIoT for R17 Document for: Discussion and Decision.
3GPP TSG-RAN WG2 #111-e; R2-2006636; Electronic meeting, Aug. 17-28, 2020; Source: CATT; Title: Uplink Enhancements for URLLC in Unlicensed Spectrum; Agenda Item: 8.5.3; Document for: Discussion and Decision.
3GPP TSG-RAN WG2 Meeting #111-e; R2-2006696; Online, Aug. 17-28, 2020; Agenda item: 8.5.3; Source: Huawei, HiSilicon; Title: Discussion about uplink enhancements for URLLC in unlicensed controlled environments; Document for: Discussion and Decision.
3GPP TSG-RAN WG2 #111e; Tdoc R2-2006700; Electronic meeting, Aug. 17-28, 2020; Agenda Item: 8.5.3; Source: Ericsson; Title: Uplink enhancements for URLLC in unlicensed controlled environments; Document for Discussion.
3GPP TSG-RAN WG2 Meeting #111-e; R2-2006923; Online, Aug. 17-28, 2020; Agenda item: 8.5.3; Source: Nokia, Nokia Shanghai Bell; Title: Configured Grant Enhancement Harmonization for NR-U and URLLC; WID/SID: NR_IIOT_URLLC_enh; Document for: Discussion and Decision.
3GPP TSG-RAN WG2 Meeting #111-e; R2-2006939; Electronic meeting, Aug. 17-28, 2020; Agenda item: 8.5.3; Source: Intel Corporation; Title: Uplink enhancements for URLLC in unlicensed controlled environments; Document for: Discussion and Decision.
3GPP TSG-RAN WG2 #111-e; R2-2007139; E-meeting, Aug. 2020; Agenda Item: 8.5.3; Source: OPPO; Title: Consideration on URLLC over NRU; Document for: Discussion, Decision.
3GPP TSG RAN WG2#111 electronic; R2-2007146; e-Meeting, Aug. 17-28, 2020; Source: vivo; Title: Harmonizing CG enhancements in NR-U and URLLC/IIoT; Agenda Item: 8.5.3; Document for: Discussion and Decision.
3GPP TSG-RAN WG2 Meeting #111 electronic; R2-2007204; E-meeting, Aug. 17-28, 2020; Agenda item: 8.5.3; Source: Lenovo, Motorola Mobility; Title: Potential aspects to be considered for the enhancements for URLLC in unlicensed controlled environments; Document for: Discussion and Decision.
3GPP TSG-RAN WG2 #111e; R2-2007417; Online, Aug. 17-28, 2020; Agenda Item: 8.5.3; Source: CMCC; Title: Discussion on CG enhancement for URLLC in unlicensed controlled environments; Document for: Discussion and Decision.
3GPP TSG-RAN WG2 #111 E-meeting; R2-2007532; E-Meeting, Monday-Friday Aug. 17-28; Agenda item: 8.5.3; Source: ZTE , Sanechips; Title: Disscusion on the hormination of enhanced configured grant in NRIIOT and NRU; Document for: Discussion and Decision.
3GPP RAN WG2 Meeting #111-e; R2-2007614; Aug. 17-28, 2020; Agenda Item: 8.6.2; Source: InterDigital; Title: IIoT operation in unlicensed controlled environments; Document for: Discussion, Decision.
3GPP TSG-RAN WG2 Meeting #111 electronic; R2-2007884; Online, Aug. 17-28, 2020; Title Support of IIoT on Unlicensed spectrum; Source LG Electronics; Document for Discussion and Decision; Agenda Item 8.5.3 Uplink enhancements for URLLC in unlicensed controlled environments; WID/SID NR_IITO_URLLC_enh-Core.
3GPP TSG-RAN WG2 Meeting #111-e; R2-2007958; Electronic, Aug. 17-28, 2020; Agenda item: 8.5.3; Source: Qualcomm Incorporated; Title: Uplink enhancements for controlled unlicensed operation; Document for: Discussion and decision.
3GPP TSG-RAN WG2 Meeting #111 electronic; R2-2007988; Online, Aug. 17-28, 2020; Agenda item: 8.5.3; Source: III; Title: Consideration on timers for URLLC/IIoT in unlicensed controlled environments; Document for: Discussion.
3GPP TSG-RAN WG2 Meeting #111 electronic; R2-2008060; Online, Aug. 17-28, 2020; Agenda item: 8.5.3; Source: Samsung; Title: CG Harmonization for IIOT in Unlicensed Band; Document for: Discussion & Decision.

(56) References Cited

OTHER PUBLICATIONS

3GPP TS 38.211 V16.2.0 (Jun. 2020); Technical Specification; 3rd Generation Partnership Project; Technical Specification Group Radio Access Network; NR; Physical channels and modulation; (Release 16).
3GPP TS 38.212 V16.2.0 (Jun. 2020); Technical Specification; 3rd Generation Partnership Project; Technical Specification Group Radio Access Network; NR; Multiplexing and channel coding; (Release 16).
3GPP TS 38.213 V16.2.0 (Jun. 2020); Technical Specification; 3rd Generation Partnership Project Technical Specification Group Radio Access Network; NR; Physical layer procedures for control; (Release 16).
3GPP TS 38.214 V16.2.0 (Jun. 2020); Technical Specification; 3rd Generation Partnership Project; Technical Specification Group Radio Access Network; NR; Physical layer procedures for data; (Release 16).
3GPP TS 38.300 V16.2.0 (Jul. 2020); Technical Specification; 3rd Generation Partnership Project; Technical Specification Group Radio Access Network; NR; NR and NG-RAN Overall Description; Stage 2; (Release 16).
3GPP TS 38.321 V16.1.0 (Jul. 2020); Technical Specification; 3rd Generation Partnership Project; Technical Specification Group Radio Access Network; NR; Medium Access Control (MAC) protocol specification; (Release 16).
3GPP TS 38.331 V16.1.0 (Jul. 2020); Technical Specification; 3rd Generation Partnership Project; Technical Specification Group Radio Access Network; NR; Radio Resource Control (RRC); Protocol specification; (Release 16).
3GPP TSG RAN WG1 Meeting #102-e; R1-2005243; E-meeting, Aug. 17-28, 2020; Agenda Item: 8.3.1.1; Source: Huawei, HiSilicon; Title: UE feedback enhancements for HARQ-ACK; Document for: Discussion and Decision.
3GPP TSG RAN WG1#102-e; R1-2005374; e-Meeting, Aug. 17-28, 2020; Source: vivo; Title: HARQ-ACK enhancements for Rel-17 URLLC; Agenda Item: 8.3.1.1; Document for: Discussion and Decision.
3GPP TSG RAN WG1#102-e ; R1-2005376; e-Meeting, Aug. 17-28, 2020; Source: vivo; Title: Enhancements for unlicensed band URLLC/IIoT; Agenda Item: 8.3.2.; Document for: Discussion and Decision.
3GPP TSG RAN WG1 Meeting #102-e; R1-2005431; e-Meeting, Aug. 17-28, 2020; Source: ZTE; Title: Discussion on HARQ-ACK enhancements for eURLLC; Agenda item: 8.3.1.1; Document for: Discussion and Decision.
3GPP TSG RAN WG1 Meeting #102-e; R1-2005433; e-Meeting, Aug. 17-28, 2020; Source: ZTE; Title: Discussion on unlicensed band URLLC/IIoT; Agenda item: 8.3.2; Document for: Discussion and Decision.
3GPP TSG-RAN WG1 Meeting #102-e; R1-2005513; e-Meeting, Aug. 17-28, 2020; Agenda Item: 8.3.1.1; Source: Ericsson; Title: HARQ-ACK Enhancements for IIoT/URLLC; Document for: Discussion, Decision.
3GPP TSG-RAN WG1 Meeting #102-e; R1-2005515; e-Meeting, Aug. 17-28, 2020; Agenda Item: 8.3.2; Source: Ericsson; Title: Enhancements for IIoT/URLLC on Unlicensed Band; Document for: Discussion, Decision.
3GPP TSG RAN WG1 #102-e; R1-2005569; e-Meeting, Aug. 17-28, 2020; Agenda Item: 8.3.1.1; Source: Sony; Title: HARQ-ACK enhancement to reduce retransmission time; Document for: Discussion / decision.
3GPP TSG RAN WG1 #102-e; R1-2005571; e-Meeting, Aug. 17-28, 2020; Agenda Item: 8.3.2; Source: Sony; Title: Enhancements for unlicensed band URLLC/IIoT; Document for: Discussion / Decision.
3GPP TSG RAN WG1 Meeting #102-e; R1-2005633; e-Meeting, Aug. 17-28, 2020; Agenda Item: 8.3.1.1; Source: MediaTek Inc.; Title: On UE feedback enhancements for HARQ-ACK; Document for: Discussion and Decision.
3GPP TSG RAN WG1 Meeting #102-e; R1-2005635; e-Meeting, Aug. 17-28, 2020; Agenda Item: 8.3.2; Source: MediaTek Inc.; Title: On the enhancements for unlicensed band URLLC/IIoT; Document for: Discussion and Decision.
3GPP TSG RAN WG1 #102-e; R1-2005701; e-Meeting, Aug. 17-28, 2020; Source: CATT; Title: UE feedback enhancements for HARQ-ACK; Agenda Item: 8.3.1.1; Document for: Discussion and Decision.
3GPP TSG RAN WG1 #102-e; R1-2005703; e-Meeting, Aug. 17-28, 2020; Source: CATT; Title: Enhancements for unlicensed band URLLC/IIoT; Agenda Item: 8.3.2; Document for: Discussion and Decision.
3GPP TSG RAN WG1 #102; R1-2005736; e-Meeting, Aug. 17-28, 2020; Agenda item: 8.3.2; Source: Xiaomi; Title: Enhancement for unlicensed band URLLC/IIoT; Document for: Discussion.
3GPP TSG RAN WG1 #102-e; R1-2005760; e-Meeting, Aug. 17-28, 2020; Source: NEC; Title: Enhancements on URLLC HARQ-ACK feedback; Agenda Item: 8.3.1.1; Document for: Discussion and Decision.
3GPP TSG RAN WG1 #102-e; R1-2005768; e-Meeting, Aug. 17-28, 2020; Agenda item: 8.3.2; Source: TCL; Title: Enhancements for unlicensed band URLLC/IIoT; Document for: Discussion and Decision.
3GPP TSG RAN WG1 #102-e; R1-2005869; e-Meeting, Aug. 17-28, 2020; Source: Intel Corporation; Title: UE HARQ feedback enhancements in Release 17 URLLC/IIoT; Agenda item: 8.3.1.1; Document for: Discussion and Decision.
3GPP TSG RAN WG1 Meeting #102-E; R1-2005871; E-Meeting, Aug. 17-28, 2020; Source: Intel Corporation; Title: Uplink Enhancements for URLLC Operating in Unlicensed Spectrum; Agenda item: 8.3.3; Document for: Discussion/Decision.
3GPP TSG RAN WG1 Meeting #102-e; R1-2005929; e-Meeting, Aug. 17-28, 2020; Agenda item: 8.3.1.1; Source: Lenovo, Motorola Mobility; Title: HARQ-ACK feedback enhancement for IIoT/URLLC; Document for: Discussion.
3GPP TSG RAN WG1 #102-e; R1-2005931; e-Meeting, Aug. 17-28, 2020; Agenda Item: 8.3.2; Source: Lenovo, Motorola Mobility; Title: Enhancements for unlicensed band URLLC/IIoT; Document for: Discussion.
3GPP TSG RAN WG1 Meeting #102-e; R1-2005967; e-Meeting, Aug. 17-28, 2020; Agenda Item: 8.3.1.1; Source: TCL Communication; Title: UE feedback enhancements for HARQ-ACK; Document for: Discussion and decision.
3GPP TSG RAN WG1 #102-e; R1-2006058; e-Meeting, Aug. 17-28, 2020; Source: OPPO; Title: HARQ-ACK enhancements for Rel-17 URLLC/IIoT; Agenda Item: 8 3.1 1; Document for: Discussion and Decision.
3GPP TSG RAN WG1 #102-e; R1-2006060; e-Meeting, Aug. 17-28, 2020; Source: OPPO; Title: Enhancements for unlicensed band URLLC/IIoT; Agenda Item: 8.3.2; Document for: Discussion and Decision.
3GPP TSG RAN WG1 #102-e; R1-2006070; e-Meeting, Aug. 17-28, 2020; Agenda Item: 8.3.1.1; Source: InterDigital, Inc.; Title: UE HARQ-ACK Feedback enhancements; Document for: Discussion and Decision.
3GPP TSG RAN WG1 #102-e; R1-2006072; e-Meeting, Aug. 17-28, 2020; Agenda Item: 8.3.2; Source: InterDigital, Inc.; Title: Enhancements for unlicensed band URLLC/IIoT; Document for: Discussion and Decision.
3GPP TSG RAN WG1 #102-e; R1-2006139; e-Meeting, Aug. 17-28, 2020; Agenda Item: 8.3.1.1; Source: Samsung; Title: HARQ-ACK feedback enhancements for Rel-17 URLLC/IIoT; Document for: Discussion and decision.
3GPP TSG RAN WG1 #102-e; R1-2006141; e-Meeting, Aug. 17-28, 2020; Agenda item: 8.3.2; Source: Samsung; Title: Enhancements for unlicensed band URLLC/IIoT; Document for: Discussion and Decision.
3GPP TSG RAN WG1 #102-e; R1-2006207; e-Meeting, Aug. 17-28, 2020; Agenda item: 8.3.1.1; Title: Discussion on UE feedback enhancements for HARQ-ACK; Source: CMCC; Document for: Discussion and Decision.
3GPP TSG RAN WG1 Meeting #102-e; R1-2006247; e-Meeting, Aug. 17-28, 2020; Agenda item: 8.3.2; Source: Nokia, Nokia

(56) References Cited

OTHER PUBLICATIONS

Shanghai Bell; Title: On UL enhancements for IIoT/URLLC in unlicensed controlled environment; Document for: Discussion and Decision.
3GPP TSG RAN WG1 #102-e; R1-2006252; e-Meeting, Aug. 17-28, 2020; Agenda item: 8.3.1.1; Source: Spreadtrum Communications; Title: Discussion on necessity and support of Physical Layer feedback enhancements; Document for: Discussion and decision.
3GPP TSG RAN WG1 #102-e; R1-2006277; e-Meeting, Aug. 17-28, 2020; Agenda item: 8.3.1.2; Source: Spreadtrum Communications; Title: Discussion on enhancements for unlicensed band URLLCIIoT; Document for Discussion and decision.
3GPP TSG RAN WG1 #102-e; R1-2006314; e-Meeting, Aug. 17-28, 2020; Agenda Item: 8.3.1.1; Source: LG Electronics; Title: Discussion on UE feedback enhancement for HARQ-ACK; Document for: Discussion and decision.
3GPP TSG RAN WG1 #102-e; R1-2006316; e-Meeting, Aug. 17-28, 2020; Agenda Item: 8.3.2; Source: LG Electronics; Title: Discussion on unlicensed band URLLC/IIOT; Document for: Discussion and decision.
3GPP TSG RAN WG1 Meeting #102-e; R1-2006339; e-Meeting, Aug. 17-28, 2020; Agenda item: 8.3.1.1; Source: Nokia, Nokia Shanghai Bell; Title: On the necessity and support of Rel-17 URLLC HARQ-ACK feedback enhancements; Document for: Discussion and Decision.
3GPP TSG RAN WG1 #102-e; R1-2006342; e-Meeting, Aug. 17-28, 2020; Source: Panasonic; Title: Discussion on UE feedback enhancements for HARQ-ACK; Agenda Item: 8.3.1.1; Document for: Discussion.
3GPP TSG RAN WG1 #102-e; R1-2006344; e-Meeting, Aug. 17-28, 2020; Source: Panasonic; Title: Enhancements for unlicensed band URLLC/IIoT; Agenda Item: 8.3 2; Document for: Discussion.
3GPP TSG RAN WG1 #102-e; R1-2006356; e-Meeting, Aug. 17-28, 2020; Source: ETRI; Title: Discussion on enhancements for URLLC in unlicensed bands; Agenda Item: 8.3.2 Enhancements for unlicensed band URLLC/IIoT Document for: Discussion/Decision.
3GPP TSG RAN WG1 #102; R1-2006514; e-Meeting, Aug. 17-28, 2020; Agenda Item: 8.3.1.1; Source: Apple Inc.; Title: UE feedback enhancements for HARQ-ACK; Document for: Discussion/Decision.
3GPP TSG RAN WG1 #102-e; R1-2006516; e-Meeting, Aug. 17-28, 2020; Agenda Item: 8.3.2; Source: Apple Inc.; Title: URLLC uplink enhancements for unlicensed spectrum; Document for: Discussion/Decision.
3GPP TSG RAN WG1#102-e; R1-2006572; eMeeting, Aug. 17-28, 2020; Source: Sharp; Title: UE feedback enhancements for HARQ-ACK; Agenda Item: 8.3.1 1; Document for: Discussion and Decision.
3GPP TSG RAN WG1#102-e; R1-2006574; eMeeting, Aug. 17-28, 2020; Source: Sharp; Title: Potential enhancements for unlicensed band URLLC/IIoT; Agenda Item: 8.3.2; Document for: Discussion and Decision.
3GPP TSG-RAN WG1 Meeting #102-e; R1-2006639; e-Meeting, Aug. 17-28, 2020; Source: Asia Pacific Telecom; Title: Discussion on HARQ-ACK enhancements; Agenda item: 8.3.1.1; Document for: Discussion and Decision.
3GPP TSG-RAN WG1 Meeting #102-e; R1-2006651; e-Meeting, Aug. 17-28, 2020; Agenda item: 8.3.2; Source: Charter Communications; Title: Considerations for Unlicensed IIoT; Document for: Discussion.
Invitation to Pay Additional Fees from the International Searching Authority dated Dec. 21, 2021, in International Application No. PCT/US2021/051148.
PCT International Search Report and the Written Opinion from the International Searching Authority dated Feb. 11, 2022, in International Application No. PCT/US2021/051148.

* cited by examiner

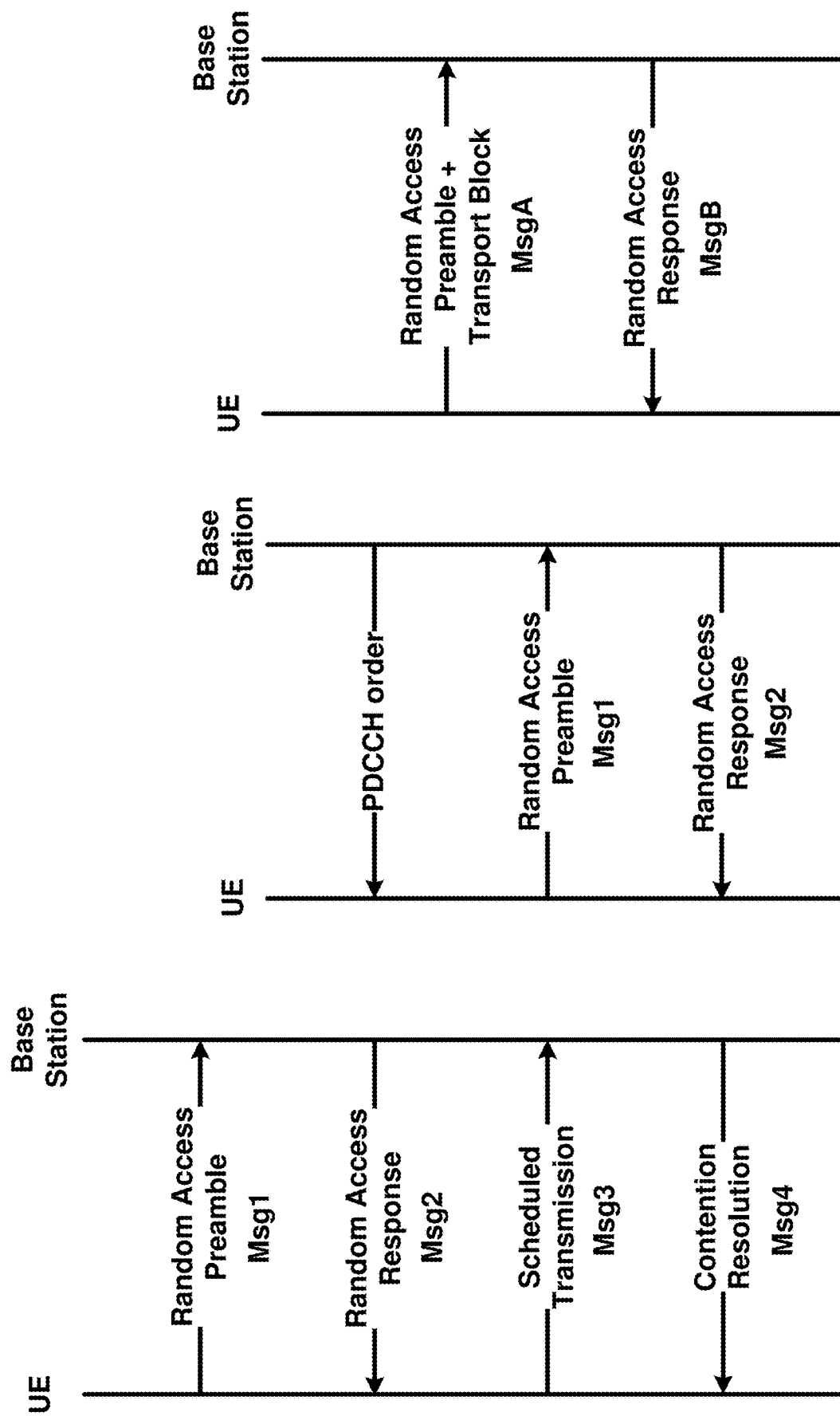

Receive, in a 1st timing, a TB associated with a SPS configuration

4610

Determine a 2nd timing of a HARQ feedback, associated with the TB, based on a DCI and the 1st timing

4620

Start the HARQ RTT timer in a 1st symbol after a 3rd timing in response to determining to defer the HARQ feedback, from the 2nd timing to the 3rd timing, based on the 2nd timing not being valid for transmission of the HARQ feedback

```
┌─────────────────────────────────────────────────────────────┐
│ Determine to skip transmission of HARQ feedback(s), scheduled│
│ for transmission in a 1st timing, based on the HARQ feedback(s)│
│           being negative acknowledgements                    │
│                                                              │
│                          4910                                │
└─────────────────────────────────────────────────────────────┘
                              │
                              ▼
┌─────────────────────────────────────────────────────────────┐
│ Transmit an indication that the wireless device skips transmission│
│         of the HARQ feedback(s) in the 1st timing            │
│                                                              │
│                          4920                                │
└─────────────────────────────────────────────────────────────┘
```

FIG. 49

```
┌─────────────────────────────────────────────────────────────┐
│ Transmit repetitions of a HARQ feedback, associated with a TB, │
│              via uplink control channels                    │
│                                                             │
│                          5110                               │
└─────────────────────────────────────────────────────────────┘
                              │
                              ▼
┌─────────────────────────────────────────────────────────────┐
│ Start a HARQ RTT timer on a 1st symbol after transmission of the │
│   HARQ feedback via a 1st uplink control channel of the uplink   │
│                     control channels                        │
│                                                             │
│                          5120                               │
└─────────────────────────────────────────────────────────────┘
```

FIG. 51

ENHANCED WIRELESS DEVICE AND WIRELESS NETWORK PROCESSES

CROSS-REFERENCE TO RELATED APPLICATIONS

This application claims the benefit of U.S. Provisional Application No. 63/080,739, filed Sep. 20, 2020, which is hereby incorporated by reference in its entirety.

BRIEF DESCRIPTION OF THE DRAWINGS

FIG. 12A, FIG. 12B and FIG. 12C show example random access processes in accordance with several of various embodiments of the present disclosure.

FIG. 46 shows an example flow diagram in accordance with several of various embodiments of the present disclosure.

FIG. 49 shows an example flow diagram in accordance with several of various embodiments of the present disclosure.

FIG. 51 shows an example flow diagram in accordance with several of various embodiments of the present disclosure.

DETAILED DESCRIPTION

The exemplary embodiments of the disclosed technology enhance processes for a wireless device and/or one or more base stations. The exemplary disclosed embodiments may be implemented in the technical field of wireless communication systems. More particularly, the embodiments of the disclosed technology may relate to hybrid automatic repeat request (HARQ) and/or discontinuous reception (DRX) and/or configured grants.

The devices and/or nodes of the mobile communications system disclosed herein may be implemented based on various technologies and/or various releases/versions/amendments of a technology. The various technologies include various releases of long-term evolution (LTE) technologies, various releases of 5G new radio (NR) technologies, various wireless local area networks technologies and/or or a combination thereof and/or alike. For example, a base station may support a given technology and may communicate with wireless devices with different characteristics. The wireless devices may have different categories that define their capabilities in terms of supporting various features. The wireless device with the same category may have different capabilities. The wireless devices may support various technologies such as various releases of LTE technologies, various releases of 5G NR technologies and/or a combination thereof and/or alike. At least some of the wireless devices in the mobile communications system of the present disclosure may be stationary or almost stationary. In this disclosure, the terms "mobile communications system" and "wireless communications system" may be used interchangeably.

Figure 1A:
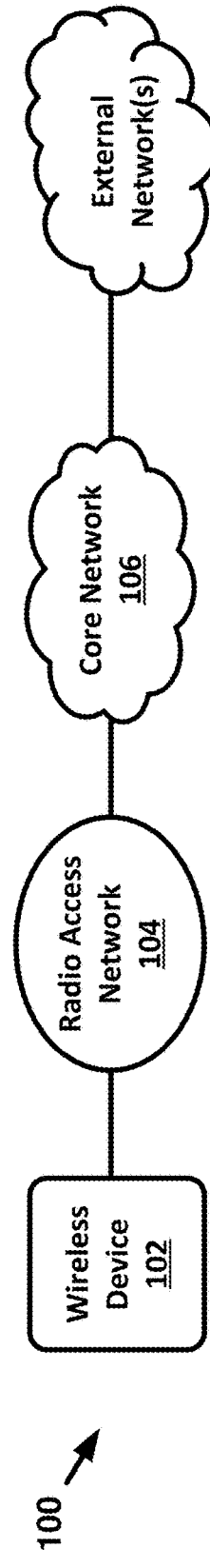
FIG. 1A and FIG. 1B show examples of mobile communications systems in accordance with several of various embodiments of the present disclosure.

FIG. 1A shows an example of a mobile communications system 100 in accordance with several of various embodiments of the present disclosure. The mobile communications system 100 may be, for example, run by a mobile network operator (MNO) or a mobile virtual network operator (MVNO). The mobile communications system 100 may be a public land mobile network (PLMN) run by a network operator providing a variety of service including voice, data, short messaging service (SMS), multimedia messaging service (MMS), emergency calls, etc. The mobile communications system 100 includes a core network (CN) 106, a radio access network (RAN) 104 and at least one wireless device 102.

The CN 106 connects the RAN 104 to one or more external networks (e.g., one or more data networks such as the Internet) and is responsible for functions such as authentication, charging and end-to-end connection establishment. Several radio access technologies (RATs) may be served by the same CN 106.

The RAN 104 may implement a RAT and may operate between the at least one wireless device 102 and the CN 106. The RAN 104 may handle radio related functionalities such as scheduling, radio resource control, modulation and coding, multi-antenna transmissions and retransmission protocols. The wireless device and the RAN may share a portion of the radio spectrum by separating transmissions from the wireless device to the RAN and the transmissions from the RAN to the wireless device. The direction of the transmissions from the wireless device to the RAN is known as the uplink and the direction of the transmissions from the RAN to the wireless device is known as the downlink. The separation of uplink and downlink transmissions may be achieved by employing a duplexing technique. Example duplexing techniques include frequency division duplexing (FDD), time division duplexing (TDD) or a combination of FDD and TDD.

In this disclosure, the term wireless device may refer to a device that communicates with a network entity or another device using wireless communication techniques. The wireless device may be a mobile device or a non-mobile (e.g., fixed) device. Examples of the wireless device include cellular phone, smart phone, tablet, laptop computer, wearable device (e.g., smart watch, smart shoe, fitness trackers, smart clothing, etc.), wireless sensor, wireless meter, extended reality (XR) devices including augmented reality (AR) and virtual reality (VR) devices, Internet of Things (IoT) device, vehicle to vehicle communications device, road-side units (RSU), automobile, relay node or any combination thereof. In some examples, the wireless device (e.g., a smart phone, tablet, etc.) may have an interface (e.g., a graphical user interface (GUI)) for configuration by an end user. In some examples, the wireless device (e.g., a wireless sensor device, etc.) may not have an interface for configuration by an end user. The wireless device may be referred to as a user equipment (UE), a mobile station (MS), a subscriber unit, a handset, an access terminal, a user terminal, a wireless transmit and receive unit (WTRU) and/or other terminology.

The at least one wireless device may communicate with at least one base station in the RAN 104. In this disclosure, the term base station may encompass terminologies associated with various RATs. For example, a base station may be referred to as a Node B in a 3G cellular system such as Universal Mobile Telecommunication Systems (UMTS), an evolved Node B (eNB) in a 4G cellular system such as evolved universal terrestrial radio access (E-UTRA), a next generation eNB (ng-eNB), a Next Generation Node B (gNB) in NR and/or a 5G system, an access point (AP) in Wi-Fi and/or other wireless local area networks. A base station may be referred to as a remote radio head (RRH), a baseband unit (BBU) in connection with one or more RRHs, a repeater or relay for coverage extension and/or any combination thereof. In some examples, all protocol layers of a base station may be implemented in one unit. In some examples, some of the protocol layers (e.g., upper layers) of the base station may be implemented in a first unit (e.g., a central unit (CU)) and some other protocol layer (e.g., lower layers) may be implemented in one or more second units (e.g., distributed units (DUs)).

A base station in the RAN 104 includes one or more antennas to communicate with the at least one wireless device. The base station may communicate with the at least one wireless device using radio frequency (RF) transmissions and receptions via RF transceivers. The base station antennas may control one or more cells (or sectors). The size and/or radio coverage area of a cell may depend on the range that transmissions by a wireless device can be successfully received by the base station when the wireless device transmits using the RF frequency of the cell. The base station may be associated with cells of various sizes. At a given location, the wireless device may be in coverage area of a first cell of the base station and may not be in coverage area of a second cell of the base station depending on the sizes of the first cell and the second cell.

A base station in the RAN 104 may have various implementations. For example, a base station may be implemented by connecting a BBU (or a BBU pool) coupled to one or more RRHs and/or one or more relay nodes to extend the cell coverage. The BBU pool may be located at a centralized site like a cloud or data center. The BBU pool may be connected to a plurality of RRHs that control a plurality of cells. The combination of BBU with the one or more RRHs may be referred to as a centralized or cloud RAN (C-RAN) architecture. In some implementations, the BBU functions may be implemented on virtual machines (VMs) on servers at a centralized location. This architecture may be referred to as virtual RAN (vRAN). All, most or a portion of the protocol layer functions (e.g., all or portions of physical layer, medium access control (MAC) layer and/or higher layers) may be implemented at the BBU pool and the processed data may be transmitted to the RRHs for further processing and/or RF transmission. The links between the BBU pool and the RRHs may be referred to as fronthaul.

In some deployment scenarios, the RAN 104 may include macrocell base stations with high transmission power levels and large coverage areas. In other deployment scenarios, the RAN 104 may include base stations that employ different transmission power levels and/or have cells with different coverage areas. For example, some base station may be macrocell base stations with high transmission powers and/or large coverage areas and other base station may be small cell base stations with comparatively smaller transmission powers and/or coverage areas. In some deployment scenarios, a small cell base station may have coverage that is within or has overlap with coverage area of a macrocell base station. A wireless device may communicate with the macrocell base station while within the coverage area of the macrocell base station. For additional capacity, the wireless device may communicate with both the macrocell base station and the small cell base station while in the overlapped coverage area of the macrocell base station and the small cell base station. Depending on their coverage areas, a small cell base station may be referred to as a microcell base station, a picocell base station, a femtocell base station or a home base station.

Different standard development organizations (SDOs) have specified, or may specify in future, mobile communications systems that have similar characteristics as the mobile communications system 100 of FIG. 1A. For example, the Third-Generation Partnership Project (3GPP) is a group of SDOs that provides specifications that define 3GPP technologies for mobile communications systems that are akin to the mobile communications system 100. The 3GPP has developed specifications for third generation (3G) mobile networks, fourth generation (4G) mobile networks and fifth generation (5G) mobile networks. The 3G, 4G and 5G networks are also known as Universal Mobile Telecommunications System (UMTS), Long Term Evolution (LTE) and 5G system (5GS), respectively. In this disclosure, embodiments are described with respect to the RAN implemented in a 3GPP 5G mobile network that is also referred to as next generation RAN (NG-RAN). The embodiments may also be implemented in other mobile communications systems such as 3G or 4G mobile networks or mobile networks that may be standardized in future such as sixth generation (6G) mobile networks or mobile networks that are implemented by standards bodies other than 3GPP. The NG-RAN may be based on a new RAT known as new radio (NR) and/or other radio access technologies such as LTE and/or non-3GPP RATs.

Figure 1B:
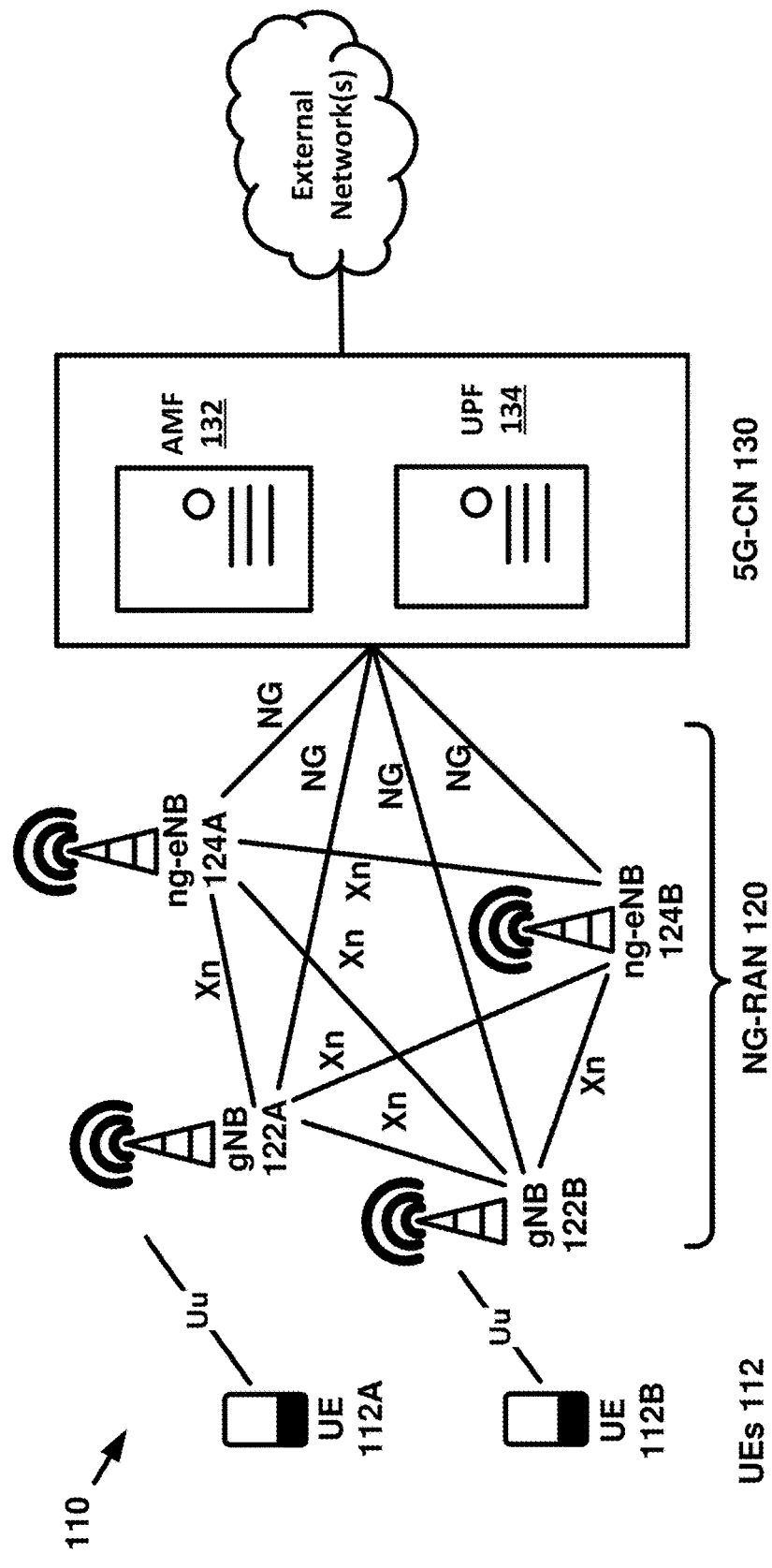

FIG. 1B shows an example of a mobile communications system 110 in accordance with several of various embodiments of the present disclosure. The mobile communications system 110 of FIG. 1B is an example of a 5G mobile network and includes a 5G CN (5G-CN) 130, an NG-RAN 120 and UEs (collectively 112 and individually UE 112A and UE 112B). The 5G-CN 130, the NG-RAN 120 and the UEs 112 of FIG. 1B operate substantially alike the CN 106, the RAN 104 and the at least one wireless device 102, respectively, as described for FIG. 1A.

The 5G-CN 130 of FIG. 1B connects the NG-RAN 120 to one or more external networks (e.g., one or more data networks such as the Internet) and is responsible for functions such as authentication, charging and end-to-end connection establishment. The 5G-CN has new enhancements compared to previous generations of CNs (e.g., evolved packet core (EPC) in the 4G networks) including service-based architecture, support for network slicing and control plane/user plane split. The service-based architecture of the 5G-CN provides a modular framework based on service and functionalities provided by the core network wherein a set of network functions are connected via service-based interfaces. The network slicing enables multiplexing of independent logical networks (e.g., network slices) on the same physical network infrastructure. For example, a network slice may be for mobile broadband applications with full mobility support and a different network slice may be for non-mobile latency-critical applications such as industry automation. The control plane/user plane split enables independent scaling of the control plane and the user plane. For example, the control plane capacity may be increased without affecting the user plane of the network.

The 5G-CN 130 of FIG. 1B includes an access and mobility management function (AMF) 132 and a user plane function (UPF) 134. The AMF 132 may support termination of non-access stratum (NAS) signaling, NAS signaling security such as ciphering and integrity protection, inter-3GPP access network mobility, registration management, connection management, mobility management, access authentication and authorization and security context management. The NAS is a functional layer between a UE and the CN and the access stratum (AS) is a functional layer between the UE and the RAN. The UPF 134 may serve as an interconnect point between the NG-RAN and an external data network. The UPF may support packet routing and forwarding, packet inspection and Quality of Service (QoS) handling and packet filtering. The UPF may further act as a Protocol Data Unit (PDU) session anchor point for mobility within and between RATs.

The 5G-CN 130 may include additional network functions (not shown in FIG. 1B) such as one or more Session Management Functions (SMFs), a Policy Control Function (PCF), a Network Exposure Function (NEF), a Unified Data Management (UDM), an Application Function (AF), and/or an Authentication Server Function (AUSF). These network functions along with the AMF 132 and UPF 134 enable a service-based architecture for the 5G-CN.

The NG-RAN 120 may operate between the UEs 112 and the 5G-CN 130 and may implement one or more RATs. The NG-RAN 120 may include one or more gNBs (e.g., gNB 122A or gNB 122B or collectively gNBs 122) and/or one or more ng-eNBs (e.g., ng-eNB 124A or ng-eNB 124B or collectively ng-eNBs 124). The general terminology for gNB s 122 and/or an ng-eNBs 124 is a base station and may be used interchangeably in this disclosure. The gNBs 122 and the ng-eNBs 124 may include one or more antennas to communicate with the UEs 112. The one or more antennas of the gNB s 122 or ng-eNBs 124 may control one or more cells (or sectors) that provide radio coverage for the UEs 112.

A gNB and/or an ng-eNB of FIG. 1B may be connected to the 5G-CN 130 using an NG interface. A gNB and/or an ng-eNB may be connected with other gNBs and/or ng-eNBs using an Xn interface. The NG or the Xn interfaces are logical connections that may be established using an underlying transport network. The interface between a UE and a gNB or between a UE and an ng-eNBs may be referred to as the Uu interface. An interface (e.g., Uu, NG or Xn) may be established by using a protocol stack that enables data and control signaling exchange between entities in the mobile communications system of FIG. 1B. When a protocol stack is used for transmission of user data, the protocol stack may be referred to as user plane protocol stack. When a protocol stack is used for transmission of control signaling, the protocol stack may be referred to as control plane protocol stack. Some protocol layer may be used in both of the user plane protocol stack and the control plane protocol stack while other protocol layers may be specific to the user plane or control plane.

The NG interface of FIG. 1B may include an NG-User plane (NG-U) interface between a gNB and the UPF 134 (or an ng-eNB and the UPF 134) and an NG-Control plane (NG-C) interface between a gNB and the AMF 132 (or an ng-eNB and the AMF 132). The NG-U interface may provide non-guaranteed delivery of user plane PDUs between a gNB and the UPF or an ng-eNB and the UPF. The NG-C interface may provide services such as NG interface management, UE context management, UE mobility management, transport of NAS messages, paging, PDU session management, configuration transfer and/or warning message transmission.

The UEs 112 and a gNB may be connected using the Uu interface and using the NR user plane and control plane protocol stack. The UEs 112 and an ng-eNB may be connected using the Uu interface using the LTE user plane and control plane protocol stack.

In the example mobile communications system of FIG. 1B, a 5G-CN is connected to a RAN comprised of 4G LTE and/or 5G NR RATs. In other example mobile communications systems, a RAN based on the 5G NR RAT may be connected to a 4G CN (e.g., EPC). For example, earlier releases of 5G standards may support a non-standalone mode of operation where a NR based RAN is connected to the 4G EPC. In an example non-standalone mode, a UE may be connected to both a 5G NR gNB and a 4G LTE eNB (e.g., a ng-eNB) and the control plane functionalities (such as initial access, paging and mobility) may be provided through the 4G LTE eNB. In a standalone of operation, the 5G NR gNB is connected to a 5G-CN and the user plane and the control plane functionalities are provided by the 5G NR gNB.

Figure 2A:
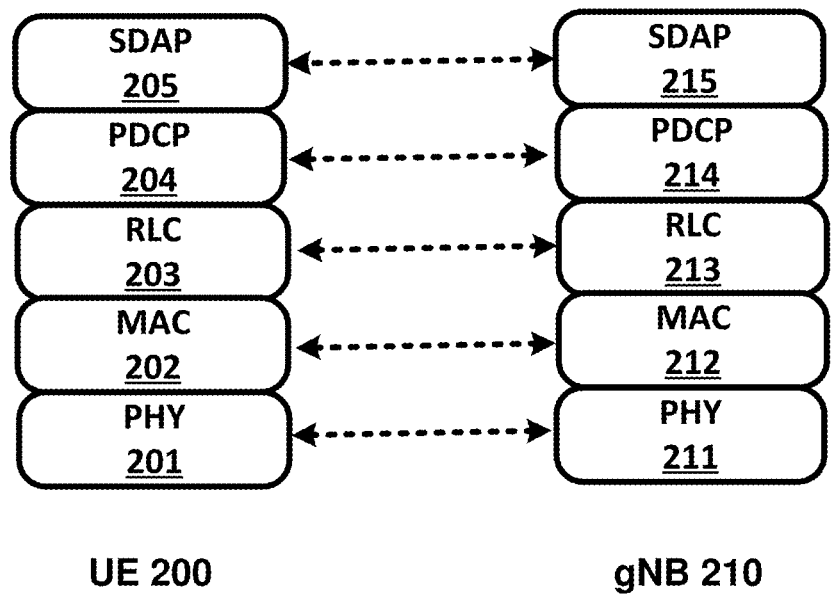
FIG. 2A and FIG. 2B show examples of user plane and control plane protocol layers in accordance with several of various embodiments of the present disclosure.

FIG. 2A shows an example of the protocol stack for the user plan of an NR Uu interface in accordance with several of various embodiments of the present disclosure. The user plane protocol stack comprises five protocol layers that terminate at the UE 200 and the gNB 210. The five protocol layers, as shown in FIG. 2A, include physical (PHY) layer referred to as PHY 201 at the UE 200 and PHY 211 at the gNB 210, medium access control (MAC) layer referred to as MAC 202 at the UE 200 and MAC 212 at the gNB 210, radio link control (RLC) layer referred to as RLC 203 at the UE 200 and RLC 213 at the gNB 210, packet data convergence protocol (PDCP) layer referred to as PDCP 204 at the UE 200 and PDCP 214 at the gNB 210, and service data application protocol (SDAP) layer referred to as SDAP 205 at the UE 200 and SDAP 215 at the gNB 210. The PHY layer, also known as layer 1 (L1), offers transport services to higher layers. The other four layers of the protocol stack (MAC, RLC, PDCP and SDAP) are collectively known as layer 2 (L2).

Figure 2B:
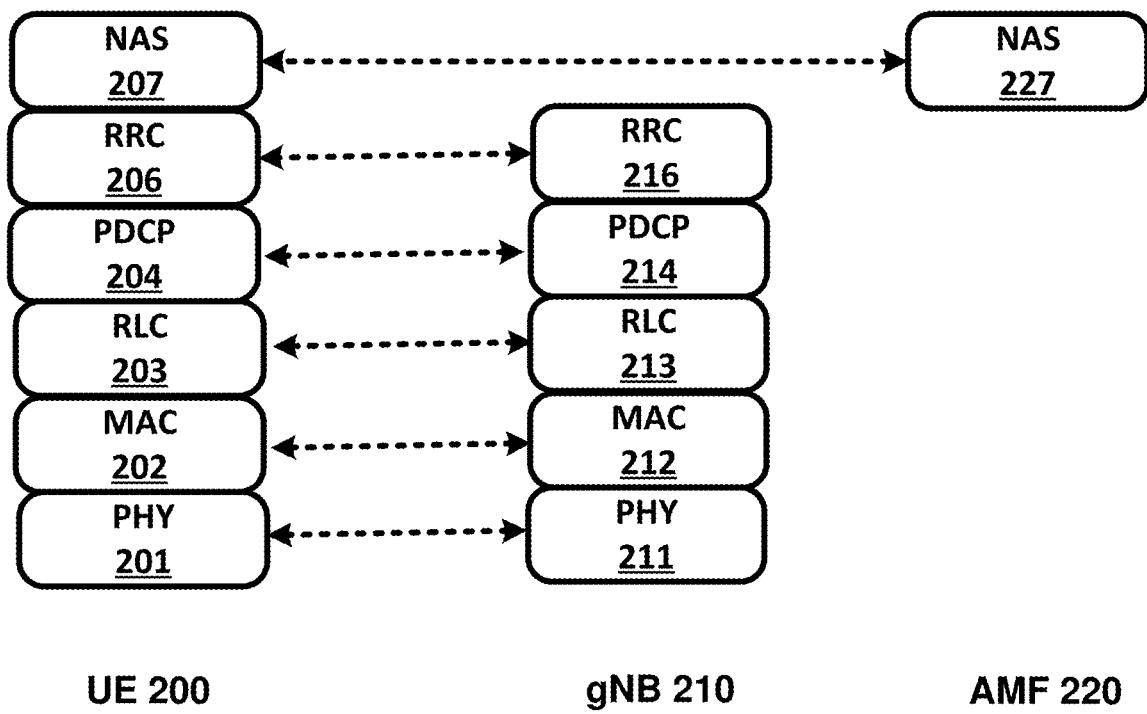

FIG. 2B shows an example of the protocol stack for the control plan of an NR Uu interface in accordance with several of various embodiments of the present disclosure. Some of the protocol layers (PHY, MAC, RLC and PDCP) are common between the user plane protocol stack shown in FIG. 2A and the control plan protocol stack. The control plane protocol stack also includes the RRC layer, referred to RRC 206 at the UE 200 and RRC 216 at the gNB 210, that also terminates at the UE 200 and the gNB 210. In addition, the control plane protocol stack includes the NAS layer that terminates at the UE 200 and the AMF 220. In FIG. 2B, the NAS layer is referred to as NAS 207 at the UE 200 and NAS 227 at the AMF 220.

Figure 3:
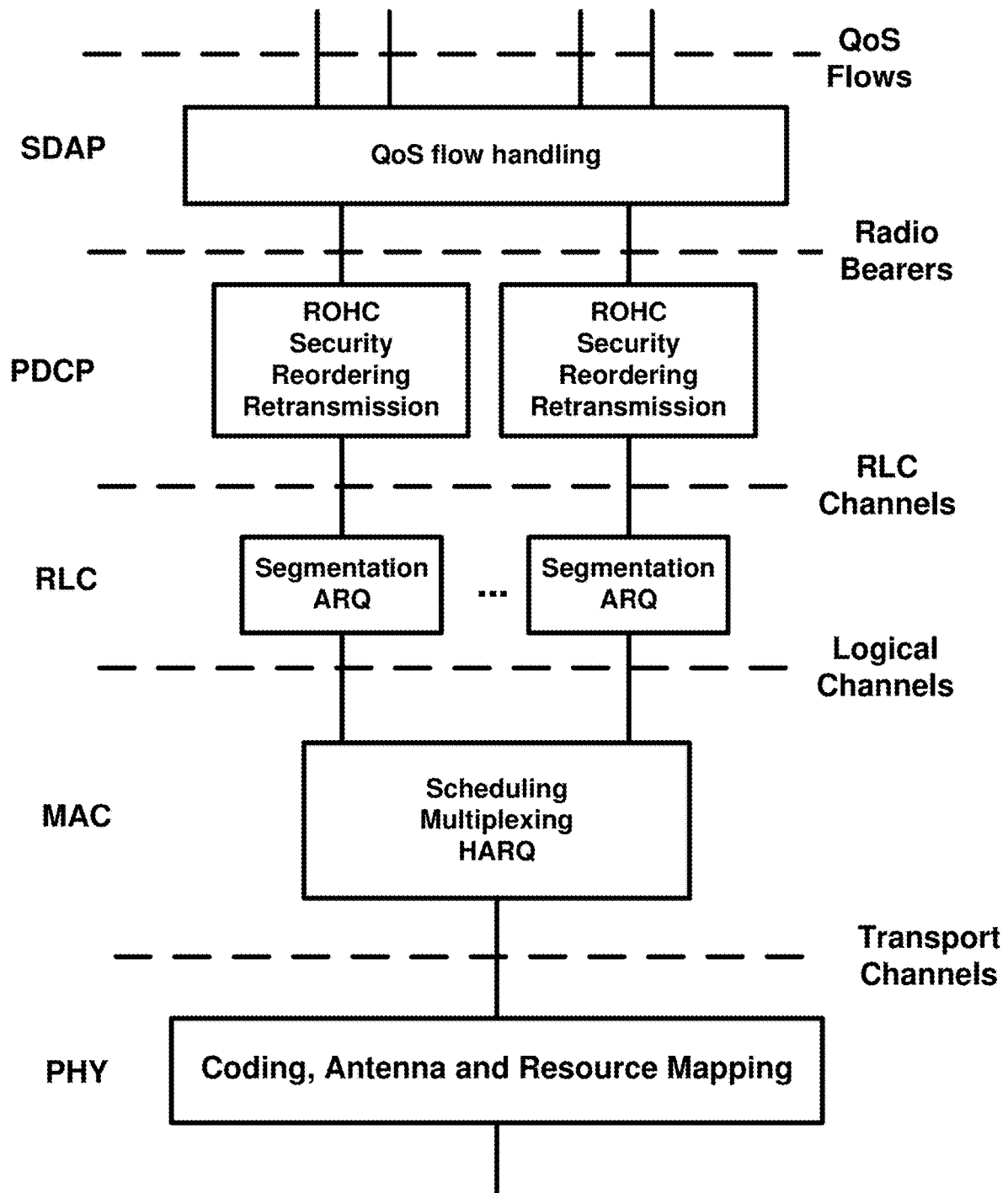
FIG. 3 shows example functions and services offered by protocol layers in a user plane protocol stack in accordance with several of various embodiments of the present disclosure.

FIG. 3 shows example functions and services offered to other layers by a layer in the NR user plane protocol stack of FIG. 2A in accordance with several of various embodiments of the present disclosure. For example, the SDAP layer of FIG. 3 (shown in FIG. 2A as SDAP 205 at the UE side and SDAP 215 at the gNB side) may perform mapping and de-mapping of QoS flows to data radio bearers. The mapping and de-mapping may be based on QoS (e.g., delay, throughput, jitter, error rate, etc.) associated with a QoS flow. A QoS flow may be a QoS differentiation granularity for a PDU session which is a logical connection between a UE 200 and a data network. A PDU session may contain one or more QoS flows. The functions and services of the SDAP layer include mapping and de-mapping between one or more QoS flows and one or more data radio bearers. The SDAP layer may also mark the uplink and/or downlink packets with a QoS flow ID (QFI).

The PDCP layer of FIG. 3 (shown in FIG. 2A as PDCP 204 at the UE side and PDCP 214 at the gNB side) may perform header compression and decompression (e.g., using Robust Header Compression (ROHC) protocol) to reduce the protocol header overhead, ciphering and deciphering and integrity protection and verification to enhance the security over the air interface, reordering and in-order delivery of packets and discarding of duplicate packets. A UE may be configured with one PDCP entity per bearer.

In an example scenario not shown in FIG. 3, a UE may be configured with dual connectivity and may connect to two different cell groups provided by two different base stations. For example, a base station of the two base stations may be referred to as a master base station and a cell group provided by the master base station may be referred to as a master cell group (MCG). The other base station of the two base stations may be referred to as a secondary base station and the cell group provided by the secondary base station may be referred to as a secondary cell group (SCG). A bearer may be configured for the UE as a split bearer that may be handled by the two different cell groups. The PDCP layer may perform routing of packets corresponding to a split bearer to and/or from RLC channels associated with the cell groups.

In an example scenario not shown in FIG. 3, a bearer of the UE may be configured (e.g., with control signaling) with PDCP packet duplication. A bearer configured with PDCP duplication may be mapped to a plurality of RLC channels each corresponding to different one or more cells. The PDCP layer may duplicate packets of the bearer configured with PDCP duplication and the duplicated packets may be mapped to the different RLC channels. With PDCP packet duplication, the likelihood of correct reception of packets increases thereby enabling higher reliability.

The RLC layer of FIG. 3 (shown in FIG. 2A as RLC 203 at the UE side and RLC 213 at the gNB side) provides service to upper layers in the form of RLC channels. The RLC layer may include three transmission modes: transparent mode (TM), Unacknowledged mode (UM) and Acknowledged mode (AM). The RLC layer may perform error correction through automatic repeat request (ARQ) for the AM transmission mode, segmentation of RLC service data units (SDUs) for the AM and UM transmission modes and re-segmentation of RLC SDUs for AM transmission mode, duplicate detection for the AM transmission mode, RLC SDU discard for the AM and UM transmission modes, etc. The UE may be configured with one RLC entity per RLC channel.

The MAC layer of FIG. 3 (shown in FIG. 2A as MAC 202 at the UE side and MAC 212 at the gNB side) provides services to the RLC layer in form of logical channels. The MAC layer may perform mapping between logical channels and transport channels, multiplexing/demultiplexing of MAC SDUs belonging to one or more logical channels into/from transport blocks (TBs) delivered to/from the physical layer on transport channels, reporting of scheduling information, error correction through hybrid automatic repeat request (HARQ), priority handling between UEs by means of dynamic scheduling, priority handling between logical channels of one UE by means of logical channel prioritization and/or padding. In case of carrier aggregation, a MAC entity may comprise one HARQ entity per cell. A MAC entity may support multiple numerologies, transmission timings and cells. The control signaling may configure logical channels with mapping restrictions. The mapping restrictions in logical channel prioritization may control the numerology(ies), cell(s), and/or transmission timing(s)/duration(s) that a logical channel may use.

The PHY layer of FIG. 3 (shown in FIG. 2A as PHY 201 at the UE side and PHY 211 at the gNB side) provides transport services to the MAC layer in form of transport channels. The physical layer may handle coding/decoding, HARQ soft combining, rate matching of a coded transport channel to physical channels, mapping of coded transport channels to physical channels, modulation and demodulation of physical channels, frequency and time synchronization, radio characteristics measurements and indication to higher layers, RF processing, and mapping to antennas and radio resources.

Figure 4:
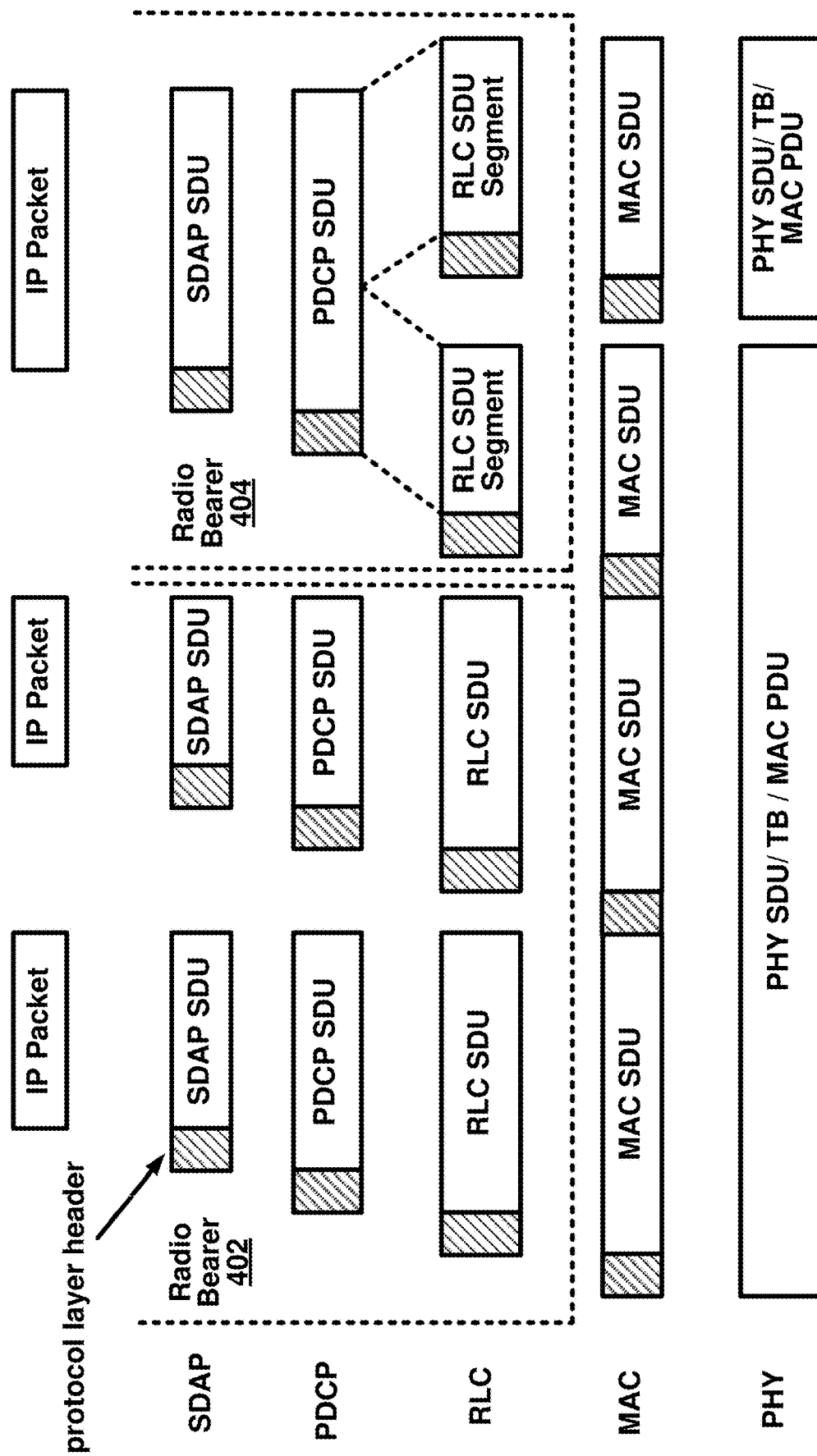
FIG. 4 shows example flow of packets through the protocol layers in accordance with several of various embodiments of the present disclosure.

FIG. 4 shows example processing of packets at different protocol layers in accordance with several of various embodiments of the present disclosure. In this example, three Internet Protocol (IP) packets that are processed by the different layers of the NR protocol stack. The term SDU shown in FIG. 4 is the data unit that is entered from/to a higher layer. In contrast, a protocol data unit (PDU) is the data unit that is entered to/from a lower layer. The flow of packets in FIG. 4 is for downlink. An uplink data flow through layers of the NR protocol stack is similar to FIG. 4. In this example, the two leftmost IP packets are mapped by the SDAP layer (shown as SDAP 205 and SDAP 215 in FIG. 2A) to radio bearer 402 and the rightmost packet is mapped by the SDAP layer to the radio bearer 404. The SDAP layer adds SDAP headers to the IP packets which are entered into the PDCP layer as PDCP SDUs. The PDCP layer is shown as PDCP 204 and PDCP 214 in FIG. 2A. The PDCP layer adds the PDCP headers to the PDCP SDUs which are entered into the RLC layer as RLC SDUs. The RLC layer is shown as RLC 203 and RLC 213 in FIG. 2A. An RLC SDU may be segmented at the RLC layer. The RLC layer adds RLC headers to the RLC SDUs after segmentation (if segmented) which are entered into the MAC layer as MAC SDUs. The MAC layer adds the MAC headers to the MAC SDUs and multiplexes one or more MAC SDUs to form a PHY SDU (also referred to as a transport block (TB) or a MAC PDU).

In FIG. 4, the MAC SDUs are multiplexed to form a transport block. The MAC layer may multiplex one or more MAC control elements (MAC CEs) with zero or more MAC SDUs to form a transport block. The MAC CEs may also be referred to as MAC commands or MAC layer control signaling and may be used for in-band control signaling. The MAC CEs may be transmitted by a base station to a UE (e.g., downlink MAC CEs) or by a UE to a base station (e.g., uplink MAC CEs). The MAC CEs may be used for transmission of information useful by a gNB for scheduling (e.g., buffer status report (BSR) or power headroom report (PHR)), activation/deactivation of one or more cells, activation/deactivation of configured radio resources for or one or more processes, activation/deactivation of one or more processes, indication of parameters used in one or more processes, etc.

Figure 5A:
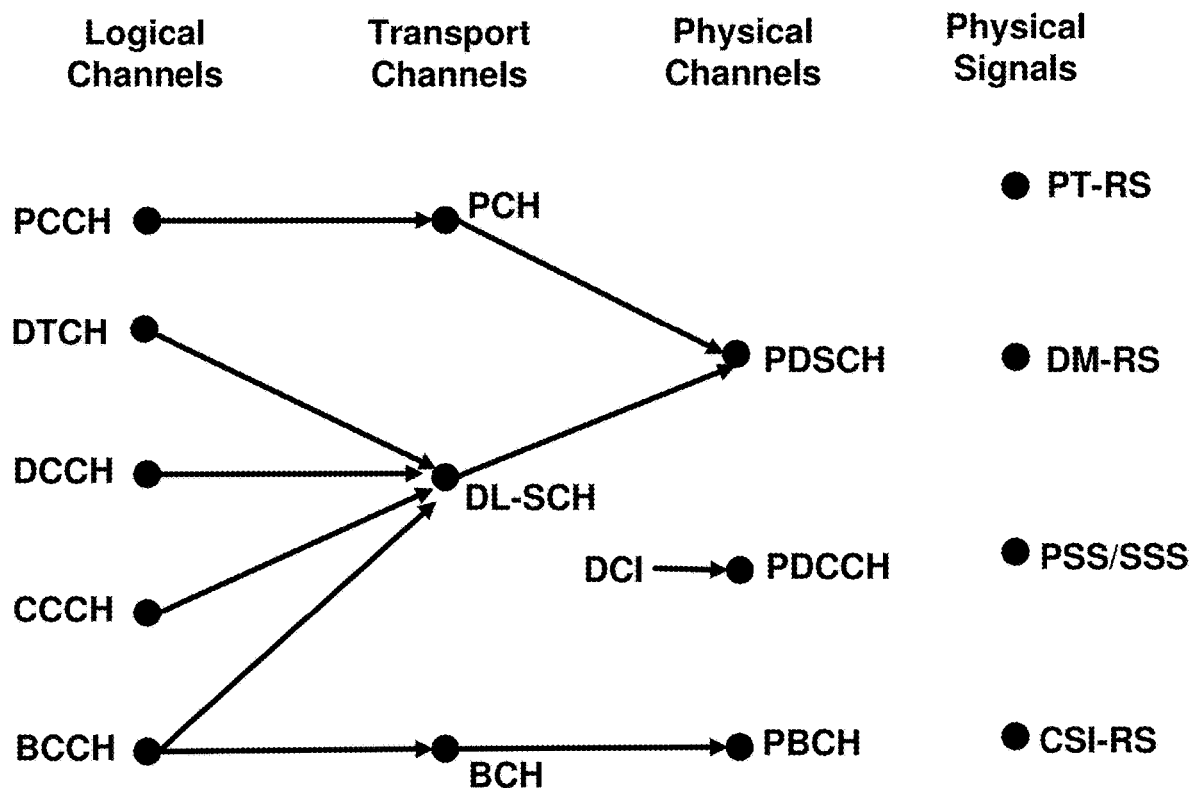
FIG. 5A shows example mapping of channels between layers of the protocol stack and different physical signals in downlink in accordance with several of various embodiments of the present disclosure.
Figure 5B:
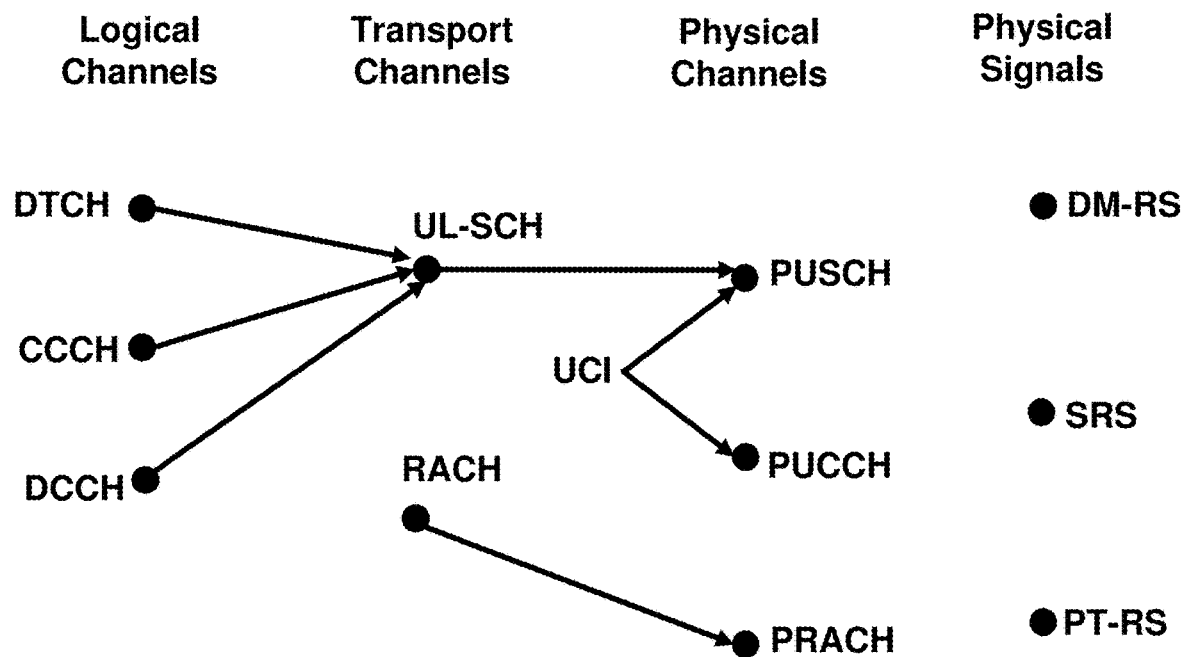
FIG. 5B shows example mapping of channels between layers of the protocol stack and different physical signals in uplink in accordance with several of various embodiments of the present disclosure.

FIG. 5A and FIG. 5B show example mapping between logical channels, transport channels and physical channels for downlink and uplink, respectively in accordance with several of various embodiments of the present disclosure. As discussed before, the MAC layer provides services to higher layer in the form of logical channels. A logical channel may be classified as a control channel, if used for transmission of control and/or configuration information, or a traffic channel if used for transmission of user data. Example logical channels in NR include Broadcast Control Channel (BCCH) used for transmission of broadcast system control information, Paging Control Channel (PCCH) used for carrying paging messages for wireless devices with unknown locations, Common Control Channel (CCCH) used for transmission of control information between UEs and network and for UEs that have no RRC connection with the network, Dedicated Control Channel (DCCH) which is a point-to-point bi-directional channel for transmission of dedicated control information between a UE that has an RRC connection and the network and Dedicated Traffic Channel (DTCH) which is point-to-point channel, dedicated to one UE, for the transfer of user information and may exist in both uplink and downlink.

As discussed before, the PHY layer provides services to the MAC layer and higher layers in the form of transport channels. Example transport channels in NR include Broadcast Channel (BCH) used for transmission of part of the BCCH referred to as master information block (MIB), Downlink Shared Channel (DL-SCH) used for transmission of data (e.g., from DTCH in downlink) and various control information (e.g., from DCCH and CCCH in downlink and part of the BCCH that is not mapped to the BCH), Uplink Shared Channel (UL-SCH) used for transmission of uplink data (e.g., from DTCH in uplink) and control information (e.g., from CCCH and DCCH in uplink) and Paging Channel (PCH) used for transmission of paging information from the PCCH. In addition, Random Access Channel (RACH) is a transport channel used for transmission of random access preambles. The RACH does not carry a transport block. Data on a transport channel (except RACH) may be organized in transport blocks, wherein One or more transport blocks may be transmitted in a transmission time interval (TTI).

The PHY layer may map the transport channels to physical channels. A physical channel may correspond to time-frequency resources that are used for transmission of information from one or more transport channels. In addition to mapping transport channels to physical channels, the physical layer may generate control information (e.g., downlink control information (DCI) or uplink control information (UCI)) that may be carried by the physical channels. Example DCI include scheduling information (e.g., downlink assignments and uplink grants), request for channel state information report, power control command, etc. Example UCI include HARQ feedback indicating correct or incorrect reception of downlink transport blocks, channel state information report, scheduling request, etc. Example physical channels in NR include a Physical Broadcast Channel (PBCH) for carrying information from the BCH, a Physical Downlink Shared Channel (PDSCH) for carrying information form the PCH and the DL-SCH, a Physical Downlink Control Channel (PDCCH) for carrying DCI, a Physical Uplink Shared Channel (PUSCH) for carrying information from the UL-SCH and/or UCI, a Physical Uplink Control Channel (PUCCH) for carrying UCI and Physical Random Access Channel (PRACH) for transmission of RACH (e.g., random access preamble).

The PHY layer may also generate physical signals that are not originated from higher layers. As shown in FIG. 5A, example downlink physical signals include Demodulation Reference Signal (DM-RS), Phase Tracking Reference Signal (PT-RS), Channel State Information Reference Signal (CSI-RS), Primary Synchronization Signal (PSS) and Secondary Synchronization Signal (SSS). As shown in FIG. 5B, example uplink physical signals include DM-RS, PT-RS and sounding reference signal (SRS).

As indicated earlier, some of the protocol layers (PHY, MAC, RLC and PDCP) of the control plane of an NR Uu interface, are common between the user plane protocol stack (as shown in FIG. 2A) and the control plane protocol stack (as shown in FIG. 2B). In addition to PHY, MAC, RLC and PDCP, the control plane protocol stack includes the RRC protocol layer and the NAS protocol layer.

The NAS layer, as shown in FIG. 2B, terminates at the UE 200 and the AMF 220 entity of the 5G-C 130. The NAS layer is used for core network related functions and signaling including registration, authentication, location update and session management. The NAS layer uses services from the AS of the Uu interface to transmit the NAS messages.

The RRC layer, as shown in FIG. 2B, operates between the UE 200 and the gNB 210 (more generally NG-RAN 120) and may provide services and functions such as broadcast of system information (SI) related to AS and NAS as well as paging initiated by the 5G-C 130 or NG-RAN 120. In addition, the RRC layer is responsible for establishment, maintenance and release of an RRC connection between the UE 200 and the NG-RAN 120, carrier aggregation configuration (e.g., addition, modification and release), dual connectivity configuration (e.g., addition, modification and release), security related functions, radio bearer configuration/maintenance and release, mobility management (e.g., maintenance and context transfer), UE cell selection and reselection, inter-RAT mobility, QoS management functions, UE measurement reporting and control, radio link failure (RLF) detection and NAS message transfer. The RRC layer uses services from PHY, MAC, RLC and PDCP layers to transmit RRC messages using signaling radio bearers (SRBs). The SRBs are mapped to CCCH logical channel during connection establishment and to DCCH logical channel after connection establishment.

Figure 6:
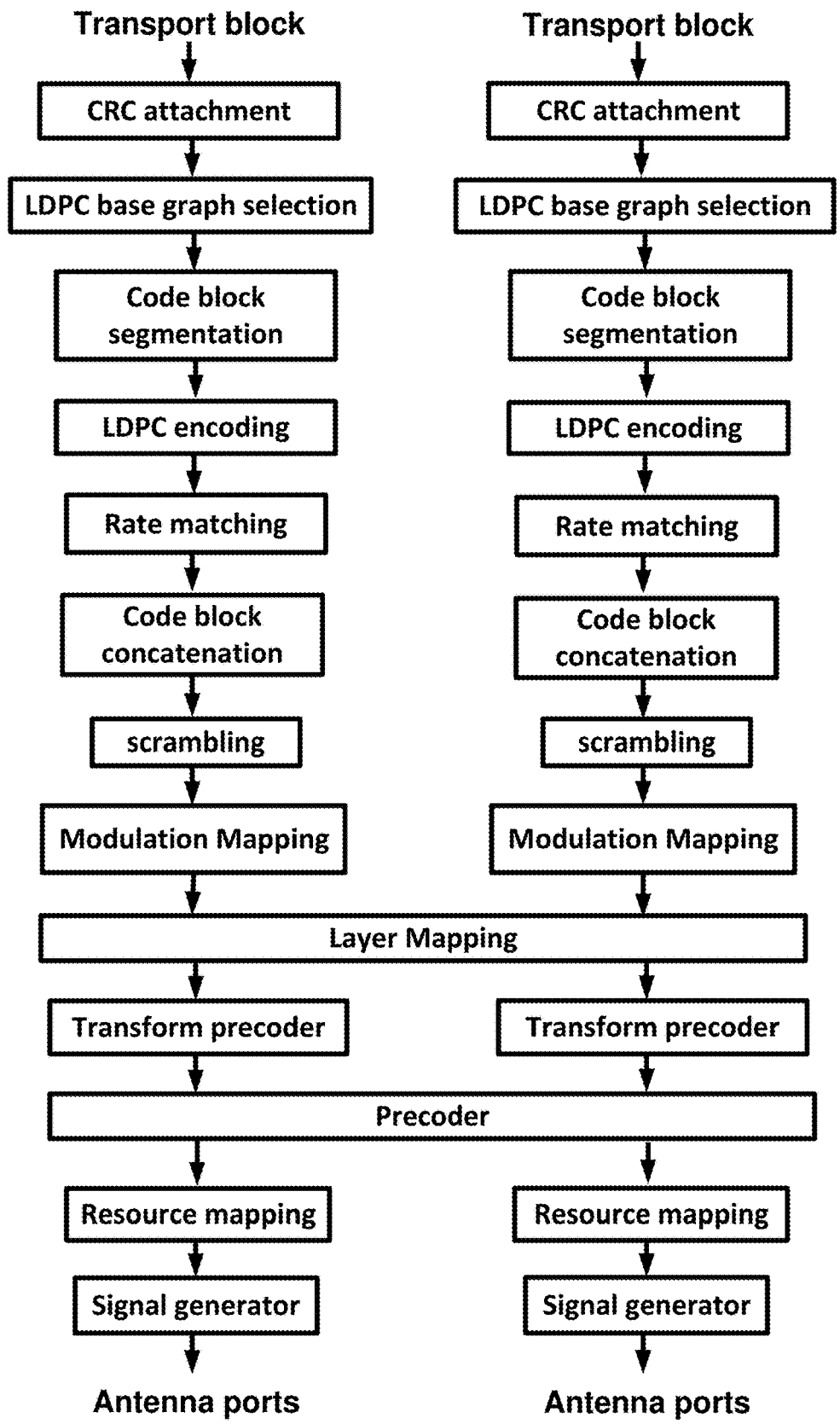
FIG. 6 shows example physical layer processes for signal transmission in accordance with several of various embodiments of the present disclosure.

FIG. 6 shows example physical layer processes for signal transmission in accordance with several of various embodiments of the present disclosure. Data and/or control streams from MAC layer may be encoded/decoded to offer transport and control services over the radio transmission link. For example, one or more (e.g., two as shown in FIG. 6) transport blocks may be received from the MAC layer for transmission via a physical channel (e.g., a physical downlink shared channel or a physical uplink shared channel). A cyclic redundancy check (CRC) may be calculated and attached to a transport block in the physical layer. The CRC calculation may be based on one or more cyclic generator polynomials. The CRC may be used by the receiver for error detection. Following the transport block CRC attachment, a low-density parity check (LDPC) base graph selection may be performed. In example embodiments, two LDPC base graphs may be used wherein a first LDPC base graph may be optimized for small transport blocks and a second LDPC base graph may be optimized for comparatively larger transport blocks.

The transport block may be segmented into code blocks and code block CRC may be calculated and attached to a code block. A code block may be LDPC coded and the LDPC coded blocks may be individually rate matched. The code blocks may be concatenated to create one or more codewords. The contents of a codeword may be scrambled and modulated to generate a block of complex-valued modulation symbols. The modulation symbols may be mapped to a plurality of transmission layers (e.g., multiple-input multiple-output (MIMO) layers) and the transmission layers may be subject to transform precoding and/or precoding. The precoded complex-valued symbols may be mapped to radio resources (e.g., resource elements). The signal generator block may create a baseband signal and up-convert the baseband signal to a carrier frequency for transmission via antenna ports. The signal generator block may employ mixers, filters and/or other radio frequency (RF) components prior to transmission via the antennas. The functions and blocks in FIG. 6 are illustrated as examples and other mechanisms may be implemented in various embodiments.

Figure 7:
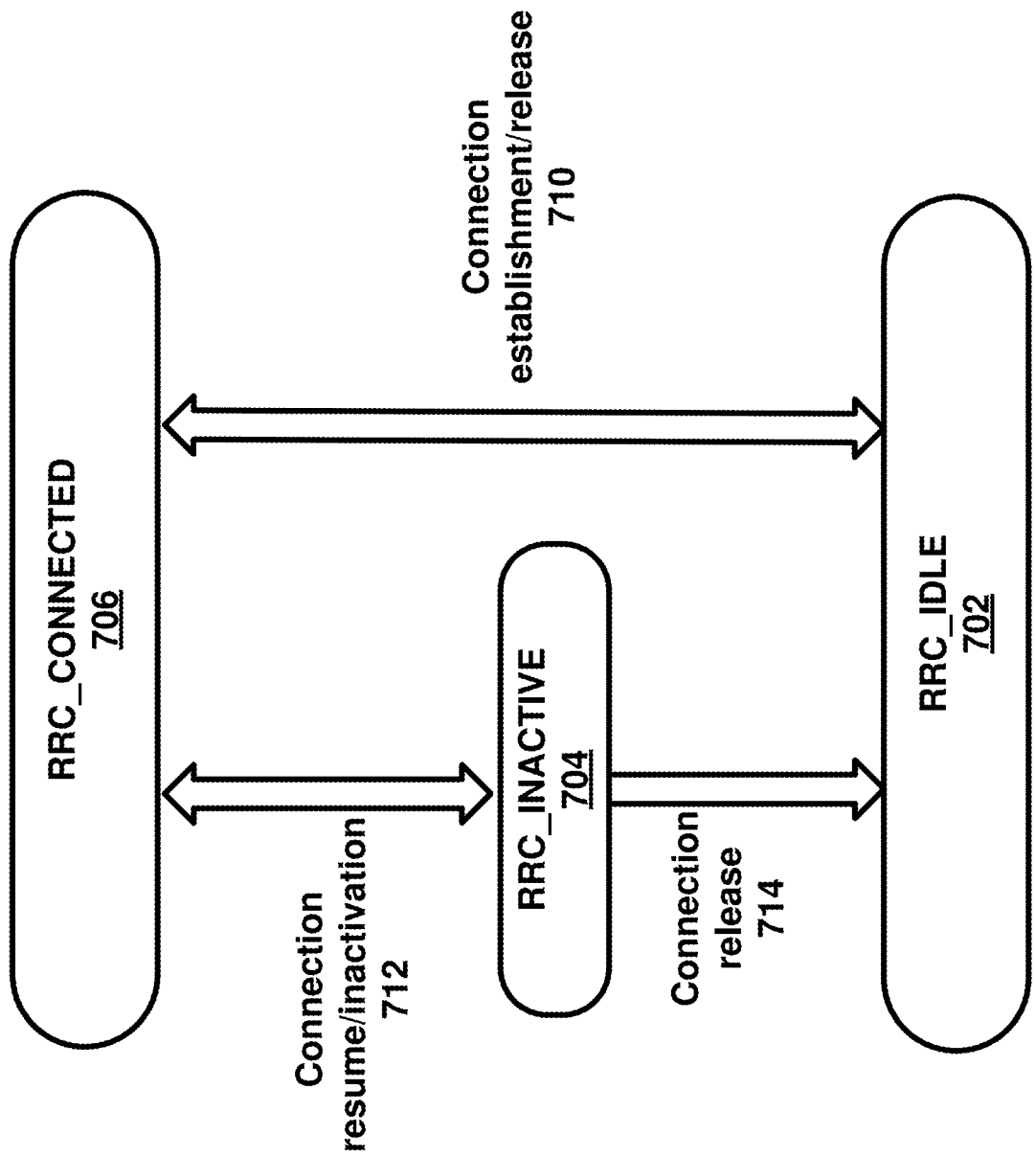
FIG. 7 shows examples of RRC states and RRC state transitions in accordance with several of various embodiments of the present disclosure.

FIG. 7 shows examples of RRC states and RRC state transitions at a UE in accordance with several of various embodiments of the present disclosure. A UE may be in one of three RRC states: RRC_IDLE 702, RRC INACTIVE 704 and RRC_CONNECTED 706. In RRC_IDLE 702 state, no RRC context (e.g., parameters needed for communications between the UE and the network) may be established for the UE in the RAN. In RRC_IDLE 702 state, no data transfer between the UE and the network may take place and uplink synchronization is not maintained. The wireless device may sleep most of the time and may wake up periodically to receive paging messages. The uplink transmission of the UE may be based on a random access process and to enable transition to the RRC_CONNECTED 706 state. The mobility in RRC_IDLE 702 state is through a cell reselection procedure where the UE camps on a cell based on one or more criteria including signal strength that is determined based on the UE measurements.

In RRC_CONNECTED 706 state, the RRC context is established and both the UE and the RAN have necessary parameters to enable communications between the UE and the network. In the RRC_CONNECTED 706 state, the UE is configured with an identity known as a Cell Radio Network Temporary Identifier (C-RNTI) that is used for signaling purposes (e.g., uplink and downlink scheduling, etc.) between the UE and the RAN. The wireless device mobility in the RRC_CONNECTED 706 state is managed by the RAN. The wireless device provides neighboring cells and/or current serving cell measurements to the network and the network may make hand over decisions. Based on the wireless device measurements, the current serving base station may send a handover request message to a neighboring base station and may send a handover command to the wireless device to handover to a cell of the neighboring base station. The transition of the wireless device from the RRC_IDLE 702 state to the RRC_CONNECTED 706 state or from the RRC_CONNECTED 706 state to the RRC_IDLE 702 state may be based on connection establishment and connection release procedures (shown collectively as connection establishment/release 710 in FIG. 7).

To enable a faster transition to the RRC_CONNECTED 706 state (e.g., compared to transition from RRC_IDLE 702 state to RRC_CONNECTED 706 state), an RRC_INACTIVE 704 state is used for an NR UE wherein, the RRC context is kept at the UE and the RAN. The transition from the RRC_INACTIVE 704 state to the RRC_CONNECTED 706 state is handled by RAN without CN signaling. Similar to the RRC_IDLE 702 state, the mobility in RRC_INACTIVE 704 state is based on a cell reselection procedure without involvement from the network. The transition of the wireless device from the RRC_INACTIVE 704 state to the RRC_CONNECTED 706 state or from the RRC_CONNECTED 706 state to the RRC_INACTIVE 704 state may be based on connection resume and connection inactivation procedures (shown collectively as connection resume/inactivation 712 in FIG. 7). The transition of the wireless device from the RRC_INACTIVE 704 state to the RRC_IDLE 702 state may be based on a connection release 714 procedure as shown in FIG. 7.

In NR, Orthogonal Frequency Division Multiplexing (OFDM), also called cyclic prefix OFDM (CP-OFDM), is the baseline transmission scheme in both downlink and uplink of NR and the Discrete Fourier Transform (DFT) spread OFDM (DFT-s-OFDM) is a complementary uplink transmission in addition to the baseline OFDM scheme. OFDM is multi-carrier transmission scheme wherein the transmission bandwidth may be composed of several narrowband sub-carriers. The subcarriers are modulated by the complex valued OFDM modulation symbols resulting in an OFDM signal. The complex valued OFDM modulation symbols are obtained by mapping, by a modulation mapper, the input data (e.g., binary digits) to different points of a modulation constellation diagram. The modulation constellation diagram depends on the modulation scheme. NR may use different types of modulation schemes including Binary Phase Shift Keying (BPSK), π/2-BPSK, Quadrature Phase Shift Keying (QPSK), 16 Quadrature Amplitude Modulation (16 QAM), 64 QAM and 256 QAM. Different and/or higher order modulation schemes (e.g., M-QAM in general) may be used. An OFDM signal with N subcarriers may be generated by processing N subcarriers in parallel for example by using Inverse Fast Fourier Transform (IFFT) processing. The OFDM receiver may use FFT processing to recover the transmitted OFDM modulation symbols. The subcarrier spacing of subcarriers in an OFDM signal is inversely proportional to an OFDM modulation symbol duration. For example, for a 15 KHz subcarrier spacing, duration of an OFDM signal is nearly 66.7 µs. To enhance the robustness of OFDM transmission in time dispersive channels, a cyclic prefix (CP) may be inserted at the beginning of an OFDM symbol. For example, the last part of an OFDM symbol may be copied and inserted at the beginning of an OFDM symbol. The CP insertion enhanced the OFDM transmission scheme by preserving subcarrier orthogonality in time dispersive channels.

In NR, different numerologies may be used for OFDM transmission. A numerology of OFDM transmission may indicate a subcarrier spacing and a CP duration for the OFDM transmission. For example, a subcarrier spacing in NR may generally be a multiple of 15 KHz and expressed as $\Delta f = 2^\mu \cdot 15$ KHz ($\mu = 0, 1, 2, \ldots$). Example subcarrier spacings used in NR include 15 KHz ($\mu=0$), 30 KHz ($\mu=1$), 60 KHz ($\mu=2$), 120 KHz ($\mu=3$) and 240 KHz ($\mu=4$). As discussed before, a duration of OFDM symbol is inversely proportional to the subcarrier spacing and therefor OFDM symbol duration may depend on the numerology (e.g., the µ value).

Figure 8:
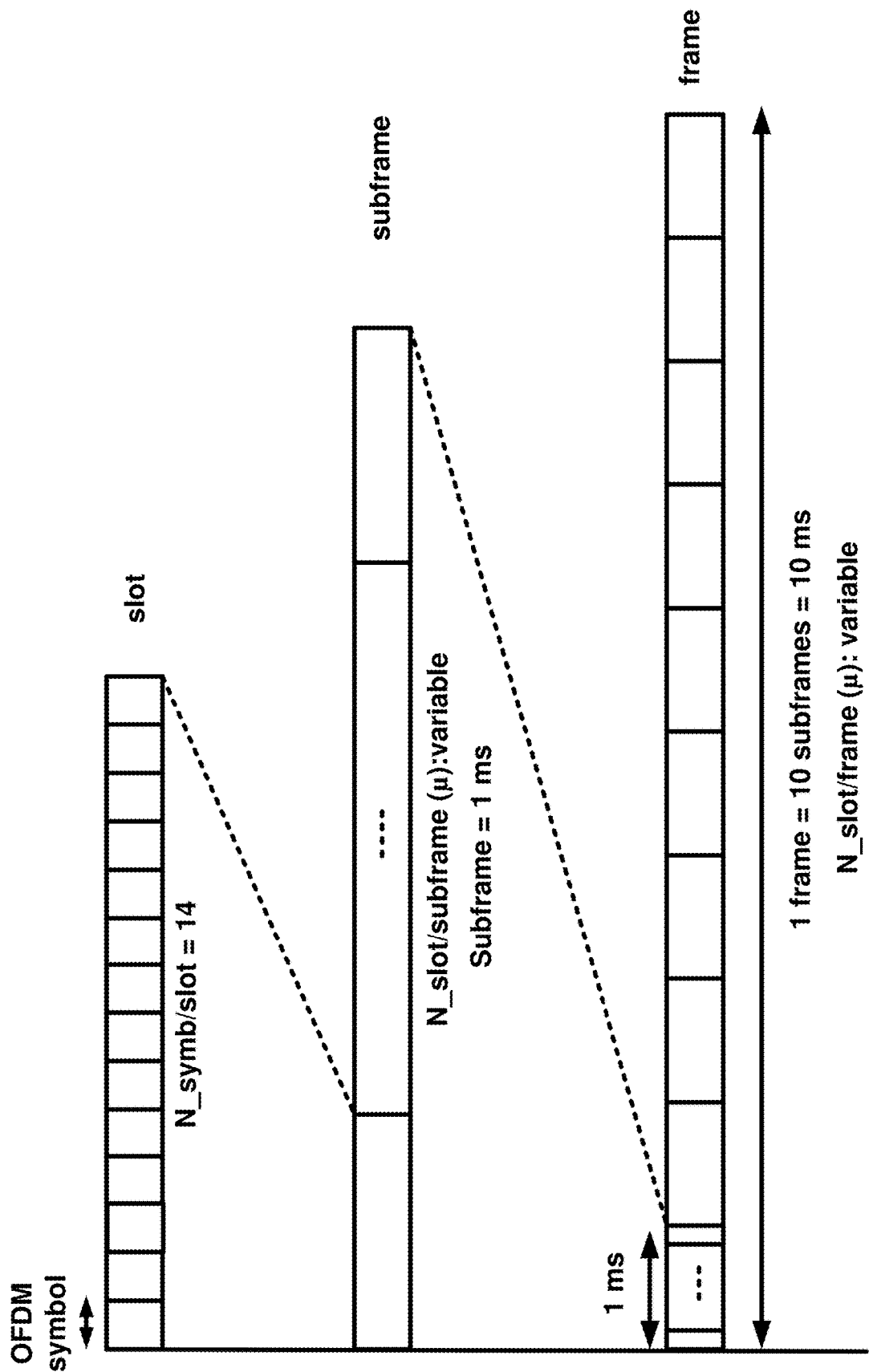
FIG. 8 shows an example time domain transmission structure in NR by grouping OFDM symbols into slots, subframes and frames in accordance with several of various embodiments of the present disclosure.

FIG. 8 shows an example time domain transmission structure in NR wherein OFDM symbols are grouped into slots, subframes and frames in accordance with several of various embodiments of the present disclosure. A slot is a group of $N_{symb}^{slot}$ OFDM symbols, wherein the $N_{symb}^{slot}$ may have a constant value (e.g., 14). Since different numerologies results in different OFDM symbol durations, duration of a slot may also depend on the numerology and may be variable. A subframe may have a duration of 1 ms and may be composed of one or more slots, the number of which may depend on the slot duration. The number of slots per subframe is therefore a function of µ and may generally expressed as $N_{slot}^{subframe,\mu}$ and the number of symbols per subframe may be expressed as $N_{symb}^{subframe,\mu} = N_{symb}^{slot} N_{slot}^{subframe,\mu}$. A frame may have a duration of 10 ms and may consist of 10 subframes. The number of slots per frame may depend on the numerology and therefore may be variable. The number of slots per frame may generally be expressed as $N_{slot}^{frame,\mu}$.

An antenna port may be defined as a logical entity such that channel characteristics over which a symbol on the antenna port is conveyed may be inferred from the channel characteristics over which another symbol on the same antenna port is conveyed. For example, for DM-RS associated with a PDSCH, the channel over which a PDSCH symbol on an antenna port is conveyed may be inferred from the channel over which a DM-RS symbol on the same antenna port is conveyed, for example, if the two symbols are within the same resource as the scheduled PDSCH and/or in the same slot and/or in the same precoding resource block group (PRG). For example, for DM-RS associated with a PDCCH, the channel over which a PDCCH symbol on an antenna port is conveyed may be inferred from the channel over which a DM-RS symbol on the same antenna port is conveyed if, for example, the two symbols are within resources for which the UE may assume the same precoding being used. For example, for DM-RS associated with a PBCH, the channel over which a PBCH symbol on one antenna port is conveyed may be inferred from the channel over which a DM-RS symbol on the same antenna port is conveyed if, for example, the two symbols are within a SS/PBCH block transmitted within the same slot, and with the same block index. The antenna port may be different from a physical antenna. An antenna port may be associated with an antenna port number and different physical channels may correspond to different ranges of antenna port numbers.

Figure 9:
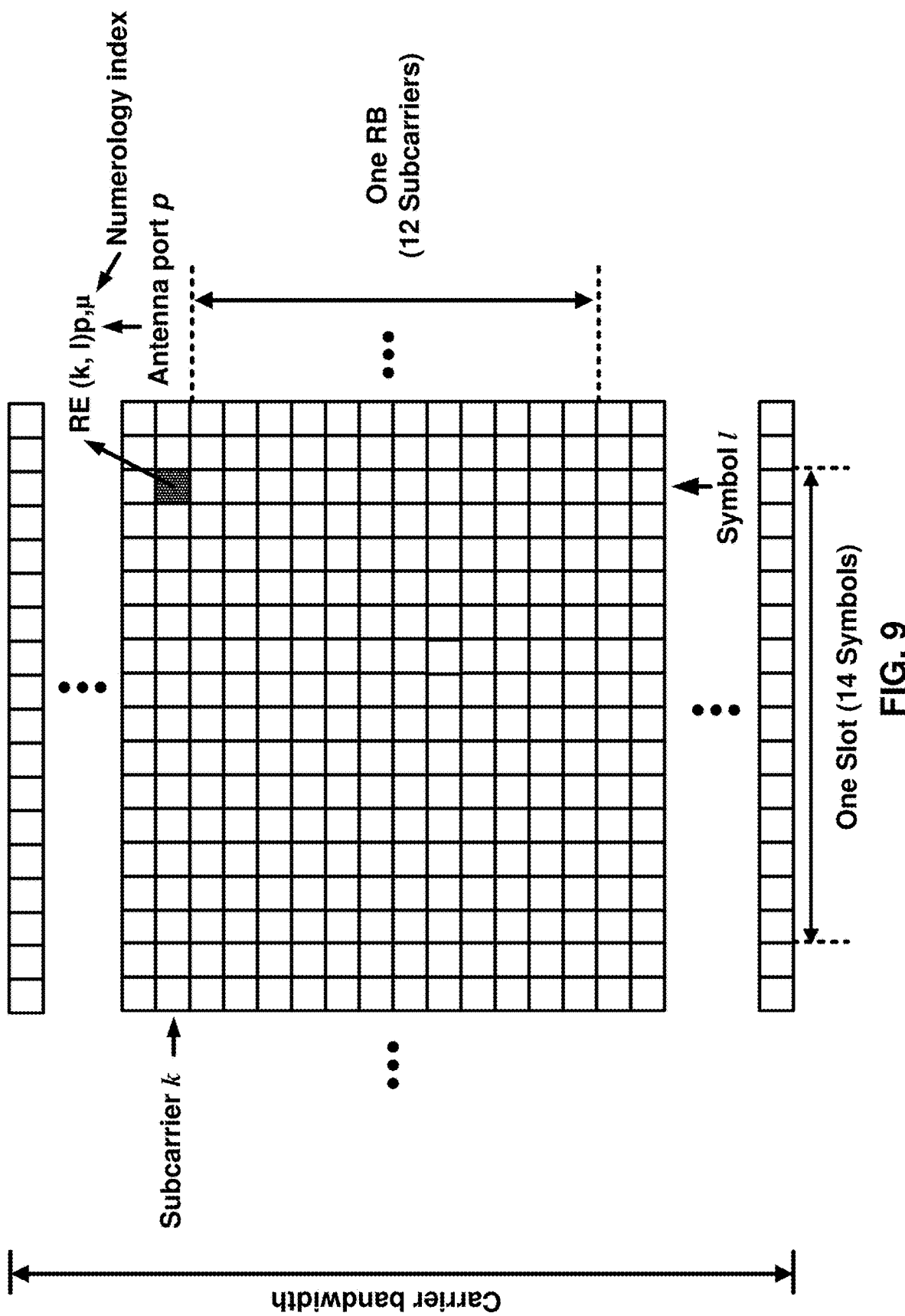
FIG. 9 shows an example of time-frequency resource grid in accordance with several of various embodiments of the present disclosure.

FIG. 9 shows an example of time-frequency resource grid in accordance with several of various embodiments of the present disclosure. The number of subcarriers in a carrier bandwidth may be based on the numerology of OFDM transmissions in the carrier. A resource element, corresponding to one symbol duration and one subcarrier, may be the smallest physical resource in the time-frequency grid. A resource element (RE) for antenna port p and subcarrier spacing configuration $\mu$ may be uniquely identified by $(k,l)_{p,\mu}$ where k is the index of a subcarrier in the frequency domain and l may refer to the symbol position in the time domain relative to some reference point. A resource block may be defined as $N_{SC}^{RB}=12$ subcarriers. Since subcarrier spacing depends on the numerology of OFDM transmission, the frequency domain span of a resource block may be variable and may depend on the numerology. For example, for a subcarrier spacing of 15 KHz (e.g., $\mu=0$), a resource block may be 180 KHz and for a subcarrier spacing of 30 KHz (e.g., $\mu=1$), a resource block may be 360 KHz.

With large carrier bandwidths defined in NR and due to limited capabilities for some UEs (e.g., due to hardware limitations), a UE may not support an entire carrier bandwidth. Receiving on the full carrier bandwidth may imply high energy consumption. For example, transmitting downlink control channels on the full downlink carrier bandwidth may result in high power consumption for wide carrier bandwidths. NR may use a bandwidth adaptation procedure to dynamically adapt the transmit and receive bandwidths. The transmit and receive bandwidth of a UE on a cell may be smaller than the bandwidth of the cell and may be adjusted. For example, the width of the transmit and/or receive bandwidth may change (e.g., shrink during period of low activity to save power); the location of the transmit and/or receive bandwidth may move in the frequency domain (e.g., to increase scheduling flexibility); and the subcarrier spacing of the transmit or receive bandwidth may change (e.g., to allow different services). A subset of the cell bandwidth may be referred to as a Bandwidth Part (BWP) and bandwidth adaptation may be achieved by configuring the UE with one or more BWPs. The base station may configure a UE with a set of downlink BWPs and a set of uplink BWPs. A BWP may be characterized by a numerology (e.g., subcarrier spacing and cyclic prefix) and a set of consecutive resource blocks in the numerology of the BWP. One or more first BWPs of the one or more BWPs of the cell may be active at a time. An active BWP may be an active downlink BWP or an active uplink BWP.

Figure 10:
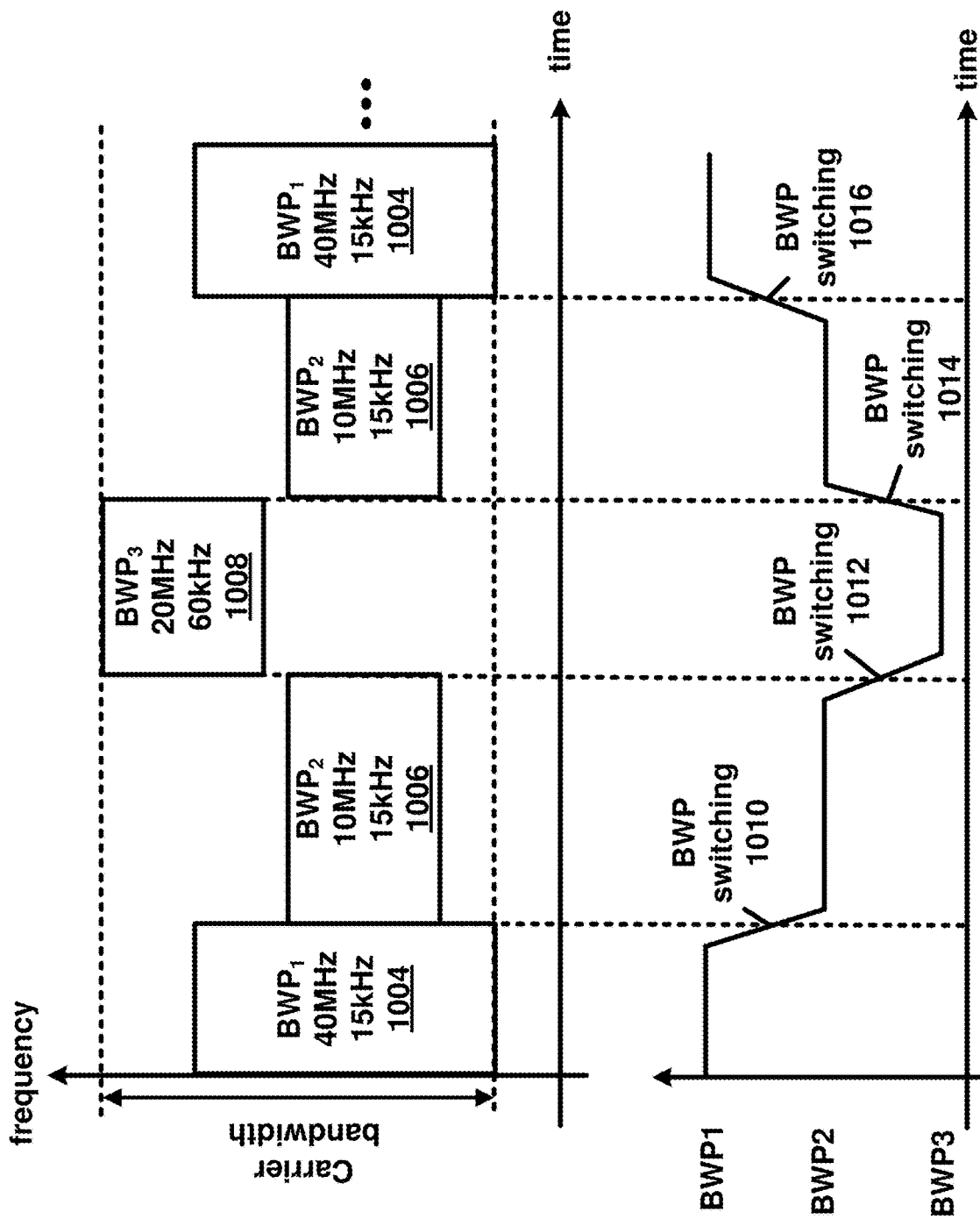
FIG. 10 shows example adaptation and switching of bandwidth parts in accordance with several of various embodiments of the present disclosure.

FIG. 10 shows an example of bandwidth part adaptation and switching. In this example, three BWPs ($BWP_1$ 1004, $BWP_2$ 1006 and $BWP_3$ 1008) are configured for a UE on a carrier bandwidth. The $BWP_1$ is configured with a bandwidth of 40 MHz and a numerology with subcarrier spacing of 15 KHz, the $BWP_2$ is configured with a bandwidth of 10 MHz and a numerology with subcarrier spacing of 15 KHz and the $BWP_3$ is configured with a bandwidth of 20 MHz and a subcarrier spacing of 60 KHz. The wireless device may switch from a first BWP (e.g., $BWP_1$) to a second BWP (e.g., $BWP_2$). An active BWP of the cell may change from the first BWP to the second BWP in response to the BWP switching.

The BWP switching (e.g., BWP switching 1010, BWP switching 1012, BWP switching 1014, or BWP switching 1016 in FIG. 10) may be based on a command from the base station. The command may be a DCI comprising scheduling information for the UE in the second BWP. In case of uplink BWP switching, the first BWP and the second BWP may be uplink BWPs and the scheduling information may be an uplink grant for uplink transmission via the second BWP. In case of downlink BWP switching, the first BWP and the second BWP may be downlink BWPs and the scheduling information may be a downlink assignment for downlink reception via the second BWP.

The BWP switching (e.g., BWP switching 1010, BWP switching 1012, BWP switching 1014, or BWP switching 1016 in FIG. 10) may be based on an expiry of a timer. The base station may configure a wireless device with a BWP inactivity timer and the wireless device may switch to a default BWP (e.g., default downlink BWP) based on the expiry of the BWP inactivity timer. The expiry of the BWP inactivity timer may be an indication of low activity on the current active downlink BWP. The base station may configure the wireless device with the default downlink BWP. If the base station does not configure the wireless device with the default BWP, the default BWP may be an initial downlink BWP. The initial active BWP may be the BWP that the wireless device receives scheduling information for remaining system information upon transition to an RRC_CONNECTED state.

A wireless device may monitor a downlink control channel of a downlink BWP. For example, the UE may monitor a set of PDCCH candidates in configured monitoring occasions in one or more configured COntrol REsource SETs (CORESETs) according to the corresponding search space configurations. A search space configuration may define how/where to search for PDCCH candidates. For example, the search space configuration parameters may comprise a monitoring periodicity and offset parameter indicating the slots for monitoring the PDCCH candidates. The search space configuration parameters may further comprise a parameter indicating a first symbol with a slot within the slots determined for monitoring PDCCH candidates. A search space may be associated with one or more CORESETs and the search space configuration may indicate one or more identifiers of the one or more CORESETs. The search space configuration parameters may further indicate that whether the search space is a common search space or a UE-specific search space. A common search space may be monitored by a plurality of wireless devices and a UE-specific search space may be dedicated to a specific UE.

Figure 11A:
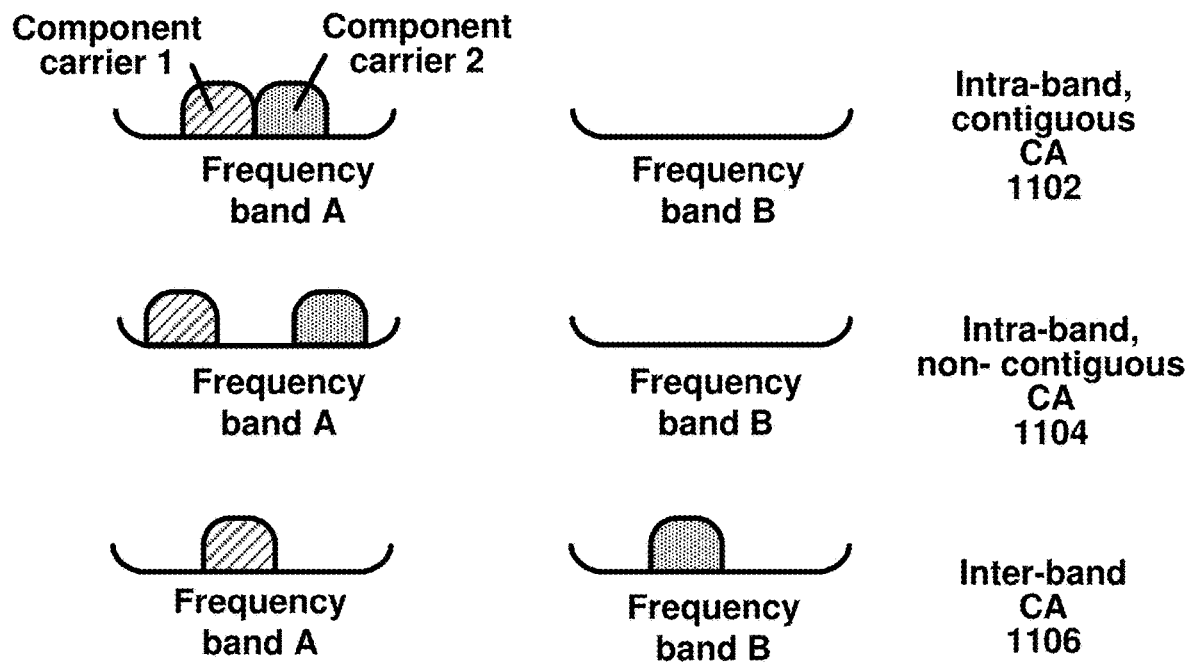
FIG. 11A shows example arrangements of carriers in carrier aggregation in accordance with several of various embodiments of the present disclosure.

FIG. 11A shows example arrangements of carriers in carrier aggregation in accordance with several of various embodiments of the present disclosure. With carrier aggregation, multiple NR component carriers (CCs) may be aggregated. Downlink transmissions to a wireless device may take place simultaneously on the aggregated downlink CCs resulting in higher downlink data rates. Uplink transmissions from a wireless device may take place simultaneously on the aggregated uplink CCs resulting in higher uplink data rates. The component carriers in carrier aggregation may be on the same frequency band (e.g., intra-band carrier aggregation) or on different frequency bands (e.g., inter-band carrier aggregation). The component carriers may also be contiguous or non-contiguous. This results in three possible carrier aggregation scenarios, intra-band contiguous CA 1102, intra-band non-contiguous CA 1104 and inter-band CA 1106 as shown in FIG. 11A. Depending on the UE capability for carrier aggregation, a UE may transmit and/or receive on multiple carriers or for a UE that is not capable of carrier aggregation, the UE may transmit and/or receive on one component carrier at a time. In this disclosure, the carrier aggregation is described using the term cell and a carrier aggregation capable UE may transmit and/or receive via multiple cells.

In carrier aggregation, a UE may be configured with multiple cells. A cell of the multiple cells configured for the UE may be referred to as a Primary Cell (PCell). The PCell may be the first cell that the UE is initially connected to. One or more other cells configured for the UE may be referred to as Secondary Cells (SCells). The base station may configure a UE with multiple SCells. The configured SCells may be deactivated upon configuration and the base station may dynamically activate or deactivate one or more of the configured SCells based on traffic and/or channel conditions. The base station may activate or deactivate configured SCells using a SCell Activation/Deactivation MAC CE. The SCell Activation/Deactivation MAC CE may comprise a bitmap, wherein each bit in the bitmap may correspond to a SCell and the value of the bit indicates an activation status or deactivation status of the SCell.

An SCell may also be deactivated in response to expiry of a SCell deactivation timer of the SCell. The expiry of an SCell deactivation timer of an SCell may be an indication of low activity (e.g., low transmission or reception activity) on the SCell. The base station may configure the SCell with an SCell deactivation timer. The base station may not configure an SCell deactivation timer for an SCell that is configured with PUCCH (also referred to as a PUCCH SCell). The configuration of the SCell deactivation timer may be per configured SCell and different SCells may be configured with different SCell deactivation timer values. The SCell deactivation timer may be restarted based on one or more criteria including reception of downlink control information on the SCell indicating uplink grant or downlink assignment for the SCell or reception of downlink control information on a scheduling cell indicating uplink grant or downlink assignment for the SCell or transmission of a MAC PDU based on a configured uplink grant or reception of a configured downlink assignment.

A PCell for a UE may be an SCell for another UE and a SCell for a UE may be PCell for another UE. The configuration of PCell may be UE-specific. One or more SCells of the multiple SCells configured for a UE may be configured as downlink-only SCells, e.g., may only be used for downlink reception and may not be used for uplink transmission. In case of self-scheduling, the base station may transmit signaling for uplink grants and/or downlink assignments on the same cell that the corresponding uplink or downlink transmission takes place. In case of cross-carrier scheduling, the base station may transmit signaling for uplink grants and/or downlink assignments on a cell different from the cell that the corresponding uplink or downlink transmission takes place.

Figure 11B:
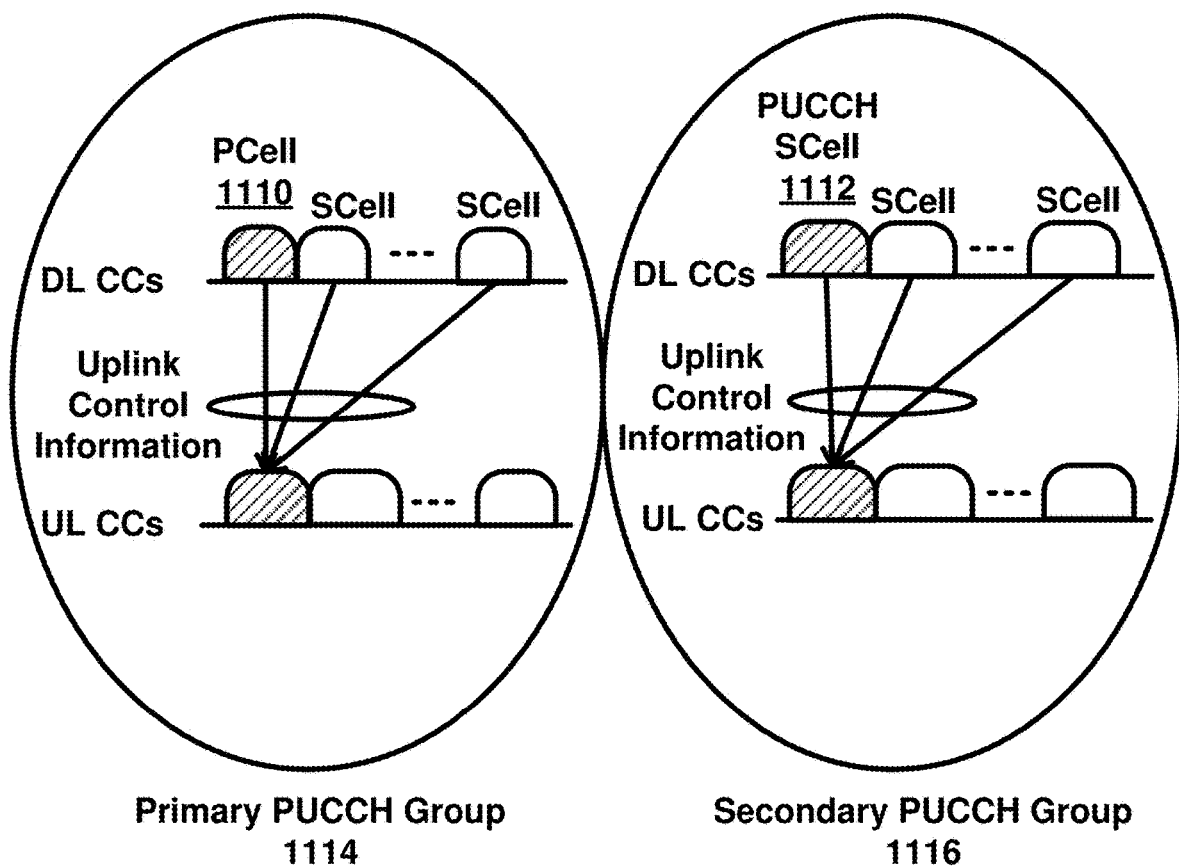
FIG. 11B shows examples of uplink control channel groups in accordance with several of various embodiments of the present disclosure.

FIG. 11B shows examples of uplink control channel groups in accordance with several of various embodiments of the present disclosure. A base station may configure a UE with multiple PUCCH groups wherein a PUCCH group comprises one or more cells. For example, as shown in FIG. 11B, the base station may configure a UE with a primary PUCCH group 1114 and a secondary PUCCH group 1116. The primary PUCCH group may comprise the PCell 1110 and one or more first SCells. First UCI corresponding to the PCell and the one or more first SCells of the primary PUCCH group may be transmitted by the PUCCH of the PCell. The first UCI may be, for example, HARQ feedback for downlink transmissions via downlink CCs of the PCell and the one or more first SCells. The secondary PUCCH group may comprise a PUCCH SCell and one or more second SCells. Second UCI corresponding to the PUCCH SCell and the one or more second SCells of the secondary PUCCH group may be transmitted by the PUCCH of the PUCCH SCell. The second UCI may be, for example, HARQ feedback for downlink transmissions via downlink CCs of the PUCCH SCell and the one or more second SCells.

FIG. 12A, FIG. 12B and FIG. 12C show example random access processes in accordance with several of various embodiments of the present disclosure. FIG. 12A shows an example of four step contention-based random access (CBRA) procedure. The four-step CBRA procedure includes exchanging four messages between a UE and a base station. Msg1 may be for transmission (or retransmission) of a random access preamble by the wireless device to the base station. Msg2 may be the random access response (RAR) by the base station to the wireless device. Msg3 is the scheduled transmission based on an uplink grant indicated in Msg2 and Msg4 may be for contention resolution.

The base station may transmit one or more RRC messages comprising configuration parameters of the random access parameters. The random access parameters may indicate radio resources (e.g., time-frequency resources) for transmission of the random access preamble (e.g., Msg1), configuration index, one or more parameters for determining the power of the random access preamble (e.g., a power ramping parameter, a preamble received target power, etc.), a parameter indicating maximum number of preamble transmission, RAR window for monitoring RAR, cell-specific random access parameters and UE specific random access parameters. The UE-specific random access parameters may indicate one or more PRACH occasions for random access preamble (e.g., Msg1) transmissions. The random access parameters may indicate association between the PRACH occasions and one or more reference signals (e.g., SSB or CSI-RS). The random access parameters may further indicate association between the random access preambles and one or more reference signals (e.g., SBB or CSI-RS). The UE may use one or more reference signals (e.g., SSB(s) or CSI-RS(s)) and may determine a random access preamble to use for Msg1 transmission based on the association between the random access preambles and the one or more reference signals. The UE may use one or more reference signals (e.g., SSB(s) or CSI-RS(s)) and may determine the PRACH occasion to use for Msg1 transmission based on the association between the PRACH occasions and the reference signals. The UE may perform a retransmission of the random access preamble if no response is received with the RAR window following the transmission of the preamble. UE may use a higher transmission power for retransmission of the preamble. UE may determine the higher transmission power of the preamble based on the power ramping parameter.

Msg2 is for transmission of RAR by the base station. Msg2 may comprise a plurality of RARs corresponding to a plurality of random access preambles transmitted by a plurality of UEs. Msg2 may be associated with a random access temporary radio identifier (RA-RNTI) and may be received in a common search space of the UE. The RA-RNTI may be based on the PRACH occasion (e.g., time and frequency resources of a PRACH) in which a random access preamble is transmitted. RAR may comprise a timing advance command for uplink timing adjustment at the UE, an uplink grant for transmission of Msg3 and a temporary C-RNTI. In response to the successful reception of Msg2, the UE may transmit the Msg3. Msg3 and Msg4 may enable contention resolution in case of CBRA. In a CBRA, a plurality of UEs may transmit the same random access preamble and may consider the same RAR as being corresponding to them. UE may include a device identifier in Msg3 (e.g., a C-RNTI, temporary C-RNTI or other UE identity). Base station may transmit the Msg4 with a PDSCH and UE may assume that the contention resolution is successful in response to the PDSCH used for transmission of Msg4 being associated with the UE identifier included in Msg3.

FIG. 12B shows an example of a contention-free random access (CFRA) process. Msg 1 (random access preamble) and Msg 2 (random access response) in FIG. 12B for CFRA may be analogous to Msg 1 and Msg 2 in FIG. 12A for CBRA. In an example, the CFRA procedure may be initiated in response to a PDCCH order from a base station. The PDCCH order for initiating the CFRA procedure by the wireless device may be based on a DCI having a first format (e.g., format 1_0). The DCI for the PDCCH order may comprise a random access preamble index, an UL/SUL indicator indicating an uplink carrier of a cell (e.g., normal uplink carrier or supplementary uplink carrier) for transmission of the random access preamble, a SS/PBCH index indicating the SS/PBCH that may be used to determine a RACH occasion for PRACH transmission, a PRACH mask index indicating the RACH occasion associated with the SS/PBCH indicated by the SS/PBCH index for PRACH transmission, etc. In an example, the CFRA process may be started in response to a beam failure recovery process. The wireless device may start the CFRA for the beam failure recovery without a command (e.g., PDCCH order) from the base station and by using the wireless device dedicated resources.

FIG. 12C shows an example of a two-step random access process comprising two messages exchanged between a wireless device and a base station. Msg A may be transmitted by the wireless device to the base station and may comprise one or more transmissions of a preamble and/or one or more transmissions of a transport block. The transport block in Msg A and Msg 3 in FIG. 12A may have similar and/or equivalent contents. The transport block of Msg A may comprise data and control information (e.g., SR, HARQ feedback, etc.). In response to the transmission of Msg A, the wireless device may receive Msg B from the base station. Msg B in FIG. 12C and Msg 2 (e.g., RAR) illustrated in FIGS. 12A and 12B may have similar and/or equivalent content.

The base station may periodically transmit synchronization signals (SS s), e.g., primary SS (PSS) and secondary SS (SSS) along with PBCH on each NR cell. The PSS/SSS together with PBCH is jointly referred to as a SS/PBCH block. The SS/PBCH block enables a wireless device to find a cell when entering to the mobile communications network or find new cells when moving within the network. The SS/PBCH block spans four OFDM symbols in time domain. The PSS is transmitted in the first symbol and occupies 127 subcarriers in frequency domain. The SSS is transmitted in the third OFDM symbol and occupies the same 127 subcarriers as the PSS. There are eight and nine empty subcarriers on each side of the SSS. The PBCH is transmitted on the second OFDM symbol occupying 240 subcarriers, the third OFDM symbol occupying 48 subcarriers on each side of the SSS, and on the fourth OFDM symbol occupying 240 subcarriers. Some of the PBCH resources indicated above may be used for transmission of the demodulation reference signal (DMRS) for coherent demodulation of the PBCH. The SS/PBCH block is transmitted periodically with a period ranging from 5 ms to 160 ms. For initial cell search or for cell search during inactive/idle state, a wireless device may assume that that the SS/PBCH block is repeated at least every 20 ms.

In NR, transmissions using of antenna arrays, with many antenna elements, and beamforming plays an important role specially in higher frequency bands. Beamforming enables higher capacity by increasing the signal strength (e.g., by focusing the signal energy in a specific direction) and by lowering the amount interference received at the wireless devices. The beamforming techniques may generally be divided to analog beamforming and digital beamforming techniques. With digital beamforming, signal processing for beamforming is carried out in the digital domain before digital-to-analog conversion and detailed control of both amplitude and phase of different antenna elements may be possible. With analog beamforming, the signal processing for beamforming is carried out in the analog domain and after the digital to analog conversion. The beamformed transmissions may be in one direction at a time. For example, the wireless devices that are in different directions relative to the base station may receive their downlink transmissions at different times. For analog receiver-side beamforming, the receiver may focus its receiver beam in one direction at a time.

In NR, the base station may use beam sweeping for transmission of SS/PBCH blocks. The SS/PBCH blocks may be transmitted in different beams using time multiplexing. The set of SS/PBCH blocks that are transmitted in one beam sweep may be referred to as a SS/PBCH block set. The period of PBCH/SSB block transmission may be a time duration between a SS/PBCH block transmission in a beam and the next SS/PBCH block transmission in the same beam. The period of SS/PBCH block is, therefore, also the period of the SS/PBCH block set.

Figure 13A:
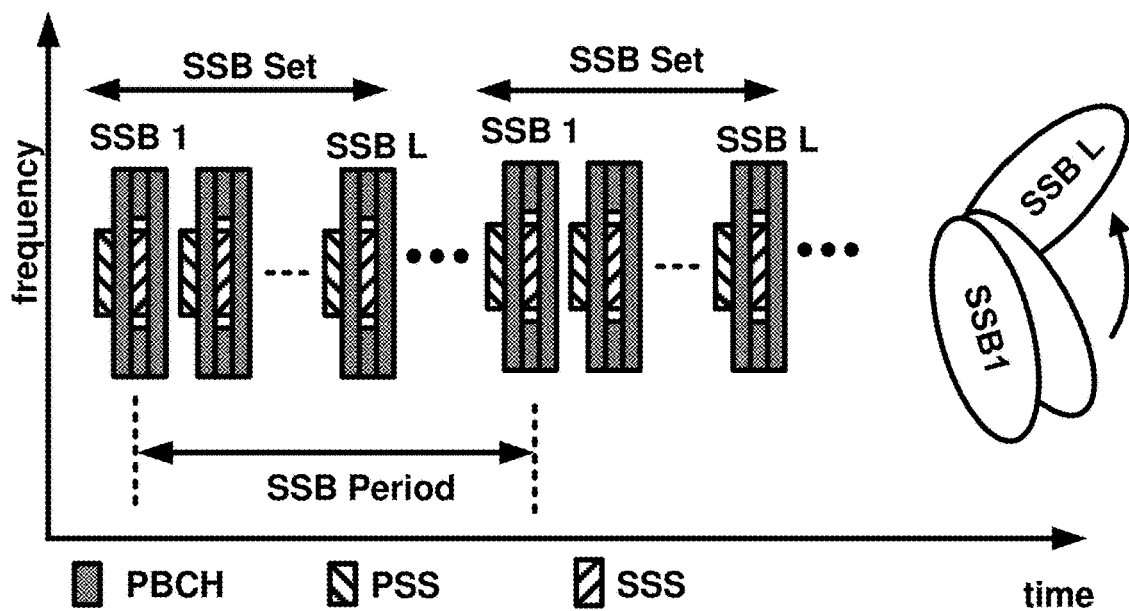
FIG. 13A shows example time and frequency structure of SSBs and their associations with beams in accordance with several of various embodiments of the present disclosure.

FIG. 13A shows example time and frequency structure of SS/PBCH blocks and their associations with beams in accordance with several of various embodiments of the present disclosure. In this example, a SS/PBCH block (also referred to as SSB) set comprise L SSBs wherein an SSB in the SSB set is associated with (e.g., transmitted in) one of L beams of a cell. The transmission of SBBs of an SSB set may be confined within a 5 ms interval, either in a first half-frame or a second half-frame of a 10 ms frame. The number of SSBs in an SSB set may depend on the frequency band of operation. For example, the number of SSBs in a SSB set may be up to four SSBs in frequency bands below 3 GHz enabling beam sweeping of up to four beams, up to eight SSBs in frequency bands between 3 GHz and 6 GHz enabling beam sweeping of up to eight beams, and up to sixty four SSBs in higher frequency bands enabling beam sweeping of up to sixty four beams. The SSs of an SSB may depend on a physical cell identity (PCI) of the cell and may be independent of which beam of the cell is used for transmission of the SSB. The PBCH of an SSB may indicate a time index parameter and the wireless device may determine the relative position of the SSB within the SSB set using the time index parameter. The wireless device may use the relative position of the SSB within an SSB set for determining the frame timing and/or determining RACH occasions for a random access process.

A wireless device entering the mobile communications network may first search for the PSS. After detecting the PSS, the wireless device may determine the synchronization up to the periodicity of the PSS. By detecting the PSS, the wireless device may determine the transmission timing of the SSS. The wireless device may determine the PCI of the cell after detecting the SSS. The PBCH of a SS/PBCH block is a downlink physical channel that carries the MIB. The MIB may be used by the wireless device to obtain remaining system information (RMSI) that is broadcast by the network. The RMSI may include System Information Block 1 (SIB1) that contains information required for the wireless device to access the cell.

As discussed earlier, the wireless device may determine a time index parameter from the SSB. The PBCH comprises a half-frame parameter indicating whether the SSB is in the first 5 ms half or the second 5 ms half of a 10 ms frame. The wireless device may determine the frame boundary using the time index parameter and the half-frame parameter. In addition, the PBCH may comprise a parameter indicating the system frame number (SFN) of the cell.

The base station may transmit CSI-RS and a UE may measure the CSI-RS to obtain channel state information (CSI). The base station may configure the CSI-RS in a UE-specific manner. In some scenarios, same set of CSI-RS resources may be configured for multiple UEs and one or more resource elements of a CSI-RS resource may be shared among multiple UEs. A CSI-RS resource may be configured such that it does not collide with a CORESET configured for the wireless device and/or with a DMRS of a PDSCH scheduled for the wireless device and/or transmitted SSBs. The UE may measure one or more CSI-RS s configured for the UE and may generate a CSI report based on the CSI-RS measurements and may transmit the CSI report to the base station for scheduling, link adaptation and/or other purposes.

NR supports flexible CSI-RS configurations. A CSI-RS resource may be configured with single or multiple antenna ports and with configurable density. Based on the number of configured antenna ports, a CSI-RS resource may span different number of OFDM symbols (e.g., 1, 2, and 4 symbols). The CSI-RS may be configured for a downlink BWP and may use the numerology of the downlink BWP. The CSI-RS may be configured to cover the full bandwidth of the downlink BWP or a portion of the downlink BWP. In some case, the CSI-RS may be repeated in every resource block of the CSI-RS bandwidth, referred to as CSI-RS with density equal to one. In some cases, the CSI-RS may be configured to be repeated in every other resource block of the CSI-RS bandwidth. CSI-RS may be non-zero power (NZP) CSI-RS or zero-power (ZP) CSI-RS.

The base station may configure a wireless device with one or more sets of NZP CSI-RS resources. The base station may configure the wireless device with a NZP CSI-RS resource set using an RRC information element (IE) NZP-CSI-RS-ResourceSet indicating a NZP CSI-RS resource set identifier (ID) and parameters specific to the NZP CSI-RS resource set. An NZP CSI-RS resource set may comprise one or more CSI-RS resources. An NZP CSI-RS resource set may be configured as part of the CSI measurement configuration.

The CSI-RS may be configured for periodic, semi-persistent or aperiodic transmission. In case of the periodic and semi-persistent CSI-RS configurations, the wireless device may be configured with a CSI resource periodicity and offset parameter that indicate a periodicity and corresponding offset in terms of number of slots. The wireless device may determine the slots that the CSI-RSs are transmitted. For semi-persistent CSI-RS, the CSI-RS resources for CSI-RS transmissions may be activated and deactivated by using a semi-persistent (SP) CSI-CSI Resource Set Activation/Deactivation MAC CE. In response to receiving a MAC CE indicating activation of semi-persistent CSI-RS resources, the wireless device may assume that the CSI-RS transmissions will continue until the CSI-RS resources for CSI-RS transmissions are activated.

As discussed before, CSI-RS may be configured for a wireless device as NZP CSI-RS or ZP CSI-RS. The configuration of the ZP CSI-RS may be similar to the NZP CSI-RS with the difference that the wireless device may not carry out measurements for the ZP CSI-RS. By configuring ZP CSI-RS, the wireless device may assume that a scheduled PDSCH that includes resource elements from the ZP CSI-RS is rate matched around those ZP CSI-RS resources. For example, a ZP CSI-RS resource configured for a wireless device may be an NZP CSI-RS resource for another wireless device. For example, by configuring ZP CSI-RS resources for the wireless device, the base station may indicate to the wireless device that the PDSCH scheduled for the wireless device is rate matched around the ZP CSI-RS resources.

A base station may configure a wireless device with channel state information interference measurement (CSI-IM) resources. Similar to the CSI-RS configuration, configuration of locations and density of CSI-IM resources may be flexible. The CSI-IM resources may be periodic (configured with a periodicity), semi-persistent (configured with a periodicity and activated and deactivated by MAC CE) or aperiodic (triggered by a DCI).

Tracking reference signals (TRSs) may be configured for a wireless device as a set of sparse reference signals to assist the wireless in time and frequency tracking and compensating time and frequency variations in its local oscillator. The wireless device may further use the TRSs for estimating channel characteristics such as delay spread or doppler frequency. The base station may use a CSI-RS configuration for configuring TRS for the wireless device. The TRS may be configured as a resource set comprising multiple periodic NZP CSI-RS resources.

A base station may configure a UE and the UE may transmit sounding reference signals (SRSs) to enable uplink channel sounding/estimation at the base station. The SRS may support up to four antenna ports and may be designed with low cubic metric enabling efficient operation of the wireless device amplifier. The SRS may span one or more (e.g., one, two or four) consecutive OFDM symbols in time domain and may be located within the last n (e.g., six)

symbols of a slot. In the frequency domain, the SRS may have a structure that is referred to as a comb structure and may be transmitted on every Nth subcarrier. Different SRS transmissions from different wireless devices may have different comb structures and may be multiplexed in frequency domain.

A base station may configure a wireless device with one or more SRS resource sets and an SRS resource set may comprise one or more SRS resources. The SRS resources in an SRS resources set may be configured for periodic, semi-persistent or aperiodic transmission. The periodic SRS and the semi-persistent SRS resources may be configured with periodicity and offset parameters. The Semi-persistent SRS resources of a configured semi-persistent SRS resource set may be activated or deactivated by a semi-persistent (SP) SRS Activation/Deactivation MAC CE. The set of SRS resources included in an aperiodic SRS resource set may be activated by a DCI. A value of a field (e.g., an SRS request field) in the DCI may indicate activation of resources in an aperiodic SRS resource set from a plurality of SRS resource sets configured for the wireless device.

An antenna port may be associated with one or more reference signals. The receiver may assume that the one or more reference signals, associated with the antenna port, may be used for estimating channel corresponding to the antenna port. The reference signals may be used to derive channel state information related to the antenna port. Two antenna ports may be referred to as quasi co-located if characteristics (e.g., large-scale properties) of the channel over which a symbol is conveyed on one antenna port may be inferred from the channel over which a symbol is conveyed from another antenna port. For example, a UE may assume that radio channels corresponding to two different antenna ports have the same large-scale properties if the antenna ports are specified as quasi co-located. In some cases, the UE may assume that two antenna ports are quasi co-located based on signaling received from the base station. Spatial quasi-colocation (QCL) between two signals may be, for example, due to the two signals being transmitted from the same location and in the same beam. If a receive beam is good for a signal in a group of signals that are spatially quasi co-located, it may be assumed also be good for the other signals in the group of signals.

The CSI-RS in the downlink and the SRS in uplink may serve as quasi-location (QCL) reference for other physical downlink channels and physical uplink channels, respectively. For example, a downlink physical channel (e.g., PDSCH or PDCCH) may be spatially quasi co-located with a downlink reference signal (e.g., CSI-RS or SSB). The wireless device may determine a receive beam based on measurement on the downlink reference signal and may assume that the determined received beam is also good for reception of the physical channels (e.g., PDSCH or PDCCH) that are spatially quasi co-located with the downlink reference signal. Similarly, an uplink physical channel (e.g., PUSCH or PUCCH) may be spatially quasi co-located with an uplink reference signal (e.g., SRS). The base station may determine a receive beam based on measurement on the uplink reference signal and may assume that the determined received beam is also good for reception of the physical channels (e.g., PUSCH or PUCCH) that are spatially quasi co-located with the uplink reference signal.

The Demodulation Reference Signals (DM-RS s) enables channel estimation for coherent demodulation of downlink physical channels (e.g., PDSCH, PDCCH and PBH) and uplink physical channels (e.g., PUSCH and PUCCH). The DM-RS may be located early in the transmission (e.g., front-loaded DM-RS) and may enable the receiver to obtain the channel estimate early and reduce the latency. The time-domain structure of the DM-RS (e.g., symbols wherein the DM-RS are located in a slot) may be based on different mapping types.

The Phase Tracking Reference Signals (PT-RS s) enables tracking and compensation of phase variations across the transmission duration. The phase variations may be, for example, due to oscillator phase noise. The oscillator phase noise may become more sever in higher frequencies (e.g., mmWave frequency bands). The base station may configure the PT-RS for uplink and/or downlink. The PT-RS configuration parameters may indicate frequency and time density of PT-RS, maximum number of ports (e.g., uplink ports), resource element offset, configuration of uplink PT-RS without transform precoder (e.g., CP-OFDM) or with transform precoder (e.g., DFT-s-OFDM), etc. The subcarrier number and/or resource blocks used for PT-RS transmission may be based on the C-RNTI of the wireless device to reduce risk of collisions between PT-RS s of wireless devices scheduled on overlapping frequency domain resources.

Figure 13B:
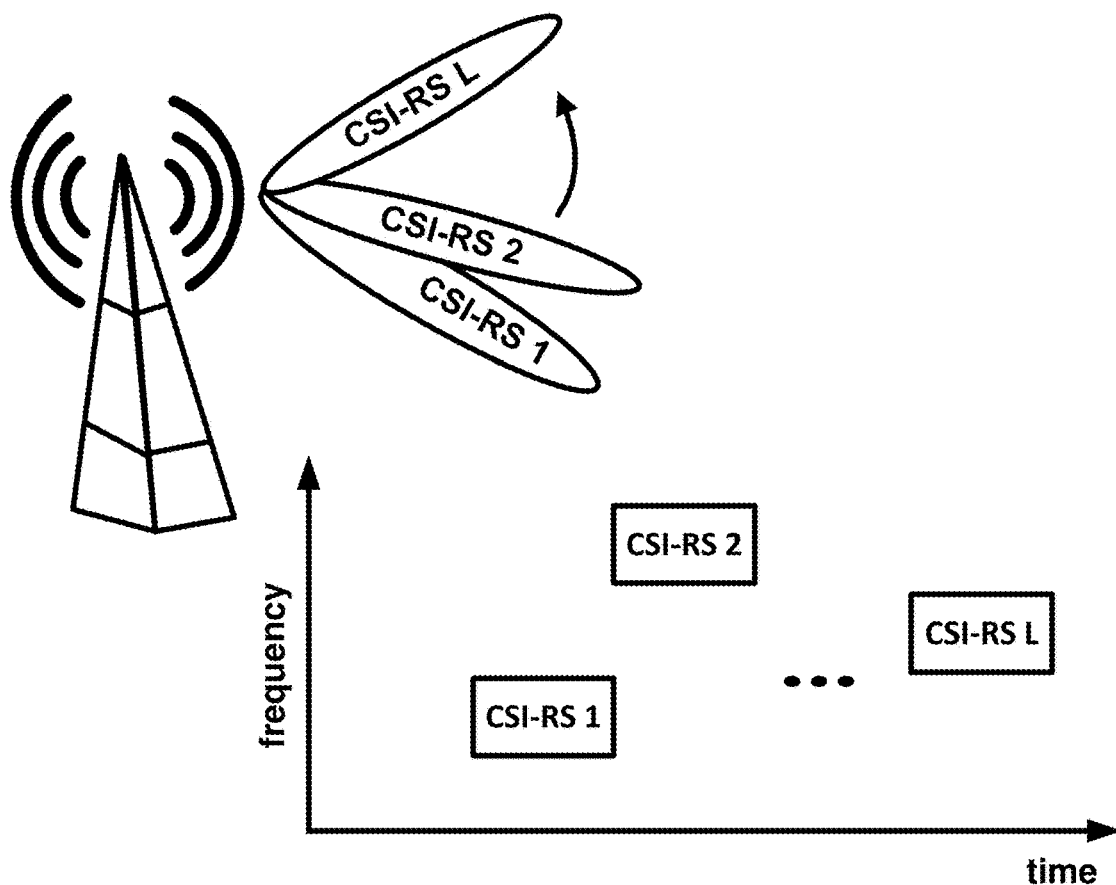
FIG. 13B shows example time and frequency structure of CSI-RSs and their association with beams in accordance with several of various embodiments of the present disclosure.

FIG. 13B shows example time and frequency structure of CSI-RS s and their association with beams in accordance with several of various embodiments of the present disclosure. A beam of the L beams shown in FIG. 13B may be associated with a corresponding CSI-RS resource. The base station may transmit the CSI-RS s using the configured CSI-RS resources and a UE may measure the CSI-RS s (e.g., received signal received power (RSRP) of the CSI-RS s) and report the CSI-RS measurements to the base station based on a reporting configuration. For example, the base station may determine one or more transmission configuration indication (TCI) states and may indicate the one or more TCI states to the UE (e.g., using RRC signaling, a MAC CE and/or a DCI). Based on the one or more TCI states indicated to the UE, the UE may determine a downlink receive beam and receive downlink transmissions using the receive beam. In case of a beam correspondence, the UE may determine a spatial domain filter of a transmit beam based on spatial domain filter of a corresponding receive beam. Otherwise, the UE may perform an uplink beam selection procedure to determine the spatial domain filter of the transmit beam. The UE may transmit one or more SRSs using the SRS resources configured for the UE and the base station may measure the SRSs and determine/select the transmit beam for the UE based the SRS measurements. The base station may indicate the selected beam to the UE. The CSI-RS resources shown in FIG. 13B may be for one UE. The base station may configure different CSI-RS resources associated with a given beam for different UEs by using frequency division multiplexing.

A base station and a wireless device may perform beam management procedures to establish beam pairs (e.g., transmit and receive beams) that jointly provide good connectivity. For example, in the downlink direction, the UE may perform measurements for a beam pair and estimate channel quality for a transmit beam by the base station (or a transmission reception point (TRP) more generally) and the receive beam by the UE. The UE may transmit a report indicating beam pair quality parameters. The report may comprise one or more parameters indicating one or more beams (e.g., a beam index, an identifier of reference signal associated with a beam, etc.), one or more measurement parameters (e.g., RSRP), a precoding matrix indicator (PMI), a channel quality indicator (CQI), and/or a rank indicator (RI).

Figure 14A:
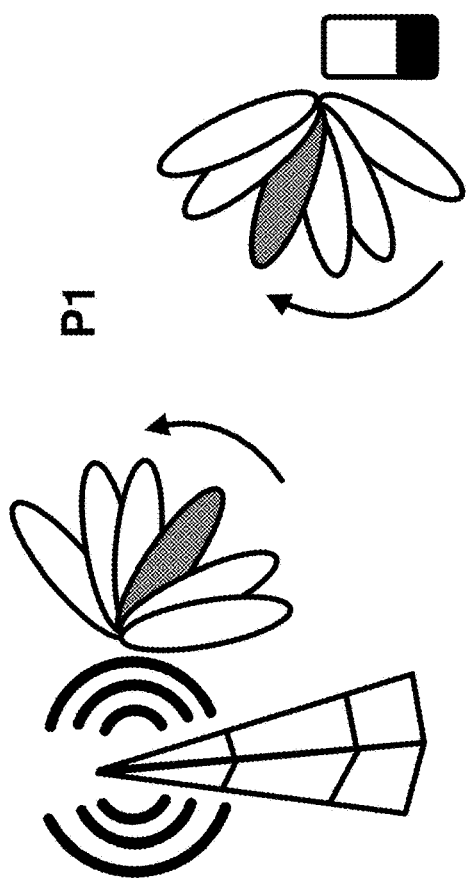
FIG. 14A, FIG. 14B and FIG. 14C show example beam management processes in accordance with several of various embodiments of the present disclosure.
Figure 14C:
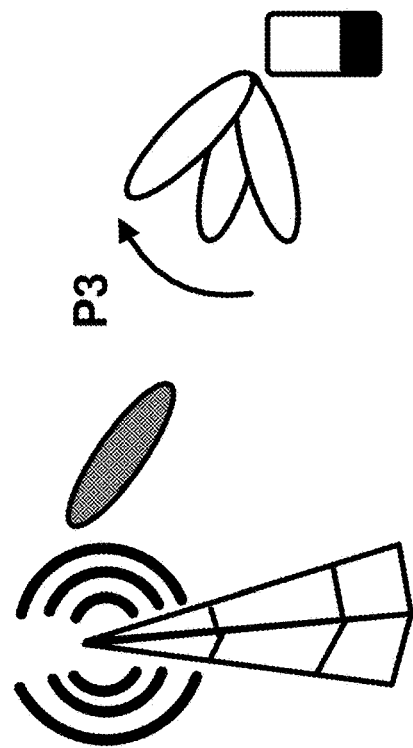
Figure 14B:
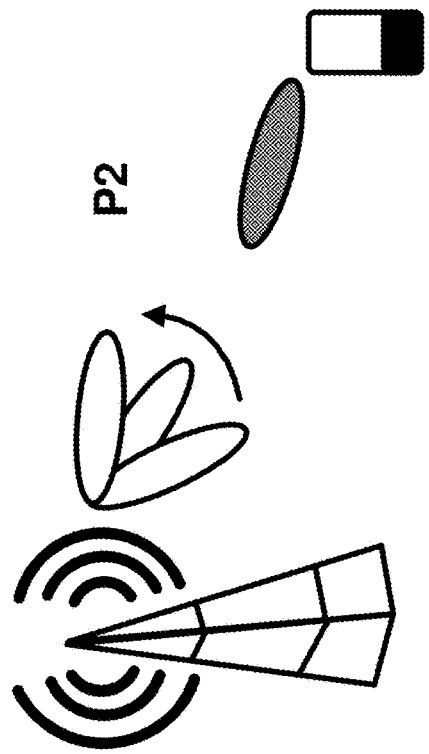

FIG. 14A, FIG. 14B and FIG. 14C show example beam management processes (referred to as P1, P2 and P3, respectively) in accordance with several of various embodiments of the present disclosure. The P1 process shown in FIG. 14A may enable, based on UE measurements, selection of a base station (or TRP more generally) transmit beam and/or a wireless device receive beam. The TRP may perform a beam sweeping procedure where the TRP may sequentially transmit reference signals (e.g., SSB and/or CSI-RS) on a set of beams and the UE may select a beam from the set of beams and may report the selected beam to the TRP. The P2 procedure as shown in FIG. 14B may be a beam refinement procedure. The selection of the TRP transmit beam and the UE receive beam may be regularly reevaluated due to movements and/or rotations of the UE or movement of other objects. In an example, the base station may perform the beam sweeping procedure over a smaller set of beams and the UE may select the best beam over the smaller set. In an example, the beam shape may be narrower compared to beam selected based on the P1 procedure. Using the P3 procedure as shown in FIG. 14C, the TRP may fix its transmit beam and the UE may refine its receive beam.

A wireless device may receive one or more messages from a base station. The one or more messages may comprise one or more RRC messages. The one or more messages may comprise configuration parameters of a plurality of cells for the wireless device. The plurality of cells may comprise a primary cell and one or more secondary cells. For example, the plurality of cells may be provided by a base station and the wireless device may communicate with the base station using the plurality of cells. For example, the plurality of cells may be provided by multiple base station (e.g., in case of dual and/or multi-connectivity). The wireless device may communicate with a first base station, of the multiple base stations, using one or more first cells of the plurality of cells. The wireless device may communicate with a second base station of the multiple base stations using one or more second cells of the plurality of cells.

The one or more messages may comprise configuration parameters used for processes in physical, MAC, RLC, PCDP, SDAP, and/or RRC layers of the wireless device. For example, the configuration parameters may include values of timers used in physical, MAC, RLC, PCDP, SDAP, and/or RRC layers. For example, the configuration parameters may include parameters for configuring different channels (e.g., physical layer channel, logical channels, RLC channels, etc.) and/or signals (e.g., CSI-RS, SRS, etc.).

Upon starting a timer, the timer may start running until the timer is stopped or until the timer expires. A timer may be restarted if it is running. A timer may be started if it is not running (e.g., after the timer is stopped or after the timer expires). A timer may be configured with or may be associated with a value (e.g., an initial value). The timer may be started or restarted with the value of the timer. The value of the timer may indicate a time duration that the timer may be running upon being started or restarted and until the timer expires. The duration of a timer may not be updated until the timer is stopped or expires (e.g., due to BWP switching). This specification may disclose a process that includes one or more timers. The one or more timers may be implemented in multiple ways. For example, a timer may be used by the wireless device and/or base station to determine a time window [t1, t2], wherein the timer is started at time t1 and expires at time t2 and the wireless device and/or base station may be interested in and/or monitor the time window [t1, t2], for example to receive a specific signaling. Other examples of implementation of a timer may be provided.

Figure 15:
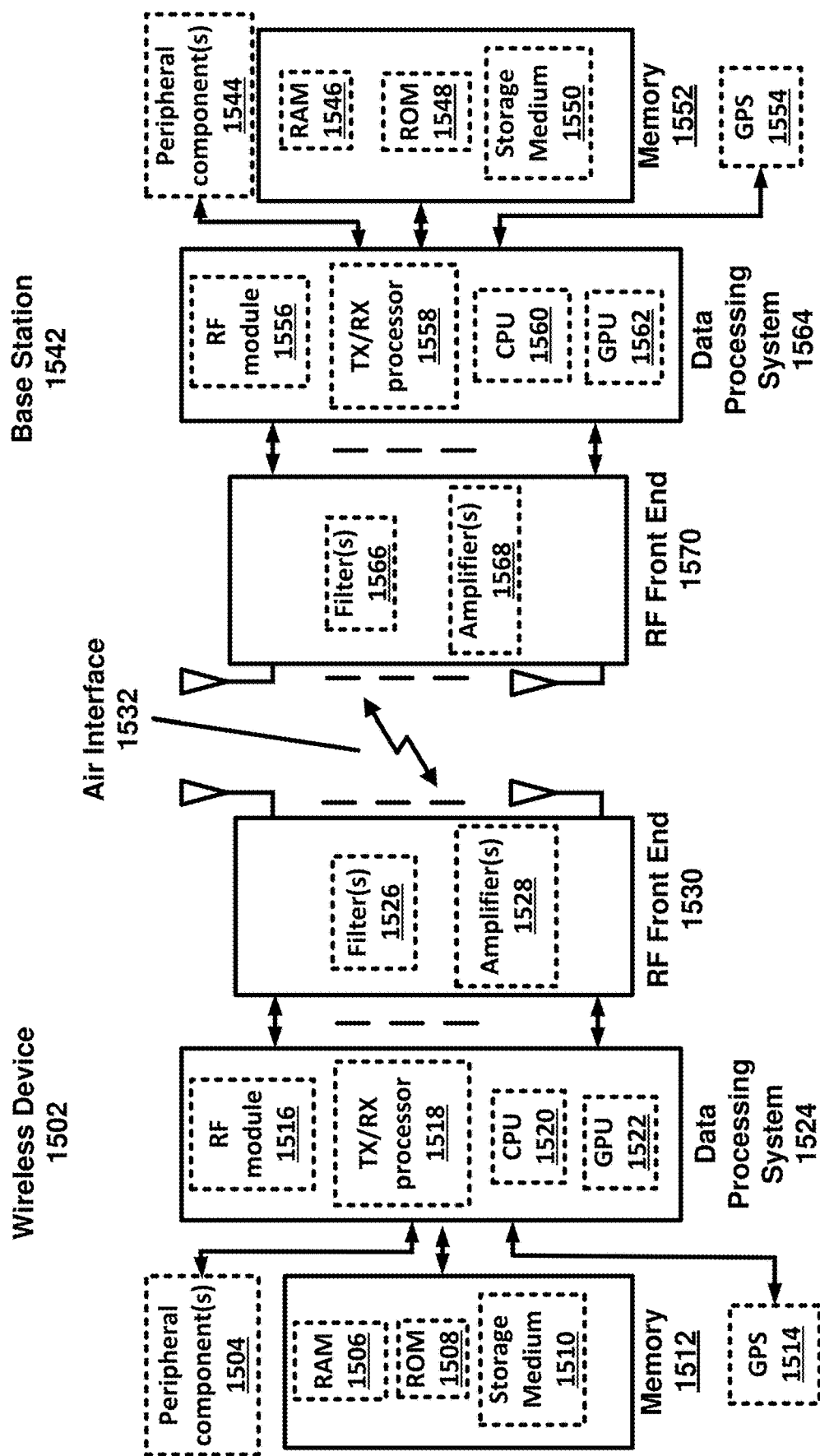
FIG. 15 shows example components of a wireless device and a base station that are in communication via an air interface in accordance with several of various embodiments of the present disclosure.

FIG. 15 shows example components of a wireless device and a base station that are in communication via an air interface in accordance with several of various embodiments of the present disclosure. The wireless device 1502 may communicate with the base station 1542 over the air interface 1532. The wireless device 1502 may include a plurality of antennas. The base station 1542 may include a plurality of antennas. The plurality of antennas at the wireless device 1502 and/or the base station 1542 enables different types of multiple antenna techniques such as beamforming, single-user and/or multi-user MIMO, etc.

The wireless device 1502 and the base station 1542 may have one or more of a plurality of modules/blocks, for example RF front end (e.g., RF front end 1530 at the wireless device 1502 and RF front end 1570 at the base station 1542), Data Processing System (e.g., Data Processing System 1524 at the wireless device 1502 and Data Processing System 1564 at the base station 1542), Memory (e.g., Memory 1512 at the wireless device 1502 and Memory 1542 at the base station 1542). Additionally, the wireless device 1502 and the base station 1542 may have other modules/blocks such as GPS (e.g., GPS 1514 at the wireless device 1502 and GPS 1554 at the base station 1542).

An RF front end module/block may include circuitry between antennas and a Data Processing System for proper conversion of signals between these two modules/blocks. An RF front end may include one or more filters (e.g., Filter(s) 1526 at RF front end 1530 or Filter(s) 1566 at the RF front end 1570), one or more amplifiers (e.g., Amplifier(s) 1528 at the RF front end 1530 and Amplifier(s) 1568 at the RF front end 1570). The Amplifier(s) may comprise power amplifier(s) for transmission and low-noise amplifier(s) (LNA(s)) for reception.

The Data Processing System 1524 and the Data Processing System 1564 may process the data to be transmitted or the received signals by implementing functions at different layers of the protocol stack such as PHY, MAC, RLC, etc. Example PHY layer functions that may be implemented by the Data Processing System 1524 and/or 1564 may include forward error correction, interleaving, rate matching, modulation, precoding, resource mapping, MIMO processing, etc. Similarly, one or more functions of the MAC layer, RLC layer and/or other layers may be implemented by the Data Processing System 1524 and/or the Data Processing System 1564. One or more processes described in the present disclosure may be implemented by the Data Processing System 1524 and/or the Data Processing System 1564. A Data Processing System may include an RF module (RF module 1516 at the Data Processing System 1524 and RF module 1556 at the Data Processing System 1564) and/or a TX/RX processor (e.g., TX/RX processor 1518 at the Data Processing System 1524 and TX/RX processor 1558 at the Data Processing System 1566) and/or a central processing unit (CPU) (e.g., CPU 1520 at the Data Processing System 1524 and CPU 1560 at the Data Processing System 1564) and/or a graphical processing unit (GPU) (e.g., GPU 1522 at the Data Processing System 1524 and GPU 1562 at the Data Processing System 1564).

The Memory 1512 may have interfaces with the Data Processing System 1524 and the Memory 1552 may have interfaces with Data Processing System 1564, respectively. The Memory 1512 or the Memory 1552 may include non-transitory computer readable mediums (e.g., Storage Medium 1510 at the Memory 1512 and Storage Medium 1550 at the Memory 1552) that may store software code or instructions that may be executed by the Data Processing System 1524 and Data Processing System 1564, respectively, to implement the processes described in the present disclosure. The Memory 1512 or the Memory 1552 may include random-access memory (RAM) (e.g., RAM 1506 at the Memory 1512 or RAM 1546 at the Memory 1552) or read-only memory (ROM) (e.g., ROM 1508 at the Memory 1512 or ROM 1548 at the Memory 1552) to store data and/or software codes.

The Data Processing System 1524 and/or the Data Processing System 1564 may be connected to other components such as a GPS module 1514 and a GPS module 1554, respectively, wherein the GPS module 1514 and a GPS module 1554 may enable delivery of location information of the wireless device 1502 to the Data Processing System 1524 and location information of the base station 1542 to the Data Processing System 1564. One or more other peripheral components (e.g., Peripheral Component(s) 1504 or Peripheral Component(s) 1544) may be configured and connected to the data Processing System 1524 and data Processing System 1564, respectively.

In example embodiments, a wireless device may be configured with parameters and/or configuration arrangements. For example, the configuration of the wireless device with parameters and/or configuration arrangements may be based on one or more control messages that may be used to configure the wireless device to implement processes and/or actions. The wireless device may be configured with the parameters and/or the configuration arrangements regardless of the wireless device being in operation or not in operation. For example, software, firmware, memory, hardware and/or a combination thereof and/or alike may be configured in a wireless device regardless of the wireless device being in operation or not operation. The configured parameters and/or settings may influence the actions and/or processes performed by the wireless device when in operation.

In example embodiments, a wireless device may receive one or more message comprising configuration parameters. For example, the one or more messages may comprise radio resource control (RRC) messages. A parameter of the configuration parameters may be in at least one of the one or more messages. The one or more messages may comprise information element (IEs). An information element may be a structural element that includes single or multiple fields. The fields in an IE may be individual contents of the IE. The terms configuration parameter, IE and field may be used equally in this disclosure. The IEs may be implemented using a nested structure, wherein an IE may include one or more other IEs and an IE of the one or more other IEs may include one or more additional IEs. With this structure, a parent IE contains all the offspring IEs as well. For example, a first IE containing a second IE, the second IE containing a third IE, and the third IE containing a fourth IE may imply that the first IE contains the third IE and the fourth IE.

In an example, the IE ConfiguredGrantConfig may be used to configure uplink transmission without dynamic grant according to two possible schemes. The uplink grant may either be configured via RRC (type1) or provided via the PDCCH (addressed to CS-RNTI) (type2). Multiple Configured Grant configurations may be configured in one BWP of a serving cell. A parameter cg-nrofPUSCH-InSlot may indicate the number of consecutive PUSCH configured to CG within a slot where the SLIV indicating the first PUSCH and additional PUSCH appended with the same length. A parameter cg-nrofSlots may indicate the number of allocated slots in a configured grant periodicity following the time instance of configured grant offset. A parameter cg-Retransmission-Timer may indicate the initial value of the configured retransmission timer in multiples of periodicity. The value of cg-RetransmissionTimer may be less than the value of configuredGrantTimer. This field may be configured for operation with shared spectrum channel access together with harq-ProcID-Offset. This field may not be configured for operation in licensed spectrum or simultaneously with harq-ProcID-Offset2. A parameter configuredGrantConfigIndex may indicate the index of the Configured Grant configurations within the BWP. A parameter configuredGrantConfig-IndexMACmay indicate the index of the Configured Grant configurations within the MAC entity. A parameter configuredGrantTimermay indicate the initial value of the configured grant timer in multiples of periodicity. When cg-RetransmissonTimer is configured, if HARQ processes are shared among different configured grants on the same BWP, configuredGrantTimer may be set to the same value for all of configurations on this BWP. A parameter frequencyDomainAllocation may indicate the frequency domain resource allocation. A parameter harq-ProcID-Offset, for operation with shared spectrum channel access, may configure the range of HARQ process IDs which may be used for this configured grant where the UE can select a HARQ process ID within [harq-procID-offset, . . . , (harq-procID-offset+nrofHARQ-Processes-1)]. A parameter harq-ProcID-Offset2 may indicate the offset used in deriving the HARQ process IDs. This field may not be configured for operation with shared spectrum channel access. The number of HARQ processes may be configured. It may apply for both Type 1 and Type 2. A parameter periodicitymay indicate oeriodicity for UL transmission without UL grant for type 1 and type 2. A parameter repK-RVmay be the redundancy version (RV) sequence to use. The network may configure this field if repetitions are used, e.g., if repK is set to n2, n4 or n8. This field may not be configured when cg-RetransmissionTimer is configured. Otherwise, the field may be absent. A parameter repK may indicate the number of repetitions of K. A parameter resourceAllocation may indicate configuration of resource allocation type 0 and resource allocation type 1. For Type 1 UL data transmission without grant, resourceAllocation may be resourceAllocationType0 or resourceAllocationType1. A parameter rrc-ConfiguredUplinkGrantmay indicate configuration for "configured grant" transmission with fully RRC-configured UL grant (Type1). If this field is absent the UE may use UL grant configured by DCI addressed to CS-RNTI (Type2). Type 1 configured grant may be configured for UL or SUL, but not for both simultaneously. A parameter timeDomainAllocation may indicate a combination of start symbol and length and PUSCH mapping type. A parameter timeDomainOffset may indicate Offset related to the reference SFN indicated by timeReferenceSFN. A parameter timeReferenceSFN may indicate SFN used for determination of the offset of a resource in time domain. The UE may use the closest SFN with the indicated number preceding the reception of the configured grant configuration. If the field timeReferenceSFN is not present, the reference SFN may be 0. A parameter channelAccessPriority may indicate the Channel Access Priority Class that the gNB may assume when sharing the UE initiated COT.

The IE ConfiguredGrantConfigIndex may be used to indicate the index of one of multiple UL Configured Grant configurations in one BWP.

The IE ConfiguredGrantConfigIndexMAC may be used to indicate the unique Configured Grant configurations index per MAC entity.

In an example, uplink grant may be received dynamically on the PDCCH, in a Random Access Response, configured semi-persistently by RRC or determined to be associated with the PUSCH resource of MSGA. The MAC entity may have an uplink grant to transmit on the UL-SCH. To perform the requested transmissions, the MAC layer may receive HARQ information from lower layers. An uplink grant addressed to CS-RNTI with NDI=0 may be considered as a configured uplink grant. An uplink grant addressed to CS-RNTI with NDI=1 may be considered as a dynamic uplink grant.

In an example, if an uplink grant for this Serving Cell has been received on the PDCCH for the MAC entity's C-RNTI or Temporary C-RNTI; or if an uplink grant has been received in a Random Access Response: if the uplink grant is for MAC entity's C-RNTI and if the previous uplink grant delivered to the HARQ entity for the same HARQ process was either an uplink grant received for the MAC entity's CS-RNTI or a configured uplink grant: the wireless device may consider the NDI to have been toggled for the corresponding HARQ process regardless of the value of the NDI.

In an example, if an uplink grant for this Serving Cell has been received on the PDCCH for the MAC entity's C-RNTI or Temporary C-RNTI; or if an uplink grant has been received in a Random Access Response: if the uplink grant is for MAC entity's C-RNTI, and the identified HARQ process is configured for a configured uplink grant: the wireless device may start or restart the configuredGrantTimer for the corresponding HARQ process, if configured. The wireless device may stop the cg-RetransmissionTimer for the corresponding HARQ process, if running.

In an example, if an uplink grant for this PDCCH occasion has been received for this Serving Cell on the PDCCH for the MAC entity's CS-RNTI: if the NDI in the received HARQ information is 1: the wireless device may consider the NDI for the corresponding HARQ process not to have been toggled; start or restart the configuredGrantTimer for the corresponding HARQ process, if configured; stop the cg-RetransmissionTimer for the corresponding HARQ process, if running; deliver the uplink grant and the associated HARQ information to the HARQ entity.

In an example, if an uplink grant for this PDCCH occasion has been received for this Serving Cell on the PDCCH for the MAC entity's CS-RNTI: if the NDI in the received HARQ information is 0: if PDCCH contents indicate configured grant Type 2 activation: the wireless device may trigger configured uplink grant confirmation; store the uplink grant for this Serving Cell and the associated HARQ information as configured uplink grant; initialize or re-initialize the configured uplink grant for this Serving Cell to start in the associated PUSCH duration and to recur; stop the configuredGrantTimer for the corresponding HARQ process, if running; and stop the cg-RetransmissionTimer for the corresponding HARQ process, if running.

In an example, for a Serving Cell and a configured uplink grant, if configured and activated, the MAC entity may: the wireless device may set the HARQ Process ID to the HARQ Process ID associated with this PUSCH duration. If, for the corresponding HARQ process, the configuredGrantTimer is not running and cg-RetransmissionTimer is not configured (i.e. new transmission): the wireless device may consider the NDI bit for the corresponding HARQ process to have been toggled; and deliver the configured uplink grant and the associated HARQ information to the HARQ entity. If the cg-RetransmissionTimer for the corresponding HARQ process is configured and not running, for the corresponding HARQ process: if the configuredGrantTimer is not running, and the HARQ process is not pending (i.e. new transmission): the wireless device may consider the NDI bit to have been toggled; the wireless device may deliver the configured uplink grant and the associated HARQ information to the HARQ entity.

In an example, for configured uplink grants neither configured with harq-ProcID-Offset2 nor with cg-RetransmissionTimer, the HARQ Process ID associated with the first symbol of a UL transmission may be derived from the following equation: HARQ Process ID=[floor(CURRENT_symbol/periodicity)] modulo nrofHARQ-Processes. For configured uplink grants with harq-ProcID-Offset2, the HARQ Process ID associated with the first symbol of a UL transmission is derived from the following equation: HARQ Process ID=[floor(CURRENT_symbol/periodicity)] modulo nrofHARQ-Processes+harq-ProcID-Offset2, where CURRENT_symbol=(SFN×numberOfSlotsPerFrame×numberOfSymbolsPerSlot+slot number in the frame×numberOfSymbolsPerSlot+symbol number in the slot), and numberOfSlotsPerFrame and numberOfSymbolsPerSlot may refer to the number of consecutive slots per frame and the number of consecutive symbols per slot, respectively.

In an example, for configured uplink grants configured with cg-RetransmissionTimer, the UE implementation may select an HARQ Process ID among the HARQ process IDs available for the configured grant configuration. The UE may prioritize retransmissions before initial transmissions. The UE may toggle the NDI in the CG-UCI for new transmissions and not toggle the NDI in the CG-UCI in retransmissions.

In an example, if cg-RetransmissionTimer is not configured, a HARQ process may not be shared between different configured grant configurations in the same BWP.

In an example, for an uplink grant, the HARQ entity may: identify the HARQ process associated with this grant, and for each identified HARQ process: if the uplink grant is part of a bundle of the configured uplink grant, and may be used for initial transmission, and if no MAC PDU has been obtained for this bundle: if a MAC PDU to transmit has been obtained: if the uplink grant is not a configured grant configured with autonomousTx; the wireless device may deliver the MAC PDU and the uplink grant and the HARQ information of the TB to the identified HARQ process; instruct the identified HARQ process to trigger a new transmission; if the uplink grant is a configured uplink grant: start or restart the configuredGrantTimer, if configured, for the corresponding HARQ process when the transmission is performed if LBT failure indication is not received from lower layers; start or restart the cg-RetransmissionTimer, if configured, for the corresponding HARQ process when the transmission is performed if LBT failure indication is not received from lower layers. If the uplink grant is addressed to C-RNTI, and the identified HARQ process is configured for a configured uplink grant: the wireless device may start or restart the configuredGrantTimer, if configured, for the corresponding HARQ process when the transmission is performed if LBT failure indication is not received from lower layers. If cg-RetransmissionTimer is configured for the identified HARQ process: if the transmission is performed and LBT failure indication is not received from lower layers: the wireless device may consider the identified HARQ process as not pending. Otherwise, the wireless device may consider the identified HARQ process as pending.

In an example, for an uplink grant, the HARQ entity may: identify the HARQ process associated with this grant, and for each identified HARQ process: if the uplink grant is part of a bundle of the configured uplink grant, and may be used for retransmission, the wireless device may deliver the uplink grant and the HARQ information (redundancy version) of the TB to the identified HARQ process; instruct the identified HARQ process to trigger a retransmission. If if the uplink grant is addressed to CS-RNTI; or if the uplink grant is addressed to C-RNTI, and the identified HARQ process is configured for a configured uplink grant: the wireless device may start or restart the configuredGrantTimer, if configured, for the corresponding HARQ process when the transmission is performed if LBT failure indication is not received from lower layers. If the uplink grant is a configured uplink grant: if the identified HARQ process is pending: the wireless device may start or restart the configuredGrantTimer for the corresponding HARQ process when the transmission is performed if LBT failure indication is not received from lower layers. If the uplink grant is a configured uplink grant: the wireless device may start or restart the cg-RetransmissionTimer, if configured, for the corresponding HARQ process when the transmission is performed if LBT failure indication is not received from lower layers.

In an example, when cg-RetransmissionTimer is configured and the HARQ entity obtains a MAC PDU to transmit, the corresponding HARQ process may be considered to be pending. For a configured uplink grant, configured with cg-RetransmissionTimer, each associated HARQ process is considered as not pending when: a transmission is performed on that HARQ process and LBT failure indication is not received from lower layers; or the configured uplink grant is initialised and this HARQ process is not associated with another active configured uplink grant; or the HARQ buffer for this HARQ process is flushed.

In an example, if a HARQ process receives downlink feedback information, the HARQ process may: stop the cg-RetransmissionTimer, if running; if acknowledgement is indicated: stop the configuredGrantTimer, if running.

In an example, if the configuredGrantTimer expires for a HARQ process, the HARQ process may stop the cg-RetransmissionTimer, if running.

In an example, two types of transmission without dynamic grant may be used: configured grant Type 1 where an uplink grant is provided by RRC and stored as configured uplink grant; and configured grant Type 2 where an uplink grant is provided by PDCCH, and stored or cleared as configured uplink grant based on L1 signaling indicating configured uplink grant activation or deactivation.

In an example, Type 1 and Type 2 may be configured by RRC per Serving Cell and per BWP. Multiple configurations may be active simultaneously in the same BWP. For Type 2, activation and deactivation may be independent among the Serving Cells. For the same BWP, the MAC may can be configured with both Type 1 and Type 2.

In an example, RRC may configure the following parameters when the configured grant Type 1 is configured: cs-RNTI: CS-RNTI for retransmission; periodicity: periodicity of the configured grant Type 1; timeDomainOffset: Offset of a resource with respect to SFN=timeReferenceSFN in time domain; timeDomainAllocation: Allocation of configured uplink grant in time domain which may contain startSymbolAndLength (e.g., SLIV (start and length indicator value)) or startSymbol; nrofHARQ-Processes: the number of HARQ processes for configured grant; harq-ProcID-Offset: offset of HARQ process for configured grant for operation with shared spectrum channel access; harq-ProcID-Offset2: offset of HARQ process for configured grant; timeReferenceSFN: SFN used for determination of the offset of a resource in time domain. The UE may use the closest SFN with the indicated number preceding the reception of the configured grant configuration.

In an example, RRC may configure the following parameters when the configured grant Type 2 is configured: cs-RNTI: CS-RNTI for activation, deactivation, and retransmission; periodicity: periodicity of the configured grant Type 2; nrofHARQ-Processes: the number of HARQ processes for configured grant; harq-ProcID-Offset: offset of HARQ process for configured grant for operation with shared spectrum channel access; harq-ProcID-Offset2: offset of HARQ process for configured grant.

In an example, RRC may configure the following parameters when retransmissions on configured uplink grant is configured: cg-RetransmissionTimer: the duration after a configured grant (re)transmission of a HARQ process when the UE may not autonomously retransmit that HARQ process.

In an example, upon configuration of a configured grant Type 1 for a Serving Cell by upper layers, the MAC entity may: store the uplink grant provided by upper layers as a configured uplink grant for the indicated Serving Cell; initialize or re-initialize the configured uplink grant to start in the symbol according to timeDomainOffset, timeReferenceSFN, and S (derived from SLIV or provided by startSymbol), and to reoccur with periodicity.

In an example, after an uplink grant is configured for a configured grant Type 1, the MAC entity may consider sequentially that the Nth (N>=0) uplink grant occurs in the symbol for which: [(SFN×numberOfSlotsPerFrame×numberOfSymbolsPerSlot)+(slot number in the frame×numberOfSymbolsPerSlot)+symbol number in the slot]=(timeReferenceSFN×numberOfSlotsPerFrame× numberOfSymbolsPerSlot+timeDomainOffset× numberOfSymbolsPerSlot+S+N×periodicity) modulo (1024×numberOfSlotsPerFrame×numberOfSymbolsPerSlot).

In an example, after an uplink grant is configured for a configured grant Type 2, the MAC entity may consider sequentially that the Nth (N>=0) uplink grant occurs in the symbol for which: [(SFN×numberOfSlotsPerFrame×numberOfSymbolsPerSlot)+(slot number in the frame×numberOfSymbolsPerSlot)+symbol number in the slot]=[(SFNstart time×numberOfSlotsPerFrame× numberOfSymbolsPerSlot+slotstart time× numberOfSymbolsPerSlot+symbolstart time)+N× periodicity] modulo (1024×numberOfSlotsPerFrame× numberOfSymbolsPerSlot). The SFNstart time, slotstart time, and symbolstart time may be the SFN, slot, and symbol, respectively, of the first transmission opportunity of PUSCH where the configured uplink grant was (re-)initialized.

In an example, when the configured uplink grant is released by upper layers, the corresponding configurations may be released and corresponding uplink grants may be cleared.

In an example, if at least one configured uplink grant confirmation has been triggered and not cancelled; and if the MAC entity has UL resources allocated for new transmission: if the MAC entity is configured with configuredGrantConfigList: the wireless device may instruct the Multiplexing and Assembly procedure to generate a Multiple Entry Configured Grant Confirmation MAC CE. Otherwise (if the MAC entity is not configured with configuredGrantConfigList), the wireless device may instruct the Multiplexing and Assembly procedure to generate a Configured Grant Confirmation MAC CE. The wireless device may cancel the triggered configured uplink grant confirmation.

In an example, for a configured grant Type 2, the MAC entity may clear the configured uplink grant(s) immediately after first transmission of Configured Grant Confirmation MAC CE or Multiple Entry Configured Grant Confirmation MAC CE which may confirm the configured uplink grant deactivation.

In an example, the IE SPS-Config may be used to configure downlink semi-persistent transmission. Multiple Downlink SPS configurations may be configured in one BWP of a serving cell. A parameter harq-CodebookID may indicate the HARQ-ACK codebook index for the corresponding HARQ-ACK codebook for SPS PDSCH and ACK for SPS PDSCH release. A parameter harq-ProcID-Offset may indicate the offset used in deriving the HARQ process IDs. A parameter nrofHARQ-Processes may indicate number of configured HARQ processes for SPS DL. A parameter n1PUCCH-AN may indicate HARQ resource for PUCCH for DL SPS. The network may configure the resource as format0 or format1. The PUCCH-Resource may be configured in PUCCH-Config and referred to by its ID. A parameter periodicityExt may be used to calculate the periodicity for DL SPS. If this field is present, the field periodicity may be ignored. A parameter sps-ConfigIndexI may indicate the index of one of multiple SPS configurations.

In an example, the IE SPS-ConfigIndex may be used to indicate the index of one of multiple DL SPS configurations in one BWP.

In an example, the IE SPS-PUCCH-AN may be used to indicate a PUCCH resource for HARQ ACK and configure the corresponding maximum payload size for the PUCCH resource. In an example, the parameter maxPayloadSize may indicate the maximum payload size for the corresponding PUCCH resource ID. In an example, the parameter sps-PUCCH-AN-ResourceID may indicate the PUCCH resource ID.

In an example, the IE SPS-PUCCH-AN-List may be used to configure the list of PUCCH resources per HARQ ACK codebook.

In an example, for configured downlink assignments without harq-ProcID-Offset, the HARQ Process ID associated with the slot where the DL transmission starts may be derived from the following equation: HARQ Process ID=[floor (CURRENT_slot×10/(numberOfSlotsPerFrame×periodicity))] modulo nrofHARQ-Processes where CURRENT_slot=[(SFN×numberOfSlotsPerFrame)+slot number in the frame] and numberOfSlotsPerFrame may refer to the number of consecutive slots per frame.

In an example, for configured downlink assignments with harq-ProcID-Offset, the HARQ Process ID associated with the slot where the DL transmission starts may be derived from the following equation: HARQ Process ID=[floor (CURRENT_slot/periodicity)] modulo nrofHARQ-Processes+harq-ProcID-Offset where CURRENT_slot=[(SFN×numberOfSlotsPerFrame)+slot number in the frame] and numberOfSlotsPerFrame may refer to the number of consecutive slots per frame.

In an example, Semi-Persistent Scheduling (SPS) may be configured by RRC per Serving Cell and per BWP. Multiple assignments may be active simultaneously in the same BWP. Activation and deactivation of the DL SPS may be independent among the Serving Cells.

In an example, for the DL SPS, a DL assignment may be provided by PDCCH, and stored or cleared based on L1 signaling indicating SPS activation or deactivation.

In an example, RRC may configure the following parameters when the SPS is configured: cs-RNTI: CS-RNTI for activation, deactivation, and retransmission; nrofHARQ-Processes: the number of configured HARQ processes for SPS; harq-ProcID-Offset: Offset of HARQ process for SPS; and periodicity: periodicity of configured downlink assignment for SPS.

In an example, when the SPS is released by upper layers, the corresponding configurations may be released.

In an example, after a downlink assignment is configured for SPS, the MAC entity may consider sequentially that the Nth downlink assignment occurs in the slot for which: (numberOfSlotsPerFrame×SFN+slot number in the frame)=[(numberOfSlotsPerFrame×SFNstart time+slotstart time)+N×periodicity×numberOfSlotsPerFrame/10] modulo (1024×numberOfSlotsPerFrame)

where SFNstart time and slotstart time may be the SFN and slot, respectively, of the first transmission of PDSCH where the configured downlink assignment was (re-)initialized.

In an example, DCI format 1_0 may be used for the scheduling of PDSCH in one DL cell. The DCI may indicate Modulation and coding scheme; New data indicator; Redundancy version; HARQ process number; TPC command for scheduled PUCCH; PUCCH resource indicator; PandDSCH-to-HARQ_feedback timing indicator.

In an example, DCI format 1_1 may be used for the scheduling of PDSCH in one cell. The DCI may indicate Carrier indicator; Bandwidth part indicator; Frequency domain resource assignment; Time domain resource assignment; HARQ process number; TPC command for scheduled PUCCH; PUCCH resource indicator; PDSCH-to-HARQ_feedback timing indicator; Modulation and coding scheme.

In an example, DCI format 1_2 may be used for the scheduling of PDSCH in one cell. The DCI may indicate Carrier indicator; Bandwidth part indicator; Frequency domain resource assignment; Time domain resource assignment; Modulation and coding scheme; New data indicator; Redundancy version; HARQ process number; TPC command for scheduled PUCCH; PUCCH resource indicator; and PDSCH-to-HARQ_feedback timing indicator.

In an example, the MAC entity of a wireless device may be configured by RRC with a discontinuous reception (DRX) functionality that may control the UE's PDCCH monitoring activity for one or more of the MAC entity's RNTIs (e.g., C-RNTI, CI-RNTI, CS-RNTI, INT-RNTI, SFI-RNTI, SP-CSI-RNTI, TPC-PUCCH-RNTI, TPC-PUSCH-RNTI, TPC-SRS-RNTI, and AI-RNTI).

In an example, RRC may control DRX operation by configuring the following parameters: drx-onDurationTimer: the duration at the beginning of a DRX Cycle; drx-SlotOffset: the delay before starting the drx-onDurationTimer; drx-InactivityTimer: the duration after the PDCCH occasion in which a PDCCH indicates a new UL or DL transmission for the MAC entity; drx-RetransmissionTimerDL (per DL HARQ process except for the broadcast process): the maximum duration until a DL retransmission is received; drx-RetransmissionTimerUL (per UL HARQ process): the maximum duration until a grant for UL retransmission is received; drx-LongCycleStartOffset: the Long DRX cycle and drx-StartOffset which defines the subframe where the Long and Short DRX Cycle starts; drx-ShortCycle (optional): the Short DRX cycle; drx-ShortCycleTimer (optional): the duration the UE shall follow the Short DRX cycle; drx-HARQ-RTT-TimerDL (per DL HARQ process except for the broadcast process): the minimum duration before a DL assignment for HARQ retransmission is expected by the MAC entity; drx-HARQ-RTT-TimerUL (per UL HARQ process): the minimum duration before a UL HARQ retransmission grant is expected by the MAC entity.

In an example, serving Cells may be configured by RRC in two groups. When RRC does not configure a secondary DRX group, there may be only one DRX group. When two DRX groups are configured each group of Serving Cells, which is called a DRX group, is configured by RRC with its own set of parameters: drx-onDurationTimer, drx-InactivityTimer. When two DRX groups are configured, the two groups may share the following parameter values: drx-SlotOffset, drx-RetransmissionTimerDL, drx-RetransmissionTimerUL, drx-LongCycleStartOffset, drx-ShortCycle (optional), drx-ShortCycleTimer (optional), drx-HARQ-RTT-TimerDL, and drx-HARQ-RTT-TimerUL.

In an example, when a DRX cycle is configured, the Active Time for Serving Cells in a DRX group may include the time while: drx-onDurationTimer or drx-InactivityTimer configured for the DRX group is running; or drx-RetransmissionTimerDL or drx-RetransmissionTimerUL is running on any Serving Cell in the DRX group; or ra-ContentionResolutionTimer or msgB-ResponseWindow is running; or a Scheduling Request is sent on PUCCH and is pending; or a PDCCH indicating a new transmission addressed to the C-RNTI of the MAC entity has not been received after successful reception of a Random Access Response for the Random Access Preamble not selected by the MAC entity among the contention-based Random Access Preamble.

In an example, when DRX is configured, if a MAC PDU is received in a configured downlink assignment: the MAC entity may start the drx-HARQ-RTT-TimerDL for the corresponding HARQ process in the first symbol after the end of the corresponding transmission carrying the DL HARQ feedback; and stop the drx-RetransmissionTimerDL for the corresponding HARQ process.

In an example, when DRX is configured, if a MAC PDU is transmitted in a configured uplink grant and listen before talk (LBT) failure indication is not received from lower layers: the MAC entity may start the drx-HARQ-RTT-TimerUL for the corresponding HARQ process in the first symbol after the end of the first repetition of the corresponding PUSCH transmission; and stop the drx-RetransmissionTimerUL for the corresponding HARQ process.

In an example, when DRX is configured, if a drx-HARQ-RTT-TimerDL expires: if the data of the corresponding HARQ process was not successfully decoded: the MAC entity may start the drx-RetransmissionTimerDL for the corresponding HARQ process in the first symbol after the expiry of drx-HARQ-RTT-TimerDL.

In an example, when DRX is configured, if a drx-HARQ-RTT-TimerUL expires: the MAC entity may start the drx-RetransmissionTimerUL for the corresponding HARQ process in the first symbol after the expiry of drx-HARQ-RTT-TimerUL.

In an example, for a DRX group, if a DRX Command MAC CE or a Long DRX Command MAC CE is received: the MAC entity may stop drx-onDurationTimer; and stop drx-InactivityTimer.

In an example, for a DRX group, if drx-InactivityTimer for this DRX Group expires: if the Short DRX cycle is configured: the MAC entity may start or restart drx-ShortCycleTimer for this DRX Group in the first symbol after the expiry of drx-InactivityTimer; and use the Short DRX Cycle for this DRX group.

In an example, for a DRX group, if drx-InactivityTimer for this DRX Group expires: if the Short DRX cycle is not configured: the MAC entity may use the Long DRX cycle for this DRX group.

In an example, for a DRX group, if a DRX Command MAC CE is received: if the Short DRX cycle is configured: the MAC entity may start or restart drx-ShortCycleTimer for this DRX Group in the first symbol after the end of DRX Command MAC CE reception; and use the Short DRX Cycle for both DRX groups.

In an example, for a DRX group, if a DRX Command MAC CE is received: if the Short DRX cycle is not configured: the MAC entity may use the Long DRX cycle for both DRX groups.

In an example, for a DRX group, if drx-ShortCycleTimer for this DRX Group expires: the MAC entity may use the Long DRX for this DRX Group cycle.

In an example, for a DRX group, if a Long DRX Command MAC CE is received: the MAC entity may stop drx-ShortCycleTimer for both DRX groups; and use the Long DRX cycle for both DRX groups.

In an example, for a DRX group, if the Short DRX Cycle is used, and [(SFN×10)+subframe number] modulo (drx-ShortCycle)=(drx-StartOffset) modulo (drx-ShortCycle): the MAC entity may start drx-onDurationTimer after drx-SlotOffset from the beginning of the subframe.

In an example, for a DRX group, if the Long DRX Cycle is used, and [(SFN×10)+subframe number] modulo (drx-LongCycle)=drx-StartOffset: the MAC entity may start drx-onDurationTimer after drx-SlotOffset from the beginning of the subframe.

In an example, for a DRX group, if the DRX group is in Active Time: the MAC entity may monitor the PDCCH on the Serving Cells in this DRX group. If the PDCCH indicates a DL transmission: the MAC entity may start the drx-HARQ-RTT-TimerDL for the corresponding HARQ process in the first symbol after the end of the corresponding transmission carrying the DL HARQ feedback. In an example, when HARQ feedback is postponed by PDSCH-to-HARQ_feedback timing indicating a non-numerical k1 value, the corresponding transmission opportunity to send the DL HARQ feedback may be indicated in a later PDCCH requesting the HARQ-ACK feedback. The MAC entity may stop the drx-RetransmissionTimerDL for the corresponding HARQ process. If the PDSCH-to-HARQ_feedback timing indicates a non-numerical k1 value, the MAC entity may start the drx-RetransmissionTimerDL in the first symbol after the PDSCH transmission for the corresponding HARQ process.

In an example, for a DRX group, if the DRX group is in Active Time: the MAC entity may monitor the PDCCH on the Serving Cells in this DRX group. If the PDCCH indicates a UL transmission: the MAC entity may start the drx-HARQ-RTT-TimerUL for the corresponding HARQ process in the first symbol after the end of the first repetition of the corresponding PUSCH transmission; and the MAC entity may stop the drx-RetransmissionTimerUL for the corresponding HARQ process.

In an example, for a DRX group, if the DRX group is in Active Time: the MAC entity may monitor the PDCCH on the Serving Cells in this DRX group. If the PDCCH indicates a new transmission (DL or UL) on a Serving Cell in this DRX group: the MAC entity may start or restart drx-InactivityTimer for this DRX group in the first symbol after the end of the PDCCH reception.

In an example, the SPS PDSCH of a specific SPS configuration may have a fixed PDSCH-to-HARQ timer (K1) as defined in the activation DCI. With the shorter (e.g., down to 1 slot) SPS periodicities, a large number of the SPS HARQ-ACK feedback may be dropped if the corresponding PUCCH resource collides with at least 1 downlink or flexible symbol.

In an example, HARQ-ACK may be deferred until the first available valid PUCCH resource. In an example, the gNB may dynamically indicate of one or more transmission opportunities for the postponed HARQ-ACK to UE. In an example, one or more RRC configuration may indicate K1 value for a SPS transmission in a time window configured by RRC. In an example, the wireless device may receive one-shot HARQ-ACK request for a group of SPS HARQ processes. In an example, the UE may select the first applicable k1 value from a set of configured k1 values to allow HARQ-ACK load balancing.

In an example, the reliability of PUCCH may be enhanced with sub-slot based PUCCH repetition. In an example, the HARQ feedback for a PDSCH received in slot i may be transmitted after symbol 12 of slot i. The long PUCCH formats, such as format 1, 3, 4, may not be used because they would cross the boundary between slot i and slot i+1. To use long PUCCHs to enable high reliability, the HARQ-ACK may be transmitted in slot i+1. Considering the low latency requirement, the last two symbols of slot i may be used with short PUCCHs to transmit the HARQ feedback. To ensure the reliability, the short PUCCH may be transmitted three times continuously.

In an example, multiple DL SPS configurations with short periodicity may be configured, requiring the UE to send HARQ feedback for all candidate PDSCHs may result in large overhead and UL interference. For example, PDSCH skipping may generate unnecessary NACK feedback. ACK skipping and/or NACK skipping may be used to reduce HARQ feedback transmissions.

In an example, HARQ feedback for SPS may be dropped when it collides with symbols that cannot be used for uplink transmission. In unpaired spectrum, DL heavy configurations and multiple SPS configurations may cause HARQ-ACK being dropped frequently, which may cause wasting resources or degrading system performance. In an example, the HARQ feedback may be postponed when it runs into invalid symbols. For example, the HARQ feedback transmission may be postponed to the nearest semi-static UL slot/symbol. In an example, PUCCH repetition may be configured semi-statically and/or dynamically. For example, PUCCH repetition may be performed dynamically based on coverage need. In an example, for HARQ feedback on PUCCH, the number of PUCCH repetitions may be indicated dynamically depending on the coverage/reliability requirement and resource availability. Dynamic indication of PUCCH repetition may be done based on DCI. For example, a DCI field (e.g., PUCCH resource indicator (PRI)) may indicate PUCCH repetition carrying HARQ feedback.

In an example, for PUCCH repetition across multiple sub-slots, a PUCCH transmission in each of the sub-slots may have the same resource, e.g., same starting symbol, number of symbols, and number of PRBs.

In an example, with short SPS periodicity values, the periodicity value may not match with a given semi-static TDD pattern, especially when it comes to HARQ feedback timing. The timing of HARQ-ACK feedback for DL SPS may be indicated by PDSCH-to-HARQ_feedback timing indicator field, if present, in the activation DCI. In an example, the timing of HARQ feedback for DL SPS may be provided by an RRC parameter dl-DataToUL-ACK. In an example, HARQ feedback timing value (K1) may not indicate valid UL slot for some SPS PDSCH occasions. In an example, a UE may defer HARQ-ACK transmission which could have been dropped due to collision with invalid slot/symbols to the next available UL slot.

In an example, multiple SPS may be used when multiple traffic flows with different characteristics, e.g., time sensitive networking (TSN) flows are configured. In an example, an extended set of shorter SPS periodicity values, down to 1 slot, may be used to support traffics with low latency requirement.

In an example, multiple SPS configurations and/or shorter SPS periodicity may be used to support DL periodic traffic where the period is not an integer multiple of the supported SPS periodicity values. For such cases, multiple SPS configurations and/or shorter SPS periodicity values may be used to provide over-provisioned SPS occasions in order to minimize the alignment delay between the actual transmission and available SPS occasions.

When SPS occasions are over-provisioned to minimize the alignment delay to the actual transmission, there may be many unnecessary UE feedback transmissions (NACK) corresponding to unused SPS occasions with no actual SPS PDSCH transmitted.

In an example, a UE may skip the PUCCH transmission associated to the HARQ-ACK feedback if all the HARQ-ACK bits are NACK. In an example with a single A/N bit for a single TB transmission, if the TB is received correctly, UE may report ACK. If the TB is not received correctly regardless of whether SPS PDSCH was sent, the UE may not transmit NACK (e.g., DTX). The gNB may determine whether SPS PDSCH was sent or not and may identify the case of wrongly decoded PDSCH. The wireless device may support HARQ-ACK feedback skipping for a codebook with only DL-SPS HARQ feedback when all HARQ feedback bits in the codebook are NACK.

In an example, a wireless device may receive first configuration parameters of a configured grant configuration. The configured grant configuration may be configured for a cell or for a BWP of a cell. In an example, the cell may be an unlicensed cell or may be in a shared spectrum. The wireless device may receive the first configuration parameters in an RRC configuration message. In an example, the configured grant configuration may be a type 1 configuration wherein a plurality of configured grants associated with the configured grant configuration may be activated in response to receiving the configured grant configuration. In an example, the configured grant configuration may be a type 2 configuration wherein a plurality of configured grants associated with the configured grant configuration may be activated in response to receiving the configured grant configuration and receiving an activation DCI indicating activation of the configured grant configuration.

The first configuration parameters of the configured grant configuration may comprise a plurality of parameters/information elements for the configured grant configuration. The plurality of parameters/information elements may comprise a periodicity parameter for uplink configured grants associated with the configured grant configuration. The periodicity parameter may indicate a periodicity of configured grants (e.g., time duration between two consecutive configured grants). The periodicity may be in terms of number of symbols wherein a duration of the symbol may be based on a numerology (e.g., subcarrier spacing) of the bandwidth part on which the configured grant configuration is configured. The plurality of parameters/information elements may comprise an information element for a configured grant timer (e.g., ConfiguredGrantTimer). The information element for the configured grant timer may indicate a value of the configured grant timer. The value of the configured grant timer may be in multiple periodicities. The configured grant timer may be HARQ process specific. The wireless device may start or stop the configured grant timer for a specific HARQ process. At a given time, configured grant timer for one or more HARQ processes may be running. The plurality of parameters/information elements may comprise a configuration index associated with the configured grant configuration.

A wireless device may be configured for ultra-reliable low-latency communications (URLLC) applications and/or for operation in an industrial internet of things (IIoT) environment. In some examples, the wireless device may be configured for operation in an unlicensed environment (e.g., at least one cell configured for the wireless device may be an unlicensed cell). In some examples, the wireless device may be configured for operation in an unlicensed control environment (UCE). For example, based on operation in a controlled environment, the probability of collisions (e.g., collisions in transmissions performed by other coexisting wireless devices and/or network nodes) may be small and/or the collisions may occur sporadically.

In some examples, the network may configure a wireless device with one or more configured grants to be used for communications with one or more base stations in an unlicensed controlled environment. A configured grant configuration may either include a configured grant retransmission timer or may not include a configured grant retransmission timer. The network may configure or release the configured grant transmission timer of a configured grant configuration, for example by using one or more RRC messages (e.g., one or more RRC reconfiguration messages). A wireless device may transmit a transport block via a configured grant resource and may start the configured grant retransmission timer in response to transmission of the transport block. The wireless device may determine that retransmission of the transport block is prohibited while the configured grant retransmission timer is running. The configuration and/or release of the configured grant retransmission timer for a configured grant configuration by the network may result in inefficient configured grant operation. There is a need to enhance existing configured grant processes when network configures or releases one or more configured grant retransmission timers for one or more configured grant configurations.

Figure 16:
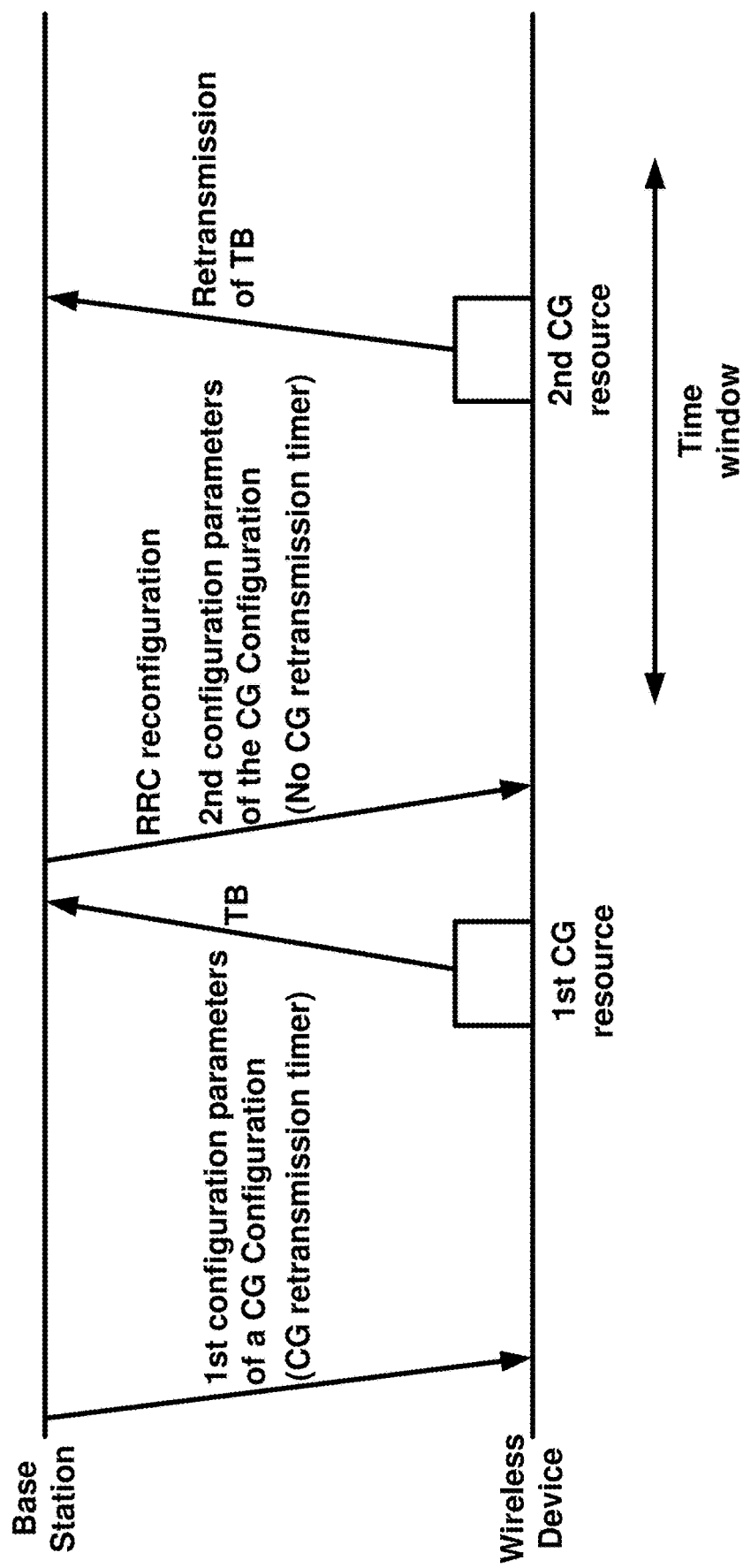
FIG. 16 shows an example process in accordance with several of various embodiments of the present disclosure.

In an example embodiment as shown in FIG. 16, the plurality of parameters/information elements may comprise an information element for a configured grant retransmission timer (e.g., cg-RetransmissionTimer). The information element for the configured grant retransmission timer may indicate a value of the configured grant retransmission timer. The value of the configured grant retransmission timer may be in multiple periodicities. In an example, the value of the configured grant retransmission timer may be smaller than the value of the configured grant timer. The configured grant retransmission timer may be HARQ process specific. The wireless device may start or stop the configured grant retransmission timer for a specific HARQ process. At a given time, configured grant retransmission timer for one or more HARQ processes may be running.

The wireless device may transmit a transport block using a first configured grant (e.g., using radio resources of a first configured grant) associated with the configured grant configuration. The wireless device may determine the radio resources of the first configured grant based on the first configuration parameters of the configured grant configuration (e.g., if the configured grant configuration is type 1) or based on the first configuration parameters of the configured grant configuration and an activation DCI (e.g., if the configured grant configuration is type 2). The wireless device may transmit, based on the radio resource, the transport block and first uplink control information. The first uplink control information may comprise one or more first HARQ related parameters associated with the transport block (e.g., a HARQ process number, a redundancy version, a new data indicator, etc.), etc. In an example, the wireless may start a configured grant retransmission timer based on transmitting the transport block. The wireless device may start the configured grant retransmission timer for the HARQ process associated with the transport block.

After transmitting the transport block, the wireless device may receive an RRC reconfiguration message. The wireless device may receive the RRC reconfiguration message in a first timing. The RRC reconfiguration message may comprise second configuration parameters of the configured grant configuration. The second configuration parameters of the configured grant configuration may not comprise an information element for a configured grant retransmission timer. The second configuration parameters of the configured grant configuration may comprise the configured grant configuration index (e.g., the same configured grant configuration index in the first configuration parameters).

The wireless device may transmit a retransmission of the transport block based on a second configured grant associated with the configured grant configuration. The wireless device may transmit the retransmission of the transport block using the second configured grant based on a second timing of the second configured grant being within a time window from the first timing of receiving the RRC reconfiguration message. In an example, the wireless device may not transmit a retransmission of the transport block using the second configured grant if the second timing of the second configured grant is not within the time window from the first timing of the RRC reconfiguration message, for example, if the second timing of the second configured grant is after/outside the time window. The wireless device may receive one or more configuration parameters indicating the time window or a duration of the time window. The wireless device may determine the time window and/or the duration of the time window and/or the start time of the time window based on one or more configuration parameters, e.g., an offset parameter (e.g., an offset to SFN=0). In an example, the wireless device may start the configured grant retransmission timer (e.g., for the HARQ process of the transport) based on transmitting the retransmission of the transport block. In an example, the transmission of the retransmission of the transport block using the second configured grant may be based on the configured grant retransmission timer (e.g., for the HARQ process of the transport block) being expired before the second timing of the second configured grant. In an example, the transmission of the retransmission of the transport block using the second configured grant may be based on the configured grant retransmission timer (e.g., for the HARQ process of the transport block) being expired before the first timing of the RRC reconfiguration message.

The wireless device may determine radio resources for the second configured grant based second configuration parameters of the configured grant configuration (e.g., if the configured grant configuration is type 1) or based on the second configuration parameters of the configured grant configuration and an activation DCI (e.g., if the configured grant configuration is type 2). The wireless device may transmit, based on the radio resource, the retransmission of the transport block and second uplink control information. The second uplink control information may comprise one or more second HARQ related parameters associated with the retransmission of the transport block (e.g., a HARQ process number, a redundancy version, a new data indicator, etc.), etc.

In an example, the time window (e.g., the duration of the time window and/or the start time of the time window) may be based on a wireless device processing time of the RRC reconfiguration message. In an example, the duration of the time window may be larger than or equal to the processing time of the RRC reconfiguration message. In an example, the wireless device may prepare for retransmission of the transport block assuming that the second configuration parameters of the configured grant configuration include an information element for the configured grant retransmission timer. The wireless device processing time of the RRC reconfiguration message may be based on the wireless capability or wireless device category and the wireless device may indicate the processing time based on a capability signaling to the base station. The wireless device capability signaling may comprise a parameter indicating the wireless device processing time of the RRC reconfiguration message. In an example, the wireless device processing time of the RRC reconfiguration message may be based on a wireless device category and/or may be pre-determined.

Figure 17:
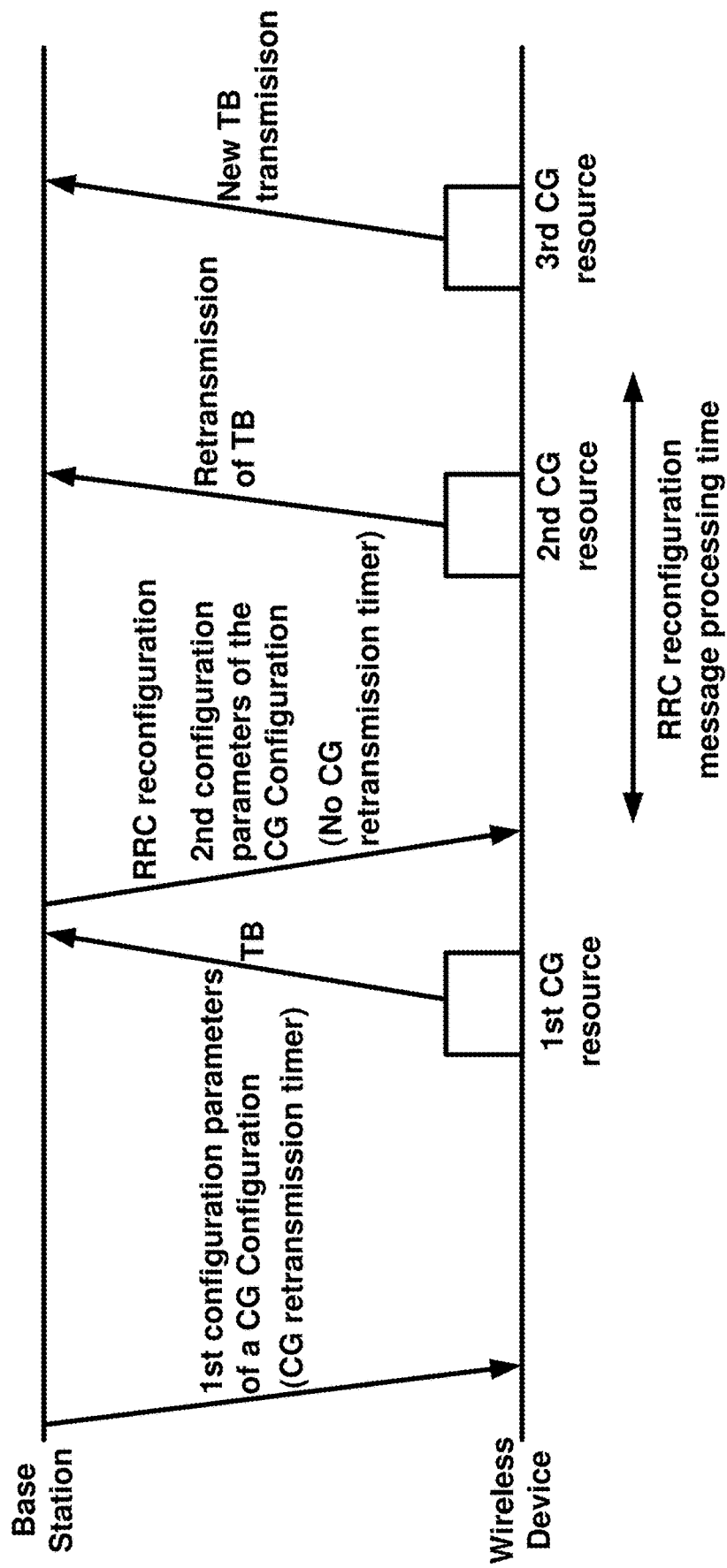
FIG. 17 shows an example process in accordance with several of various embodiments of the present disclosure.

In an example embodiment as shown in FIG. 17, the wireless device may determine a second configured grant resource and a third configured grant resource based on receiving the second configuration parameters of the configured grant configuration. The second timing of the second configured grant resource may be within the processing time of the RRC reconfiguration message. The third timing of the third configured grant may be after the processing time of the RRC reconfiguration message. The wireless device may transmit a retransmission of the transport block using the second configured grant based on the second timing of the second configured grant being within the processing time of the RRC reconfiguration message. The wireless device may transmit a retransmission of the transport block or may transmit a new transport block using the second configured grant based on the second timing of the second configured grant being within the processing time of the RRC reconfiguration message. The wireless device may transmit a new transport block using the third configured grant based on the third timing of the third configured grant being after the processing time of the RRC reconfiguration message. The wireless device may transmit only a new transport block using the third configured grant based on the third timing of the third configured grant being after the processing time of the RRC reconfiguration message.

Figure 18:
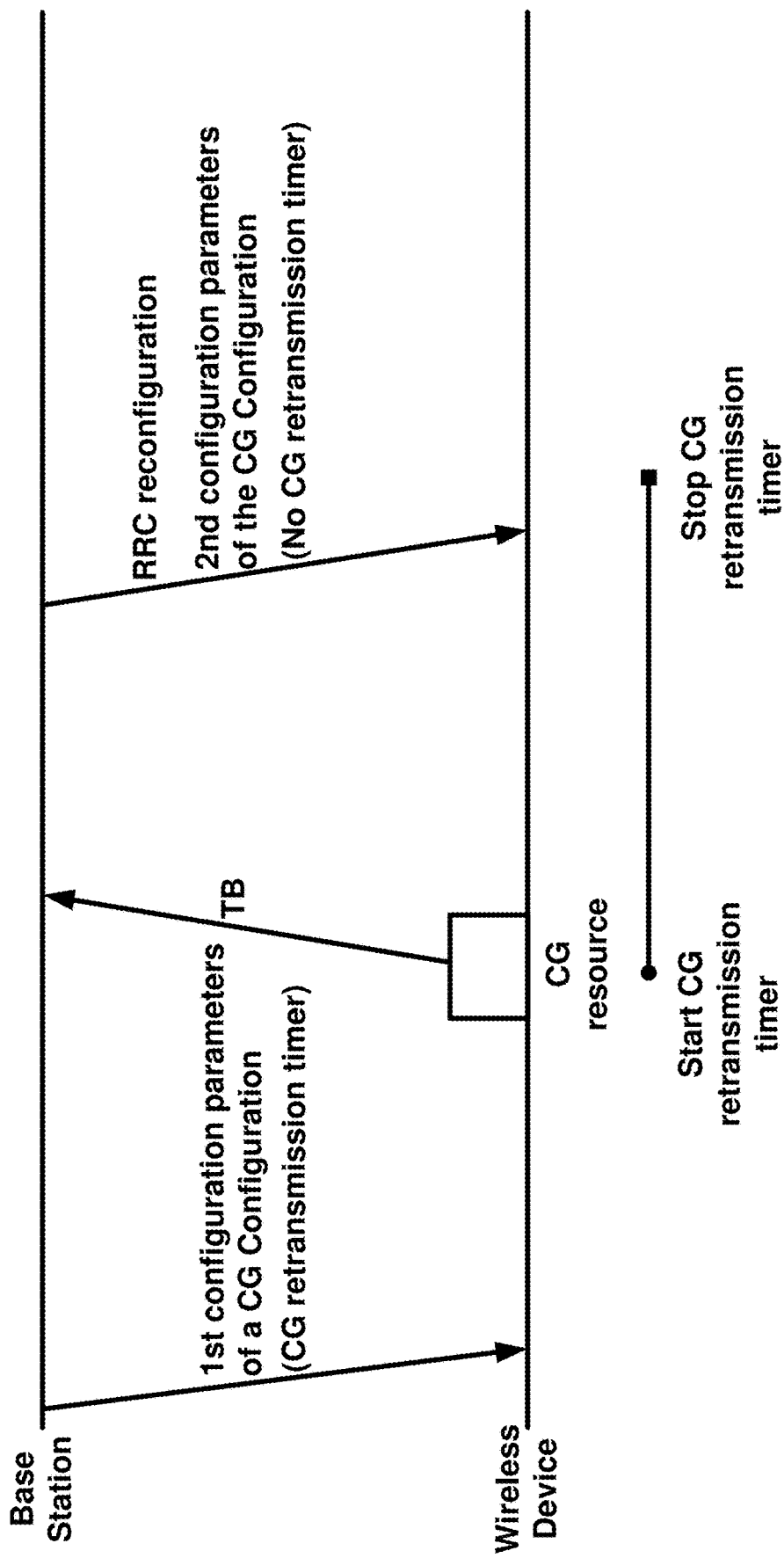
FIG. 18 shows an example process in accordance with several of various embodiments of the present disclosure.

In an example embodiment as shown in FIG. 18, the wireless device may transmit a transport block based on a configured grant associated with the configured grant configuration. The wireless device may start the configured grant retransmission timer based on the transmitting the transport block. The wireless device may start the configured grant retransmission timer for a HARQ process wherein the transport block is associated with the HARQ process. The wireless device may determine radio resources of the configured grant based on the first configured grant configuration parameters (e.g., for configured grant type 1) or based on the first configured grant configuration parameters and an activation DCI (e.g., for configured grant type 2). The wireless device may transmit the transport block and uplink control information associated with the transport block (e.g., HARQ process number, redundancy version, new data indicator, code block group transmission indication, etc.) based on the determined resources for the configured grant.

After transmitting the transport block, the wireless device may receive an RRC reconfiguration message. The RRC reconfiguration message may comprise second configuration parameters of the configured grant configuration. The second configuration parameters of the configured grant configuration may not comprise an information element for a configured grant retransmission timer. The second configuration parameters of the configured grant configuration may comprise the configured grant configuration index (e.g., the same configured grant configuration index in the first configuration parameters).

The wireless device may stop the configured grant retransmission timer based on receiving the RRC reconfiguration message and based on the second configuration parameters of the configured grant configuration not comprising an information element for the configured grant retransmission timer. In an example, the wireless device may stop the configured grant retransmission timer in a timing after receiving the RRC reconfiguration message. The timing for stopping the configured grant retransmission timer may be based on a processing time for the RRC reconfiguration message. The processing time for the RRC reconfiguration message may be based on a wireless device capability. In an example, the processing time for the RRC reconfiguration message may be based on a wireless device category. In an example, the wireless device may indicate, in a capability message or using other signaling, a capability parameter indicating the processing time for the RRC reconfiguration message and/or may indicate the wireless device category. For example, the wireless device may receive the RRC reconfiguration message in a first timing. The processing time for the RRC reconfiguration message may be a first number of symbols/slots. The wireless device may stop the configured grant retransmission timer on or after the first number of slots/symbols from the first timing. In some examples, stopping the configured grant retransmission timer may be based on an offset parameter (e.g., an offset to SFN=0). The wireless device may receive a configuration parameter indicating the offset value.

The configured grant retransmission timer may be associated with a HARQ process (e.g., the HARQ process associated with the transport block). The configured grant configuration may be for a cell configured for the wireless device. The cell may operate in a shared spectrum or may be an unlicensed cell. A plurality of HARQ processes may be configured for the wireless device. The configured configuration may be configured with a subset of the plurality of HARQ process for the cell. For example, the configuration parameters of the configured grant configuration may indicate one or more first HARQ processes, of the plurality of HARQ processes of the cell, for the configured grant configuration. In an example, based on receiving the RRC reconfiguration message and the second configuration parameters not comprising an information element for the configured grant retransmission timer, the wireless device may stop the configured grant retransmission timer for the one or more first HARQ processes. In an example, based on receiving the RRC reconfiguration message and the second configuration parameters not comprising an information element for the configured grant retransmission timer, the wireless device may stop the configured grant retransmission timer for one or more pending HARQ processes of the one or more first HARQ processes (e.g., one or more HARQ processes of the one or more first HARQ processes that have non-empty HARQ buffers). In an example, based on receiving the RRC reconfiguration message and the second configuration parameters not comprising an information element for the configured grant retransmission timer, the wireless device may stop the configured grant retransmission timer for one or more HARQ processes, of the one or more first HARQ processes, that corresponding configured grant retransmission timers are running.

Figure 19:
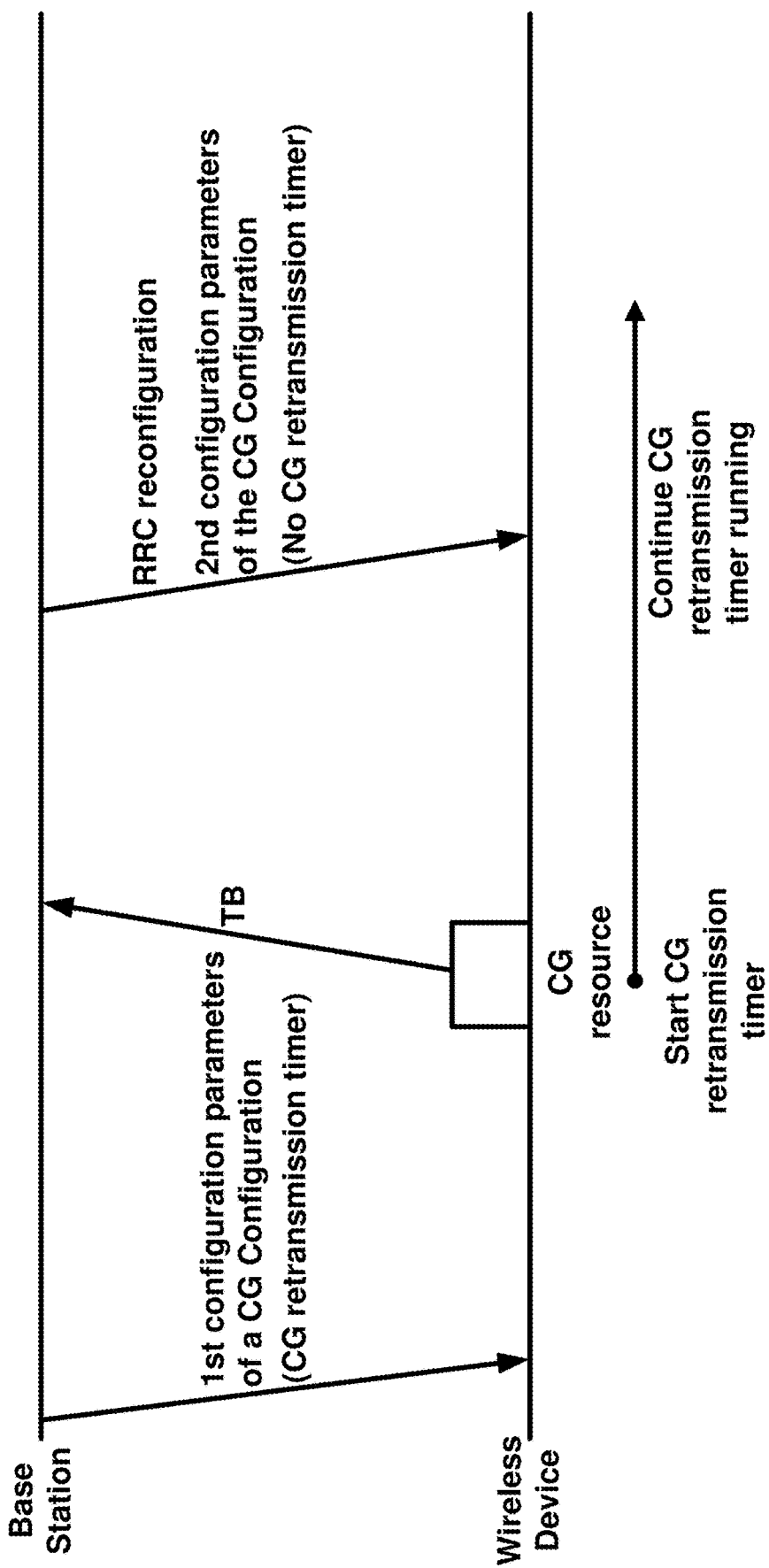
FIG. 19 shows an example process in accordance with several of various embodiments of the present disclosure.

In an example embodiment as shown in FIG. 19, in response to receiving the RRC reconfiguration message and the second configuration parameters of the configured grant configuration not comprising an information element for the configured grant retransmission timer, the wireless device may not stop the configured grant retransmission timer and/or may keep the configured grant retransmission timer running, for example until the configured grant retransmission timer expires.

Figure 20:
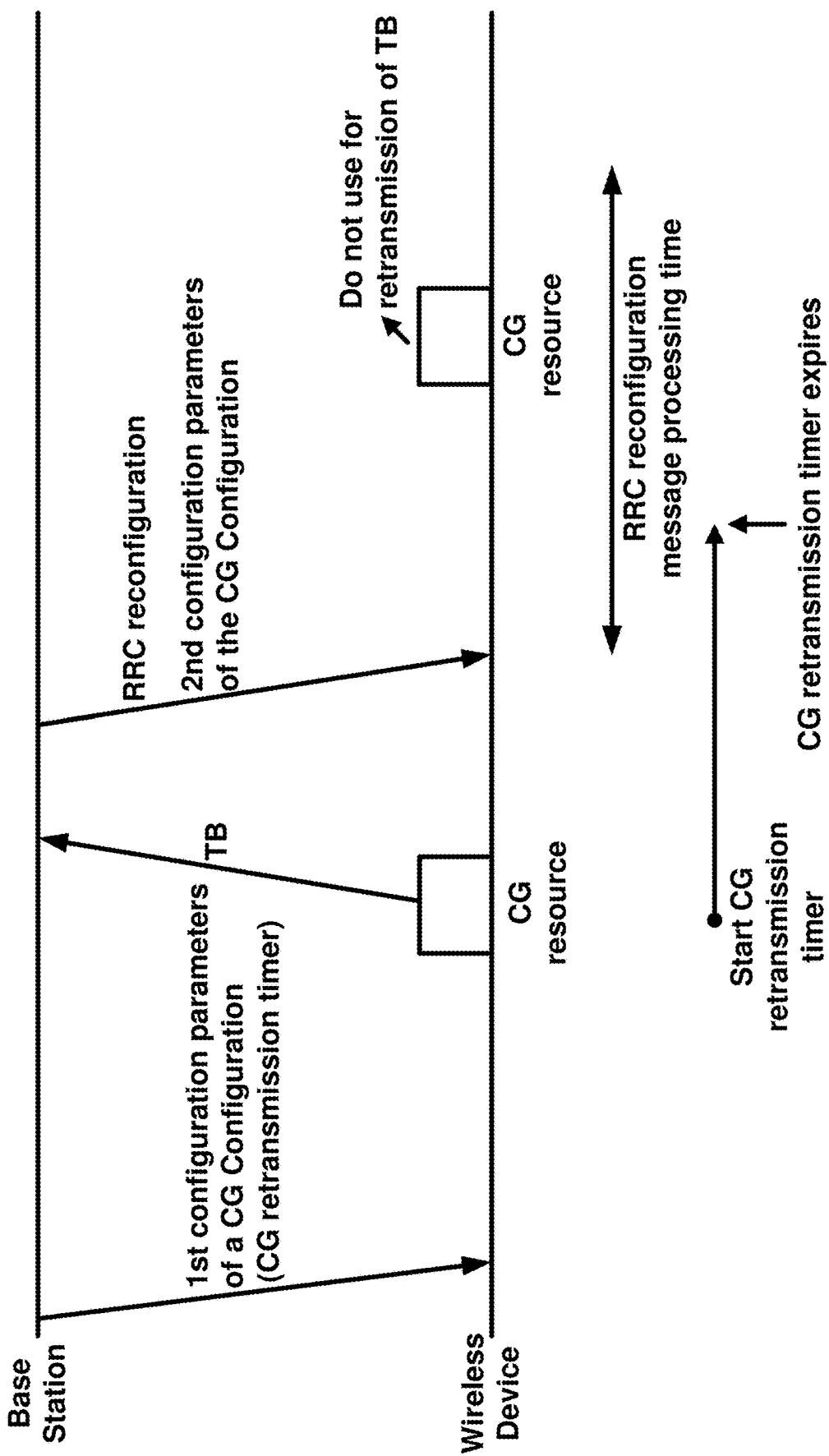
FIG. 20 shows an example process in accordance with several of various embodiments of the present disclosure.

In an example embodiment as shown in FIG. 20, a wireless device may receive first configuration of a configured grant configuration. The wireless device may transmit a transport bock using radio resources of a configured grant associated with the configured grant configuration. The wireless device may start a configured grant retransmission timer based on transmitting the transport block. The wireless device may receive an RRC reconfiguration message comprising second configuration parameters of the configured grant configuration. The wireless device may receive the RRC reconfiguration message after the configured grant retransmission timer expires or while the configured grant retransmission timer is running. The wireless device may use a configured grant for retransmission of the transport block based on the configured grant retransmission timer expiring and based on configured grant timing being before receiving the RRC reconfiguration message. The wireless device may not use a configured grant for retransmission of the transport block during the RRC reconfiguration message processing time. The wireless device may not use a configured grant for retransmission of the transport block during the RRC reconfiguration message processing time even if the configured grant retransmission timer is expired.

Figure 21:
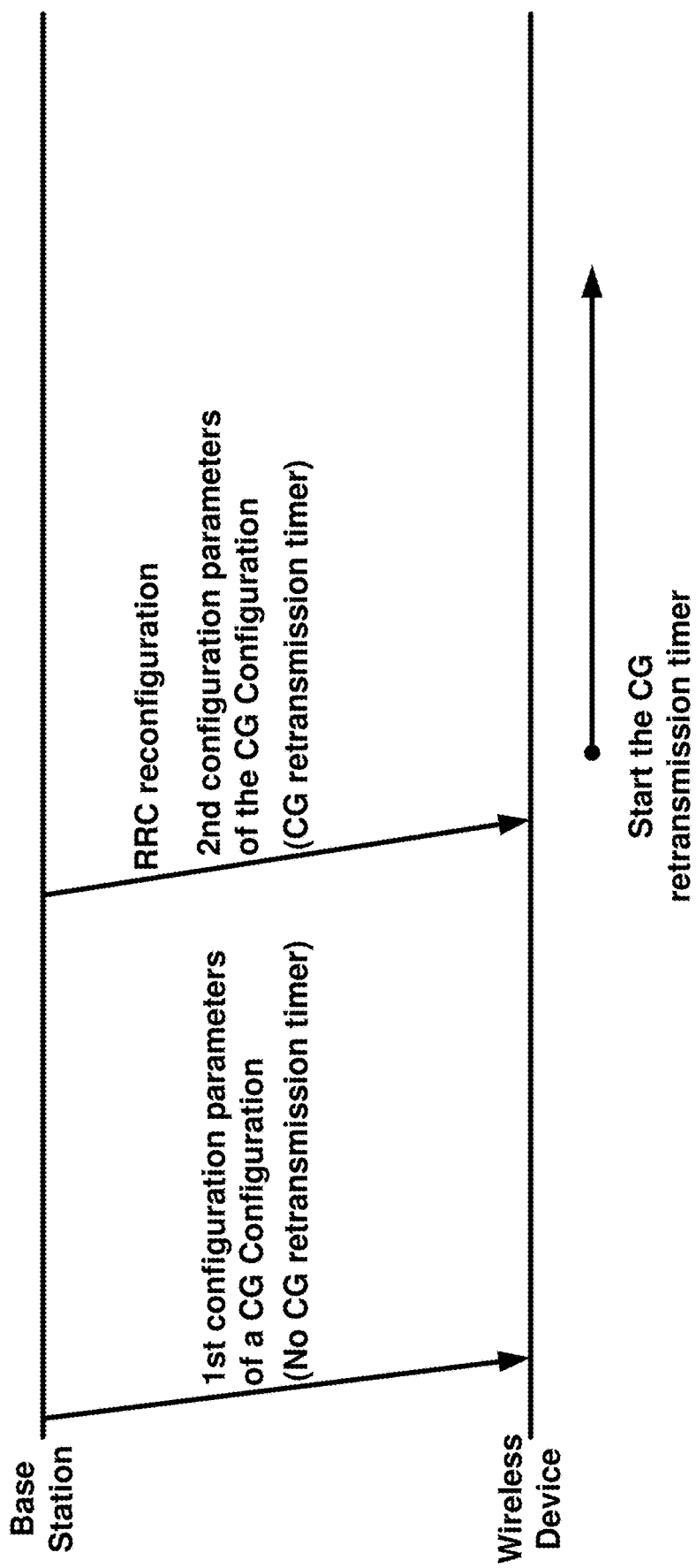
FIG. 21 shows an example process in accordance with several of various embodiments of the present disclosure.

In an example embodiment as shown in FIG. 21, the plurality of parameters/information elements in the first configuration parameters of the configured grant configuration may not comprise an information element for a configured grant retransmission timer (e.g., cg-RetransmissionTimer). The wireless device may receive, in a second RRC message (e.g., RRC reconfiguration message) after receiving the first configuration parameters, second configuration parameters of the configured grant configuration. The second configuration parameters may comprise an information element for the configured grant retransmission timer (e.g., cg-RetransmissionTimer). The information element for the configured grant retransmission timer may indicate a value of the configured grant retransmission timer. The value of the configured grant retransmission timer may be in multiple periodicities. In an example, the value of the configured grant retransmission timer may be smaller than the value of the configured grant timer. The wireless device may start the configured grant retransmission timer based on receiving the RRC reconfiguration message and based on the second configuration parameters comprising the information element for the configured grant retransmission timer. The wireless device may start the configured grant retransmission timer after receiving the RRC reconfiguration message.

In an example, the first timing for starting the configured grant retransmission timer may be after receiving the RRC reconfiguration message. The first timing for starting the configured grant retransmission timer may be based on a processing time of the RRC reconfiguration message. For example, the first timing for starting the configured grant retransmission timer may be in a first symbol/slot after the processing time of the RRC reconfiguration message. The processing time of the RRC reconfiguration message may be known at both the wireless device and the base station. In an example, the processing time of the RRC reconfiguration message may be based on the wireless device capability or may be based on a wireless device category. The wireless device may indicate (for example in a wireless device capability message and using a capability parameter) the processing time of the RRC reconfiguration message or the wireless device category to the base station. In an example, the wireless device may receive the RRC reconfiguration message in a second timing and the first timing to start the configured grant retransmission timer may be in a slot/symbol that is on or after the RRC configuration message processing time form the second timing. In an example, the first timing to start the configured grant retransmission timer may be based on an offset parameter (e.g., offset to SFN=0). The wireless device may receive a configuration parameter indicating the offset parameter. In an example, the first timing to start the configured grant retransmission timer may be based on a processing time of the RRC reconfiguration message and based on the offset parameter.

In an example, the wireless device may transmit a retransmission of a transport block using a configured grant associated with the configured grant configuration (e.g., based on the second configuration parameters) based on the configured grant retransmission timer expiring. The transport block and the configured grant retransmission timer may be associated with a HARQ process.

In an example, the configured grant configuration may be for a cell. The cell may be an unlicensed cell or a cell in the shared spectrum. The cell may be associated with a plurality of HARQ processes. One or more first HARQ processes of the plurality of the HARQ processes may be configured for the configured grant configuration. The starting the configured grant retransmission timer may be for the one or more first HARQ processes. In an example, the starting the configured grant retransmission timer may be for one or more pending HARQ processes (e.g., one or more HARQ processes with non-empty HARQ buffer) of the one or more first HARQ processes.

In an example, the first configuration parameters of the configured grant configuration may comprise a second information element for configured grant timer (e.g., ConfiguredGrantTimer). The information element for the configured grant timer may indicate a value of the configured grant timer. The value of the configured grant timer may be in multiple periodicities. The configured grant timer may be running for one or more HARQ processes when the wireless device receives the RRC reconfiguration message. Based on receiving the RRC reconfiguration message and based on the second configuration parameters comprising the information element for the configured grant retransmission timer, the wireless device may start the configured grant retransmission timer for the one or more HARQ processes for which the configured grant timer is running.

Figure 22:
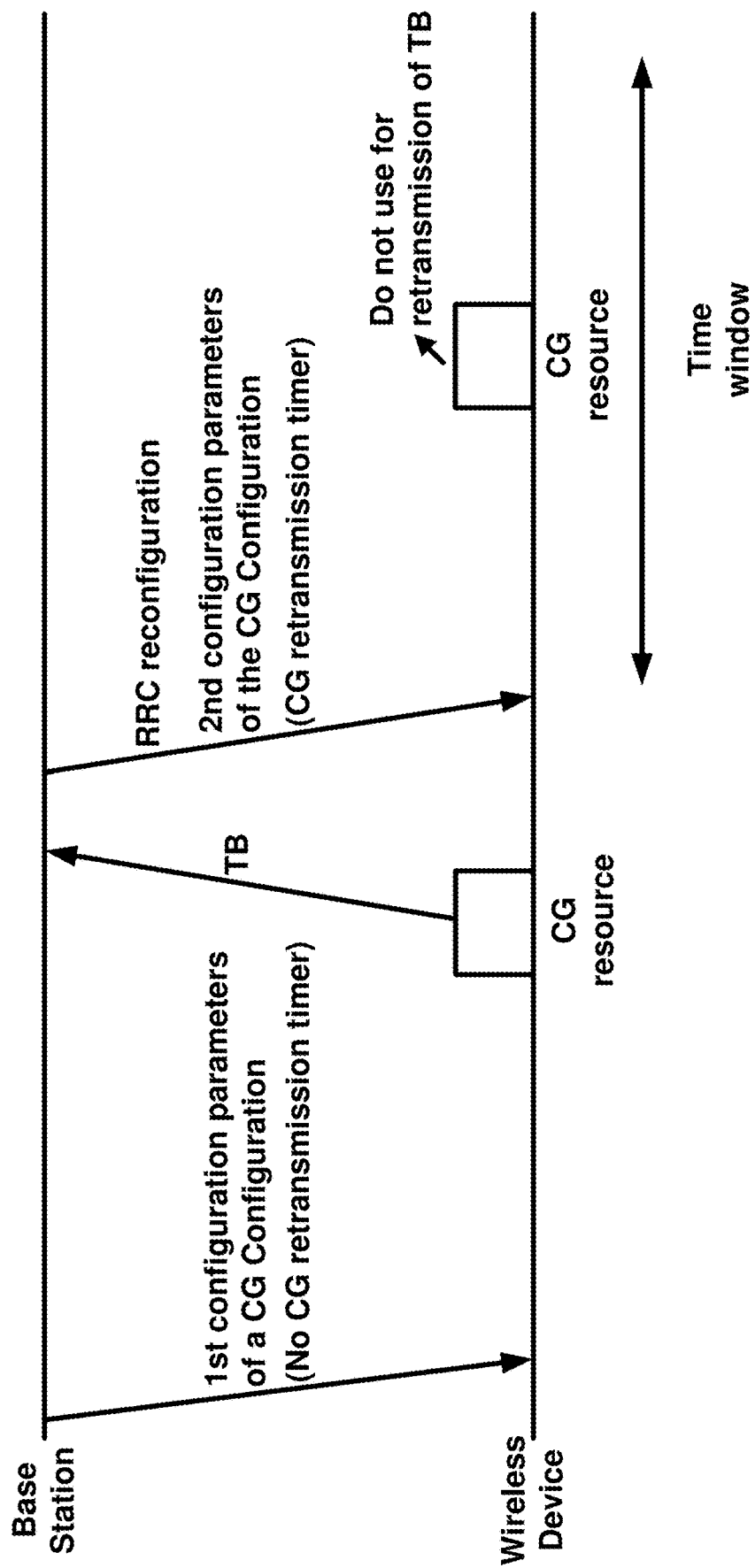
FIG. 22 shows an example process in accordance with several of various embodiments of the present disclosure.

In an example embodiment as shown in FIG. 22, the wireless device may receive first configuration parameters of the configured grant configuration, wherein the first configuration parameters do not comprise an information element for a configured grant retransmission timer. The wireless device may determine radio resources associated with a configured grant using the first configuration parameters (e.g., for type 1 configured grant configuration) or the first configuration parameters and an activation DCI (e.g., for a type 2 configured grant configuration). The wireless device may transmit a transport block based on the determined radio resources of the configured grant. The wireless device may receive an RRC reconfiguration message comprising second configuration parameters of the configured grant configuration, wherein the second configuration parameters comprise an information element for the configured grant retransmission timer. In response to receiving the RRC reconfiguration message, the wireless device may not use a configured grant resource, for retransmission of transport block, that is within a time window from the timing of the reception of the RRC reconfiguration message. In an example, the time window (e.g., the duration and/or the start time of the time window) may be pre-configured/pre-determined. In an example, the wireless device may receive one or more configuration parameters indicating the time window (e.g., the duration or the start time of the time window). In an example, the wireless device may determine the time window (e.g., the start time of the time window) based on an offset parameter (e.g., an offset to SFN=0). The wireless device may receive a configuration parameter indicating the offset parameter. In an example, the time window may be smaller in duration than the RRC reconfiguration message processing time. In an example, the time window may be larger in duration than the RRC reconfiguration message processing time.

Figure 23:
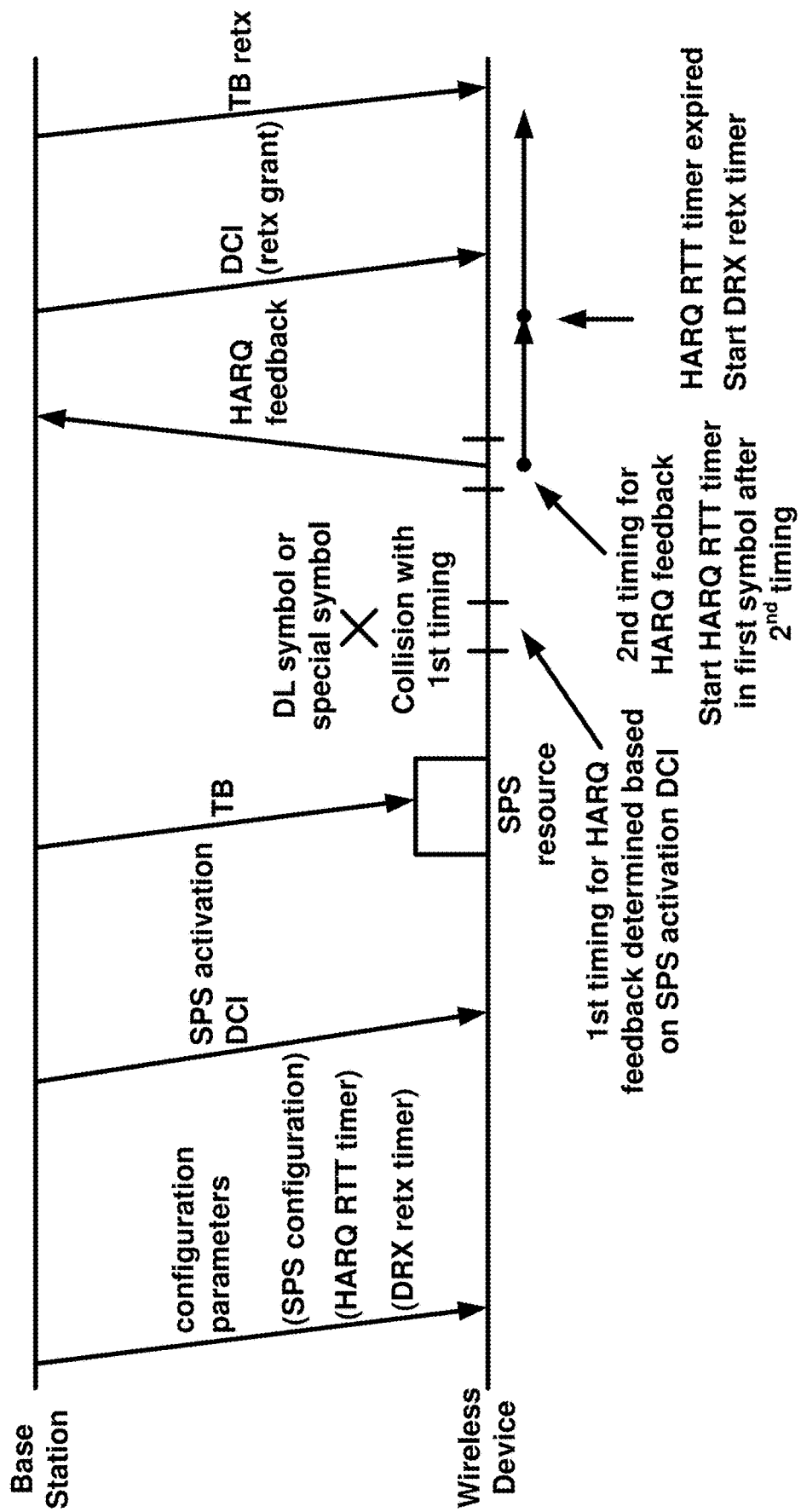
FIG. 23 shows an example process in accordance with several of various embodiments of the present disclosure.

In an example embodiment as shown in FIG. 23, a wireless device may receive one or more message comprising configuration parameters. The one or more or more messages may comprise one or more RRC messages. The configuration parameters may comprise semi-persistent scheduling (SPS) configuration parameters and discontinuous reception (DRX) configuration parameters. The SPS configuration parameters may comprise parameters for determining SPS radio resources, a SPS periodicity, one or more HARQ processes associated with the SPS configuration, a SPS configuration index, etc. The DRX configuration parameters may comprise values of one or more DRX timers, for example, a first value of a DRX HARQ RTT timer (e.g., a drx-HARQ-RTT-TimerDL) and a second value of a DRX retransmission timer (e.g., drx-Retransmisison-TimerDL). The wireless device may receive a DCI indicating activation of the SPS configuration. The DCI may comprise a plurality of fields comprising a field with a value indicating a PDSCH-to-HARQ feedback timing. The PDSCH-to-HARQ feedback timing may indicate a timing between reception of a TB associated with the SPS configuration and a timing for transmission of HARQ feedback associated with the TB. The wireless device may determine a first HARQ feedback timing based on a timing of the SPS PDSCH (e.g., the timing of reception of the SPS TB) and the PDSCH-to-HARQ feedback timing indicated by the activation DCI. The wireless device may determine to skip HARQ feedback at the first HARQ feedback timing, indicated by the activation DCI, based on the uplink channel (e.g., the PUCCH) for scheduled transmission of the HARQ feedback at the first HARQ feedback timing colliding/coinciding with a Downlink symbol or a Flexible symbol. The wireless device may not start the HARQ RTT timer at the first HARQ feedback timing based on skipping the HARQ feedback at the first HARQ feedback timing. The wireless device may determine a second timing for transmission of the HARQ feedback. In an example, the wireless device may determine the second HARQ feedback timing as a first available PUCCH resource after the first HARQ feedback timing. An available PUCCH resource may be a PUCCH resource that at least does not collide/coincide with a Downlink symbol or a Flexible symbol. In an example, the wireless device may receive an indication from the base station indicating the second HARQ feedback timing. For example, the wireless device may receive a DCI indicating the second HARQ feedback timing. In an example, the wireless device may construct/generate a HARQ feedback codebook comprising one or more HARQ feedbacks comprising the HARQ feedback of the transport block. The wireless device may transmit the HARQ feedback codebook at the second HARQ feedback timing. The wireless device may start the HARQ RTT timer in a first/adjacent/earliest symbol after the second HARQ feedback timing, instead of the first HARQ feedback timing indicated by the DCI, based on the determining to skip the HARQ feedback at the first HARQ feedback timing and based on determining to transmit the HARQ feedback at the second HARQ feedback timing. The wireless device may start the DRX retransmission timer based on the HARQ RTT timer expiring. The wireless device may be in a DRX Active timer based on the DRX retransmission timer running. The wireless device may monitor the control channel while the DRX retransmission timer running and may receive a second DCI indicating retransmission of the transport block. The second DCI may comprise scheduling information for retransmission of the transport block. The wireless device may receive a retransmission of the transport block based on the scheduling information in the second DCI.

Figure 24:
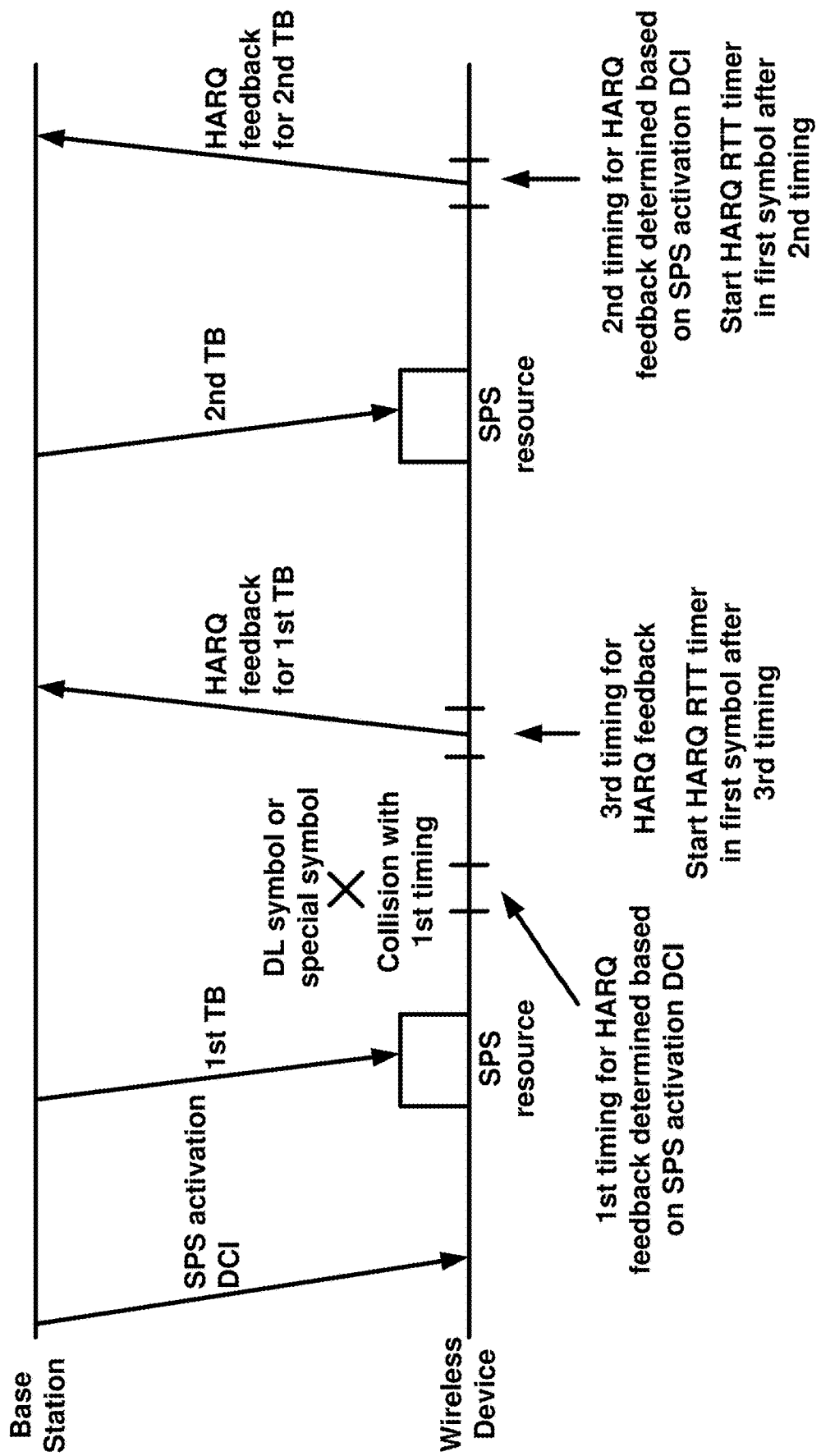
FIG. 24 shows an example process in accordance with several of various embodiments of the present disclosure.

In an example embodiment as shown in FIG. 24, a wireless device may receive an DCI indicating activation of a SPS configuration. The wireless device may determine radio resources of a plurality of SPS grants based on the DCI and the SPS configuration. The DCI may comprise a field, a value of the field indicating a timing between a SPS grant/assignment and a HARQ feedback corresponding to a TB received via the SPS grant/assignment. The DCI may indicate a first timing for a first HARQ feedback of a first transport block associated with the SPS configuration and received based on a first SPS grant/assignment. The DCI may indicate a second timing for a second HARQ feedback of a second transport block associated with the SPS configuration and received based on a second SPS grant/assignment. The first timing of the first HARQ feedback may coincide/collide with a Downlink symbol or a Flexible symbol. The second timing may not coincide/collide with a Downlink symbol or a Flexible symbol.

The wireless device may start a HARQ RTT timer with the first configured value of the HARQ RTT timer in a first/earliest/adjacent symbol after a third timing, different from the first timing, based on the first timing colliding/coinciding with a Downlink symbol or a Flexible symbol. The wireless device may determine the third timing based on a rule. For example, the third timing may be a first/earliest available PUCCH resource after the first timing. For example, the wireless device may determine the third timing based on an indication from the base station, for example a DCI indicating the third timing. The wireless device may start the HARQ RTT timer for the HARQ process associated with the first transport block.

The wireless device may start a HARQ RTT timer with the first configured value of the HARQ RTT timer in a first/earliest/adjacent symbol after the second timing based on the second timing not colliding/coinciding with a Downlink symbol or a Flexible symbol. The wireless device may start the HARQ RTT timer for the HARQ process associated with the second transport block.

Based on the expiry of the HARQ RTT timer, the wireless device may start a DRX retransmission timer with a configured value. The wireless device may be in a DRX Active time and may monitor the control channel while the DRX retransmission timer running. The wireless device may receive downlink control signaling, for example DCI indicating retransmission of the first transport block or the second transport block while the DRX retransmission timer is running.

Figure 25:
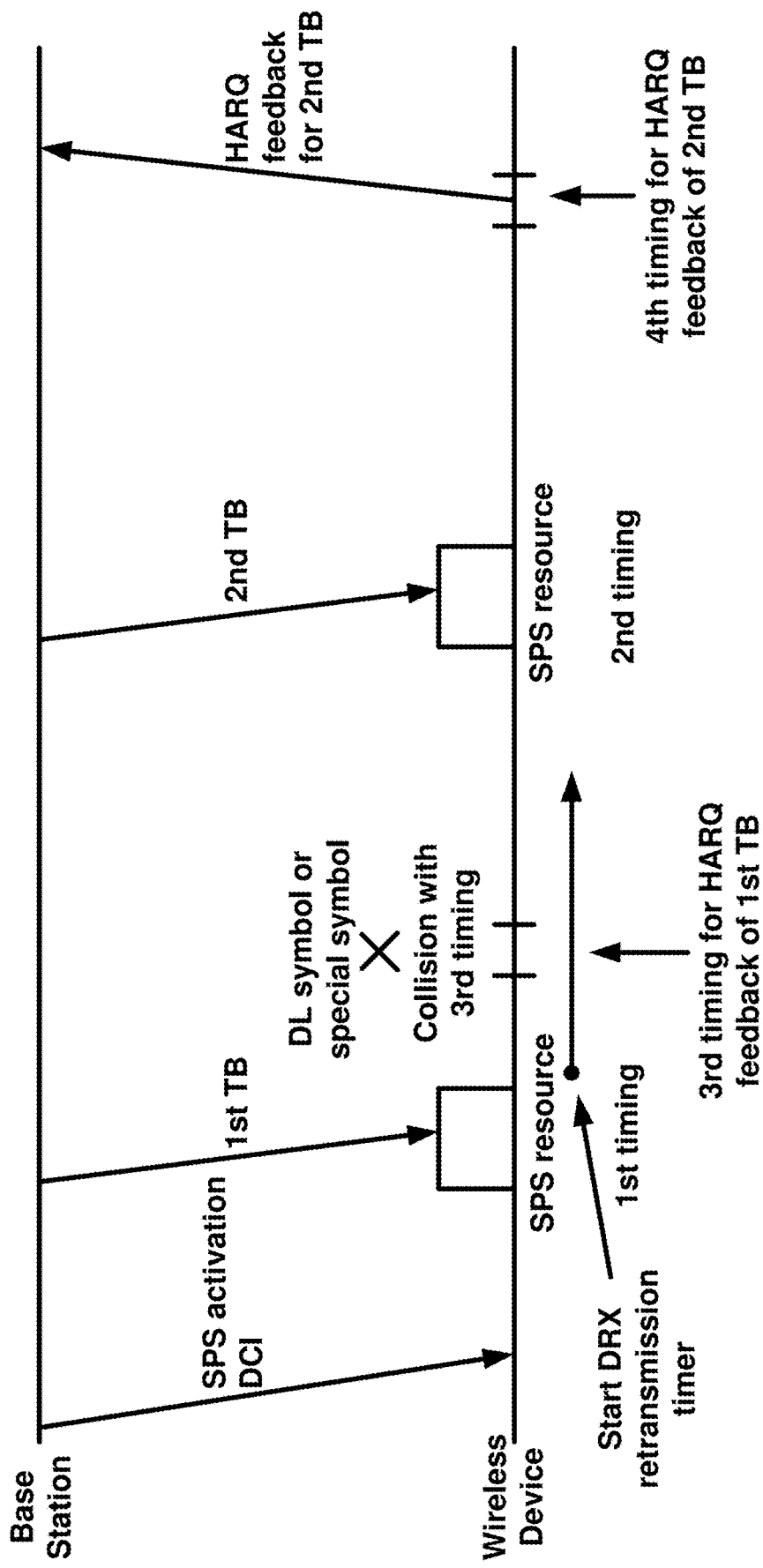
FIG. 25 shows an example process in accordance with several of various embodiments of the present disclosure.

In an example embodiment as shown in FIG. 25, a wireless device may receive a first transport block, associated with a SPS configuration, in a first timing. The wireless device may receive a second transport block, associated with the SPS configuration, in a second timing. The wireless device may determine a third timing for first HARQ feedback of the first transport block. The wireless device may determine the third timing based on the first timing of the first transport block and an activation DCI (e.g., a value of a PDSCH-to-HARQ feedback timing field in the activation DCI). The wireless device may determine a fourth timing for second HARQ feedback of the second transport block. The third timing may coincide/collide with a Downlink symbol or a Flexible symbol. The wireless device may determine the fourth timing based on the second timing of the second transport block and the activation DCI (e.g., a value of a PDSCH-to-HARQ feedback timing field in the activation DCI). The fourth timing may not coincide/collide with a Downlink symbol or a Flexible symbol. The wireless device may start a DRX retransmission timer in a first/earliest/adjacent symbol after the first timing of the first transport block based on the third timing of the first HARQ feedback of the first transport block colliding/coinciding with a Downlink symbol or a Flexible symbol. The wireless device may not start a DRX retransmission timer in a first/earliest/adjacent symbol after the second timing of the second transport block based on the fourth timing of the second HARQ feedback of the second transport block not colliding/coinciding with a Downlink symbol or a Flexible symbol. The wireless device may start a HARQ RTT timer in a first/earliest/adjacent symbol after the fourth timing of the second HARQ feedback of the second transport block. The wireless device may start the DRX retransmission timer based on the HARQ RTT timer expiring.

Figure 26:
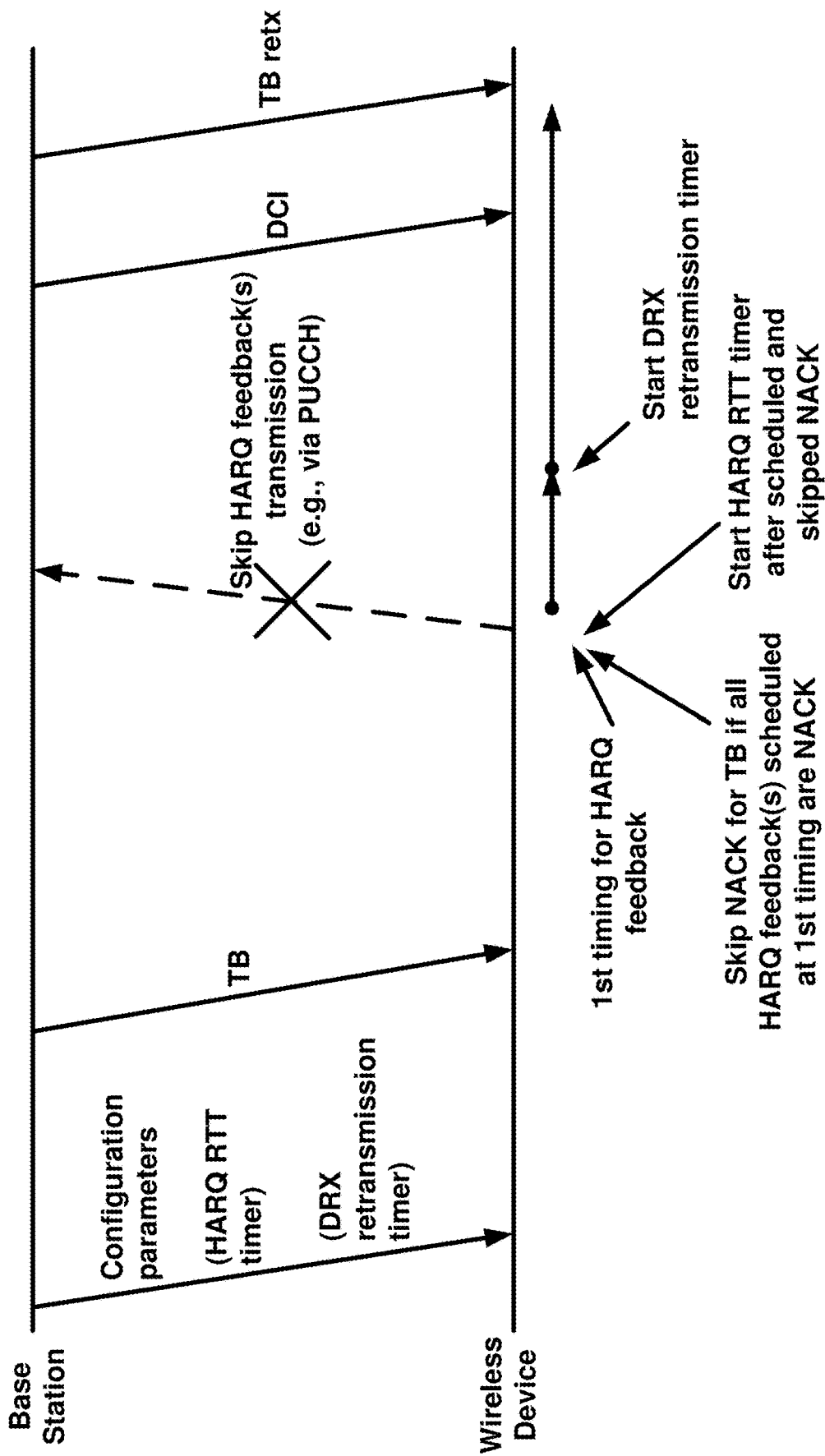
FIG. 26 shows an example process in accordance with several of various embodiments of the present disclosure.

In an example embodiment as shown in FIG. 26, a wireless device may receive one or more message comprising configuration parameters. The one or more or more messages may comprise one or more RRC messages. The configuration parameters may comprise discontinuous reception (DRX) configuration parameters. The DRX configuration parameters may comprise values of one or more DRX timers for example a first value of a HARQ RTT timer (e.g., a drx-HARQ-RTT-TimerDL) and a second value of a DRX Retransmission timer (e.g., a drx-RetransmissionTimerDL). The HARQ RTT timer or the DRX retransmission timer may be HARQ process specific. The wireless device may start or stop the HARQ RTT timer or the DRX retransmission timer for a specific HARQ process. The wireless device may use a DRX procedure based on the DRX configuration parameters to determine DRX Active Time (e.g., a duration that the wireless device monitors control channel) and time durations wherein the wireless device does not monitor the control channel.

The wireless device may receive a downlink transport block, wherein a first HARQ feedback for the downlink transport block may be scheduled at a first timing. The wireless device may determine the first timing for the first HARQ feedback based on a timing of reception of the downlink transport block (e.g., PDSCH timing) and a PDSCH to HARQ feedback timing. The PDSCH to HARQ feedback timing may be indicated by a DCI scheduling the downlink transport block (e.g., in case of dynamically scheduled PDSCH for the transport block) or may be indicated by a SPS activation DCI (e.g., in case of the semi-statically scheduled PDSCH (SPS PDSCH) for the transport block). For example, in case of dynamically scheduled PDSCH, a scheduling DCI may indicate a resource assignment for the transport block and the scheduling DCI may comprise a field, a value of the field indicating the PDSCH to HARQ feedback timing indicating the time duration between the transport block and the first timing of the first HARQ feedback. For example, in case of semi-statically scheduled PDSCH, the SPS activation DCI may comprise a field, a value of the field indicating the SPS PDSCH to HARQ feedback timing indicating the time duration between the transport block and the first timing of the first HARQ feedback. The wireless device may receive SPS configuration parameters. The wireless device may determine the radio resources for transmission of the transport block based on the SPS configuration parameters (e.g., in case of a Type 1 SPS configuration) or based on the SPS configuration parameters and a SPS activation DCI (e.g., in case of a Type 2 SPS configuration).

Figure 27:
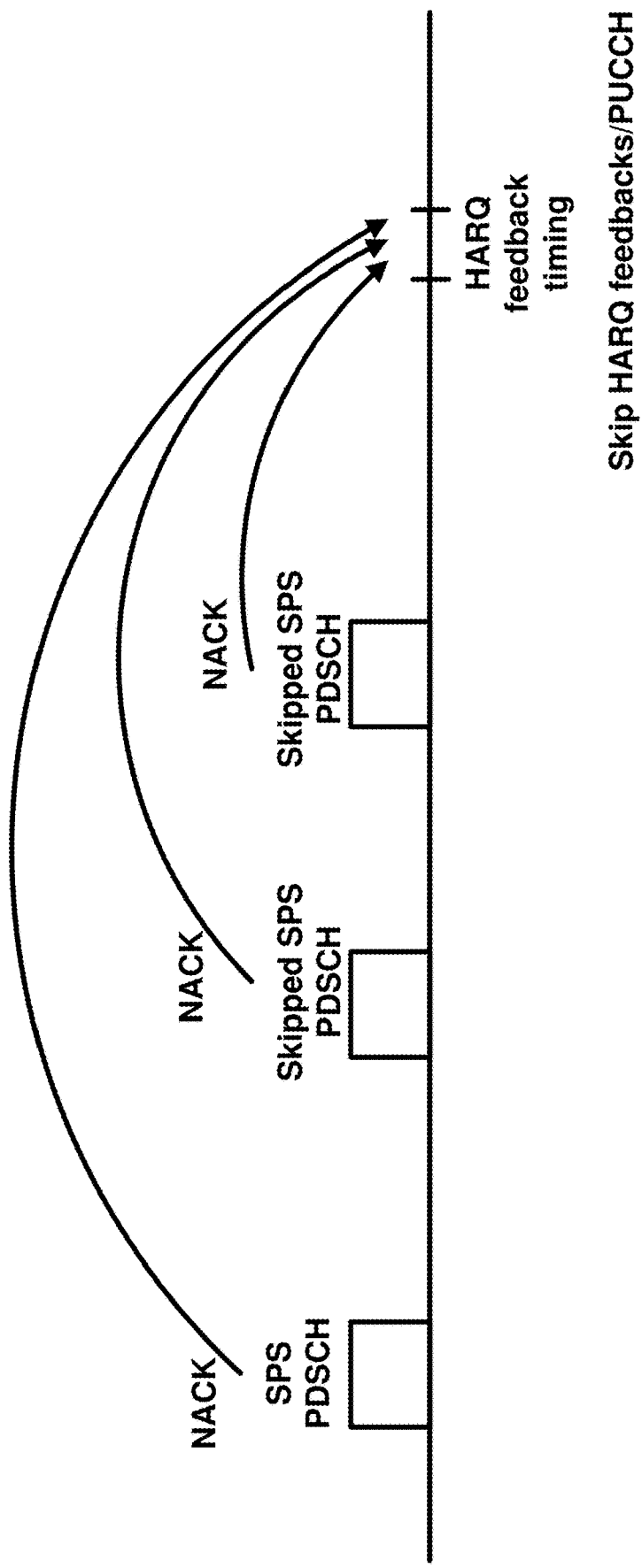
FIG. 27 shows an example process in accordance with several of various embodiments of the present disclosure.
Figure 28:
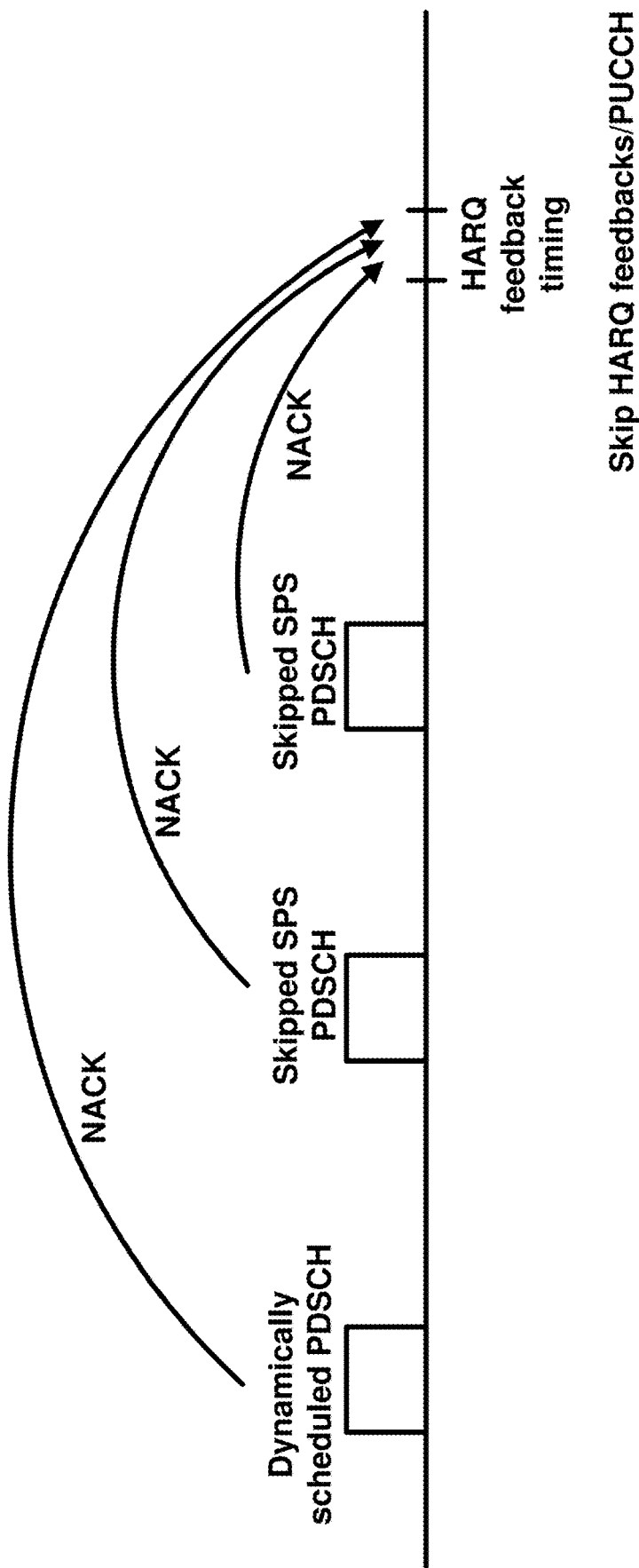
FIG. 28 shows an example process in accordance with several of various embodiments of the present disclosure.

The wireless device may be scheduled to transmit one or more HARQ feedbacks, comprising the first HARQ feedback of the transport block, at the first timing. For example, the wireless device may be scheduled to transmit the one or more HARQ feedbacks via a physical channel (e.g., PUCCH or PUSCH) at the first timing. The wireless device may be scheduled to construct/generate a HARQ feedback codebook, comprising the one or more HARQ feedbacks, and transmit the HARQ feedback codebook via the physical channel at the first timing. In an example, the one or more HARQ feedbacks may be associated with one or more SPS configurations. In an example, the one or more HARQ feedbacks may be associated with one or more downlink transport blocks associated with one or more SPS configurations. In an example as shown in FIG. 27, all of the one or more HARQ feedbacks may be associated with SPS PDSCHs/transport blocks. In an example as shown in FIG. 28, at least one of the one or more HARQ feedbacks may be associated with a dynamic grant (e.g., dynamically scheduled PDSCH). In an example, the one or more HARQ feedbacks may be associated with one or more SPS configurations and at least one of the one or more HARQ feedbacks may be a negative acknowledgement associated with a skipped SPS PDSCH (e.g., if the base station does not transmit a downlink transmission/TB at a corresponding SPS occasion/resource/grant). The one or more HARQ feedbacks may be negative acknowledgment. For example, as shown in FIG. 27 and FIG. 28, some of the one or more HARQ feedbacks may be negative acknowledgement in response to the corresponding PDSCHs being skipped SPS PDSCHs (e.g., if the base station does not transmit downlink transmissions/TB s at the corresponding SPS occasions/resources/grants). The wireless device may skip transmission of the one or more HARQ feedbacks, comprising the first HARQ feedback, at the first timing based on the one or more HARQ feedbacks being negative acknowledgements. The skipping of the first HARQ feedback may be based on a skipping transmission of a physical channel carrying the first HARQ feedback. For example, the physical channel may be PUCCH. For example, the physical channel may be PUSCH. For example, the physical channel may be PUCCH or PUSCH. In an example, the wireless device may skip transmission of the one or more HARQ feedbacks, comprising the first HARQ feedback, at the first timing based on the one or more HARQ feedbacks being negative acknowledgements and based on the one or more HARQ feedbacks being associated with one or more SPS configurations, wherein at least some of the one or more HARQ feedbacks may be negative acknowledgements in response to corresponding PDSCHs being skipped SPS PDSCHs (e.g., base station not transmitting transport blocks at the corresponding SPS occasions/grants/resources).

The wireless device may start a HARQ RRT timer with the first value indicated by the DRX configuration parameters (e.g., drx-HARQ-RTT-TimerDL) in a first/earliest/adjacent symbol after the first timing of the scheduled and skipped HARQ feedback for the transport block. The wireless device may start the HARQ RTT timer for the HARQ process associated with the transport block in the first symbol after the first timing of the scheduled and skipped HARQ feedback for the transport block. The wireless device may stop the DRX retransmission timer, associated with the HARQ process, based on receiving the transport block. The wireless device may start the DRX retransmission timer, associated with the HARQ process, based on the HARQ RTT timer expiring and based on the scheduled and skipped HARQ feedback being a negative acknowledgement. The wireless device may determine, based on the DRX procedure and based on the DRX retransmission timer running, that the wireless device is the DRX Active time and may monitor the control channel based on being in the DRX Active time. The wireless device may receive a DCI indicating scheduling information for retransmission of the transport block based on monitoring the control channel. The scheduling information may comprise a radio resource assignment for retransmission of the transport block. The wireless device may receive the transport block (e.g., the retransmission of the transport block) based on the scheduling information/resource assignment.

Figure 29:
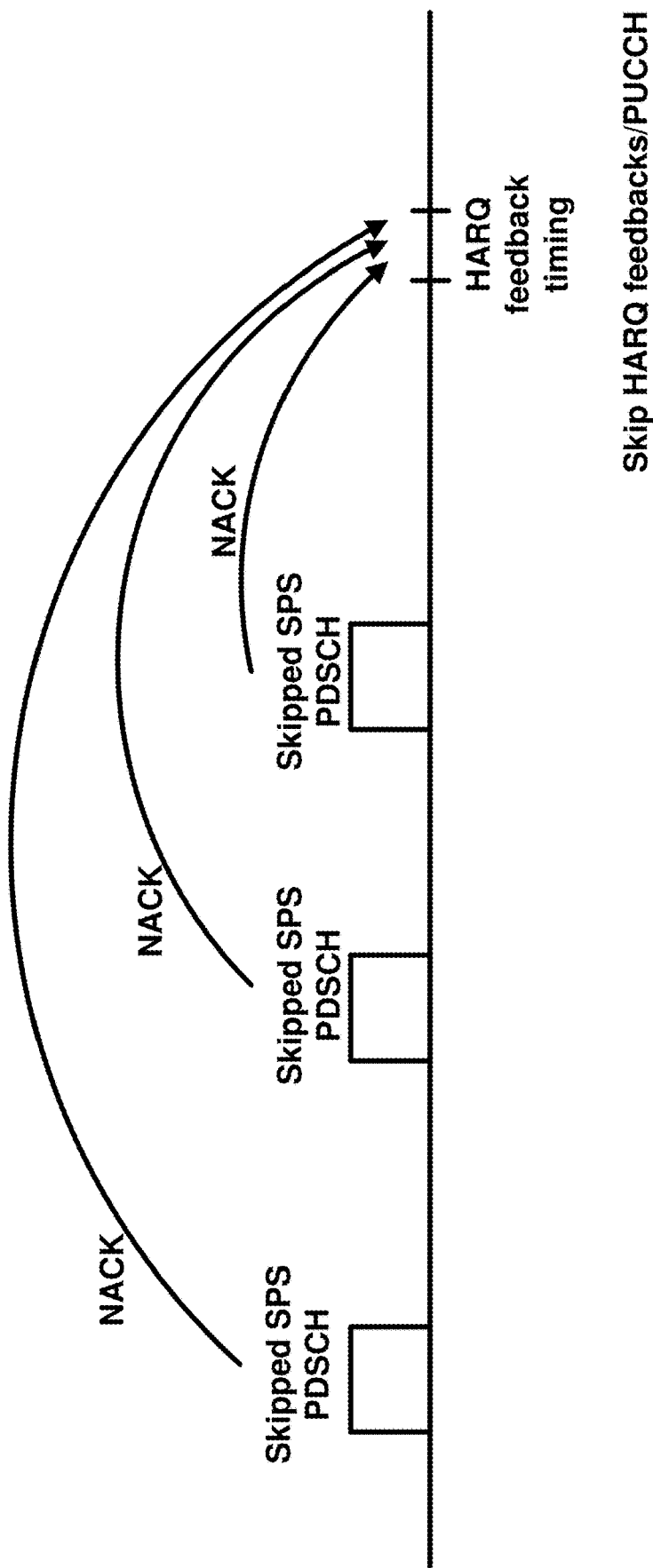
FIG. 29 shows an example process in accordance with several of various embodiments of the present disclosure.

In an example embodiment as shown in FIG. 29, a wireless device may determine that a SPS PDSCH is skipped and may differentiate between a skipped SPS PDSCH and SPS PDSCH that is wrongly decoded. For example, the wireless device may differentiate between a skipped SPS PDSCH and SPS PDSCH that is wrongly decoded based on detecting or not detecting DMRS sequences associated with a PDSCH. One or more HARQ feedbacks for one or more SPS PDSCHs may be scheduled for transmission at a first timing. Transmission of the one or more SPS PDSCHs may be skipped by the base station. The wireless device may skip transmission of HARQ feedbacks (NACKs) of the one or more skipped SPS PDSCHs, e.g., may skip transmission of a physical channel (e.g., PUCCH) used for carrying the one or more HARQ feedbacks (NACKs) associated with the one or more skipped SPS PDSCHs. The wireless device may skip transmission of HARQ feedbacks (NACKs) of the one or more skipped SPS PDSCHs based on only the HARQ feedbacks of the one or more skipped SPS PDSCHs being scheduled to be transmitted at the first timing.

A wireless device may determine to skip uplink control information (UCI) for example, HARQ feedback(s) (e.g., HARQ feedback(s) multiplexed in a HARQ feedback codebook) that are scheduled for transmission in a timing. For example, the wireless device may skip the HARQ feedback(s) in response to the plurality of HARQ feedbacks being negative acknowledgements (NACKs) or in response to the plurality of HARQ feedbacks being positive acknowledgements (ACKs). In some examples, using existing signaling mechanisms and/or processes, skipping of the plurality of HARQ feedbacks and/or other UCI may lead to inefficient wireless device and/or wireless network operation. There is a need to enhance the existing signaling mechanisms and/or processes when the wireless device skips the UCI/HARQ feedback(s). Example embodiments enhance the existing signaling mechanisms and/or processes when the wireless device skips the UCI/HARQ feedback(s).

Figure 30:
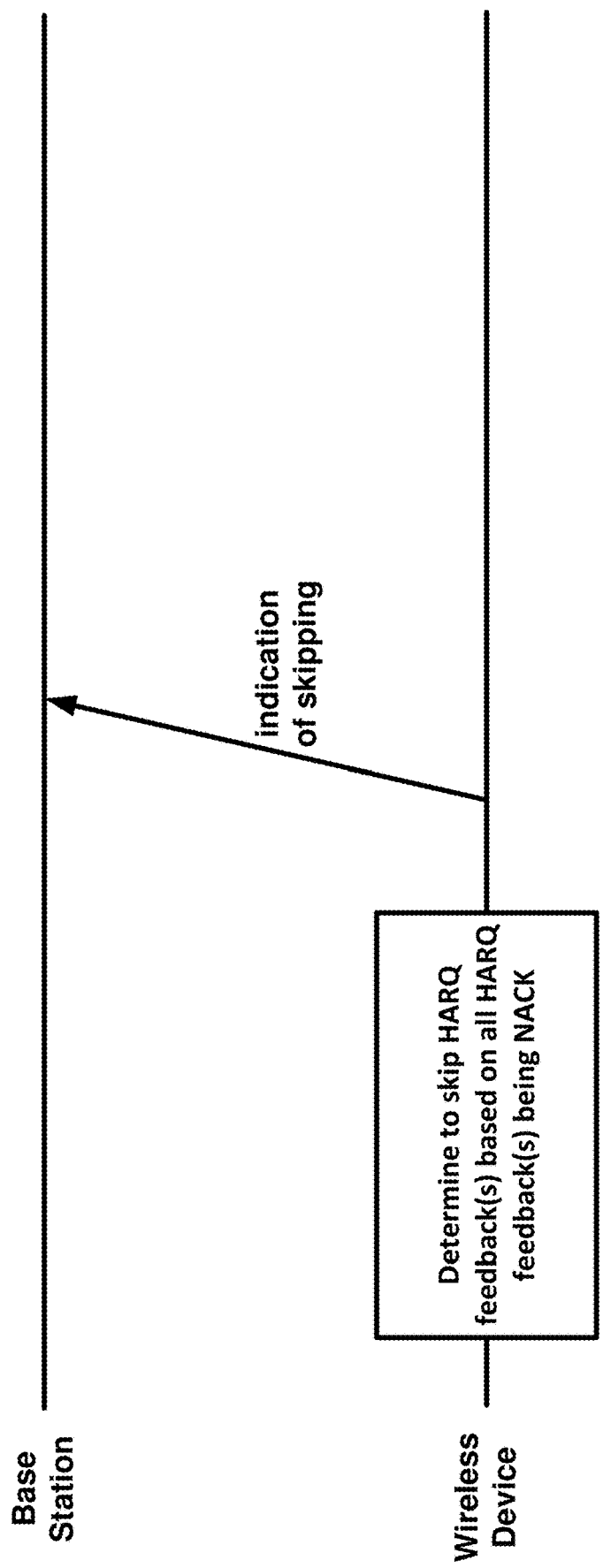
FIG. 30 shows an example process in accordance with several of various embodiments of the present disclosure.

In an example embodiment as shown in FIG. 30, a wireless device may determine to skip transmission of one or more HARQ feedbacks in a first timing. The wireless device may determine to skip transmission of a HARQ feedback codebook comprising the one or more HARQ feedbacks in the first timing. For example, the one or more HARQ feedbacks may be associated with one or more SPS grants/assignments/occasions and the wireless device may determine the first timing for the one or more HARQ feedbacks based on one or more SPS activation DCIs and the timings of the one or more SPS grants/assignments/occasions. The wireless device may receive one or more messages comprising configuration parameters of one or more SPS configurations associated with the one or more SPS grants/assignments/occasions. The wireless device may determine to skip the one or more HARQ feedbacks based on the one or more HARQ feedbacks being negative acknowledgements. In an example, the wireless device may determine to skip the one or more HARQ feedbacks based on the one or more HARQ feedbacks being negative acknowledgements associated with one or more SPS configurations. In an example, at least some of the one or more HARQ feedbacks may be negative acknowledgement in response to incorrect decoding of corresponding transport blocks. In an example, at least some of the one or more HARQ feedbacks may be negative acknowledgement in response to skipped downlink SPS transmissions. In an example, the wireless device may determine to skip the one or more HARQ feedbacks based on all the one or more HARQ feedbacks being negative acknowledgements in response to skipped downlink SPS transmissions.

Based on determining to skip the one or more HARQ feedbacks, the wireless device may transmit an indication to the base station indicating that the wireless device skips the one or more HARQ feedbacks. In an example, the indication may be uplink control information (UCI) and the wireless device may transmit the UCI using physical layer signaling. In an example, the wireless device may transmit the indication using MAC layer signaling (e.g., using a MAC CE).

In an example, the indication may indicate that the wireless device skips the transmission via a physical channel (e.g., PUCCH or PUSCH). For example, the wireless may receive scheduling information indicating radio resources for transmission of a transport block and the wireless device may transmit the indication via the radio resources indicated by the scheduling information. For example, the indication may be UCI and the wireless device may multiplex the UCI with the transport block and transmit the indication via a PUSCH.

In an example, the timing of the indication may be at the first timing that the one or more HARQ feedbacks are scheduled and skipped.

In an example, the timing of the indication may be sooner that the first timing that the one or more HARQ feedbacks are scheduled and skipped.

Figure 31:
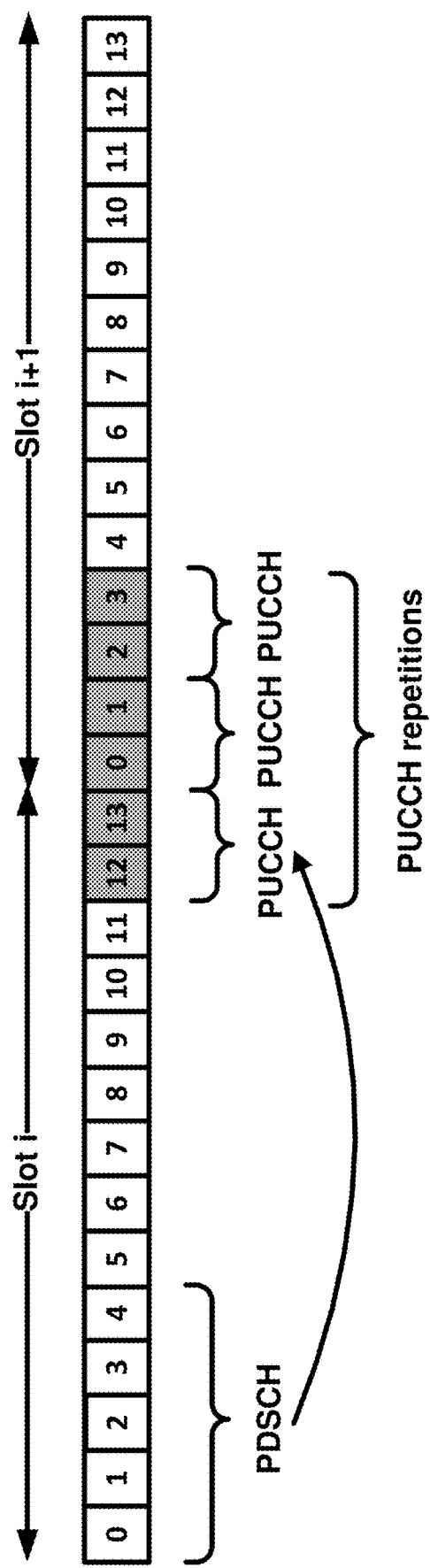
FIG. 31 shows an example PUCCH repetition process in accordance with several of various embodiments of the present disclosure.
Figure 32:
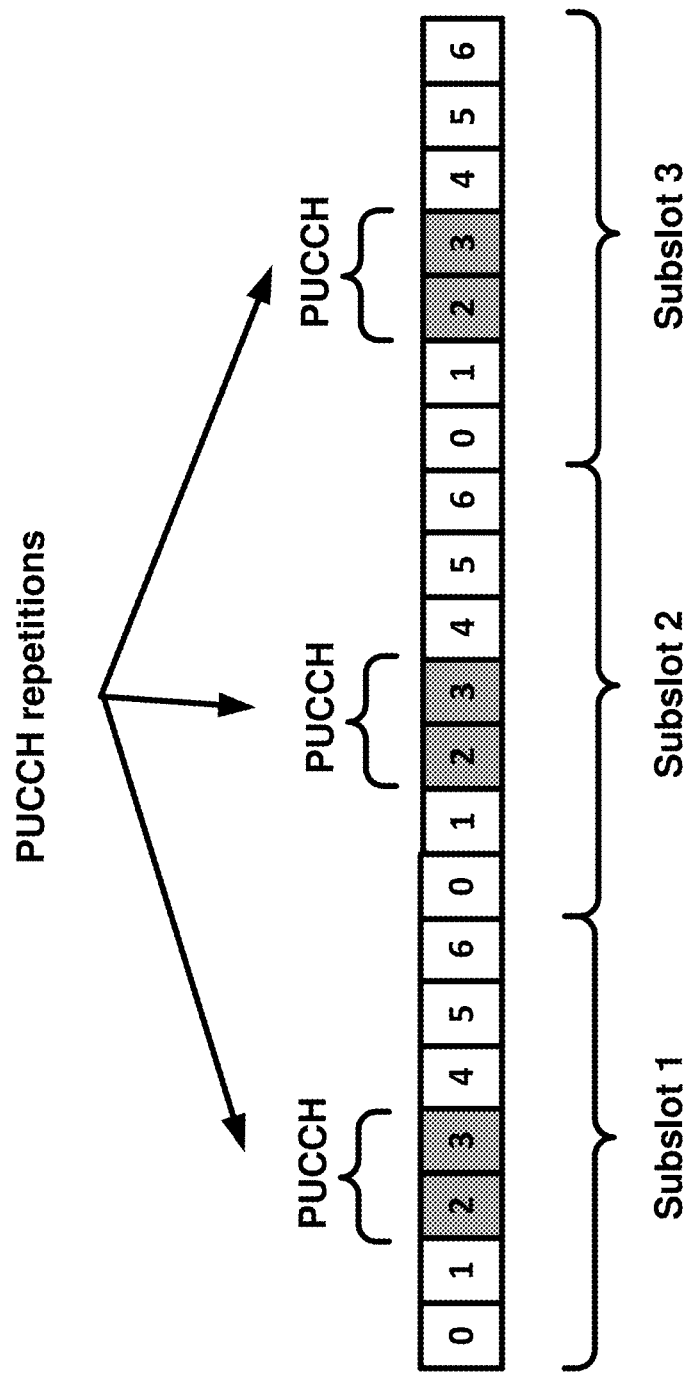
FIG. 32 shows an example PUCCH repetition process in accordance with several of various embodiments of the present disclosure.

In an example as shown in FIG. 31, a wireless device may use sub-slot based PUCCH repetition. Due to the processing time for PDSCH, the HARQ feedback may only be transmitted after symbol 12 of slot i. The long PUCCH formats, such as formats 1, 3, 4, may not be used because the long PUCCH formats may cross the boundary between slot i and slot i+1. By using only long PUCCH formats for achieving high reliability, the wireless device may only transmit HARQ feedback in slot i+1. To enable the low latency requirements of URLLC applications, the wireless device may utilize the last two symbols of slot i with a short PUCCH format to transmit the HARQ feedback. To ensure the reliability, the wireless device may transmit the short PUCCH three times continuously. FIG. 32 shows another example of sub-slot based PUCCH repetition for achieving lower latency and higher reliability.

Figure 33:
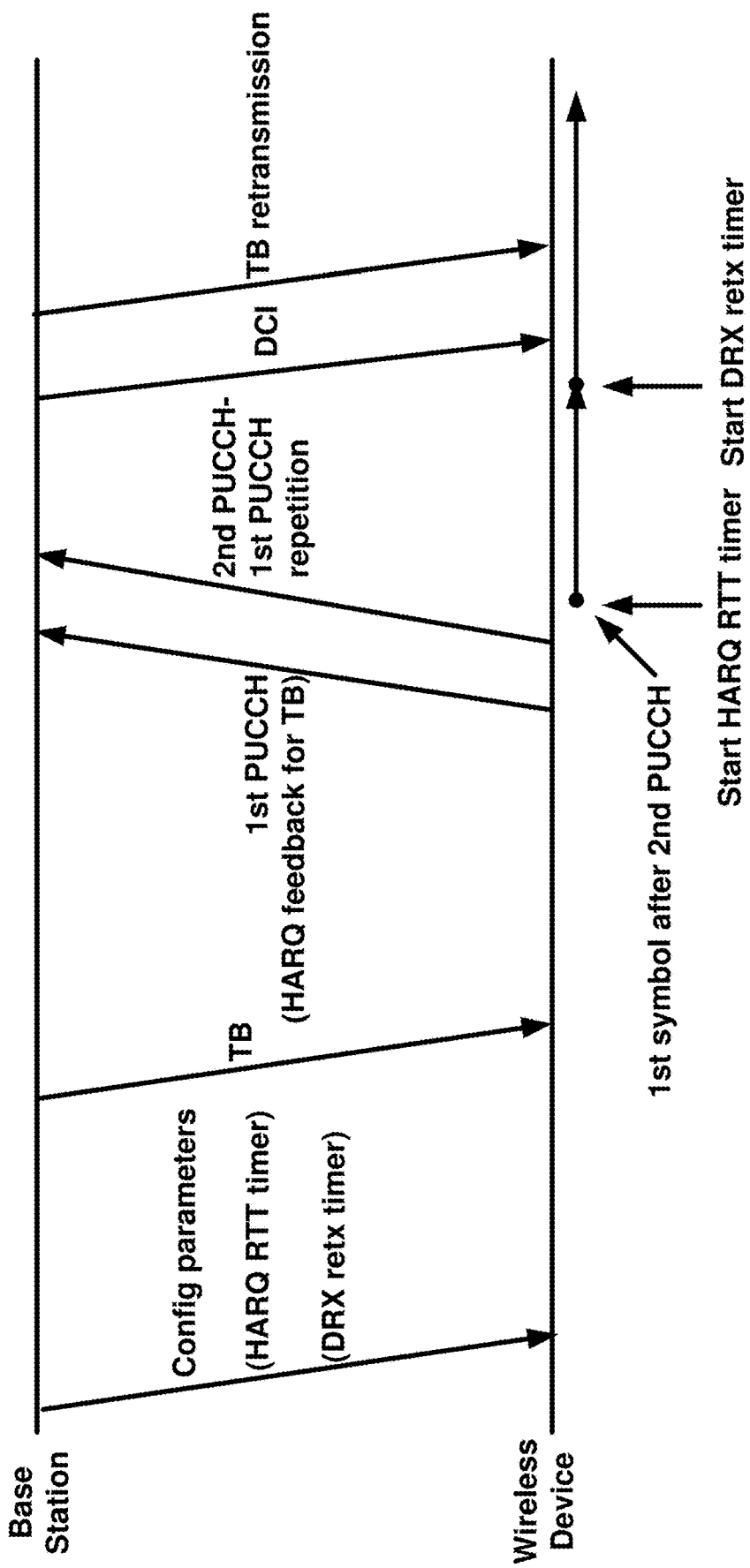
FIG. 33 shows an example process in accordance with several of various embodiments of the present disclosure.
Figure 34:
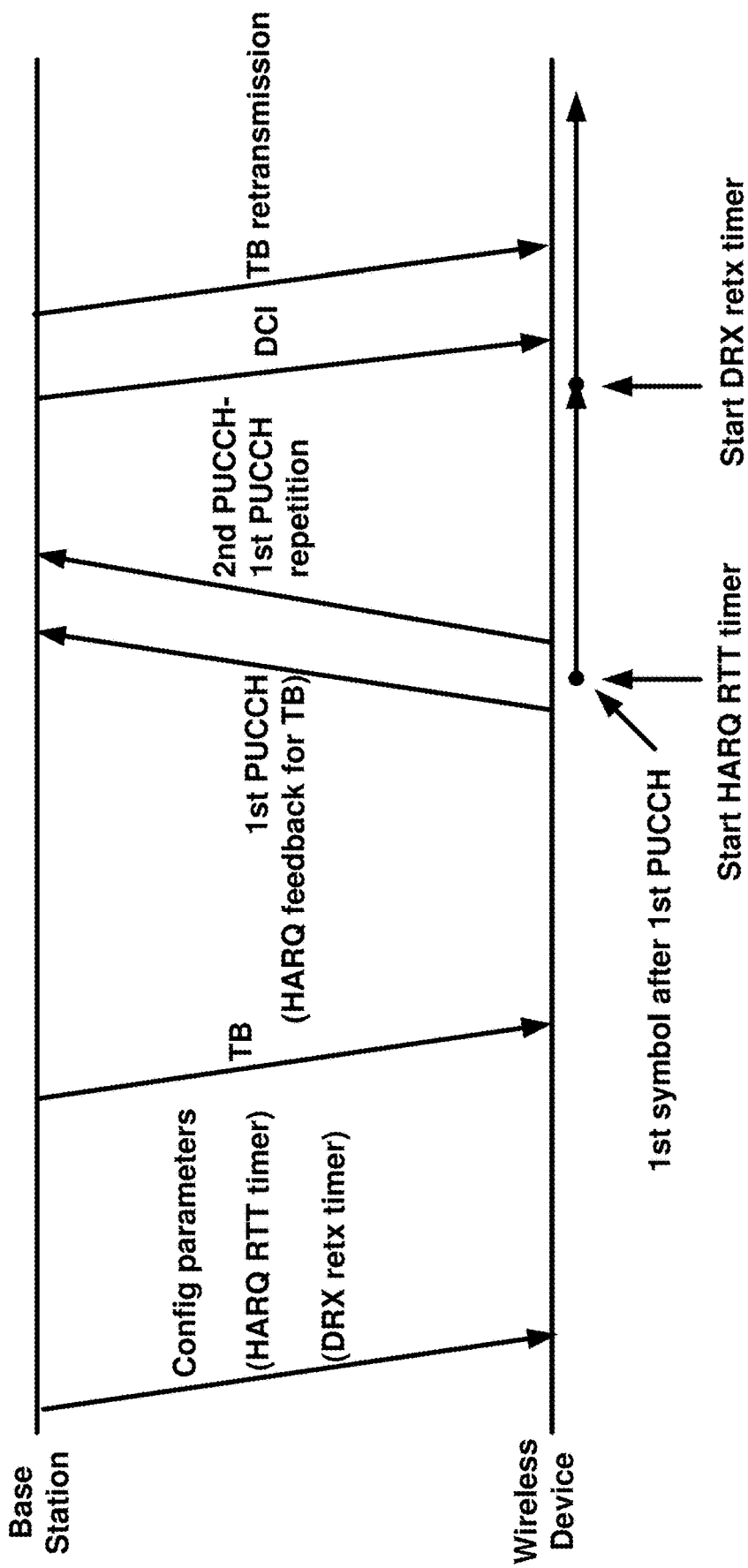
FIG. 34 shows an example process in accordance with several of various embodiments of the present disclosure.

In an example embodiment as shown in FIG. 33 and FIG. 34, a wireless device may receive discontinuous reception (DRX) configuration parameters comprising a first value for a HARQ RTT timer and a second value for a DRX retransmission timer. The wireless device may receive PUCCH configuration parameters. The PUCCH configuration parameters may comprise parameters for one or more short PUCCH formats. The PUCCH configuration parameters may comprise parameters for sub-slot based PUCCH transmission. For example, the wireless device may determine slots/sub-slots for PUCCH repetitions and/or the number of PUCCH repetitions, carrying HARQ feedback associated with a downlink transport block, based on a DCI scheduling the downlink transport block and the PUCCH configuration parameters. For example, a value of a PUCCH resource indicator field in the DCI and the PUCCH configuration parameters (e.g., the parameters for sub-slot based PUCCH transmission) may indicate the number of PUCCH repetitions, the slots/sub-slots for PUCCH repetitions, the symbols/slots for transmission of the PUCCH repetitions, etc.

The wireless device may receive a downlink transport block based on a PDSCH (e.g., a dynamically scheduled PDSCH or a SPS PDSCH). The wireless device may determine to transmit repetition of HARQ feedback of the transport block using sub-slot-based repetitions of the HARQ feedback via repetitions of sub-slot based PUCCH. For example, the wireless device may determine to transmit repetitions of the HARQ feedback of the transport block based on a value of a field (e.g., a PUCCH resource indicator field) of the DCI scheduling the transport block. The wireless device may transmit repetitions of the HARQ feedback of the transport block based on a plurality of uplink control channels (e.g., using sub-slot based PUCCH repetitions). In an example, the plurality of uplink control channels may be transmitted in a plurality of sub-slots of the same slot. In an example, the plurality of uplink control channels may be transmitted in a plurality of sub-slots of two or more slots (e.g., two or more contiguous slots). In an example, the plurality of uplink control channels may comprise a first uplink control channel and a second uplink control channel. The first uplink control channel may be in a first slot (e.g., a first sub-slot of the first slot). The second uplink control channel may be in a second slot (e.g., a second sub-slot of the second slot). In an example, the first uplink control channel may be transmitted via one or more first symbols (e.g., one or more last symbols) of the first slot. The second uplink control channel may be transmitted via one or more second symbols (e.g., one or more earliest symbols) of the second slot. In an example, the plurality of uplink control channels may be contiguous. The first/earliest symbol of a first uplink control channel, in the plurality of uplink control channels, may be adjacent to a last symbol of a second uplink control channel in the plurality of uplink control channels. In an example, at least two of the plurality of uplink control channels may not be contiguous.

In an example embodiment as shown in FIG. 33, the wireless device may start the HARQ RTT timer, with the first value, on a first/earliest symbol after transmission of the HARQ feedback of the transport block via a first/earliest uplink control channel of the plurality of uplink control channels.

In an example embodiment as shown in FIG. 34, the wireless device may start the HARQ RTT timer, with the first value, on a first/earliest symbol after transmission of the HARQ feedback of the transport block via a last/latest uplink control channel of the plurality of uplink control channels.

The wireless device may start the DRX retransmission timer, with the second value, based on the HARQ RTT timer expiring. The wireless device may be in a DRX Active time based on the DRX retransmission timer running. The wireless device may monitor a control channel while in the DRX Active time. The wireless device may receive a DCI based on monitoring the control channel. The DCI may comprise scheduling information for retransmission of the transport block. The wireless device may receive the retransmission of the transport block based on the DCI.

Figure 35:
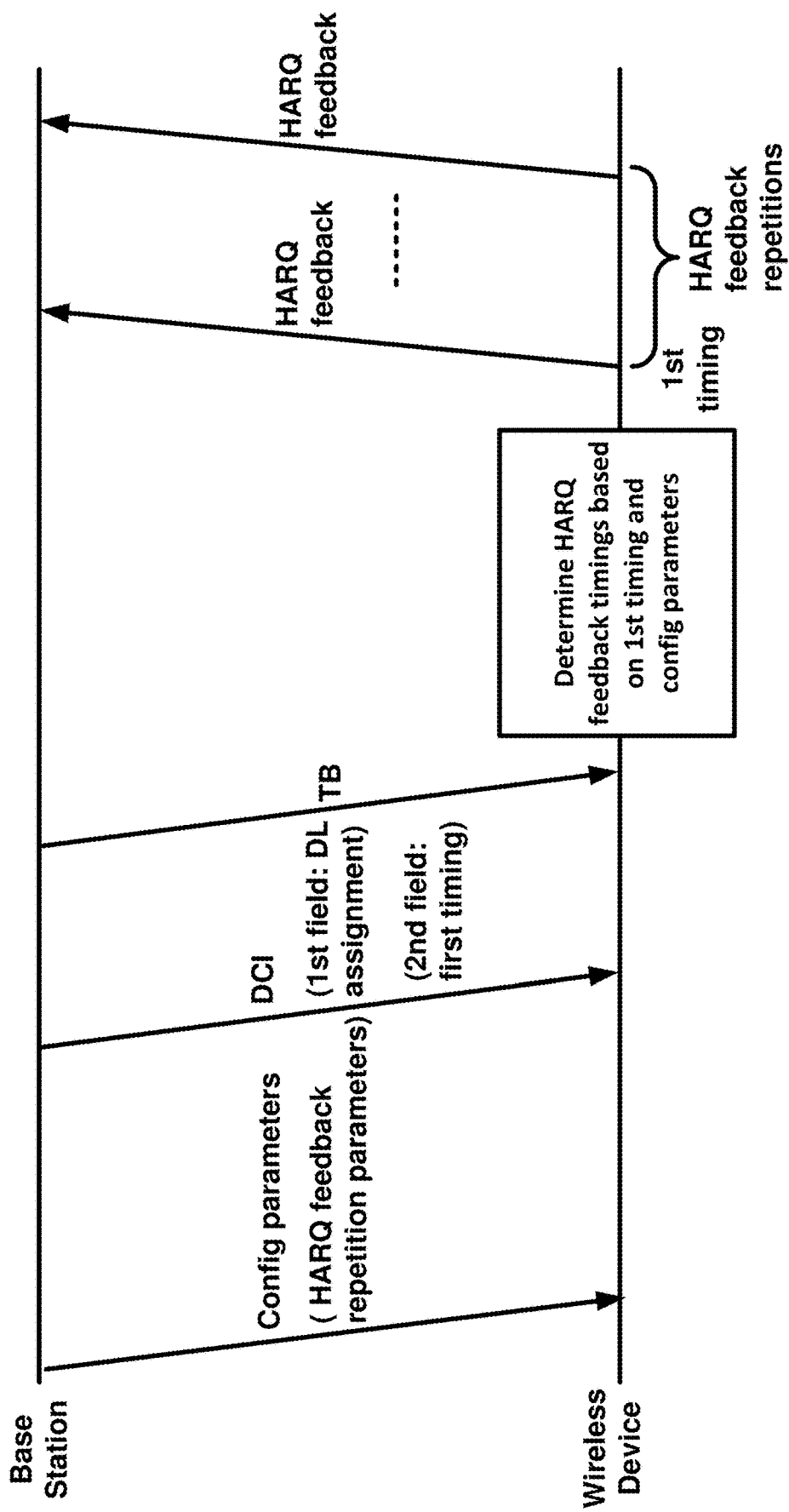
FIG. 35 shows an example process in accordance with several of various embodiments of the present disclosure.

In an example embodiment as shown in FIG. 35, a wireless device may receive configuration parameters for determining uplink control channel resources for HARQ feedback repetitions. For example, the wireless device may receive PUCCH configuration parameters. The PUCCH configuration parameters may comprise parameters for one or more short PUCCH formats. The PUCCH configuration parameters may comprise parameters for sub-slot based PUCCH transmission. For example, the wireless device may determine slots/sub-slots for PUCCH repetitions and/or the number of PUCCH repetitions, carrying HARQ feedback associated with a downlink transport block, based on a DCI scheduling the downlink transport block and the PUCCH configuration parameters. For example, a value of a PUCCH resource indicator field in the DCI and the PUCCH configuration parameters (e.g., the parameters for sub-slot based PUCCH transmission) may indicate the number of PUCCH repetitions, the slots/sub-slots for PUCCH repetitions, the symbols/slots for transmission of the PUCCH repetitions, etc.

The wireless device may receive a downlink control information comprising a first field and a second field. The first field may indicate a downlink assignment (e.g., radio resources) for receiving a downlink transport block. The second field may indicate a first timing for transmission of a first HARQ feedback associated with the transport block. For example, the first field may be a PDSCH-to-HARQ feedback timing and the wireless device may determine the first timing based on the value of the PDSCH-to-HARQ feedback timing field and based on the timing of reception of the first downlink transport block. The wireless device may receive the first transport block based on the radio resources indicated by the downlink control information. The wireless device may determine a plurality of timings for the plurality of HARQ feedbacks repetitions based on the first timing. In an example, the wireless device may determine the plurality of timings of the plurality of HARQ feedback repetitions based on the first timing and based on another field (e.g., PUCCH resource indicator) field of the downlink control information and/or based on the configuration parameters (e.g., parameters for sub-slot based PUCCH transmission). In an example, the wireless device may determine the plurality of timings of the plurality of HARQ feedback repetitions based on the first timing and based on the configuration parameters, wherein the configuration parameters indicate one or more offsets/durations between the first timing and one or more second timings of the plurality of HARQ feedback repetitions. For example, the configuration parameters may indicate whether the subs-slot based PUCCHs for transmissions of the HARQ feedback repetitions are contiguous or non-contiguous. The wireless device may transmit the plurality of HARQ feedback repetitions at the determined plurality of timings. In an example, the configuration parameters may indicate the timing/separation/duration between the first timing of the first HARQ feedback and one or more second timings, in the plurality of timings, of the plurality of HARQ feedback repetitions.

In an example embodiment, a wireless device may receive first configuration parameters, of a configured grant configuration, comprising an information element for a configured grant retransmission timer. The wireless device may transmit a transport block based on a first configured grant associated with the configured grant configuration. The wireless device may receive, in a first timing, an RRC reconfiguration message comprising second configuration parameters of the configured grant configuration and without an information element for a configured grant retransmission timer. The RRC reconfiguration message may not comprise an information element for a configured grant retransmission timer. The wireless device may transmit a retransmission of the transport block based on a second configured grant associated with the configured grant configuration based on a second timing of the second configured grant being within a time window from the first timing.

In an example, a duration of the time window may be based on a processing time for processing the RRC reconfiguration message. In an example, the time window may be larger than the processing time. In an example, the duration of the time window may be based on a capability of the wireless device for processing the RRC reconfiguration message. In an example, the wireless device may transmit to the base station, a capability message comprising a first parameter indicating the capability of the wireless device for processing the RRC reconfiguration message.

In an example, the wireless device may transmit first uplink control information, associated with the transport block, based on the first configured grant. The wireless device may transmit second uplink control information, associated with the retransmission of the transport block, based on the second configured grant.

In an example, the first uplink control information may comprise and one or more first HARQ parameters. The second uplink control information may comprise one or more second HARQ parameters.

In an example, the first configuration parameters may indicate a first configured grant configuration index. The second configuration parameters may indicate the first configured grant configuration index.

In an example, the wireless device may start the configured grant retransmission timer based on the transmitting the transport block. The transmitting the retransmission of the transport block based on a second configured grant may be further based on the configured grant retransmission timer being expired before the first timing.

In an example, the wireless device may start the configured grant retransmission timer based on the transmitting the transport block. The transmitting the retransmission of the transport block based on a second configured grant may be further based on the configured grant retransmission timer being expired before the second timing.

In an example, the wireless device may start the configured grant retransmission timer based on the transmitting the transport block. The wireless device may not start the configured grant retransmission timer based on the trans-mitting the retransmission of the transport block and based on the second timing being after the first timing and/or within the time window from the first timing and/or based on the second timing being after a first time duration (e.g., processing time for RRC reconfiguration message) from the first timing.

Ian example, the wireless device may start the configured grant retransmission timer based on the transmitting the transport block. The wireless device may start the configured grant retransmission timer based on the transmitting the retransmission of the transport block.

In an example, the wireless device may receive one or more configuration parameters indicating the time window and/or a duration of the time window.

In an example, the wireless device may determine the time window and/or a start time of the time window based on an offset parameter (e.g., an offset to SFN=0). In an example, the wireless device may receive configuration parameters indicating the offset parameter.

In an example embodiment, a wireless device may receive first configuration parameters, of a configured grant configuration, comprising an information element for a configured grant retransmission timer. The wireless device may transmit a transport block based on a configured grant associated with the configured grant configuration. The wireless device may start the configured grant retransmission timer based on transmitting the transport block. The wireless device may receive an RRC reconfiguration message comprising second configuration parameters of the configured grant configuration and without an information element for a configured grant retransmission timer. The RRC reconfiguration message may not comprise an information element for a configured grant retransmission timer. The wireless device may stop the configured grant retransmission timer based on: receiving the RRC reconfiguration message; and the second configuration parameters not comprising an information element for the configured grant retransmission timer.

In an example, the timing for stopping the configured grant retransmission timer may be based on a processing time of the RRC reconfiguration message.

In an example, the receiving the RRC reconfiguration message may be at a first timing. The processing time of the RRC reconfiguration message may be a first number of symbols. A timing for the stopping the configured grant retransmission timer may be the first number of slots after the first timing.

In an example, the timing for the stopping the configured grant retransmission timer may be further based on an offset parameter. In an example, the offset parameter may indicate an offset to system frame number (SFN)=0.

In an example, the first transport block may be associated with a HARQ process number. The configured grant retransmission timer may be associated with the HARQ process number.

In an example, the stopping the configured grant retransmission timer may be for all HARQ processes associated with a cell on which the configured grant configuration is configured.

In an example, the stopping the configured grant retransmission timer may be for one or more HARQ processes associated with the configured grant configuration. The stopping the configured grant retransmission timer may be for one or more HARQ processes configured for the configured grant configuration.

In an example, the stopping the configured grant retransmission timer may be for one or more pending HARQ processes associated with a cell on which the configured grant configuration is configured.

In an example, the stopping the configured grant retransmission timer may be for one or more first pending HARQ processes of the one or more HARQ processes associated with the configured grant configuration. In an example, the stopping the configured grant retransmission timer may be for one or more first pending HARQ processes of the one or more HARQ processes configured for the configured grant configuration.

In an example, the stopping the configured grant retransmission timer may be at a timing. The wireless device may receive a configuration parameter, wherein the timing may be based on the configuration parameter. In an example, the configuration parameter may indicate an offset (e.g., an offset to SFN=0).

In an example, the first configuration parameters may indicate a first configured grant configuration index. The second configuration parameters may indicate the first configured grant configuration index.

In an example embodiment, a wireless device may receive, first configuration parameters, of a configured grant configuration, without an information element for a configured grant retransmission timer. The first configuration parameters may not comprise an information element for a configured grant retransmission timer. The wireless device may receive an RRC reconfiguration message comprising second configuration parameters, of the configured grant configuration, comprising an information element for the configured grant retransmission timer. The wireless device may start the configured grant retransmission timer based on: the receiving the RRC reconfiguration message; and the second configuration parameters comprising the information element for the configured grant retransmission timer.

In an example, the wireless device may transmit a retransmission of a transport block based a configured grant associated with the configured grant configuration and based on the configured grant retransmission timer expiring, wherein: the configured grant retransmission timer may be associated with a HARQ process; and the transport block may be associated with the HARQ process.

In an example, the configured grant configuration may be for a cell. A plurality of HARQ processes may be associated with the cell. The starting the configured grant retransmission timer may be for the plurality of HARQ process. In an example, the configured grant configuration may be for a BWP. A plurality of HARQ processes may be associated with the BWP. The starting the configured grant retransmission timer may be for the plurality of HARQ process.

In an example, a plurality of HARQ processes may be associated with the configured grant configuration. The starting the configured grant retransmission timer may be for the plurality of HARQ process.

In an example, the configured grant configuration may be for a cell. A plurality of HARQ processes may be associated with the cell. The starting the configured grant retransmission timer may be for one or more first HARQ processes, of the plurality of HARQ process, that are pending (e.g., have non-empty HARQ buffers). In an example, the configured grant configuration may be for a BWP. A plurality of HARQ processes may be associated with the BWP. The starting the configured grant retransmission timer may be for one or more first HARQ processes, of the plurality of HARQ process, that are pending (e.g., have non-empty HARQ buffers).

In an example, a plurality of HARQ processes may be associated with the configured grant configuration. The starting the configured grant retransmission timer may be for one or more first HARQ processes, of the plurality of HARQ process, that are pending (have non-empty HARQ buffers).

In an example, the first configuration parameters may comprise a second information element for a configured grant timer. The starting the configured grant retransmission timer may be for one or more HARQ processes with the configured grant timer running.

In an example, the starting the configured grant retransmission timer may be in a first timing, wherein the first timing may be based on a processing time for the RRC reconfiguration message. In an example, the receiving the RRC reconfiguration message may be in a second timing; and the first timing may be in a slot that is on or after the processing time from the second timing. In an example, the first timing may be further based on an offset parameter. In an example, the offset parameter may indicate an offset to SFN=0. In an example, the wireless device may receive configuration parameters indicating the offset parameter.

In an example embodiment, a wireless device may receive configuration parameters of: a semi-persistent scheduling (SPS) configuration; a hybrid automatic repeat request (HARQ) round trip time (RRT) timer; and a discontinuous reception (DRX) retransmission timer. The wireless device may receive a first DCI indicating activation of the SPS configuration, the first DCI indicating a first timing for a HARQ feedback for a transport block associated with the SPS configuration. The wireless device may start the HARQ RTT timer in a first/earliest/adjacent symbol after the second timing instead of the first timing based on the first timing colliding/coinciding with a downlink symbol or a flexible symbol. The wireless device may start the DRX retransmission timer based on the HARQ RTT timer expiring. The wireless device may receive a second DCI while the DRX retransmission timer is running. The wireless may receive (a retransmission of) the transport block based on the second DCI.

In an example, the second timing may be a first/earliest available PUCCH resource after the first timing.

In an example, the wireless device may receive an indication from a base station indicating the second timing. In an example, the indication may be based on a third DCI.

In an example, the wireless device may construct/generate a HARQ feedback codebook comprising one or more HARQ feedbacks, comprising the HARQ feedback for the transport block. The wireless device may transmit the HARQ feedback codebook at the second timing.

In an example embodiment, a wireless device may receive a DCI indicating activation of a SPS configuration, the DCI indicating: a first timing for a first HARQ feedback of a first transport block associated with the SPS configuration, wherein the first timing coincides/collides with a downlink symbol or a flexible symbol; and a second timing for a second HARQ feedback of a second transport block associated with the SPS configuration, wherein the second timing does not coincide/collides with a downlink symbol or a flexible symbol. The wireless device may start a HARQ RTT timer in a first/earlier/adjacent symbol after a third timing, instead of the first timing, based on the first timing colliding/coinciding with a downlink symbol or a flexible symbol. The wireless device may start a HARQ RTT timer in a first/earlier/adjacent symbol after the second timing wherein the second timing does not collide/coincide with a downlink symbol or a flexible symbol.

In an example, the third timing may be a first/earliest available PUCCH resource after the first timing.

In an example, the wireless device may receive an indication from a base station indicating the third timing. In an example, the indication may be based on a DCI.

In an example embodiment, a wireless device may receive configuration parameters of: a semi-persistent scheduling (SPS) configuration; and a discontinuous reception (DRX) retransmission timer. The wireless device may receive a first transport block associated with the SPS configuration in a first timing. The wireless device may receive a second transport block associated with the SPS configuration in a second timing. The wireless device may determine a third timing for a first HARQ feedback of the first transport block based on the first timing and an activation DCI, wherein the third timing coincides/collides with a downlink symbol or a flexible symbol. The wireless device may determine a fourth timing for a second HARQ feedback of the second transport block based on the second timing and the activation DCI, wherein the fourth timing does not coincide/collide with a downlink symbol or a flexible symbol. The wireless device may start a DRX retransmission timer in a first/earlier/adjacent symbol after the first timing of the first transport block, based on the third timing of the first HARQ feedback colliding/coinciding with a downlink symbol or a flexible symbol. The wireless device may not start a DRX retransmission timer in a first/earlier/adjacent symbol after the second timing of the second transport block, based on the fourth timing of the second HARQ feedback not colliding/coinciding with a downlink symbol or a flexible symbol.

In an example embodiment, a wireless device may receive configuration parameters of a HARQ RTT timer and a DRX retransmission timer. The wireless device may receive a downlink transport block, wherein a first HARQ feedback for the transport block is scheduled at a first timing. The wireless device may skip the first HARQ feedback of the transport block based on one or more HARQ feedbacks, comprising the first HARQ feedback, scheduled for transmission at the first timing being negative acknowledgements. The wireless device may start the HARQ RTT timer in a first/earliest/adjacent symbol after the first timing of the scheduled and skipped first HARQ feedback. The wireless device may start the DRX retransmission timer based on the HARQ RTT timer expiring and based on the scheduled and skipped first HARQ feedback being a negative acknowledgement. The wireless device may receive scheduling information for retransmission of the transport block while the DRX retransmission timer is running. The wireless device may receive the transport block based on the scheduling information.

In an example, the transport block may be received based on a dynamic grant. In an example, the wireless device may receive a downlink control information indicating: a resource assignment for the transport block; and the first timing for transmission of the first HARQ feedback for the transport block. In an example, the downlink control information may comprise a PDSCH-TO-HARQ feedback timing field indicating the first timing.

In an example, the transport block may be received based on a semi-persistent scheduling (SPS) grant. In an example, the wireless device may receive SPS configuration parameters. The wireless device may determine radio resources for reception of the transport block based on the SPS configuration parameters. In an example, the wireless device may receive a downlink control information indicating an activation of the SPS configuration, wherein the downlink control information may comprise a field, a value of the field indicating the first timing of the first HARQ feedback. In an example, the field may be a PDSCH-TO-HARQ feedback timing field.

In an example, the one or more HARQ feedbacks may be associated with one or more SPS transport blocks received based on one or more SPS grants.

In an example, the wireless device may skip the one or more HARQ feedbacks, comprising the first HARQ feedback, scheduled for transmission at the first timing based on the one or more HARQ feedbacks being negative acknowledgements and based on the one or more HARQ feedbacks being associated with one or more SPS configurations, for example, some of the one or more HARQ feedbacks may be negative acknowledgements for skipped PDSCH transmissions. In an example, the one or more SPS grants may be associated with one or more SPS configurations. In an example, the one or more SPS grants may be associated with the same SPS configuration. In an example, the one or more SPS grants may be associated with the same or different SPS configurations.

In an example, at least one of the one or more HARQ feedbacks may be associated with a transport block that is received based on a dynamic grant.

In an example, at least one of the one or more HARQ feedbacks may be a negative acknowledgement in response to skipping a SPS PDSCH.

In an example, the downlink transport block may be associated with a first HARQ process. The HARQ RTT timer may be associated with the first HARQ process.

In an example, the skipping the first HARQ feedback may be based on a skipping transmission of a physical channel carrying the first HARQ feedback. For example, the physical channel may be a PUCCH. For example, the physical channel may be a PUSCH.

In an example embodiment, a wireless device may determine to skip transmission of one or more HARQ feedbacks scheduled for transmission in a first timing based on the one or more HARQ feedbacks being negative acknowledgements. The wireless device may transmit an indication that the wireless device skips transmission of the one or more HARQ feedbacks in the first timing.

In an example, the indication may be an uplink control information.

In an example, the indication may be a MAC CE.

In an example, the determining to skip the transmission of the one or more HARQ feedbacks may further be based on the one or more HARQ feedbacks being negative acknowledgements associated with one or more SPS configurations.

In an example, the determining to skip the transmission of the one or more HARQ feedbacks may further be based on the one or more HARQ feedbacks being negative acknowledgements in response to skipped downlink transmissions associated with one or more SPS configurations.

In an example, the indication may indicate that the wireless device skips transmission of the one or more HARQ feedbacks via a physical channel. In an example, the physical channel may be a physical uplink control channel. In an example, the physical channel may be a physical uplink shared channel. In an example, the wireless device may receive scheduling information for transmission of a transport block via the physical uplink shared channel using radio resources in the first timing; and the wireless device may transmit the indication via the physical uplink shared channel and using the radio resources.

In an example embodiment, a wireless device may receive, configuration parameters of a DRX retransmission timer and a HARQ RTT timer. The wireless device may transmit repetitions of a HARQ feedback of a transport block via a plurality of uplink control channels. The wireless device may start a HARQ RTT timer on a first/earliest symbol after transmission of the HARQ feedback via the last/latest uplink control channel of the plurality of uplink control channels. The wireless device may start the DRX retransmission timer based on the HARQ timer expiring. The wireless device may receive a DCI indicating scheduling information for retransmission of the transport block. The wireless device may receive the transport block based on the scheduling information.

In an example, the plurality of uplink control channels may be in the same slot.

In an example, a first uplink control channel, of the plurality of uplink control channels, may be in a first slot. A second uplink control channel, of the plurality of uplink control channels may be in a second slot.

In an example, the first uplink control channel may be transmitted via one or more latest symbols of the first slot; and the second uplink control channel may be transmitted via one or more earliest symbols of the second slot.

In an example embodiment, a wireless device may receive configuration parameters for determining uplink control resources for transmission of a plurality of HARQ feedback repetitions. The wireless device may receive a downlink control information comprising: a first field indicating a downlink assignment for reception of a first downlink transport block; and a second field indicating a first timing of a first HARQ feedback, of the plurality of HARQ feedback repetitions associated with the first downlink transport block. The wireless device may receive the first downlink transport block based on the downlink assignment. The wireless device may determine a plurality of timings for the plurality of HARQ feedback repetitions, associated with the first downlink transport block, based on the first timing indicated by the downlink control information and/or based on the configuration parameters. The wireless device may transmit the plurality of HARQ feedbacks associated with the first downlink transport block.

In an example, the configuration parameters may indicate one or more offsets/durations between the first timing and one or more second timings of the plurality of HARQ feedback timings.

A wireless device may be configured with a semi-persistent scheduling (SPS) configuration. The wireless may receive an activation DCI indication activation of the SPS configuration and a plurality of SPS resources may be activated in response to the activation of the SPS configuration. The wireless device may receive downlink SPS TB s based on the SPS resources. A timing of a HARQ feedback associated with a downlink SPS TB may be determined based on a timing of reception of the downlink SPS TB and the SPS activation DCI. In some examples, the timing of HARQ feedback may not be valid for transmission of the HARQ feedback. The wireless device may defer transmission of HARQ feedback to a later timing.

Based on existing processes, the network may explicitly indicate to postpone a HARQ feedback in a DCI that schedules a downlink TB. In case a downlink TB is received via SPS resource, the wireless device may autonomously determine to defer a HARQ feedback. Existing discontinuous reception (DRX) processes may lead to inefficient wireless device and wireless network performance when the wireless device autonomously determines to defer a HARQ feedback (e.g., without an explicit indication by network, in a scheduling DCI, to postpone the HARQ feedback) based on a scheduled timing of the HARQ feedback, of a received downlink SPS TB, not being valid. There is a need to enhance the existing DRX processes when the wireless device autonomously determines to defer a HARQ feedback based on a scheduled timing of the HARQ feedback not being valid. Example embodiments enhance the existing DRX processes when the wireless device autonomously determines to defer a HARQ feedback based on a scheduled timing of the HARQ feedback not being valid.

In example embodiments, a wireless device may receive one or more messages (e.g., one or more RRC messages) comprising configuration parameters. The configuration parameters may comprise SPS configuration parameters of one or more SPS configurations. SPS configuration parameters of a SPS configuration may be used by the wireless device to determine SPS resources associated with the SPS configuration. For example, the SPS configuration parameters may comprise a parameter indicating a periodicity indicating a separation between SPS resources associated with a SPS configuration. The one or more messages may further comprise DRX configuration parameters. The DRX configuration parameters may be configured for a cell group. For examples, the wireless device may receive a MAC-CellGroupConfig IE comprising the DRX configuration parameters for the cell group. The DRX configuration parameters may comprise configuration parameters of one or more DRX timers. The one or more DRX timers may comprise a DRX retransmission timer. In an example, the one or more DRX trimers may comprise a HARQ RTT timer.

In example embodiments, the wireless device may receive a SPS activation DCI indicating activation of the SPS configuration. In response to receiving the SPS activation DCI, the wireless device may determine a plurality of SPS resources based on the SPS configuration parameters (e.g., the periodicity) and the SPS activation DCI (e.g., based on one or more resource assignment fields of the SPS activation DCI). The SPS resources may comprise a first SPS resource in a first timing (e.g., in a first slot or one or more first symbols in the first slot). The wireless device may receive a first TB, associated with the SPS configuration, via the first SPS resource and in the first timing. The wireless device may determine a second timing (e.g., a second slot, a second sub-slot or one or more second symbols in the second slot/subslot) of a first HARQ feedback associated with the first TB. The wireless device may determine the second timing of the first HARQ feedback based on the first timing of the first TB and a value of a PDSCH-to-HARQ feedback timing field of the SPS activation DCI.

In example embodiments, the determined second timing of the first HARQ feedback may not be usable/valid for transmission of the first HARQ feedback. For example, the second timing may comprise one or more downlink symbols or flexible symbols and may not be used for an uplink transmission. For example, the second timing may have overlap with a downlink signal/channel (e.g., an SSB) and may not be valid for transmission of the first HARQ feedback. In response to the determination that the second timing is not valid for transmission of the first HARQ feedback, the wireless device may defer transmission of the first HARQ feedback from the second timing to a later timing. In an example, the later timing (e.g., the later slot/sub-slot or one or more symbols in the later slot/sub-slot) may include valid uplink control channel resource for HARQ feedback transmission.

Figure 36:
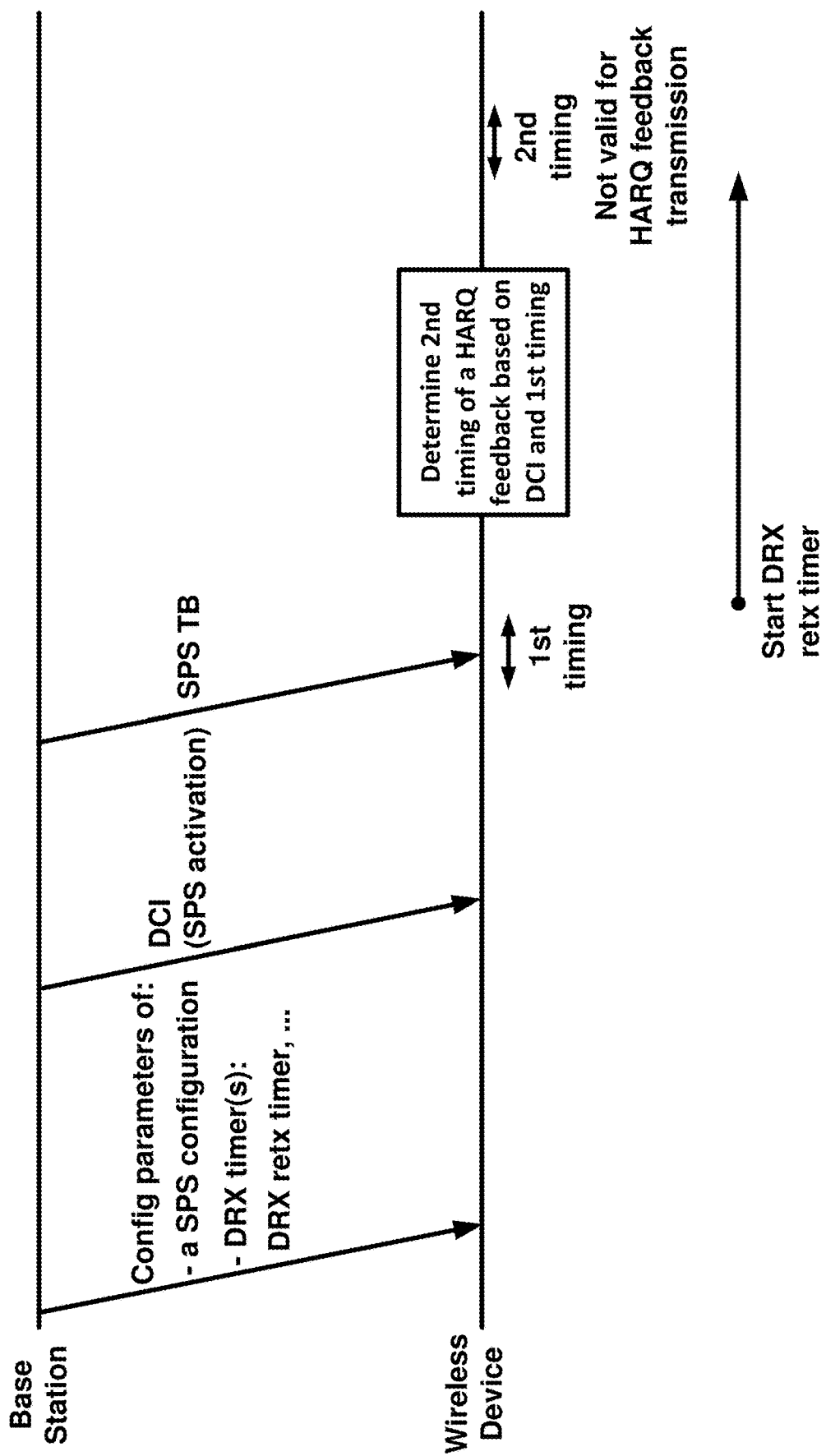
FIG. 36 shows an example process in accordance with several of various embodiments of the present disclosure.

In an example embodiment as shown in FIG. 36, in response to reception of the first TB and based on the second timing of the first HARQ feedback not being valid for transmission of the first HARQ feedback, the wireless device may start a DRX retransmission time (with a timer value indicated by the corresponding configuration parameter). The starting of the DRX retransmission timer may be based on autonomous determination by the wireless device to defer the HARQ feedback (e.g., not based on an explicit indication by the network to postpone the HARQ feedback), wherein the autonomous determination to defer the HARQ feedback may be based on a scheduled timing of the HARQ feedback not being valid for transmission of the HARQ feedback. The wireless device may start the DRX retransmission timer in a first symbol after the first timing of reception of the first TB.

While the DRX retransmission timer is running, the wireless device may be in a DRX Active time and the wireless may monitor a downlink control channel (e.g., PDCCH). The wireless device may receive a DCI comprising a downlink assignment for a TB (e.g., a downlink assignment for retransmission of the first TB). The wireless device may receive the TB (e.g., the retransmission of the first TB) based on the downlink assignment.

In an example, the wireless device may receive a second TB associated with the SPS configuration via a second SPS resource. The second SPS resource may be in a third timing (e.g., a third slot or one or more third symbols in the third slot). The wireless device may determine a fourth timing (e.g., a fourth slot/sub-slot or one or more fourth symbols in the fourth slot/sub-slot) for a second HARQ feedback associated with the second TB. The wireless device may determine the fourth timing based on the third timing of reception of the second TB and based on the SPS activation DCI, e.g., based on a value of the PDSCH-to-HARQ feedback timing field of the SPS activation DCI.

The determined fourth timing of the second HARQ feedback may be usable/valid for transmission of the second HARQ feedback. For example, the second timing may not comprise a downlink symbol or a flexible symbol and/or may be usable for an uplink transmission and/or the uplink symbol(s) of the fourth timing may be sufficient to transmit the payload of the uplink control information comprising the second HARQ feedback. For example, the fourth timing may not have overlap with a downlink signal/channel (e.g., an SSB) and may be valid for transmission of the second HARQ feedback. In response to the determination that the fourth timing is valid for transmission of the second HARQ feedback, the wireless device may transmit the second HARQ feedback via a slot/sub-slot in the fourth timing. In response to transmission of the wireless device may start a HARQ RTT timer (with a value indicated by the corresponding configuration parameter) in a first symbol after the fourth timing. The wireless device may start a DRX retransmission time (with a value indicated by the corresponding configuration parameter) in response to expiry of the HARQ RTT timer.

Figure 37:
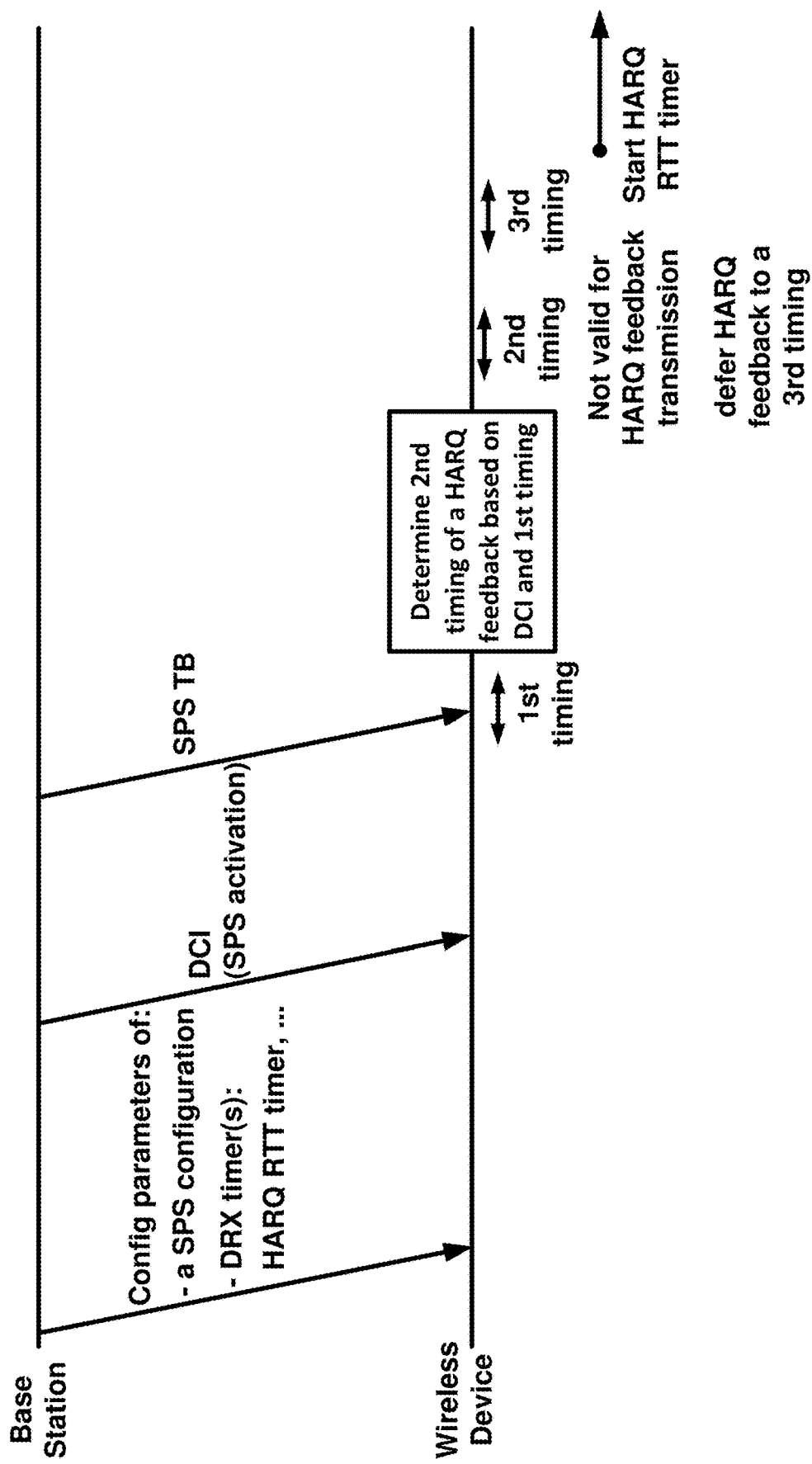
FIG. 37 shows an example process in accordance with several of various embodiments of the present disclosure.

In an example embodiment as shown in FIG. 37, in response to determining to defer the first HARQ feedback from the first timing (e.g., the first slot/sub-slot or one or more first symbols of the first slot/sublot) to a third timing (e.g., a third slot/sub-slot or one or more third symbols of the third slot/sub-slot), the wireless device may start a HARQ RTT timer (with a value indicated by the corresponding configuration parameter) in a first symbol after the third timing. The wireless device may start the HARQ RTT timer in a first symbol after the third timing, instead of a first symbol after the second timing, in response to the determination to defer the first HARQ feedback from the second timing to the third timing. The starting of the HARQ RTT timer, in the first symbols after the third timing, may be based on autonomous determination by the wireless device to defer the HARQ feedback (e.g., not based on an explicit indication by the network to postpone the HARQ feedback), wherein the autonomous determination to defer the HARQ feedback may be based on a scheduled timing of the HARQ feedback not being valid for transmission of the HARQ feedback.

In an example, in response to expiry of the HARQ RTT timer, the wireless device may start a DRX retransmission timer with a value indicated by the corresponding configuration parameter. The wireless device may be in a DRX Active time when the DRX retransmission timer is running. The wireless device may monitor a downlink control channel (e.g., PDCCH) while the wireless device is in a DRX Active time. The wireless device may monitor a downlink control channel (e.g., PDCCH) while the DRX retransmission timer is running.

In an example, the wireless device may receive a second downlink TB associated with the SPS configuration. The wireless device may receive the second downlink TB via a second SPS resource associated with the SPS configuration. The second SPS resource may be in a fourth timing (e.g., a fourth slot or one or more fourth symbols in the fourth slot). The wireless device may determine a fifth timing of a second HARQ feedback associate with the second downlink TB. The wireless device may determine the fifth timing based on the fourth timing of the second downlink TB and based on a value of the PDSCH to HARQ feedback timing field of the SPS activation DCI.

The determined fifth timing of the second HARQ feedback may be usable/valid for transmission of the second HARQ feedback. For example, the second timing may not comprise a downlink symbol or a flexible symbol and/or may be usable for an uplink transmission and/or the uplink symbol(s) of the fourth timing may be sufficient to transmit the payload of the uplink control information comprising the second HARQ feedback. For example, the fifth timing may not have overlap with a downlink signal/channel (e.g., an SSB) and may be valid for transmission of the second HARQ feedback. In response to the determination that the fifth timing is valid for transmission of the second HARQ feedback, the wireless device may start the HARQ RTT timer in a first symbol after the fifth timing A wireless device may determine a timing for a first HARQ feedback for a received downlink TB. The wireless device may determine to skip the first HARQ feedback at the scheduled timing. The determination to skip the first HARQ feedback may be based on one or more criteria, for examples, based on all of the HARQ feedbacks that are scheduled for transmission at the scheduled timing being NACK or ACK. Existing discontinuous reception (DRX) processes may lead to inefficient wireless device and wireless network performance when the wireless device skips a HARQ feedback in a scheduled timing of the HARQ feedback. There is a need to enhance the existing DRX processes when the wireless device skips a HARQ feedback in a scheduled timing of the HARQ feedback. Example embodiments enhance the existing DRX processes when the wireless device skips a HARQ feedback in a scheduled timing of the HARQ feedback.

Figure 38:
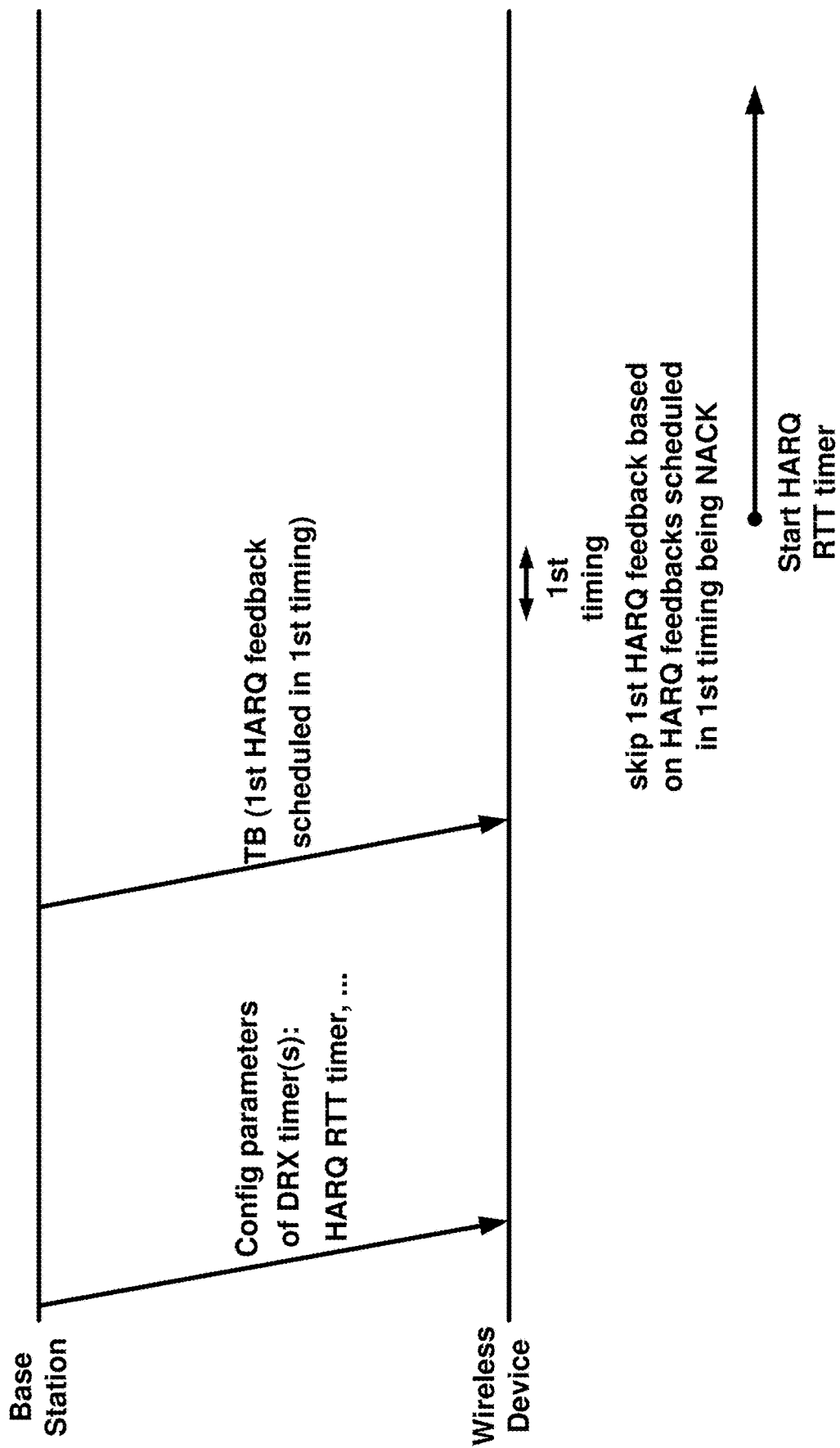
FIG. 38 shows an example process in accordance with several of various embodiments of the present disclosure.

In an example embodiment as shown in FIG. 38, a wireless device may receive one or more messages (e.g., one or more RRC messages) comprising configuration parameters. The configuration parameters may comprise DRX configuration parameters. The DRX configuration parameters may be configured for a cell group. For examples, the wireless device may receive a MAC-CellGroupConfig IE comprising the DRX configuration parameters for the cell group. The DRX configuration parameters may comprise configuration parameters of one or more DRX timers. The one or more DRX timers may comprise a HARQ RTT timer. In an example, the one or more DRX trimers may comprise a DRX retransmission timer.

The wireless device may receive a downlink TB in a first timing. In an example, the downlink TB may be based on a dynamic downlink assignment/grant. The wireless device may receive a DCI comprising the downlink assignment. In an example, the downlink TB may be associated with a SPS configuration. The wireless device may receive a SPS activation DCI indicating activation of the SPS configuration, wherein activation of the SPS configuration indicates activation of a plurality of SPS grants comprising a first SPS grant used for reception of the downlink TB. The wireless device may receive configuration parameters (e.g., periodicity, etc.) of the SPS configuration, wherein the determination of the plurality of the SPS grants may be based on the SPS configuration parameters. A first HARQ feedback of the downlink TB may be scheduled in a first timing. For example, the DCI comprising the downlink assignment (e.g., in case of a dynamic grant) or a SPS activation DCI may comprise a PDSCH-to-HARQ feedback timing field. The wireless device may determine the first timing of the first HARQ feedback based on a timing of reception of the downlink TB and a value of the PDSCH-to-HARQ feedback timing field of the DCI.

The wireless device may skip the first HARQ feedback based on one or more criteria. For example, the wireless device may skip the first HARQ feedback based on one or more HARQ feedbacks, comprising the first HARQ feedback, that are scheduled for transmission in the first timing being negative acknowledgements (NACKs). For example, the wireless device may skip the first HARQ feedback based on one or more HARQ feedbacks, comprising the first HARQ feedback, that are scheduled for transmission in the first timing being positive acknowledgements (ACKs). For example, the wireless device may skip transmission of a HARQ feedback codebook comprising the one or more HARQ feedbacks scheduled for transmission in the first timing. For example, the wireless device may skip transmission of a physical channel (e.g., PUCCH or PUSCH) for carrying the first HARQ feedback (e.g., the one or more HARQ feedbacks comprising the first HARQ feedback or a HARQ feedback codebook comprising the first HARQ feedback). The wireless device may start the HARQ RTT timer in a first symbol after the skipped first HARQ feedback. The wireless device may start the HARQ RTT timer in a first symbol after the skipped first HARQ feedback based on an autonomous determination (e.g., without indication by the network) to skip the first HARQ feedback based on the one or more criteria. In an example, the downlink TB may be associated with a first HARQ process number (e.g., the first HARQ process number of the active BWP) and the HARQ RTT timer may be associated with the first HARQ process number.

In an example, the wireless device may start the DRX retransmission timer in response to expiry of the HARQ RTT timer. The wireless device may be in a DRX Active time while the DRX retransmission timer is running and may monitor a downlink control channel (e.g., PDCCH) while in the DRX Active time. The wireless device may receive a DCI comprising a downlink assignment for retransmission of the downlink TB.

The one or more HARQ feedbacks may be associated with one or more downlink TBs. In an example, the one or more downlink TBs may be one or more downlink SPS TBs associated with one or more SPS configurations. In an example, at least one of the one or more downlink TBs may be received based on a dynamic downlink assignment/grant. In an example, a HARQ feedback associated with at least one of the one or more downlink TBs may be NACK based on skipping a corresponding downlink transmission (e.g., skipping a corresponding PDSCH transmission). For example, at least one of the one or more HARQ feedbacks may be NACK based on skipping a corresponding downlink SPS transmission.

A wireless device may be configured and/or may be dynamically indicated to repeat HARQ feedback associated with a downlink TB for a plurality of times (e.g., a plurality of sub-slots and using one or more short PUCCH formats). For example, a DCI scheduling the downlink TB or indicating activation of a SPS configuration, associated with the downlink TB, may indicate repetition of the HARQ feedback for the plurality of times (e.g., the plurality of sub-slots). Existing discontinuous reception (DRX) processes may lead to inefficient wireless device and wireless network performance when the wireless is configured with and/or is dynamically indicated to repeat the HARQ feedback. There is a need to enhance the existing DRX processes when the wireless device is configured with and/or is dynamically indicated to repeat the HARQ feedback. Example embodiments enhance the existing DRX processes when the wireless device is configured with and/or is dynamically indicated to repeat the HARQ feedback.

Figure 39:
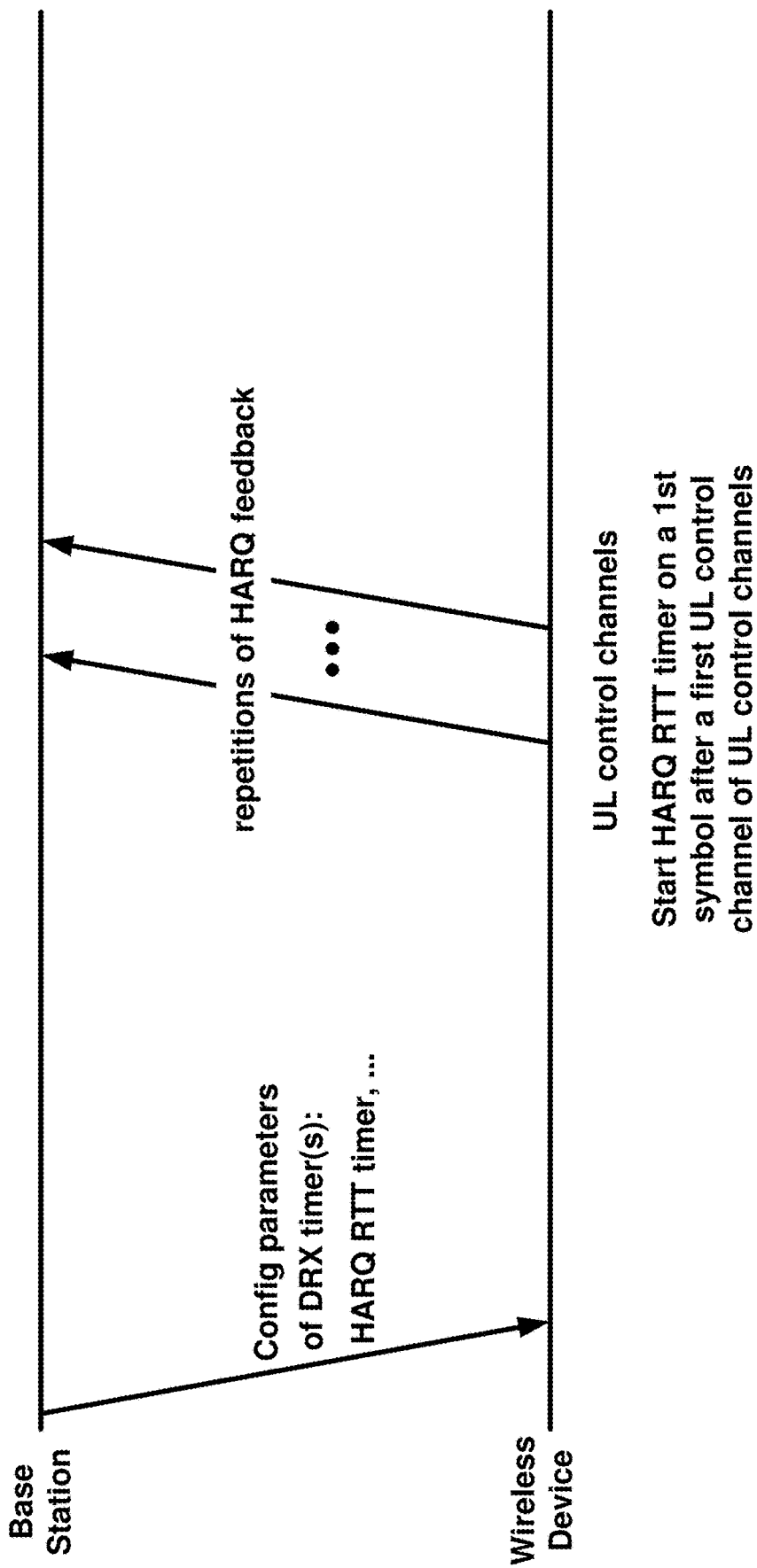
FIG. 39 shows an example process in accordance with several of various embodiments of the present disclosure.

In an example embodiment as shown in FIG. 39, a wireless device may receive one or more messages (e.g., one or more RRC messages) comprising configuration parameters. The configuration parameters may comprise DRX configuration parameters. The DRX configuration parameters may be configured for a cell group. For examples, the wireless device may receive a MAC-CellGroupConfig IE comprising the DRX configuration parameters for the cell group. The DRX configuration parameters may comprise configuration parameters of one or more DRX timers. The one or more DRX timers may comprise a HARQ RTT timer. In an example, the one or more DRX trimers may comprise a DRX retransmission timer.

The wireless device may receive a downlink TB. For example, the wireless device may receive the downlink TB based on radio resources indicated by a dynamic grant. For example, the wireless device may receive the downlink TB based on radio resource of a SPS grant associated with a SPS configuration. The wireless device may transmit repetitions of HARQ feedback associated with the downlink TB. The wireless device may determine the timings of the plurality of uplink control channels. In an example, the wireless device may determine the timings of the plurality of HARQ feedbacks based on a DCI scheduling the downlink TB or, in case the downlink TB is associated with a SPS configuration, based on an activation DCI indicating activation of the SPS configuration. For example, the DCI or the SPS activation DCI may comprise a field (e.g., a resource indicator field) indicating the number of repetitions and/or radio resources for transmission of the plurality of uplink control channels/HARQ feedback repetitions.

The wireless device may transmit the repetitions of the HARQ feedback via a plurality of uplink control channels. In an example, the plurality of uplink control channels may be in the same slot. In an example, the plurality of uplink control channels may be in a plurality of slots or in a plurality sublots.

In an example, at least some of the plurality of uplink control channels may have a short uplink control channel format.

The wireless device may start the HARQ RTT timer (with a value indicated by a corresponding configuration parameter) in a first symbol (e.g., earliest symbol) after a first timing of a first uplink control channel in the plurality of uplink control channels.

In an example embodiment, the first uplink control channel, in the plurality of uplink control channel may be the earliest uplink control channel in the plurality of uplink control channels.

In an example embodiment, the first uplink control channel, in the plurality of uplink control channel may be the latest uplink control channel in the plurality of uplink control channels.

In an example, in response to expiry of the HARQ RTT timer, the wireless device may start a DRX retransmission timer. While the DRX retransmission timer is running, the wireless device may be in a DRX Active time. The wireless device may monitor a downlink control channel (e.g., PDCCH) while the DRX retransmission timer is running. In response to monitoring the downlink control channel, the wireless device may receive a DCI indicating a downlink assignment for retransmission of the downlink TB.

A wireless device may be configured to perform sub-slot-based uplink control information (UCI) (e.g., HARQ feedback) transmission, for example using a short uplink control channel format. For example, the sub-slot-based UCI/HARQ feedback transmission may be to reduce latency. To enhance the reliability of UCI/HARQ feedback transmission when sub-slot based UCI/HARQ feedback transmission is performed, the wireless device may transmit repetitions of UCI/HARQ feedback, for example via a plurality of uplink control channels. The repetitions of the HARQ feedback, associated with a downlink TB, may be dynamically indicated to the wireless device, for example via a DCI that scheduled a downlink TB or via a SPS activation DCI that activates a SPS configuration that may be associated with the downlink TB. Existing processes for determination of timings for the UCI/HARQ feedback, when the wireless device is indicated to repeat HARQ feedback, may lead to inefficient wireless device and wireless network performance. There is a need to enhance existing processes for determination of timings for the UCI/HARQ feedback when the wireless device is indicated to repeat HARQ feedback. Example embodiments may enhance existing processes for determination of timings for the UCI/HARQ feedback.

Figure 40:
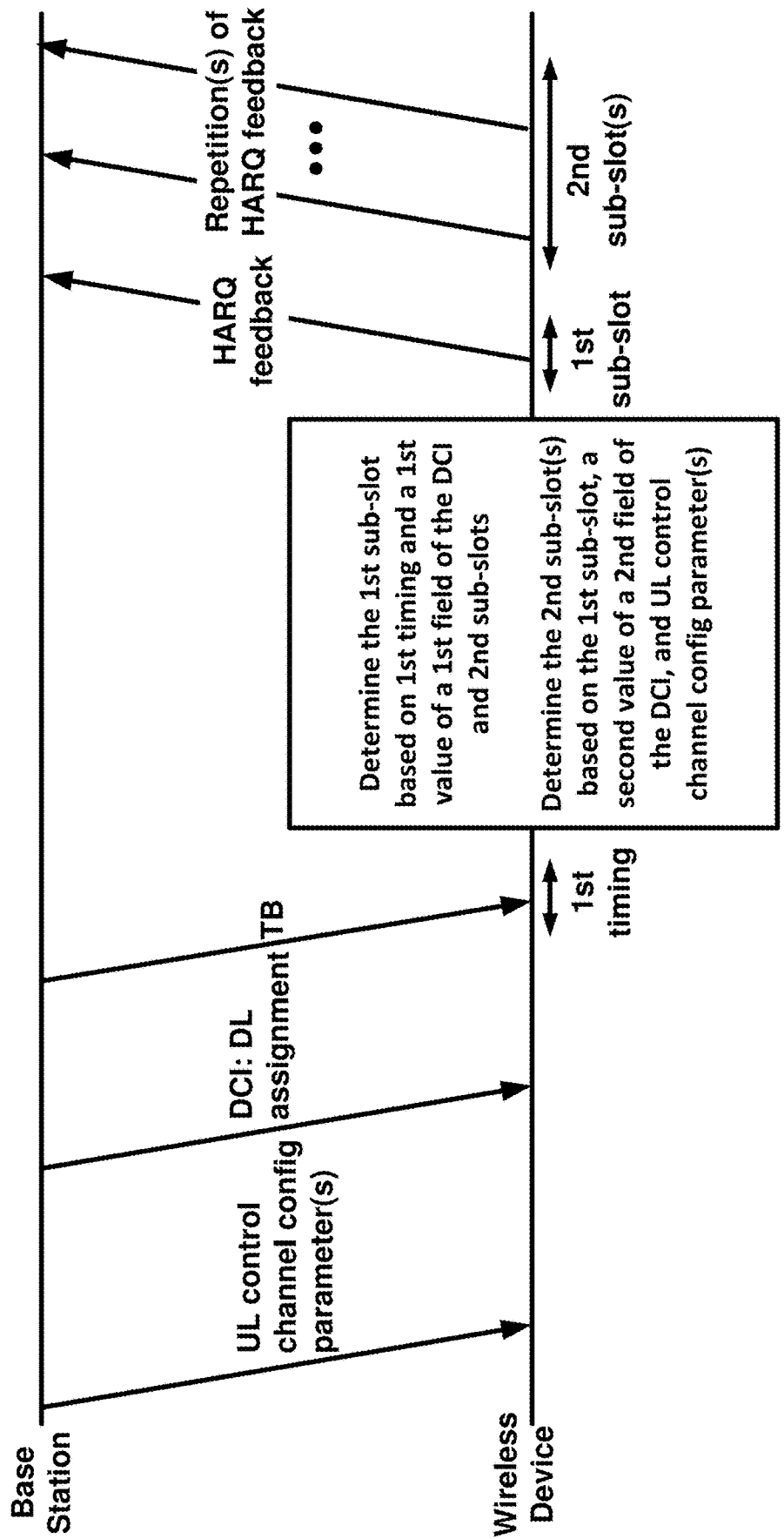
FIG. 40 shows an example process in accordance with several of various embodiments of the present disclosure.

In an example embodiment as shown in FIG. 40, a wireless device may receive one or more messages (e.g., one or more RRC messages) comprising configuration parameters. The configuration parameters may comprise one or more uplink control channel configuration parameters. The wireless device may receive DCI indicating a downlink assignment for a downlink TB. For example, the DCI may indicate a dynamic downlink assignment/grant for receiving the downlink TB. For example, the downlink TB may be associated with a SPS configuration, and the DCI may indicate activation of the SPS configuration. The downlink assignment or the SPS resource for receiving the downlink TB may be in a first timing. The wireless device may receive the downlink TB in the first timing. The DCI (e.g., the DCI indicating the dynamic grant or the SPS activation DCI) may comprise a PDSCH-to-HARQ feedback timing field. The wireless device may determine a first sub-slot or one or more first symbols of the first sub-slot, for transmission of a HARQ feedback associated with the downlink TB, based on the value of the PDSCH-to-HARQ feedback timing field of the DCI. The wireless device may determine one or more second sub-slots, or one or more second symbols of the one or more second sub-slots, for transmission of one or more repetitions of the HARQ feedback. The wireless device may determine the one or more second sub-slots based on the first sub-sot, a value of resource indicator field of the DCI (e.g., the DCI indicating the dynamic grant or the SPS activation DCI in case the downlink TB is associated with a SPS configuration) and the one or more uplink control channel configuration parameters. For example, the one or more uplink control channel configuration parameters indicate a number of repetitions of the HARQ feedback. For example, the one or more uplink control channel configuration parameters may indicate whether the sub-slots used for transmission of the HARQ feedback and/or repetitions of the HARQ feedback are contiguous or non-contiguous. In an example, the one or more uplink control channel configuration parameters may indicate one or more offsets (e.g., one or more offsets to the first sub-slot) to be used in determination of the one or more second sub-slots. The wireless device may transmit the HARQ feedback in the first sub-slot (e.g., in the one or more first symbols of the first sub-slot) and may transmit the one or more repetitions of the HARQ feedback in the one or more second sub-slots (e.g., one or more send symbols of the one or more second sub-slots). In an example, transmitting the HARQ feedback and the one or more repetition of the HARQ feedback may be based on based on uplink control channels with short format.

In accordance with various exemplary embodiments in the present disclosure, a device (e.g., a wireless device, a base station and/or alike) may include one or more processors and may include memory that may store instructions. The instructions, when executed by the one or more processors, cause the device to perform actions as illustrated in the accompanying drawings and described in the specification. The order of events or actions, as shown in a flow chart of this disclosure, may occur and/or may be performed in any logically coherent order. In some examples, at least two of the events or actions shown may occur or may be performed at least in part simultaneously and/or in parallel. In some examples, one or more additional events or actions may occur or may be performed prior to, after, or in between the events or actions shown in the flow charts of the present disclosure.

Figure 41:
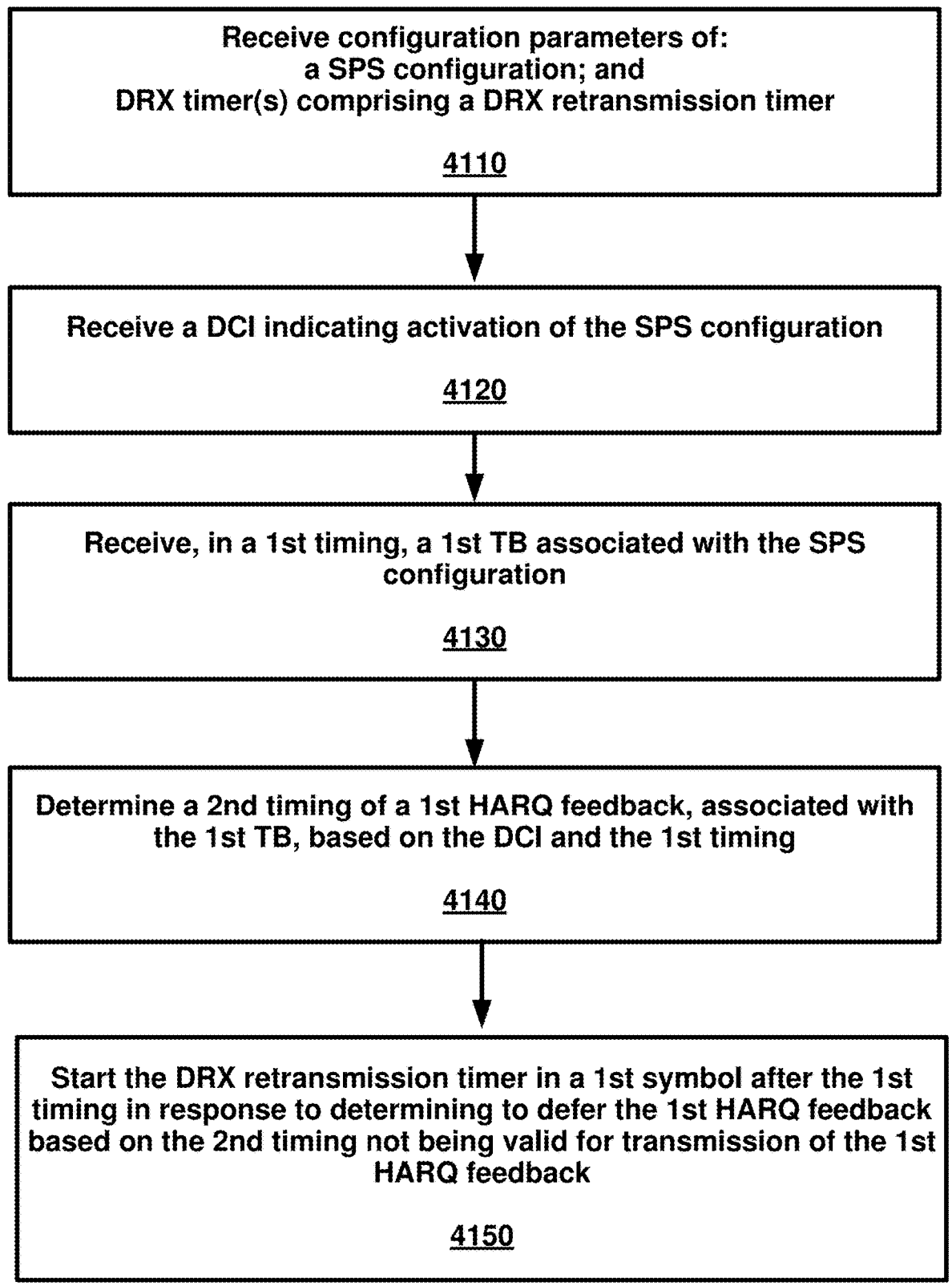
FIG. 41 shows an example flow diagram in accordance with several of various embodiments of the present disclosure.

FIG. 41 shows an example flow diagram in accordance with several of various embodiments of the present disclosure. At 4110, a wireless device may receive configuration parameters of: a semi-persistent scheduling (SPS) configuration; and one or more discontinuous reception (DRX) timers comprising a DRX retransmission timer. At 4120, the wireless device may receive a downlink control information (DCI) indicating activation of the SPS configuration. At 4130, the wireless device may receive, in a first timing, a first transport block (TB) associated with the SPS configuration. At 4140, the wireless device may determine a second timing of a first hybrid automatic repeat request (HARQ) feedback, associated with the first TB, based on the DCI and the first timing. At 4150, the wireless device may start the DRX retransmission timer in a first symbol after the first timing in response to determining to defer the first HARQ feedback based on the second timing not being valid for transmission of the first HARQ feedback.

In an example embodiment, the second timing may not be valid for transmission of the first HARQ feedback based on the second timing comprising one or more symbols that are not usable for uplink transmission. In an example embodiment, the second timing may not be valid for transmission of the first HARQ feedback based on the second timing colliding with a downlink symbol or a flexible symbol.

In an example embodiment, the wireless device may defer the first HARQ feedback until a valid uplink control channel resource.

In an example embodiment, the wireless device may receive, in a third timing, a second TB associated with the SPS configuration. The wireless device may determine a fourth timing of a second HARQ feedback, associated with the second TB, based on the DCI and the third timing. The wireless device may start the DRX retransmission timer in response to expiry of a HARQ round trip time (RTT) timer based on the fourth timing being valid for transmission of the second HARQ feedback. In an example embodiment, the fourth timing may be valid for transmission of the second HARQ feedback based on the fourth timing not colliding with a downlink symbol or a flexible symbol. In an example embodiment, the one or more DRX timers, at 4110, may comprise the HARQ RTT timer.

In an example embodiment, the wireless device may monitor a control channel based on the DRX retransmission timer, started at 4110, running.

In an example embodiment, the determining the second timing may be based on a value of a downlink shared channel to HARQ feedback timing field of the DCI received at 4120.

In an example embodiment, the configuration parameters, received at 4110, may comprise first configuration parameters of the SPS configuration. The receiving the TB, at 4130, may be via radio resources determined based on the first configuration parameters.

Figure 42:
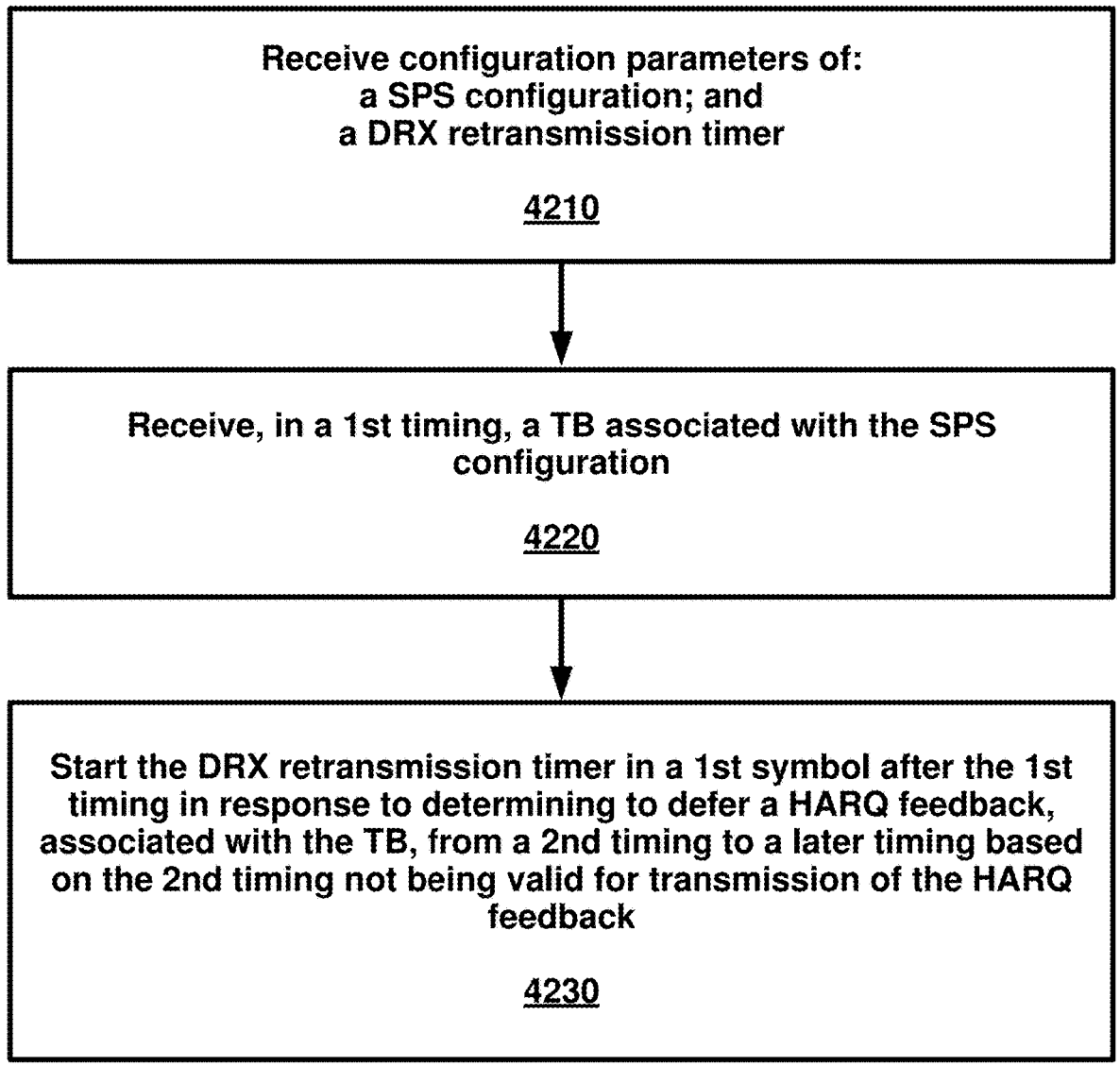
FIG. 42 shows an example flow diagram in accordance with several of various embodiments of the present disclosure.

FIG. 42 shows an example flow diagram in accordance with several of various embodiments of the present disclosure. At 4210, a wireless device may receive configuration parameters of: a semi-persistent scheduling (SPS) configuration; and a discontinuous reception (DRX) retransmission timer. At 4220, the wireless device may receive, in a first timing, a transport block (TB) associated with the SPS configuration. At 4230, the wireless device may start the DRX retransmission timer in a first symbol after the first timing in response to determining to defer a hybrid automatic repeat request (HARQ) feedback, associated with the TB, from a second timing to a later timing based on the second timing not being valid for transmission of the HARQ feedback.

In an example embodiment, the wireless device may receive a downlink control information (DCI) indicating activation of the SPS configuration. In an example embodiment, the wireless device may determine the second timing of the HARQ feedback based on the DCI and the first timing.

Figure 43:
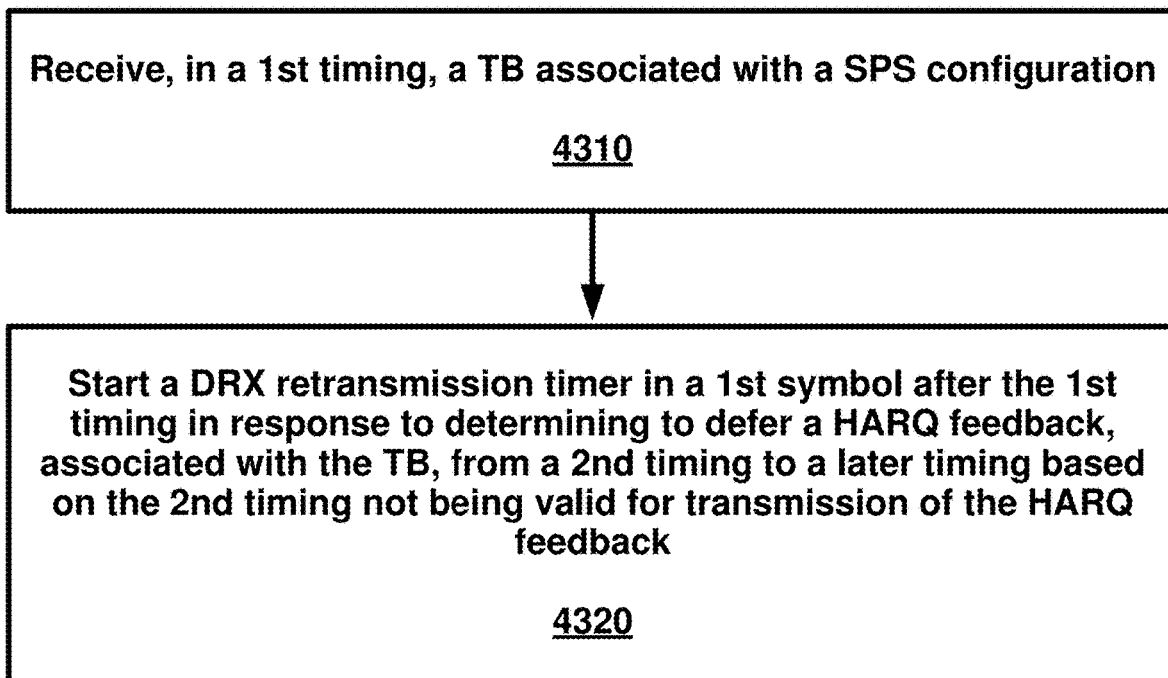
FIG. 43 shows an example flow diagram in accordance with several of various embodiments of the present disclosure.

FIG. 43 shows an example flow diagram in accordance with several of various embodiments of the present disclosure. At 4310, a wireless device may receive, by a wireless device in a first timing, a transport block (TB) associated with a semi-persistent scheduling configuration. At 4320, the wireless device may start a discontinuous reception retransmission timer in a first symbol after the first timing in response to determining to defer a hybrid automatic repeat request (HARQ) feedback, associated with the TB, from a second timing to a later timing based on the second timing not being valid for transmission of the HARQ feedback.

Figure 44:
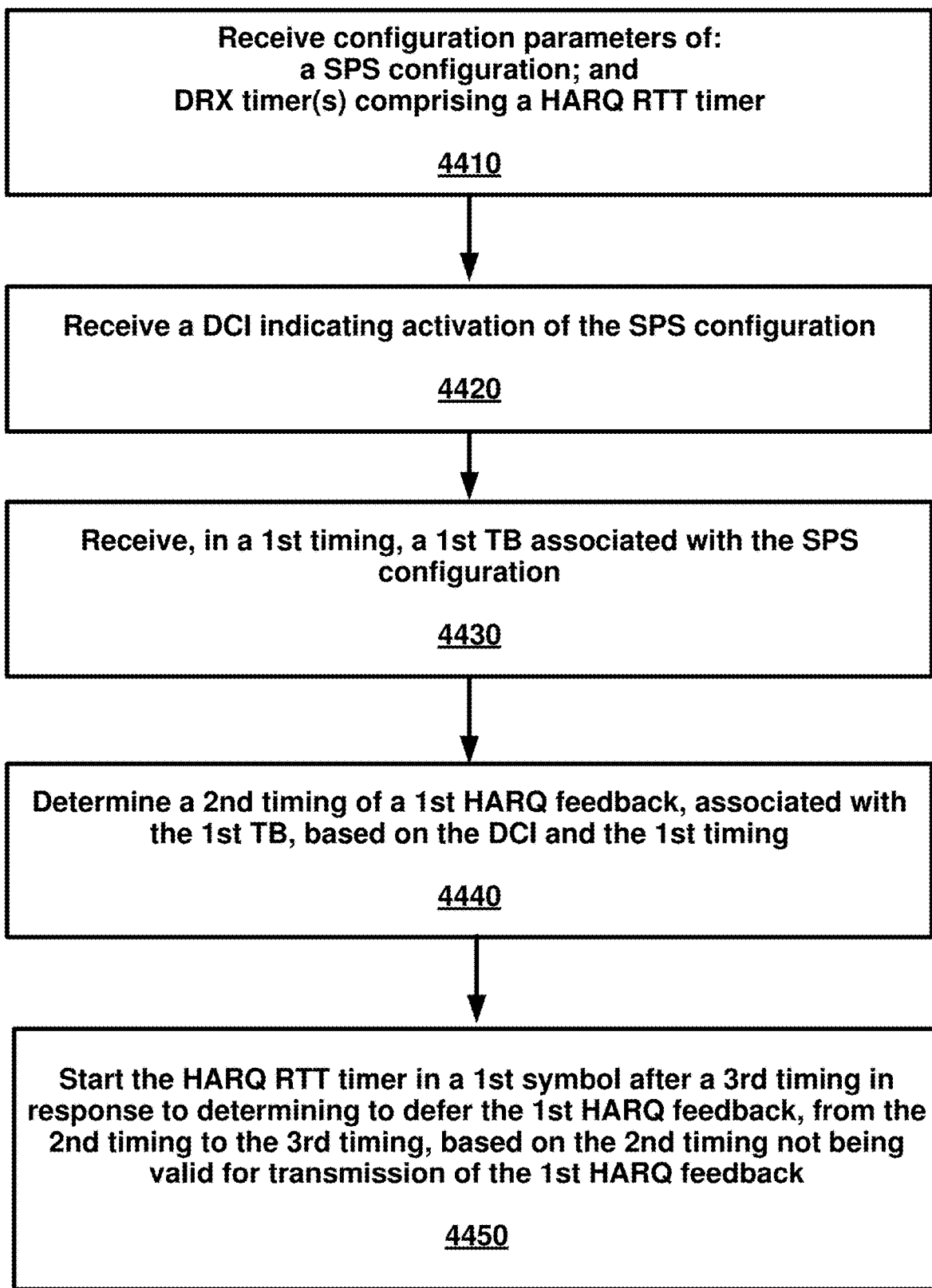
FIG. 44 shows an example flow diagram in accordance with several of various embodiments of the present disclosure.

FIG. 44 shows an example flow diagram in accordance with several of various embodiments of the present disclosure. At 4410, a wireless device may receive configuration parameters of: a semi-persistent scheduling (SPS) configuration; and one or more discontinuous reception (DRX) timers comprising a hybrid automatic repeat request (HARQ) round trip time (RTT) timer. At 4420, the wireless device may receive a downlink control information (DCI) indicating activation of the SPS configuration. At 4430, the wireless device may receive, in a first timing, a first transport block (TB) associated with the SPS configuration. At 4440, the wireless device may determine a second timing of a first hybrid automatic repeat request (HARQ) feedback, associated with the first TB, based on the DCI and the first timing. At 4450, the wireless device may start the HARQ RTT timer in a first symbol after a third timing in response to determining to defer the first HARQ feedback, from the second timing to the third timing, based on the second timing not being valid for transmission of the first HARQ feedback.

In an example embodiment, the wireless device may start a DRX retransmission timer in response to expiry of the HARQ RTT timer. In an example embodiment, the one or more DRX timers (whose configuration parameters are received in 4410) may comprise the DRX retransmission timer. In an example embodiment, the wireless device may monitor a control channel based on the DRX retransmission timer running.

In an example embodiment, the second timing may not be valid for transmission of the first HARQ feedback based on the second timing comprising one or more symbols that are not usable for uplink transmission. In an example embodiment, the second timing may not be valid for transmission of the first HARQ feedback based on the second timing colliding with a downlink symbol or a flexible symbol.

In an example embodiment, the wireless device may defer the first HARQ feedback until a valid uplink control channel resource.

In an example embodiment, the wireless device may receive, in a fourth timing, a second TB associated with the SPS configuration. The wireless device may determine a fifth timing of a second HARQ feedback, associated with the second TB, based on the DCI and the fourth timing. The wireless device may start the HARQ RTT timer in a first symbol after the fifth timing in response to the fifth timing being valid for transmission of the second HARQ feedback. In an example embodiment, the fifth timing may be valid for transmission of the second HARQ feedback based on the fifth timing not colliding with a downlink symbol or a flexible symbol.

In an example, the determining the second timing, at 4440, may be based on a value of a downlink shared channel to HARQ feedback timing field of the DCI received at 4420.

In an example embodiment, the configuration parameters, received at 4410, may comprise first configuration parameters of the SPS configuration. The wireless device may receive the first TB via radio resources determined based on the first configuration parameters.

Figure 45:
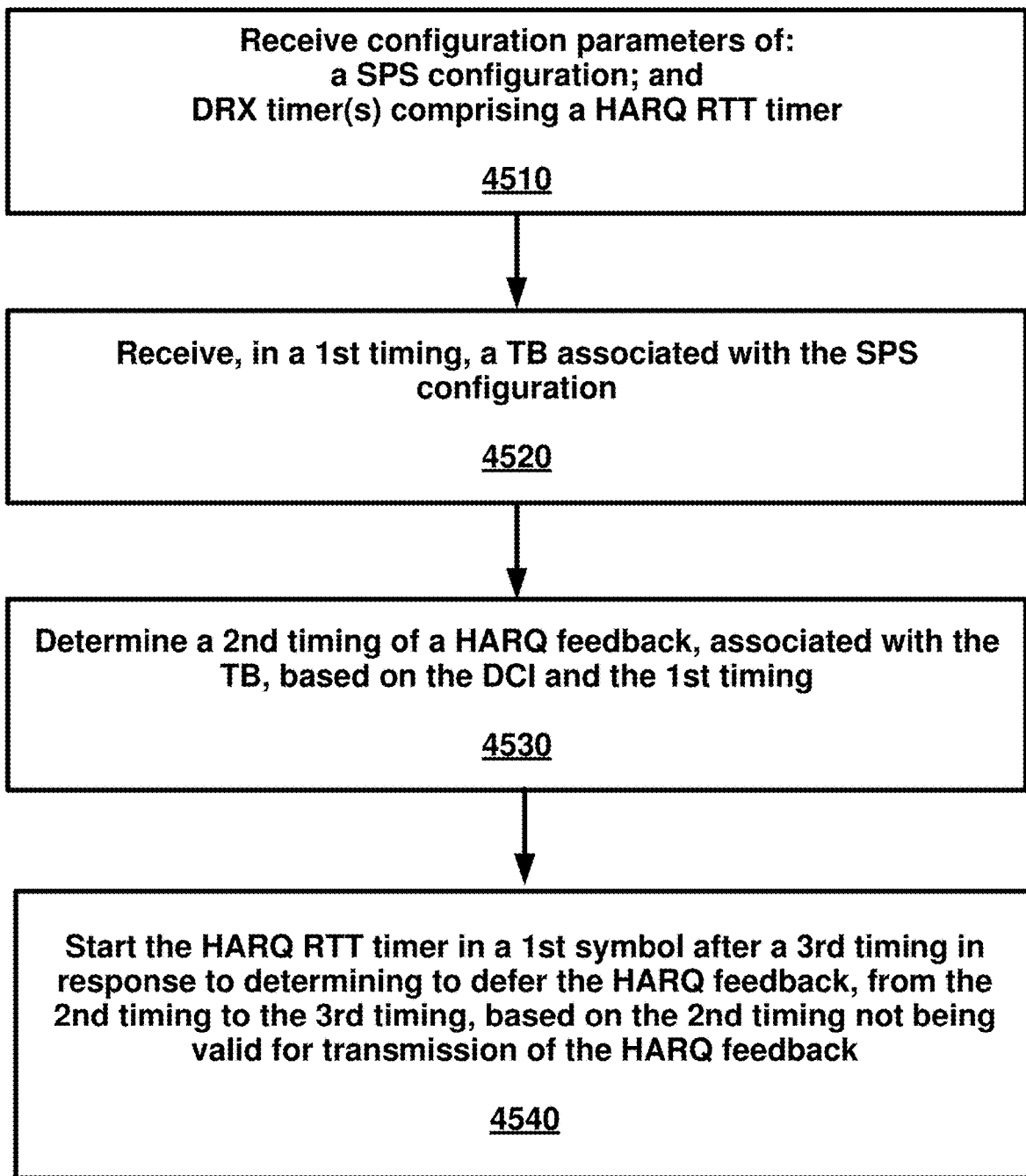
FIG. 45 shows an example flow diagram in accordance with several of various embodiments of the present disclosure.

FIG. 45 shows an example flow diagram in accordance with several of various embodiments of the present disclosure. At 4510, a wireless device may receive configuration parameters of: a semi-persistent scheduling (SPS) configuration; and a hybrid automatic repeat request (HARQ) round trip time (RTT) timer. At 4520, the wireless device may receive, in a first timing, a transport block (TB) associated with the SPS configuration. At 4530, the wireless device may determine a second timing of a hybrid automatic repeat request (HARQ) feedback, associated with the TB, based on a downlink control information and the first timing. At 4540, the wireless device may start the HARQ RTT timer in a first symbol after a third timing in response to determining to defer the HARQ feedback, from the second timing to the third timing, based on the second timing not being valid for transmission of the HARQ feedback.

In an example embodiment, the wireless device may receive the downlink control information, used in determination of the second timing in 4530, indicating activation of the SPS configuration.

FIG. 46 shows an example flow diagram in accordance with several of various embodiments of the present disclosure. At 4610, a wireless device may receive, in a first timing, a transport block (TB) associated with a semi-persistent scheduling configuration. At 4620, the wireless device may determine a second timing of a hybrid automatic repeat request (HARQ) feedback, associated with the TB, based on a downlink control information and the first timing. At 4630, the wireless device may start a HARQ round trip time (RTT) timer in a first symbol after a third timing in response to determining to defer the HARQ feedback, from the second timing to the third timing, based on the second timing not being valid for transmission of the HARQ feedback.

Figure 47:
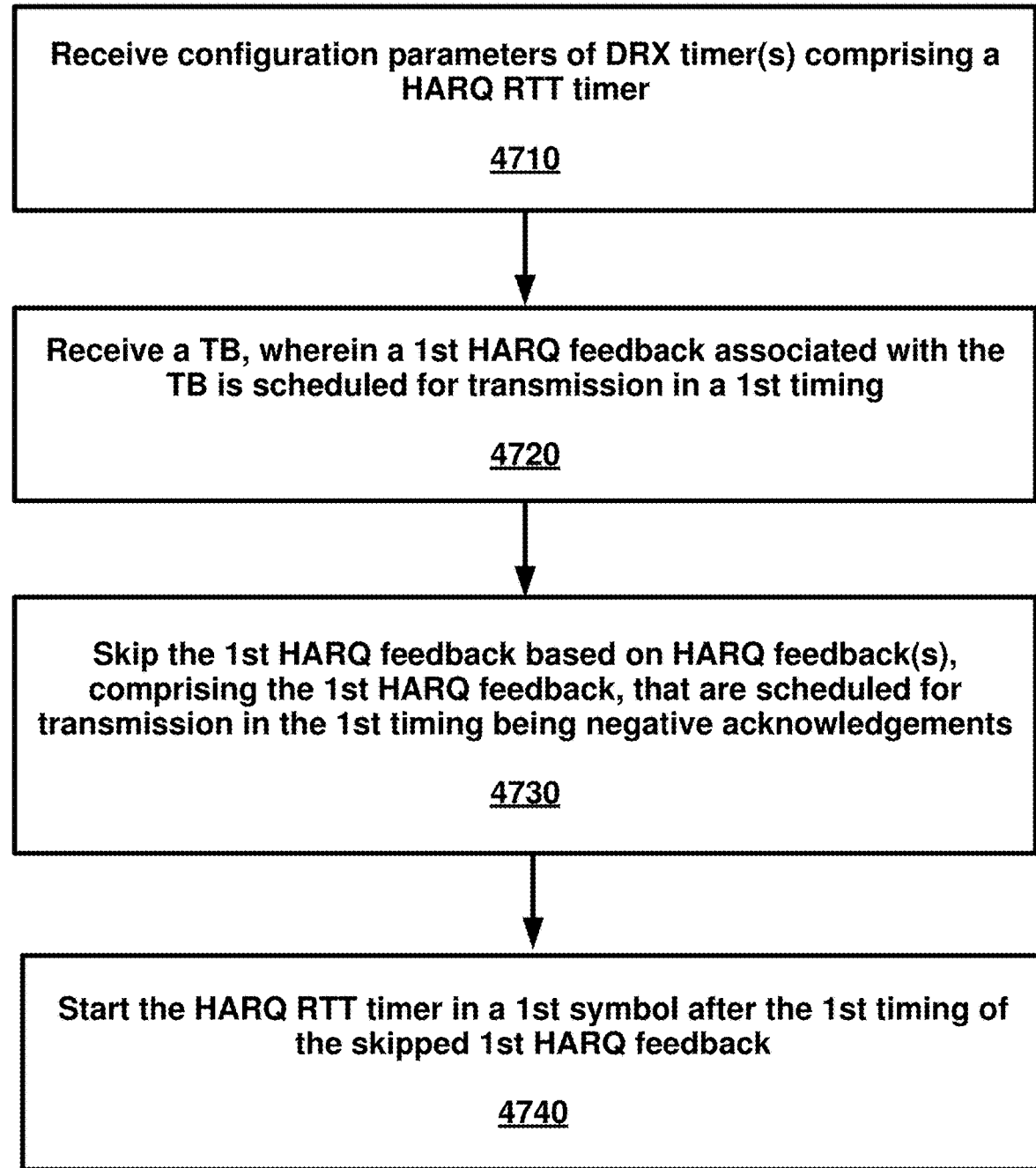
FIG. 47 shows an example flow diagram in accordance with several of various embodiments of the present disclosure.

FIG. 47 shows an example flow diagram in accordance with several of various embodiments of the present disclosure. At 4710, a wireless device may receive configuration parameters of one or more discontinuous reception (DRX) timers comprising a hybrid automatic repeat request (HARQ) round trip time (RTT) timer. At 4720, the wireless device may receive a transport block (TB), wherein a first HARQ feedback associated with the TB is scheduled for transmission in a first timing. At 4730, the wireless device may skip the first HARQ feedback based on one or more HARQ feedbacks, comprising the first HARQ feedback, that are scheduled for transmission in the first timing being negative acknowledgements. At 4740, the wireless device may start the HARQ RTT timer in a first symbol after the first timing of the skipped first HARQ feedback.

In an example embodiment, the wireless device may start a DRX retransmission timer in response to expiry of the HARQ RTT timer. In an example embodiment, the wireless device may receive, while the DRX retransmission timer is running, a downlink assignment for retransmission of the TB. The wireless device may receive a retransmission of the TB based on the downlink assignment.

In an example embodiment, the wireless device may receive a downlink control information indicating a resource assignment for the TB. In an example embodiment, the first timing may be based on a value of a downlink shared channel to HARQ feedback timing field of the downlink control information.

In an example embodiment, the TB, received at 4720, may be based on a semi-persistent scheduling (SPS) configuration. In an example embodiment, the wireless device may receive SPS configuration parameters of the SPS configuration. The wireless device may determine radio resources for receiving the TB based on the SPS configuration parameters. In an example embodiment, the wireless device may receive an activation downlink control information indicating activation of the SPS configuration, wherein the first timing may be based on a value of a downlink shared channel to HARQ feedback timing field of the activation downlink control information.

In an example embodiment, the one or more HARQ feedbacks may be associated with one or more TBs. The one or more TBs may be associated with one or more SPS configurations.

In an example embodiment, the one or more HARQ feedbacks may be associated with one or more TBs. At least one of the one or more TBs may be received based on a dynamic grant.

In an example embodiment, at least one of the one or more HARQ feedbacks may be a negative acknowledgement based on skipping a corresponding downlink transmission.

In an example embodiment, the TB, received at 4720, may be associated with a first HARQ process number. The HARQ RTT timer may be for the first HARQ process number.

In an example embodiment, the skipping the first HARQ feedback, at 4740, may be based on skipping transmission of a physical channel carrying the first HARQ feedback. In an example embodiment, the physical channel may be a physical uplink control channel. In an example embodiment, the physical channel may be a physical uplink shared channel.

Figure 48:
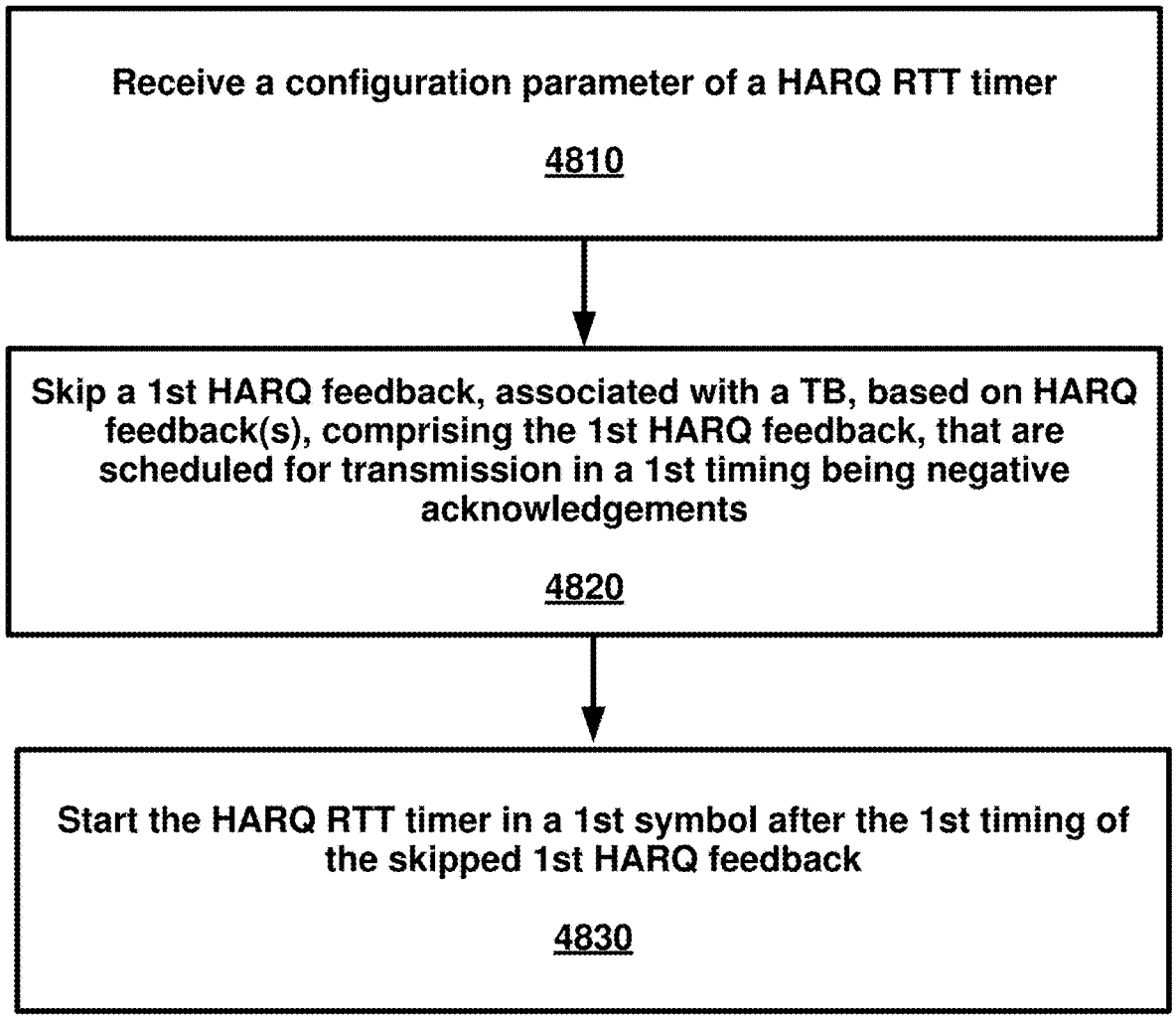
FIG. 48 shows an example flow diagram in accordance with several of various embodiments of the present disclosure.

FIG. 48 shows an example flow diagram in accordance with several of various embodiments of the present disclosure. At 4810, a wireless device may receive a configuration parameter of a hybrid automatic repeat request (HARQ) round trip time (RTT) timer. The wireless device may skip a first HARQ feedback associated with a transport block (TB) based on one or more HARQ feedbacks, comprising the first HARQ feedback, that are scheduled for transmission in a first timing being negative acknowledgements. The wireless device may start the HARQ RTT timer in a first symbol after the first timing of the skipped first HARQ feedback.

In an example embodiment, the wireless device may receive the TB whose associated HARQ feedback is skipped at 4820.

FIG. 49 shows an example flow diagram in accordance with several of various embodiments of the present disclosure. At 4910, a wireless device may determine to skip transmission of one or more hybrid automatic repeat request (HARQ) feedbacks, scheduled for transmission in a first timing, based on the one or more HARQ feedbacks being negative acknowledgements. At 4920, the wireless device may transmit an indication that the wireless device skips transmission of the one or more HARQ feedbacks in the first timing.

In an example embodiment, transmitting the indication, at 4920, may be based on uplink control information.

In an example embodiment, transmitting the indication, at 4920, may be based on a medium access control (MAC) control element (CE).

In an example embodiment, the determining to skip the transmission of the one or more HARQ feedbacks, at 4910, may further based on the one or more HARQ feedbacks being associated with one or more semi-persistent scheduling (SPS) configurations.

In an example embodiment, the one or more HARQ feedbacks may be negative acknowledgements in response to skipping downlink transmissions associated with one or more SPS configurations.

In an example embodiment, the indication, transmitted at 4920, may be that the wireless device skips transmission of the one or more HARQ feedbacks via a physical channel. In an example embodiment, the physical channel may be a physical uplink control channel. In an example embodiment, the physical channel may be a physical uplink shared channel.

Figure 50:
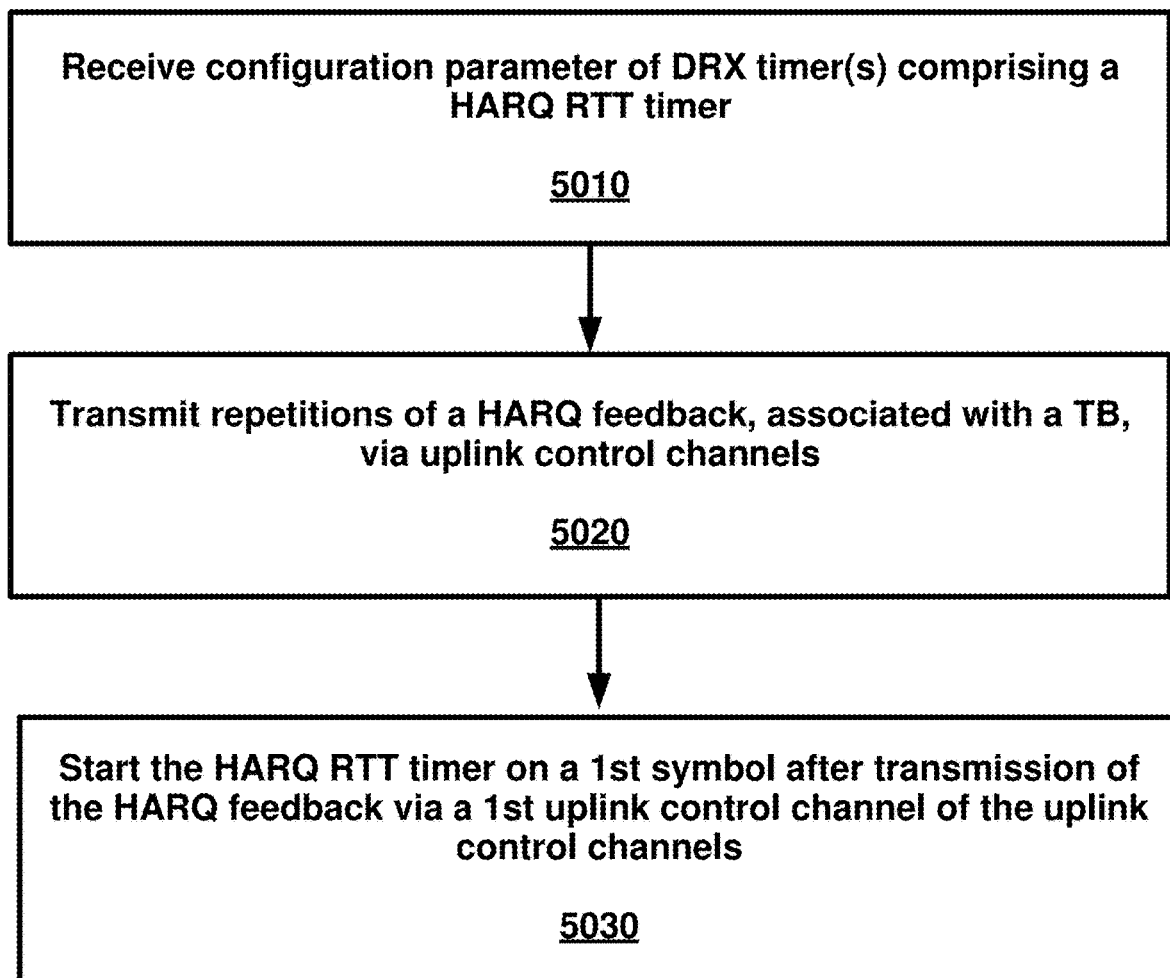
FIG. 50 shows an example flow diagram in accordance with several of various embodiments of the present disclosure.

FIG. 50 shows an example flow diagram in accordance with several of various embodiments of the present disclosure. At 5010, a wireless device may receive configuration parameter of one or more discontinuous reception (DRX) timers comprising a hybrid automatic repeat request (HARQ) round trip time (RTT) timer. At 5020, the wireless device may transmit repetitions of a HARQ feedback, associated with a transport block, via a plurality of uplink control channels. At 5030, the wireless device may start the HARQ RTT timer on a first symbol after transmission of the HARQ feedback via a first uplink control channel of the plurality of uplink control channels.

In an example embodiment, the first uplink control channel may be the earliest uplink control channel in the plurality of uplink control channels via which the repetitions of the HARQ feedback are transmitted at 5020.

In an example embodiment, the first uplink control channel may be the latest uplink control channel in the plurality of uplink control channels via which the repetitions of the HARQ feedback are transmitted at 5020.

In an example embodiment, the plurality of uplink control channels, via which the repetitions of the HARQ feedback are transmitted at 5020, may be in the same slot.

In an example embodiment, the plurality of uplink control channels, via which the repetitions of the HARQ feedback are transmitted at 5020, may be in a plurality of slots.

In an example embodiment, the plurality of uplink control channels, via which the repetitions of the HARQ feedback are transmitted at 5020, may be in a plurality of sub-slots.

In an example embodiment, the wireless device may receive a downlink control information indicating timings of the plurality of uplink control channels via which the repetitions of the HARQ feedback are transmitted at 5020.

In an example embodiment, the wireless device may start a DRX retransmission timer in response to an expiry of the HARQ RTT timer. In an example embodiment, the one or more DRX timers may comprise the DRX retransmission timer. In an example embodiment, the wireless device may receive, while the DRX retransmission timer is running, a downlink control information comprising scheduling information for retransmission of the transport block.

FIG. 51 shows an example flow diagram in accordance with several of various embodiments of the present disclosure. At 5110, a wireless device may transmit repetitions of a hybrid automatic repeat request (HARQ) feedback, associated with a transport block, via a plurality of uplink control channels. At 5120, the wireless device may start a HARQ round trip time (RTT) timer on a first symbol after transmission of the HARQ feedback via a first uplink control channel of the plurality of uplink control channels.

In an example embodiment, the wireless device may receive a configuration parameter of the HARQ RTT timer started at 5120.

Figure 52:
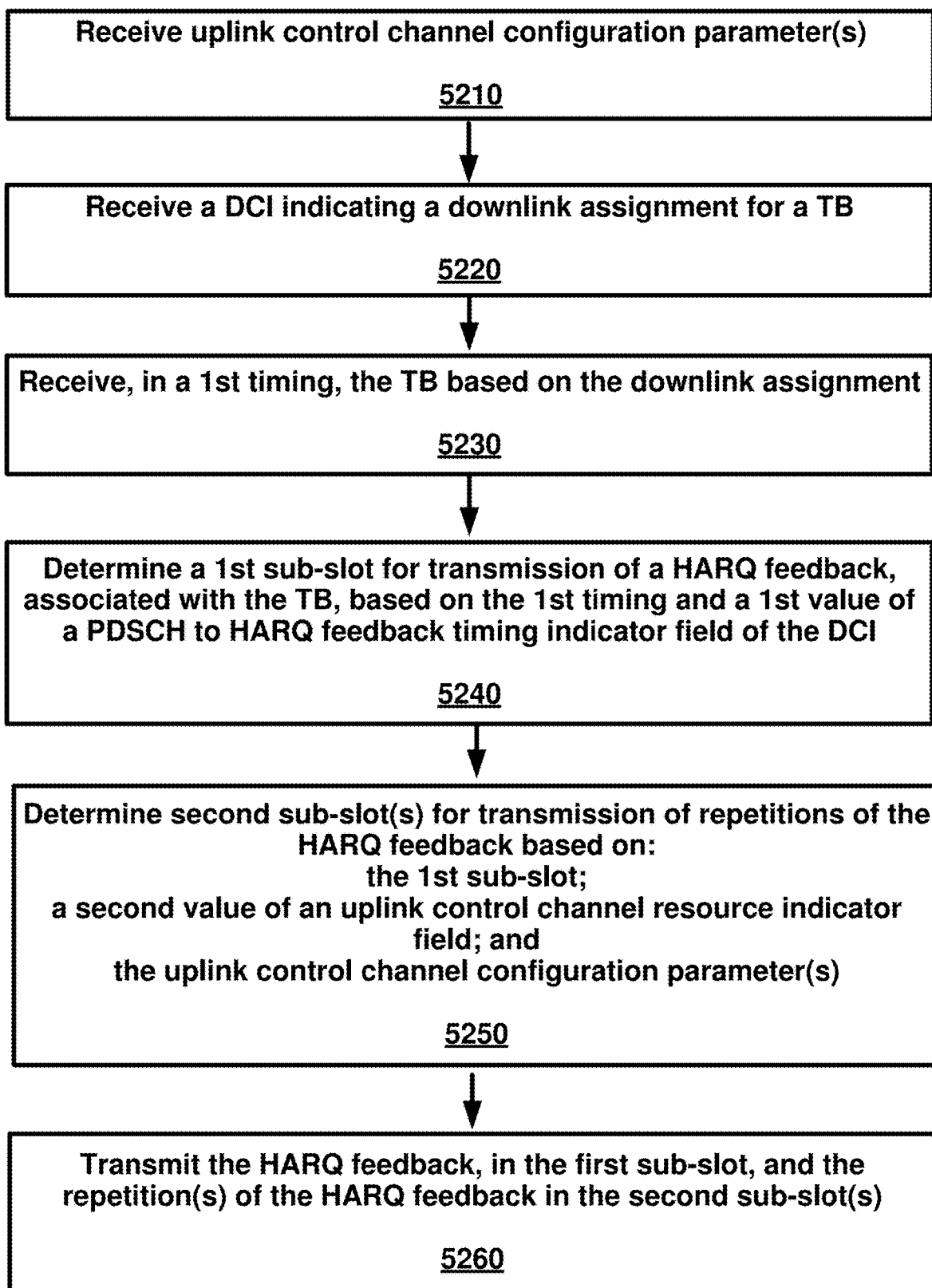
FIG. 52 shows an example flow diagram in accordance with several of various embodiments of the present disclosure.

FIG. 52 shows an example flow diagram in accordance with several of various embodiments of the present disclosure. At 5210, a wireless device may receive one or more uplink control channel configuration parameters. At 5220, the wireless device may receive a downlink control information (DCI) indicating a downlink assignment for a transport block (TB). At 5230, the wireless device may receive, in a first timing, the TB based on the downlink assignment. At 5240, the wireless device may determine a first sub-slot for transmission of a hybrid automatic repeat request (HARQ) feedback, associated with the TB, based on the first timing and a first value of a downlink shared channel to HARQ feedback timing indicator field of the DCI. At 5250, the wireless device may determine one or more second sub-slots for transmission of one or more repetitions of the HARQ feedback based on: the first sub-slot; a second value of an uplink control channel resource indicator field; and the one or more uplink control channel configuration parameters. At 5260, the wireless device may transmit the HARQ feedback, in the first sub-slot, and the one or more repetitions of the HARQ feedback in the one or more second sub-slots.

In an example embodiment, the second value of the uplink control channel resource indicator field, used in determination of the one or more second sub-slots at 5250, may indicate a number of repetitions.

In an example embodiment, the transmitting, at 5260, the HARQ feedback and the one or more repetitions of the HARQ feedback may be based on one or more short uplink control channel formats.

In an example embodiment, the one or more uplink control channel configuration parameters may indicate one or more offsets to the first sub-slot.

In an example embodiment, the one or more uplink control channel configuration parameters, used in determination of the one or more second sub-slots at 5250, may indicate whether the sub-slots for transmission of the HARQ feedback and the one or more repetitions of the HARQ feedback are contiguous or non-contiguous.

Figure 53:
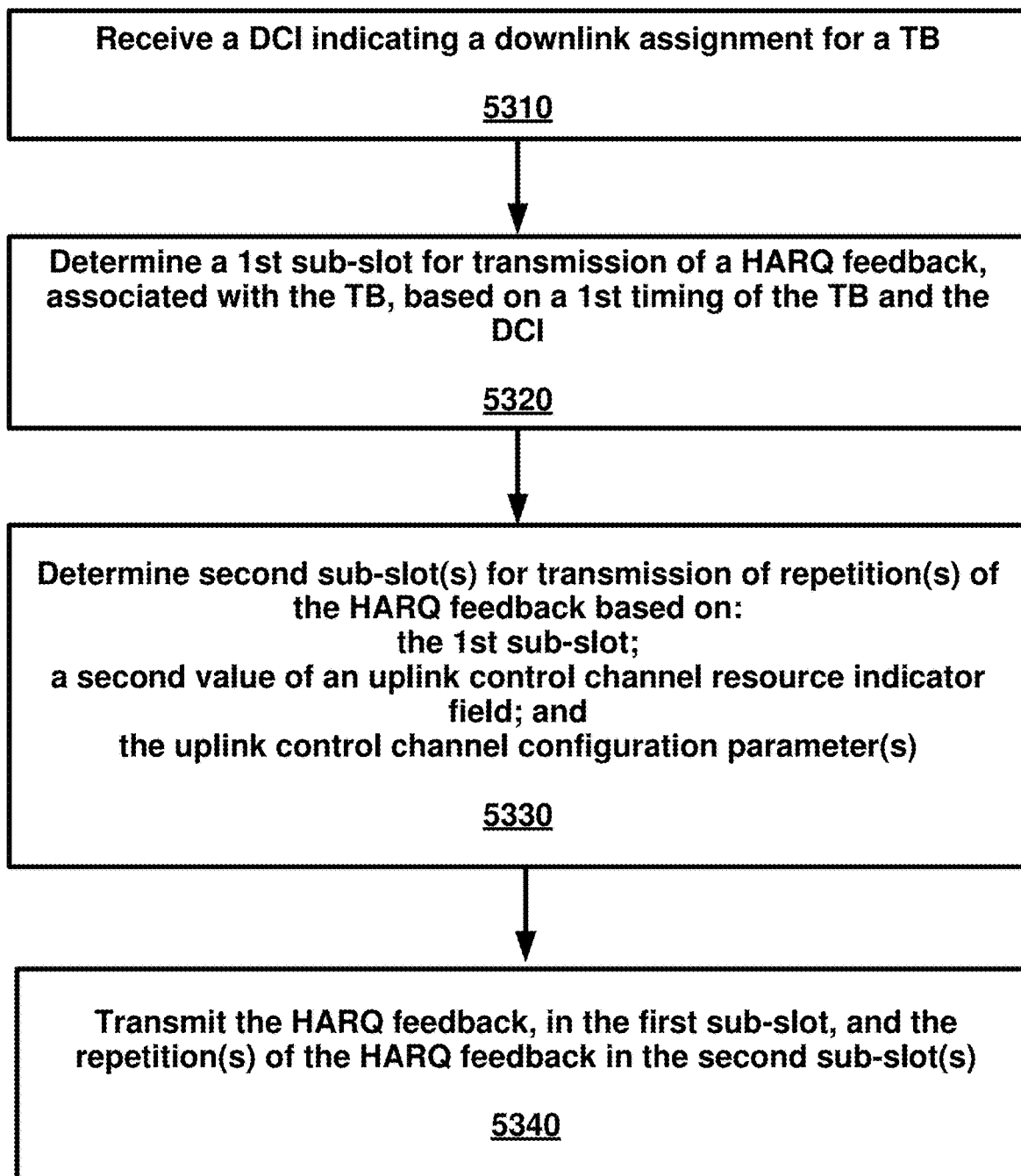
FIG. 53 shows an example flow diagram in accordance with several of various embodiments of the present disclosure.

FIG. 53 shows an example flow diagram in accordance with several of various embodiments of the present disclosure. At 5310, a wireless device may receive a downlink control information (DCI) indicating a downlink assignment for a transport block (TB). At 5320, the wireless device may determine a first sub-slot for transmission of a hybrid automatic repeat request (HARQ) feedback, associated with the TB, based on a first timing of the TB and the DCI. At 5330, the wireless device may determine one or more second sub-slots for transmission of one or more repetitions of the HARQ feedback based on: the first sub-slot; a second value of an uplink control channel resource indicator field; and one or more uplink control channel configuration parameters. At 5340, the wireless device may transmit the HARQ feedback, in the first sub-slot, and the one or more repetitions of the HARQ feedback in the one or more second sub-slots.

In an example embodiment, the wireless device may receive the one or more uplink control channel configuration parameters used in determination of the one or more second sub-slots at 5230.

In an example embodiment, the wireless device may receive the TB in the first timing based on the downlink assignment received at 5310.

In an example embodiment, the determining the first sub-slot, at 5320, may be based on a value of a downlink shared channel to HARQ feedback timing indicator field of the DCI.

Figure 54:
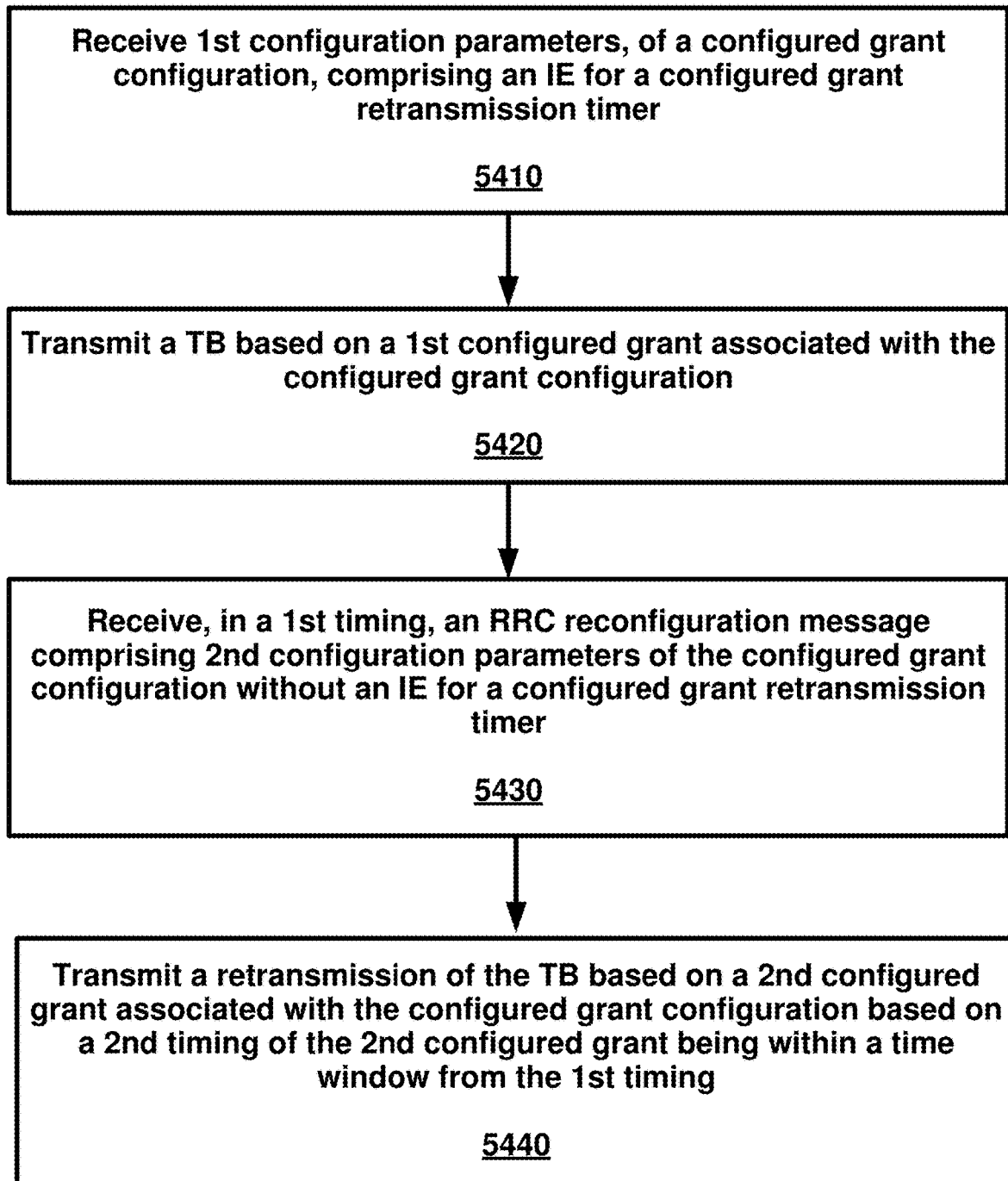
FIG. 54 shows an example flow diagram in accordance with several of various embodiments of the present disclosure.

FIG. 54 shows an example flow diagram in accordance with several of various embodiments of the present disclosure. At 5410, a wireless device may receive first configuration parameters, of a configured grant configuration, comprising an information element for a configured grant retransmission timer. At 5420, the wireless device may transmit a transport block based on a first configured grant associated with the configured grant configuration. At 5430, the wireless device may receive, in a first timing, an RRC reconfiguration message comprising second configuration parameters of the configured grant configuration without an information element for a configured grant retransmission timer. At 5440, the wireless device may transmit a retransmission of the transport block based on a second configured grant associated with the configured grant configuration based on a second timing of the second configured grant being within a time window from the first timing.

In an example embodiment, a duration of the time window, at 5440, may be based on a processing time for processing the RRC reconfiguration message. In an example embodiment, the time window, at 5440, may be larger than the processing time.

In an example embodiment, the duration of the time window, at 5440, may be based on a capability of the wireless device for processing the RRC reconfiguration message. In an example embodiment, the wireless device may transmit, to a base station, a capability message comprising a first parameter indicating the capability of the wireless device for processing the RRC reconfiguration message.

In an example embodiment, the wireless device may transmit first uplink control information, associated with the transport block, based on the first configured grant. The wireless device may transmit second uplink control information, associated with the retransmission of the transport block, based on the second configured grant. In an example embodiment, the first uplink control information may comprise and one or more first hybrid automatic repeat request (HARQ) parameters. The second uplink control information may comprise one or more second HARQ parameters.

In an example embodiment, the first configuration parameters, receive at 5410, may indicate a first configured grant configuration index. The second configuration parameters, received at 5430, may indicate the first configured grant configuration index.

In an example embodiment, the wireless device may start the configured grant retransmission timer based on the transmitting the transport block at 5420. The transmitting the retransmission of the transport block based on a second configured grant may further be based on the configured grant retransmission timer being expired before the second timing.

In an example embodiment, the wireless device may start the configured grant retransmission timer based on the transmitting the transport block at 5420. The transmitting the retransmission of the transport block based on a second configured grant may further be based on the configured grant retransmission timer being expired before the first timing.

In an example embodiment, the wireless device may start the configured grant retransmission timer in response to the transmitting the transport block at 5420. The wireless device may not start the configured grant retransmission timer in response to the transmitting the retransmission of the transport block at 5440.

In an example embodiment, the wireless device may receive one or more configuration parameters indicating the time window.

In an example embodiment, the wireless device may determine the time window based on an offset. In an example embodiment, the offset may be based on a system frame number. In an example embodiment, the wireless device may receive configuration parameters indicating the offset.

Figure 55:
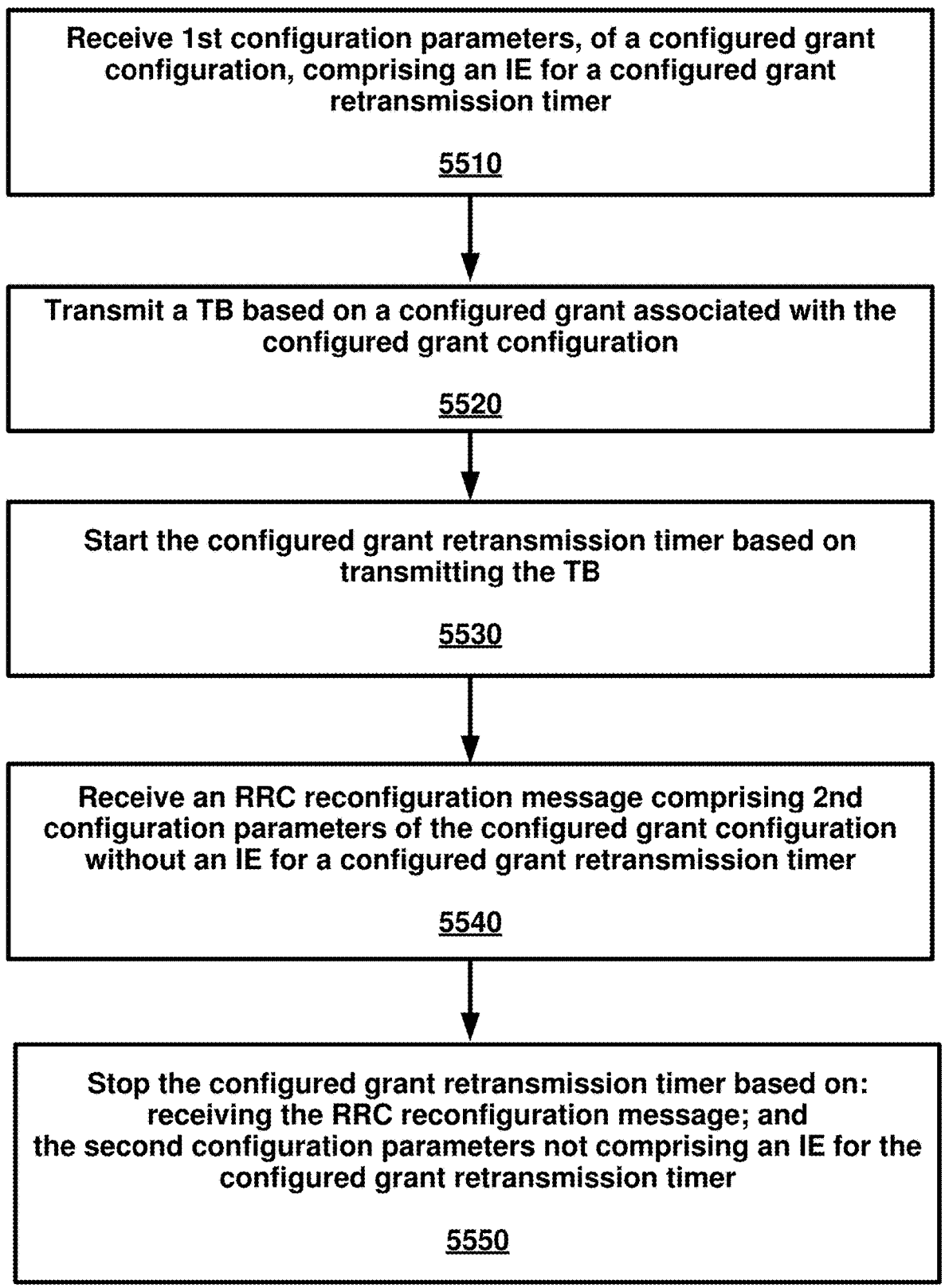
FIG. 55 shows an example flow diagram in accordance with several of various embodiments of the present disclosure.

FIG. 55 shows an example flow diagram in accordance with several of various embodiments of the present disclosure. At 5510, a wireless device may receive first configuration parameters, of a configured grant configuration, comprising an information element for a configured grant retransmission timer. At 5520, the wireless device may transmit a transport block based on a configured grant associated with the configured grant configuration. At 5530, the wireless device may start the configured grant retransmission timer based on transmitting the transport block. At 5540, the wireless device may receive a radio resource control (RRC) reconfiguration message comprising second configuration parameters of the configured grant configuration without an information element for a configured grant retransmission timer. At 5550, the wireless device may stop the configured grant retransmission timer based on: receiving the RRC reconfiguration message; and the second configuration parameters not comprising an information element for the configured grant retransmission timer.

In an example embodiment, a timing for the stopping the configured grant retransmission timer, at 5510, may be based on a processing time of the RRC reconfiguration message.

In an example embodiment, the receiving the RRC reconfiguration message, at 5540, may be in a first timing. The processing time of the RRC reconfiguration message may be a first number of symbols. The timing for the stopping the configured grant retransmission timer, at 5550, may be the first number of slots after the first timing.

In an example embodiment, the timing for the stopping the configured grant retransmission timer, at 5550, may further be based on an offset. In an example embodiment, the offset may be to a first system frame number.

In an example embodiment, the first transport block may be associated with a hybrid automatic repeat request (HARQ) process number. The configured grant retransmission timer may be associated with the HARQ process number.

In an example embodiment, the stopping the configured grant retransmission timer, at 5550, may be for all HARQ processes associated with a cell on which the configured grant configuration is configured.

In an example embodiment, the stopping the configured grant retransmission timer, at 5550, may be for one or more HARQ processes that are configured for the configured grant configuration.

In an example embodiment, the stopping the configured grant retransmission timer, at 5550, may be for one or more pending HARQ processes associated with a cell on which the configured grant configuration is configured.

In an example embodiment, the stopping the configured grant retransmission timer, at 5550, may be for one or more pending HARQ processes of one or more HARQ processes that are configured for the configured grant configuration.

In an example embodiment, the stopping the configured grant retransmission timer, at 5550, may be in a timing based on a configuration parameter. In an example embodiment, the configuration parameter may indicate an offset.

In an example embodiment, the first configuration parameters, received at 5510, may indicate a first configured grant configuration index. The second configuration parameters, received at 5540, may indicate the first configured grant configuration index.

Figure 56:
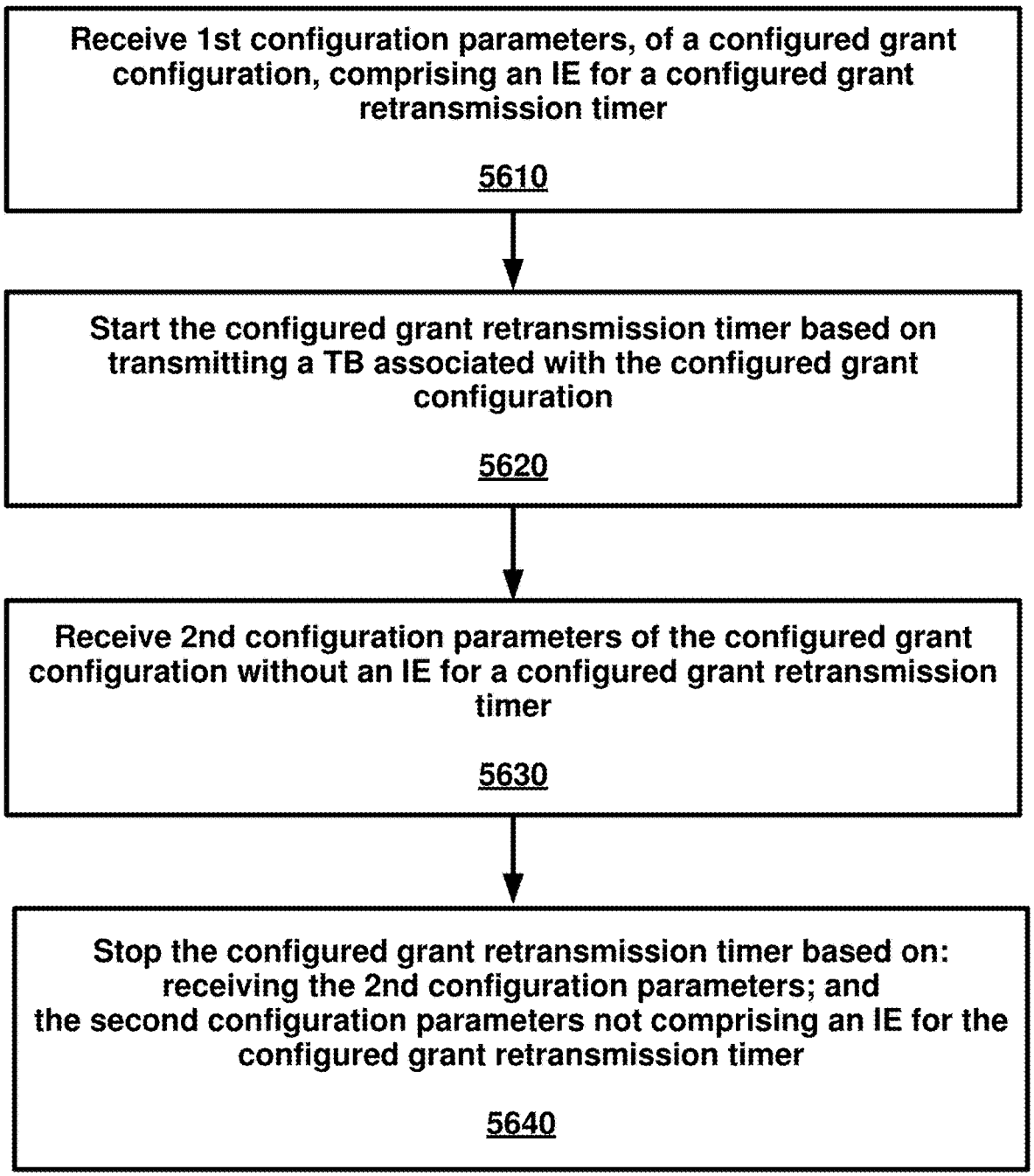
FIG. 56 shows an example flow diagram in accordance with several of various embodiments of the present disclosure.

FIG. 56 shows an example flow diagram in accordance with several of various embodiments of the present disclosure. At 5610, a wireless device may receive first configuration parameters, of a configured grant configuration, comprising an information element for a configured grant retransmission timer. At 5620, the wireless device may start the configured grant retransmission timer based on transmitting a transport block associated with the configured grant configuration. At 5630, the wireless device may receive second configuration parameters of the configured grant configuration without an information element for a configured grant retransmission timer. At 5640, the wireless device may stop the configured grant retransmission timer based on: receiving the second configuration parameters; and the second configuration parameters not comprising an information element for the configured grant retransmission timer.

In an example embodiment, the receiving the second configuration parameters, at 5630, may be based on a radio resource control (RRC) reconfiguration message.

Figure 57:
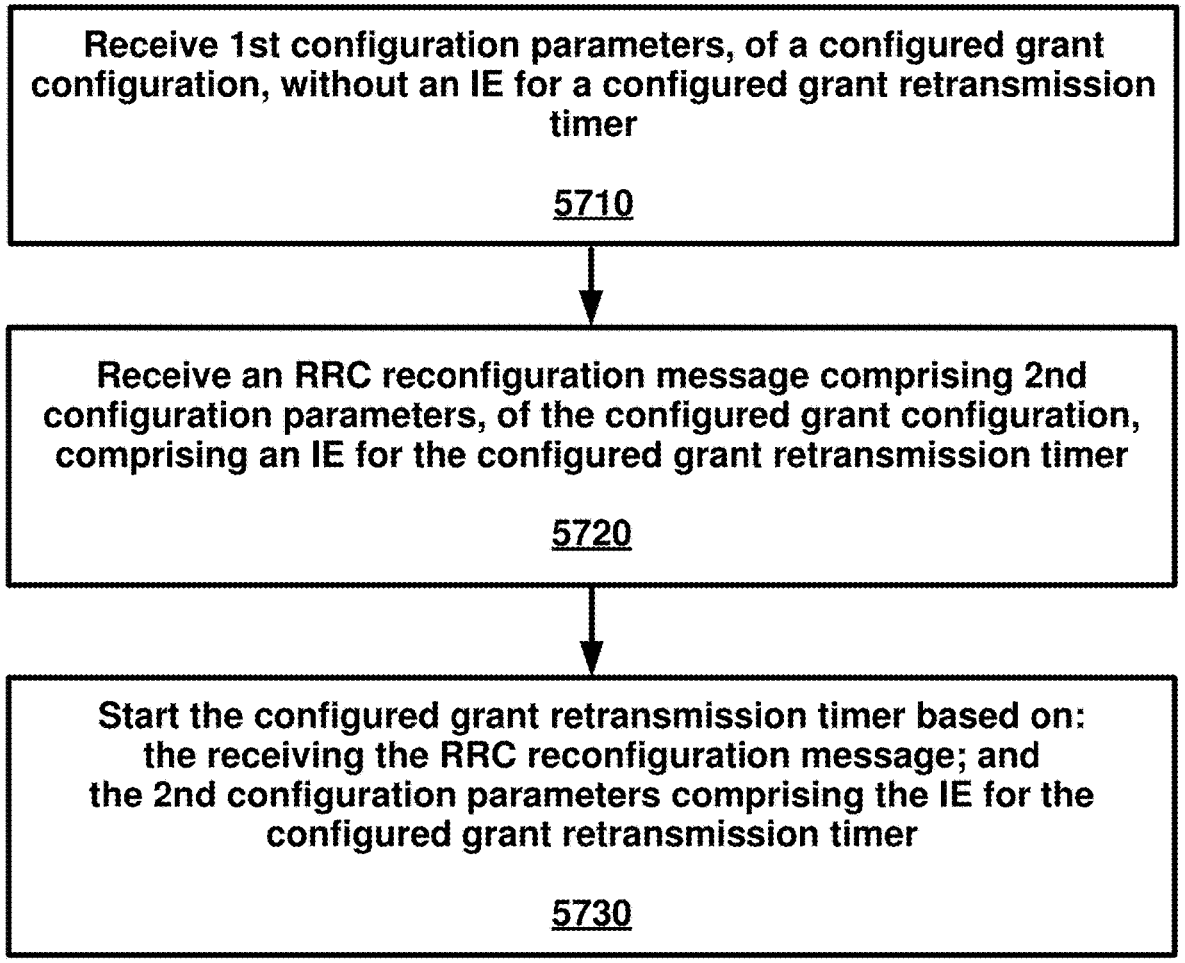
FIG. 57 shows an example flow diagram in accordance with several of various embodiments of the present disclosure.

FIG. 57 shows an example flow diagram in accordance with several of various embodiments of the present disclosure. At 5710, a wireless device may receive first configuration parameters, of a configured grant configuration, without an information element for a configured grant retransmission timer. At 5720, the wireless device may receive a radio resource control (RRC) reconfiguration message comprising second configuration parameters, of the configured grant configuration, comprising an information element for the configured grant retransmission timer. At 5730, the wireless device may start the configured grant retransmission timer based on: the receiving the RRC reconfiguration message; and the second configuration parameters comprising the information element for the configured grant retransmission timer.

In an example embodiment, the wireless device may transmit a retransmission of a transport block based a configured grant associated with the configured grant configuration and based on the configured grant retransmission timer expiring. The configured grant retransmission timer is associated with a HARQ process. The transport block may be associated with the HARQ process.

In an example embodiment, the configured grant configuration may be for a bandwidth part (BWP) of a cell. A plurality of HARQ processes may be associated with the BWP. The starting the configured grant retransmission timer may be for the plurality of HARQ process.

In an example embodiment, one or more HARQ processes may be configured for the configured grant configuration. The starting the configured grant retransmission timer, at 5730, may be for the one or more HARQ process.

In an example embodiment, the configured grant configuration may be for a bandwidth part (BWP) of a cell. A plurality of HARQ processes may be associated with the BWP. The starting the configured grant retransmission timer, at 5730, may be for one or more first HARQ processes, of the plurality of HARQ process, that are pending.

In an example embodiment, one or more HARQ processes may be configured for the configured grant configuration. The starting the configured grant retransmission timer, at 5730, may be for one or more first HARQ processes, of the one or more HARQ process, that are pending.

In an example embodiment, the first configuration parameters may comprise a second information element for a configured grant timer. The starting the configured grant retransmission timer, at 5730, may be for one or more HARQ processes with the configured grant timer running.

In an example embodiment, the starting the configured grant retransmission timer, at 5730, may be in a first timing. The first timing may be based on a processing time for the RRC reconfiguration message.

In an example embodiment, the receiving the RRC reconfiguration message, at 5720, may be in a second timing. The first timing may be in a slot that is on or after the processing time from the second timing. In an example embodiment, the first timing may be based on an offset. In an example embodiment, the offset may be to a first system frame number.

Various exemplary embodiments of the disclosed technology are presented as example implementations and/or practices of the disclosed technology. The exemplary embodiments disclosed herein are not intended to limit the scope. Persons of ordinary skill in the art will appreciate that various changes can be made to the disclosed embodiments without departure from the scope. After studying the exemplary embodiments of the disclosed technology, alternative aspects, features and/or embodiments will become apparent to one of ordinary skill in the art. Without departing from the scope, various elements or features from the exemplary embodiments may be combined to create additional embodiments. The exemplary embodiments are described with reference to the drawings. The figures and the flowcharts that demonstrate the benefits and/or functions of various aspects of the disclosed technology are presented for illustration purposes only. The disclosed technology can be flexibly configured and/or reconfigured such that one or more elements of the disclosed embodiments may be employed in alternative ways. For example, an element may be optionally used in some embodiments or the order of actions listed in a flowchart may be changed without departure from the scope.

An example embodiment of the disclosed technology may be configured to be performed when deemed necessary, for example, based on one or more conditions in a wireless device, a base station, a radio and/or core network configuration, a combination thereof and/or alike. For example, an example embodiment may be performed when the one or more conditions are met. Example one or more conditions may be one or more configurations of the wireless device and/or base station, traffic load and/or type, service type, battery power, a combination of thereof and/or alike. In some scenarios and based on the one or more conditions, one or more features of an example embodiment may be implemented selectively.

In this disclosure, the articles "a" and "an" used before a group of one or more words are to be understood as "at least one" or "one or more" of what the group of the one or more words indicate. The use of the term "may" before a phrase is to be understood as indicating that the phrase is an example of one of a plurality of useful alternatives that may be employed in an embodiment in this disclosure.

In this disclosure, an element may be described using the terms "comprises", "includes" or "consists of" in combination with a list of one or more components. Using the terms "comprises" or "includes" indicates that the one or more components are not an exhaustive list for the description of the element and do not exclude components other than the one or more components. Using the term "consists of" indicates that the one or more components is a complete list for description of the element. In this disclosure, the term "based on" is intended to mean "based at least in part on". The term "based on" is not intended to mean "based only on". In this disclosure, the term "and/or" used in a list of elements indicates any possible combination of the listed elements. For example, "X, Y, and/or Z" indicates X; Y; Z; X and Y; X and Z; Y and Z; or X, Y, and Z.

Some elements in this disclosure may be described by using the term "may" in combination with a plurality of features. For brevity and ease of description, this disclosure may not include all possible permutations of the plurality of features. By using the term "may" in combination with the plurality of features, it is to be understood that all permutations of the plurality of features are being disclosed. For example, by using the term "may" for description of an element with four possible features, the element is being described for all fifteen permutations of the four possible features. The fifteen permutations include one permutation with all four possible features, four permutations with any three features of the four possible features, six permutations with any two features of the four possible features and four permutations with any one feature of the four possible features.

Although mathematically a set may be an empty set, the term set used in this disclosure is a nonempty set. Set B is a subset of set A if every element of set B is in set A. Although mathematically a set has an empty subset, a subset of a set is to be interpreted as a non-empty subset in this disclosure. For example, for set A={subcarrier1, subcarrier2}, the subsets are {subcarrier1}, {subcarrier2} and {subcarrier1, subcarrier2}.

In this disclosure, the phrase "based on" may be used equally with "based at least on" and what follows "based on" or "based at least on" indicates an example of one of plurality of useful alternatives that may be used in an embodiment in this disclosure. The phrase "in response to" may be used equally with "in response at least to" and what follows "in response to" or "in response at least to" indicates an example of one of plurality of useful alternatives that may be used in an embodiment in this disclosure. The phrase "depending on" may be used equally with "depending at least on" and what follows "depending on" or "depending at least on" indicates an example of one of plurality of useful alternatives that may be used in an embodiment in this disclosure. The phrases "employing" and "using" and "employing at least" and "using at least" may be used equally in this in this disclosure and what follows "employing" or "using" or "employing at least" or "using at least" indicates an example of one of plurality of useful alternatives that may be used in an embodiment in this disclosure.

The example embodiments disclosed in this disclosure may be implemented using a modular architecture comprising a plurality of modules. A module may be defined in terms of one or more functions and may be connected to one or more other elements and/or modules. A module may be implemented in hardware, software, firmware, one or more biological elements (e.g., an organic computing device and/or a neurocomputer) and/or a combination thereof and/or alike. Example implementations of a module may be as software code configured to be executed by hardware and/or a modeling and simulation program that may be coupled with hardware. In an example, a module may be implemented using general-purpose or special-purpose processors, digital signal processors (DSPs), microprocessors, microcontrollers, application-specific integrated circuits (ASICs), programmable logic devices (PLDs) and/or alike. The hardware may be programmed using machine language, assembly language, high-level language (e.g., Python, FORTRAN, C, C++ or the like) and/or alike. In an example, the function of a module may be achieved by using a combination of the mentioned implementation methods.

What is claimed is:

1. A method comprising:
receiving, by a wireless device, configuration parameters of:
a semi-persistent scheduling (SPS) configuration; and
one or more discontinuous reception (DRX) timers comprising a DRX retransmission timer;
receiving a downlink control information (DCI) indicating activation of the SPS configuration;
receiving, in a first timing, a first transport block (TB) associated with the SPS configuration;
determining a second timing of a first hybrid automatic repeat request (HARQ) feedback, associated with the first TB, based on the DCI and the first timing; and
starting the DRX retransmission timer in a first symbol, that is adjacent to the first timing, in response to determining to defer the first HARQ feedback based on an uplink control channel resource in the second timing overlapping with a downlink symbol.

2. The method of claim 1, wherein the second timing is not valid for transmission of the first HARQ feedback based on the uplink control channel resource in the second timing overlapping with one or more symbols that are not usable for uplink transmission.

3. The method of claim 2, wherein the second timing is not valid for transmission of the first HARQ feedback based on the uplink control channel resource in the second timing overlapping with the downlink symbol.

4. The method of claim 1, further comprising deferring the first HARQ back until a valid uplink control channel resource that does not have a symbol overlapping with a downlink symbol.

5. The method of claim 1, further comprising:
receiving, in a third timing, a second TB associated with the SPS configuration;
determining a fourth timing of a second HARQ feedback, associated with the second TB, based on the DCI and the third timing; and
starting the DRX retransmission timer in response to expiry of a HARQ round trip time (RTT) timer based on an uplink control channel resource in the fourth timing being valid for transmission of the second HARQ feedback.

6. The method of claim 5, wherein the fourth timing is valid for transmission of the second HARQ feedback based on the uplink control channel resource in the fourth timing not overlapping with a downlink symbol.

7. The method of claim 5, wherein the one or more DRX timers comprise the HARQ RTT timer.

8. The method of claim 1, further comprising monitoring a control channel based on the DRX retransmission timer running.

9. The method of claim 1, wherein the determining the second timing is based on a value of a downlink shared channel to HARQ feedback timing field of the DCI.

10. The method of claim 1, wherein:
the configuration parameters comprise first configuration parameters of the SPS configuration; and
the receiving the TB is via radio resources determined based on the first configuration parameters.

11. A wireless device comprising:
one or more processors; and
memory storing instructions that, when executed by the one or more processors, cause the wireless device to:
receive configuration parameters of:
a semi-persistent scheduling (SPS) configuration; and
one or more discontinuous reception (DRX) timers comprising a DRX retransmission timer;
receive a downlink control information (DCI) indicating activation of the SPS configuration;
receive, in a first timing, a first transport block (TB) associated with the SPS configuration;
determine a second timing of a first hybrid automatic repeat request (HARQ) feedback, associated with the first TB, based on the DCI and the first timing; and
start the DRX retransmission timer in a first symbol, that is adjacent to the first timing, in response to determining to defer the first HARQ feedback based on an uplink control channel resource in the second timing overlapping with a downlink symbol.

12. The wireless device of claim 11, wherein the second timing is not valid for transmission of the first HARQ feedback based on the uplink control channel resource in the second timing overlapping with one or more symbols that are not usable for uplink transmission.

13. The wireless device of claim 12, wherein the second timing is not valid for transmission of the first HARQ feedback based on the uplink control channel resource in the second timing overlapping with the downlink symbol.

14. The wireless device of claim 11, wherein the instructions, when executed by the one or more processors, further cause the wireless device to defer the first HARQ back until a valid uplink control channel resource that does not have a symbol overlapping with a downlink symbol.

15. The wireless device of claim 11, wherein the instructions, when executed by the one or more processors, further cause the wireless device to:
  receive, in a third timing, a second TB associated with the SPS configuration;
  determine a fourth timing of a second HARQ feedback, associated with the second TB, based on the DCI and the third timing; and
  start the DRX retransmission timer in response to expiry of a HARQ round trip time (RTT) timer based on an uplink control channel resource in the fourth timing being valid for transmission of the second HARQ feedback.

16. The wireless device of claim 15, wherein the fourth timing is valid for transmission of the second HARQ feedback based on the uplink control channel resource in the fourth timing not overlapping with a downlink symbol.

17. The wireless device of claim 15, wherein the one or more DRX timers comprise the HARQ RTT timer.

18. The wireless device of claim 11, wherein the instructions, when executed by the one or more processors, further cause the wireless device to monitor a control channel based on the DRX retransmission timer running.

19. The wireless device of claim 11, wherein determining the second timing is based on a value of a downlink shared channel to HARQ feedback timing field of the DCI.

20. The wireless device of claim 11, wherein:
  the configuration parameters comprise first configuration parameters of the SPS configuration; and
  receiving the TB is via radio resources determined based on the first configuration parameters.

* * * * *